(12) United States Patent
Contopanagos et al.

(10) Patent No.: US 11,967,760 B2
(45) Date of Patent: Apr. 23, 2024

(54) POWER WAVE TRANSMISSION TECHNIQUES TO FOCUS WIRELESSLY DELIVERED POWER AT A LOCATION TO PROVIDE USABLE ENERGY TO A RECEIVING DEVICE

(71) Applicant: Energous Corporation, San Jose, CA (US)

(72) Inventors: Charalampos (Harry) Contopanagos, San Jose, CA (US); Chryssoula (Sissy) Kyriazidou, San Jose, CA (US); Anna Papio-Toda, San Jose, CA (US); Sohini Sengupta, Milpitas, CA (US); Farhad Farzami, Milpitas, CA (US)

(73) Assignee: ENERGOUS CORPORATION, San Jose, CA (US)

( * ) Notice: Subject to any disclaimer, the term of this patent is extended or adjusted under 35 U.S.C. 154(b) by 0 days.

(21) Appl. No.: 18/318,669

(22) Filed: May 16, 2023

(65) Prior Publication Data

US 2023/0291094 A1    Sep. 14, 2023

Related U.S. Application Data

(60) Continuation of application No. 17/964,731, filed on Oct. 12, 2022, now Pat. No. 11,699,847, which is a
(Continued)

(51) Int. Cl.
*H01Q 1/38* (2006.01)
*H01Q 21/29* (2006.01)
(Continued)

(52) U.S. Cl.
CPC ............ *H01Q 1/38* (2013.01); *H01Q 21/29* (2013.01); *H01Q 25/007* (2013.01);
(Continued)

(58) Field of Classification Search
CPC . H01Q 1/38; H01Q 21/29; H02J 50/20; H02J 50/40; H02J 50/90
(Continued)

(56) References Cited

U.S. PATENT DOCUMENTS

| | | |
|---|---|---|
| 787,412 A | 4/1905 | Tesla |
| 3,167,775 A | 1/1965 | Guertler |

(Continued)

FOREIGN PATENT DOCUMENTS

| | | |
|---|---|---|
| CN | 201278367 Y | 7/2009 |
| CN | 102292896 A | 12/2011 |

(Continued)

OTHER PUBLICATIONS

Energous Corp., IPRP, PCT/US2014/037072, Nov. 10, 2015, 6 pgs.
(Continued)

*Primary Examiner* — Alfonso Perez Borroto
(74) *Attorney, Agent, or Firm* — Morgan, Lewis & Bockius LLP

(57) ABSTRACT

An example method performed by a wireless-power-transmitting device including an antenna array is provided. The method includes, based on a location of the wireless-power-receiving device, selecting a first value for a first transmission characteristic that is used for transmission of electromagnetic waves by a first antenna group, and a second value, distinct from the first value, for the first transmission characteristic that is used for transmission of electromagnetic waves by a second antenna group. The method also includes transmitting to the location of the wireless-power-receiving device, by the first antenna group, first electromagnetic waves with the first value for the first transmission characteristic, and transmitting to a focal point that is further from the wireless-power-transmitting device than the location of the wireless-power-receiving device, by the second antenna
(Continued)

group, second electromagnetic waves with the second value for the first transmission characteristic.

20 Claims, 92 Drawing Sheets

Related U.S. Application Data division of application No. 16/405,900, filed on May 7, 2019, now Pat. No. 11,515,732.

(60) Provisional application No. 62/689,745, filed on Jun. 25, 2018.

(51) Int. Cl.
| | |
|---|---|
| *H01Q 25/00* | (2006.01) |
| *H02J 50/00* | (2016.01) |
| *H02J 50/20* | (2016.01) |
| *H02J 50/40* | (2016.01) |
| *H01Q 9/26* | (2006.01) |
| *H02J 50/90* | (2016.01) |

(52) U.S. Cl.
CPC ............ *H02J 50/005* (2020.01); *H02J 50/20* (2016.02); *H02J 50/40* (2016.02); *H01Q 9/26* (2013.01); *H02J 50/402* (2020.01); *H02J 50/90* (2016.02)

(58) Field of Classification Search
USPC .......................................................... 307/104
See application file for complete search history.

(56) References Cited

U.S. PATENT DOCUMENTS

| | | |
|---|---|---|
| 3,434,678 A | 3/1969 | Brown et al. |
| 3,696,384 A | 10/1972 | Lester |
| 3,754,269 A | 8/1973 | Clavin |
| 4,101,895 A | 7/1978 | Jones, Jr. |
| 4,360,741 A | 11/1982 | Fitzsimmons et al. |
| 4,944,036 A | 7/1990 | Hyatt |
| 4,995,010 A | 2/1991 | Knight |
| 5,200,759 A | 4/1993 | McGinnis |
| 5,211,471 A | 5/1993 | Rohrs |
| 5,548,292 A | 8/1996 | Hirshfield et al. |
| 5,556,749 A | 9/1996 | Mitsuhashi et al. |
| 5,568,088 A | 10/1996 | Dent et al. |
| 5,646,633 A | 7/1997 | Dahlberg |
| 5,697,063 A | 12/1997 | Kishigami et al. |
| 5,712,642 A | 1/1998 | Hulderman |
| 5,936,527 A | 8/1999 | Isaacman et al. |
| 5,982,139 A | 11/1999 | Parise |
| 6,046,708 A | 4/2000 | MacDonald, Jr. et al. |
| 6,061,025 A | 5/2000 | Jackson et al. |
| 6,127,799 A | 10/2000 | Krishnan |
| 6,127,942 A | 10/2000 | Welle |
| 6,163,296 A | 12/2000 | Lier et al. |
| 6,271,799 B1 | 8/2001 | Rief |
| 6,289,237 B1 | 9/2001 | Mickle et al. |
| 6,329,908 B1 | 12/2001 | Frecska |
| 6,400,586 B2 | 6/2002 | Raddi et al. |
| 6,421,235 B2 | 7/2002 | Ditzik |
| 6,437,685 B2 | 8/2002 | Hanaki |
| 6,456,253 B1 | 9/2002 | Rummeli et al. |
| 6,476,795 B1 | 11/2002 | Derocher et al. |
| 6,501,414 B2 | 12/2002 | Arndt et al. |
| 6,583,723 B2 | 6/2003 | Watanabe et al. |
| 6,597,897 B2 | 7/2003 | Tang |
| 6,615,074 B2 | 9/2003 | Mickle et al. |
| 6,650,376 B1 | 11/2003 | Obitsu |
| 6,664,920 B1 | 12/2003 | Mott et al. |
| 6,680,700 B2 | 1/2004 | Hilgers |
| 6,798,716 B1 | 9/2004 | Charych |
| 6,803,744 B1 | 10/2004 | Sabo |
| 6,853,197 B1 | 2/2005 | McFarland |
| 6,856,291 B2 | 2/2005 | Mickle et al. |
| 6,911,945 B2 | 6/2005 | Korva |
| 6,960,968 B2 | 11/2005 | Odendaal et al. |
| 6,967,462 B1 | 11/2005 | Landis |
| 6,988,026 B2 | 1/2006 | Breed et al. |
| 7,003,350 B2 | 2/2006 | Denker et al. |
| 7,027,311 B2 | 4/2006 | Vanderelli et al. |
| 7,068,234 B2 | 6/2006 | Sievenpiper |
| 7,068,991 B2 | 6/2006 | Parise |
| 7,079,079 B2 | 7/2006 | Jo et al. |
| 7,183,748 B1 | 2/2007 | Unno et al. |
| 7,191,013 B1 | 3/2007 | Miranda et al. |
| 7,193,644 B2 | 3/2007 | Carter |
| 7,196,663 B2 | 3/2007 | Bolzer et al. |
| 7,205,749 B2 | 4/2007 | Hagen et al. |
| 7,215,296 B2 | 5/2007 | Abramov et al. |
| 7,222,356 B1 | 5/2007 | Yonezawa et al. |
| 7,274,334 B2 | 9/2007 | O'Riordan et al. |
| 7,274,336 B2 | 9/2007 | Carson |
| 7,351,975 B2 | 4/2008 | Brady et al. |
| 7,359,730 B2 | 4/2008 | Dennis et al. |
| 7,372,408 B2 | 5/2008 | Gaucher |
| 7,392,068 B2 | 6/2008 | Dayan |
| 7,403,803 B2 | 7/2008 | Mickle et al. |
| 7,443,057 B2 | 10/2008 | Nunally |
| 7,451,839 B2 | 11/2008 | Perlman |
| 7,463,201 B2 | 12/2008 | Chiang et al. |
| 7,471,247 B2 | 12/2008 | Saily |
| 7,535,195 B1 | 5/2009 | Horovitz et al. |
| 7,564,411 B2 | 7/2009 | Piisila et al. |
| 7,614,556 B2 | 11/2009 | Overhultz et al. |
| 7,639,994 B2 | 12/2009 | Greene et al. |
| 7,643,312 B2 | 1/2010 | Vanderelli et al. |
| 7,652,577 B1 | 1/2010 | Madhow et al. |
| 7,679,576 B2 | 3/2010 | Riedel et al. |
| 7,702,771 B2 | 4/2010 | Ewing et al. |
| 7,786,419 B2 | 8/2010 | Hyde et al. |
| 7,812,771 B2 | 10/2010 | Greene et al. |
| 7,830,312 B2 | 11/2010 | Choudhury et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,904,117 B2 | 3/2011 | Doan et al. |
| 7,911,386 B1 | 3/2011 | Itoh et al. |
| 7,925,308 B2 | 4/2011 | Greene et al. |
| 7,948,208 B2 | 5/2011 | Partovi et al. |
| 8,055,003 B2 | 11/2011 | Mittleman et al. |
| 8,070,595 B2 | 12/2011 | Alderucci et al. |
| 8,072,380 B2 | 12/2011 | Crouch |
| 8,092,301 B2 | 1/2012 | Alderucci et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,228,194 B2 | 7/2012 | Mickle |
| 8,234,509 B2 | 7/2012 | Gioscia et al. |
| 8,264,101 B2 | 9/2012 | Hyde et al. |
| 8,264,291 B2 | 9/2012 | Morita |
| 8,276,325 B2 | 10/2012 | Clifton et al. |
| 8,278,784 B2 | 10/2012 | Cook et al. |
| 8,284,101 B2 | 10/2012 | Fusco |
| 8,310,201 B1 | 11/2012 | Wright |
| 8,338,991 B2 | 12/2012 | Von Novak et al. |
| 8,362,745 B2 | 1/2013 | Tinaphong |
| 8,380,255 B2 | 2/2013 | Shearer et al. |
| 8,384,600 B2 | 2/2013 | Huang et al. |
| 8,410,953 B2 | 4/2013 | Zeine |
| 8,411,963 B2 | 4/2013 | Luff |
| 8,432,062 B2 | 4/2013 | Greene et al. |
| 8,432,071 B2 | 4/2013 | Huang et al. |
| 8,446,248 B2 | 5/2013 | Zeine |
| 8,447,234 B2 | 5/2013 | Cook et al. |
| 8,451,189 B1 | 5/2013 | Fluhler |
| 8,452,235 B2 | 5/2013 | Kirby et al. |
| 8,457,656 B2 | 6/2013 | Perkins et al. |
| 8,461,817 B2 | 6/2013 | Martin et al. |
| 8,467,733 B2 | 6/2013 | Leabman |

(56) References Cited

U.S. PATENT DOCUMENTS

| | | |
|---|---|---|
| 8,497,601 B2 | 7/2013 | Hall et al. |
| 8,497,658 B2 | 7/2013 | Von Novak et al. |
| 8,552,597 B2 | 8/2013 | Song et al. |
| 8,558,661 B2 | 10/2013 | Zeine |
| 8,560,026 B2 | 10/2013 | Chanterac |
| 8,564,485 B2 | 10/2013 | Milosavljevic et al. |
| 8,604,746 B2 | 12/2013 | Lee |
| 8,614,643 B2 | 12/2013 | Leabman |
| 8,621,245 B2 | 12/2013 | Shearer et al. |
| 8,626,249 B2 | 1/2014 | Ungari et al. |
| 8,629,576 B2 | 1/2014 | Levine |
| 8,653,966 B2 | 2/2014 | Rao et al. |
| 8,674,551 B2 | 3/2014 | Low et al. |
| 8,686,685 B2 | 4/2014 | Moshfeghi |
| 8,686,905 B2 | 4/2014 | Shtrom |
| 8,712,355 B2 | 4/2014 | Black et al. |
| 8,712,485 B2 | 4/2014 | Tam |
| 8,718,773 B2 | 5/2014 | Wills et al. |
| 8,729,737 B2 | 5/2014 | Schatz et al. |
| 8,736,228 B1 | 5/2014 | Freed et al. |
| 8,760,113 B2 | 6/2014 | Keating |
| 8,770,482 B2 | 7/2014 | Ackermann et al. |
| 8,772,960 B2 | 7/2014 | Yoshida |
| 8,823,319 B2 | 9/2014 | Von Novak, III et al. |
| 8,832,646 B1 | 9/2014 | Wendling |
| 8,854,176 B2 | 10/2014 | Zeine |
| 8,860,364 B2 | 10/2014 | Low et al. |
| 8,897,770 B1 | 11/2014 | Frolov et al. |
| 8,903,456 B2 | 12/2014 | Chu et al. |
| 8,917,057 B2 | 12/2014 | Hui |
| 8,923,189 B2 | 12/2014 | Leabman |
| 8,928,544 B2 | 1/2015 | Massie et al. |
| 8,937,408 B2 | 1/2015 | Ganem et al. |
| 8,946,940 B2 | 2/2015 | Kim et al. |
| 8,963,486 B2 | 2/2015 | Kirby et al. |
| 8,970,070 B2 | 3/2015 | Sada et al. |
| 8,989,053 B1 | 3/2015 | Skaaksrud et al. |
| 9,000,616 B2 | 4/2015 | Greene et al. |
| 9,001,622 B2 | 4/2015 | Perry |
| 9,006,934 B2 | 4/2015 | Kozakai et al. |
| 9,021,277 B2 | 4/2015 | Shearer et al. |
| 9,030,161 B2 | 5/2015 | Lu et al. |
| 9,059,598 B2 | 6/2015 | Kang et al. |
| 9,059,599 B2 | 6/2015 | Won et al. |
| 9,077,188 B2 | 7/2015 | Moshfeghi |
| 9,083,595 B2 | 7/2015 | Rakib et al. |
| 9,088,216 B2 | 7/2015 | Garrity et al. |
| 9,124,125 B2 | 9/2015 | Leabman et al. |
| 9,130,397 B2 | 9/2015 | Leabman et al. |
| 9,130,602 B2 | 9/2015 | Cook |
| 9,142,998 B2 | 9/2015 | Yu et al. |
| 9,143,000 B2 | 9/2015 | Leabman et al. |
| 9,143,010 B2 | 9/2015 | Urano |
| 9,153,074 B2 | 10/2015 | Zhou et al. |
| 9,178,389 B2 | 11/2015 | Hwang |
| 9,225,196 B2 | 12/2015 | Huang et al. |
| 9,240,469 B2 | 1/2016 | Sun et al. |
| 9,242,411 B2 | 1/2016 | Kritchman et al. |
| 9,244,500 B2 | 1/2016 | Cain et al. |
| 9,252,628 B2 | 2/2016 | Leabman et al. |
| 9,270,344 B2 | 2/2016 | Rosenberg |
| 9,276,329 B2 | 3/2016 | Jones et al. |
| 9,282,582 B1 | 3/2016 | Dunsbergen et al. |
| 9,294,840 B1 | 3/2016 | Anderson et al. |
| 9,297,896 B1 | 3/2016 | Andrews |
| 9,318,898 B2 | 4/2016 | John |
| 9,368,020 B1 | 6/2016 | Bell et al. |
| 9,401,977 B1 | 7/2016 | Gaw |
| 9,409,490 B2 | 8/2016 | Kawashima |
| 9,419,335 B2 | 8/2016 | Pintos |
| 9,419,443 B2 | 8/2016 | Leabman |
| 9,438,045 B1 | 9/2016 | Leabman |
| 9,438,046 B1 | 9/2016 | Leabman |
| 9,444,283 B2 | 9/2016 | Son et al. |
| 9,450,449 B1 | 9/2016 | Leabman et al. |
| 9,461,502 B2 | 10/2016 | Lee et al. |
| 9,520,725 B2 | 12/2016 | Masaoka et al. |
| 9,520,748 B2 | 12/2016 | Hyde et al. |
| 9,522,270 B2 | 12/2016 | Perryman et al. |
| 9,537,354 B2 | 1/2017 | Bell et al. |
| 9,537,357 B2 | 1/2017 | Leabman |
| 9,537,358 B2 | 1/2017 | Leabman |
| 9,538,382 B2 | 1/2017 | Bell et al. |
| 9,544,640 B2 | 1/2017 | Lau |
| 9,559,553 B2 | 1/2017 | Bae |
| 9,564,773 B2 | 2/2017 | Pogorelik et al. |
| 9,570,805 B2 * | 2/2017 | Lai .................. H01Q 9/42 |
| 9,571,974 B2 | 2/2017 | Choi et al. |
| 9,590,317 B2 | 3/2017 | Zimmerman et al. |
| 9,590,444 B2 | 3/2017 | Walley |
| 9,620,996 B2 | 4/2017 | Zeine |
| 9,647,328 B2 | 5/2017 | Dobric |
| 9,706,137 B2 | 7/2017 | Scanlon et al. |
| 9,711,999 B2 | 7/2017 | Hietala et al. |
| 9,723,635 B2 | 8/2017 | Nambord et al. |
| 9,793,758 B2 | 10/2017 | Leabman |
| 9,793,764 B2 | 10/2017 | Perry |
| 9,800,080 B2 | 10/2017 | Leabman et al. |
| 9,800,172 B1 | 10/2017 | Leabman |
| 9,806,400 B2 * | 10/2017 | Tseng .................. H01Q 21/28 |
| 9,806,564 B2 | 10/2017 | Leabman |
| 9,819,230 B2 | 11/2017 | Petras et al. |
| 9,824,815 B2 | 11/2017 | Leabman et al. |
| 9,825,674 B1 | 11/2017 | Leabman |
| 9,831,718 B2 | 11/2017 | Leabman et al. |
| 9,838,083 B2 | 12/2017 | Bell et al. |
| 9,843,213 B2 | 12/2017 | Leabman et al. |
| 9,843,229 B2 | 12/2017 | Leabman |
| 9,843,763 B2 | 12/2017 | Leabman et al. |
| 9,847,669 B2 | 12/2017 | Leabman |
| 9,847,677 B1 | 12/2017 | Leabman |
| 9,847,679 B2 | 12/2017 | Bell et al. |
| 9,853,361 B2 | 12/2017 | Chen et al. |
| 9,853,485 B2 | 12/2017 | Contopanagos |
| 9,853,692 B1 | 12/2017 | Bell et al. |
| 9,859,756 B2 | 1/2018 | Leabman et al. |
| 9,859,758 B1 | 1/2018 | Leabman |
| 9,859,797 B1 | 1/2018 | Leabman |
| 9,866,279 B2 | 1/2018 | Bell et al. |
| 9,867,032 B2 | 1/2018 | Verma et al. |
| 9,867,062 B1 | 1/2018 | Bell et al. |
| 9,871,301 B2 | 1/2018 | Contopanagos |
| 9,876,379 B1 | 1/2018 | Leabman et al. |
| 9,876,380 B1 | 1/2018 | Leabman et al. |
| 9,876,394 B1 | 1/2018 | Leabman |
| 9,876,536 B1 | 1/2018 | Bell et al. |
| 9,882,394 B1 | 1/2018 | Bell et al. |
| 9,882,427 B2 | 1/2018 | Leabman et al. |
| 9,887,584 B1 | 2/2018 | Bell et al. |
| 9,887,739 B2 | 2/2018 | Leabman et al. |
| 9,891,669 B2 | 2/2018 | Bell |
| 9,893,554 B2 | 2/2018 | Bell et al. |
| 9,893,555 B1 | 2/2018 | Leabman et al. |
| 9,893,564 B2 | 2/2018 | de Rochemont |
| 9,899,744 B1 * | 2/2018 | Contopanagos ... H01Q 15/0086 |
| 9,899,844 B1 | 2/2018 | Bell et al. |
| 9,899,861 B1 | 2/2018 | Leabman et al. |
| 9,899,873 B2 | 2/2018 | Bell et al. |
| 9,906,065 B2 | 2/2018 | Leabman et al. |
| 9,906,275 B2 | 2/2018 | Leabman |
| 9,912,199 B2 | 3/2018 | Leabman et al. |
| 9,917,477 B1 | 3/2018 | Bell et al. |
| 9,923,386 B1 | 3/2018 | Leabman et al. |
| 9,939,864 B1 | 4/2018 | Bell et al. |
| 9,941,747 B2 | 4/2018 | Bell et al. |
| 9,941,754 B2 | 4/2018 | Leabman et al. |
| 9,948,135 B2 | 4/2018 | Leabman et al. |
| 9,954,374 B1 | 4/2018 | Bell et al. |
| 9,965,009 B1 | 5/2018 | Bell et al. |
| 9,966,765 B1 | 5/2018 | Leabman |
| 9,966,784 B2 | 5/2018 | Leabman |
| 9,967,743 B1 | 5/2018 | Bell et al. |
| 9,973,008 B1 | 5/2018 | Leabman |
| 10,003,211 B1 | 6/2018 | Leabman et al. |

(56) References Cited

U.S. PATENT DOCUMENTS

| | | |
|---|---|---|
| 10,008,889 B2 | 6/2018 | Bell et al. |
| 10,014,728 B1 | 7/2018 | Leabman |
| 10,027,159 B2 | 7/2018 | Hosseini |
| 10,038,337 B1 | 7/2018 | Leabman et al. |
| 10,050,462 B1 | 8/2018 | Leabman et al. |
| 10,056,782 B1 | 8/2018 | Leabman |
| 10,063,064 B1 | 8/2018 | Bell et al. |
| 10,063,105 B2 | 8/2018 | Leabman |
| 10,063,106 B2 | 8/2018 | Bell et al. |
| 10,068,703 B1 | 9/2018 | Contopanagos |
| 10,075,008 B1 | 9/2018 | Bell et al. |
| 10,079,515 B2 | 9/2018 | Hosseini et al. |
| 10,090,699 B1 | 10/2018 | Leabman |
| 10,090,886 B1 | 10/2018 | Bell et al. |
| 10,103,552 B1 | 10/2018 | Leabman et al. |
| 10,103,582 B2 | 10/2018 | Leabman et al. |
| 10,116,170 B1 | 10/2018 | Leabman |
| 10,122,219 B1 | 11/2018 | Hosseini et al. |
| 10,124,754 B1 | 11/2018 | Leabman |
| 10,128,686 B1 | 11/2018 | Leabman et al. |
| 10,128,693 B2 | 11/2018 | Bell et al. |
| 10,128,695 B2 | 11/2018 | Leabman et al. |
| 10,128,699 B2 | 11/2018 | Leabman |
| 10,134,260 B1 | 11/2018 | Bell et al. |
| 10,135,112 B1 | 11/2018 | Hosseini |
| 10,135,286 B2 | 11/2018 | Hosseini et al. |
| 10,135,294 B1 | 11/2018 | Leabman |
| 10,135,295 B2 | 11/2018 | Leabman |
| 10,141,768 B2 | 11/2018 | Leabman et al. |
| 10,141,771 B1 | 11/2018 | Hosseini et al. |
| 10,141,791 B2 | 11/2018 | Bell et al. |
| 10,148,097 B1 | 12/2018 | Leabman et al. |
| 10,148,133 B2 | 12/2018 | Leabman et al. |
| 10,153,645 B1 | 12/2018 | Bell et al. |
| 10,153,653 B1 | 12/2018 | Bell et al. |
| 10,153,660 B1 | 12/2018 | Leabman et al. |
| 10,158,257 B2 | 12/2018 | Leabman |
| 10,158,259 B1 | 12/2018 | Leabman |
| 10,164,478 B2 | 12/2018 | Leabman |
| 10,170,917 B1 | 1/2019 | Bell et al. |
| 10,177,594 B2 | 1/2019 | Contopanagos |
| 10,181,756 B2 | 1/2019 | Bae et al. |
| 10,186,892 B2 | 1/2019 | Hosseini et al. |
| 10,186,893 B2 | 1/2019 | Bell et al. |
| 10,186,911 B2 | 1/2019 | Leabman |
| 10,186,913 B2 | 1/2019 | Leabman et al. |
| 10,193,396 B1 | 1/2019 | Bell et al. |
| 10,199,835 B2 | 2/2019 | Leabman |
| 10,199,849 B1 | 2/2019 | Bell |
| 10,199,850 B2 | 2/2019 | Leabman |
| 10,205,239 B1 | 2/2019 | Contopanagos et al. |
| 10,206,185 B2 | 2/2019 | Leabman et al. |
| 10,211,674 B1 | 2/2019 | Leabman et al. |
| 10,211,680 B2 | 2/2019 | Leabman et al. |
| 10,211,682 B2 | 2/2019 | Bell et al. |
| 10,211,685 B2 | 2/2019 | Bell et al. |
| 10,218,207 B2 | 2/2019 | Hosseini et al. |
| 10,218,227 B2 | 2/2019 | Leabman et al. |
| 10,223,717 B1 | 3/2019 | Bell |
| 10,224,758 B2 | 3/2019 | Leabman et al. |
| 10,224,982 B1 | 3/2019 | Leabman |
| 10,230,266 B1 | 3/2019 | Leabman et al. |
| 10,243,414 B1 | 3/2019 | Leabman et al. |
| 10,256,657 B2 | 4/2019 | Hosseini et al. |
| 10,256,677 B2 | 4/2019 | Hosseini et al. |
| 10,263,432 B1 | 4/2019 | Leabman et al. |
| 10,263,476 B2 | 4/2019 | Leabman |
| 10,270,261 B2 | 4/2019 | Bell et al. |
| 10,277,054 B2 | 4/2019 | Hosseini |
| 10,291,055 B1 | 5/2019 | Bell et al. |
| 10,291,056 B2 | 5/2019 | Bell et al. |
| 10,291,066 B1 | 5/2019 | Leabman |
| 10,291,294 B2 | 5/2019 | Leabman |
| 10,298,024 B2 | 5/2019 | Leabman |
| 10,298,133 B2 | 5/2019 | Leabman |
| 10,305,315 B2 | 5/2019 | Leabman et al. |
| 10,312,715 B2 | 6/2019 | Leabman |
| 10,320,446 B2 | 6/2019 | Hosseini |
| 10,355,534 B2 | 7/2019 | Johnston et al. |
| 10,381,880 B2 | 8/2019 | Leabman et al. |
| 10,389,161 B2 | 8/2019 | Hosseini et al. |
| 10,396,588 B2 | 8/2019 | Leabman |
| 10,396,604 B2 | 8/2019 | Bell et al. |
| 10,439,442 B2 | 10/2019 | Hosseini et al. |
| 10,439,448 B2 | 10/2019 | Bell et al. |
| 10,447,093 B2 | 10/2019 | Hosseini |
| 10,476,312 B2 | 11/2019 | Johnston et al. |
| 10,490,346 B2 | 11/2019 | Contopanagos |
| 10,491,029 B2 | 11/2019 | Hosseini |
| 10,498,144 B2 | 12/2019 | Leabman et al. |
| 10,511,097 B2 | 12/2019 | Kornaros et al. |
| 10,516,289 B2 | 12/2019 | Leabman et al. |
| 10,516,301 B2 | 12/2019 | Leabman |
| 10,523,033 B2 | 12/2019 | Leabman |
| 10,523,058 B2 | 12/2019 | Leabman |
| 10,554,052 B2 | 2/2020 | Bell et al. |
| 10,680,319 B2 | 6/2020 | Hosseini et al. |
| 10,714,984 B2 | 7/2020 | Hosseini et al. |
| 10,734,717 B2 | 8/2020 | Hosseini |
| 10,778,041 B2 | 9/2020 | Leabman |
| 10,790,674 B2 | 9/2020 | Bell et al. |
| 10,848,853 B2 | 11/2020 | Leabman et al. |
| 10,879,740 B2 | 12/2020 | Hosseini |
| 10,923,954 B2 | 2/2021 | Leabman |
| 10,965,164 B2 | 3/2021 | Leabman et al. |
| 10,992,187 B2 | 4/2021 | Leabman |
| 11,011,942 B2 | 5/2021 | Liu |
| 11,056,929 B2 | 7/2021 | Bell et al. |
| 11,114,885 B2 | 9/2021 | Hosseini et al. |
| 11,233,425 B2 | 1/2022 | Leabman |
| 11,342,798 B2 | 5/2022 | Johnston et al. |
| 11,515,732 B2 | 11/2022 | Contopanagos et al. |
| 11,699,847 B2 | 7/2023 | Contopanagos et al. |
| 2001/0027876 A1 | 10/2001 | Tsukamoto et al. |
| 2002/0001307 A1 | 1/2002 | Nguyen et al. |
| 2002/0024471 A1 | 2/2002 | Ishitobi |
| 2002/0028655 A1 | 3/2002 | Rosener et al. |
| 2002/0034958 A1 | 3/2002 | Oberschmidt et al. |
| 2002/0054330 A1 | 5/2002 | Jinbo et al. |
| 2002/0065052 A1 | 5/2002 | Pande et al. |
| 2002/0072784 A1 | 6/2002 | Sheppard et al. |
| 2002/0095980 A1 | 7/2002 | Breed et al. |
| 2002/0103447 A1 | 8/2002 | Terry |
| 2002/0123776 A1 | 9/2002 | Von Arx |
| 2002/0133592 A1 | 9/2002 | Matsuda |
| 2002/0171594 A1 | 11/2002 | Fang |
| 2002/0172223 A1 | 11/2002 | Stilp |
| 2002/0196192 A1 | 12/2002 | Nagumo et al. |
| 2003/0005759 A1 | 1/2003 | Breed et al. |
| 2003/0058187 A1 | 3/2003 | Billiet et al. |
| 2003/0076274 A1 | 4/2003 | Phelan et al. |
| 2003/0179152 A1 | 9/2003 | Watada et al. |
| 2003/0179573 A1 | 9/2003 | Chun |
| 2003/0192053 A1 | 10/2003 | Sheppard et al. |
| 2004/0019624 A1 | 1/2004 | Sukegawa |
| 2004/0020100 A1 | 2/2004 | O'Brien et al. |
| 2004/0036657 A1 | 2/2004 | Forster et al. |
| 2004/0066251 A1 | 4/2004 | Eleftheriades et al. |
| 2004/0095282 A1 | 5/2004 | Fukushima et al. |
| 2004/0107641 A1 | 6/2004 | Walton et al. |
| 2004/0113543 A1 | 6/2004 | Daniels |
| 2004/0119675 A1 | 6/2004 | Washio et al. |
| 2004/0130425 A1 | 7/2004 | Dayan et al. |
| 2004/0130442 A1 | 7/2004 | Breed |
| 2004/0142733 A1 | 7/2004 | Parise |
| 2004/0145342 A1 | 7/2004 | Lyon |
| 2004/0196190 A1 | 10/2004 | Mendolia et al. |
| 2004/0203979 A1 | 10/2004 | Attar et al. |
| 2004/0207559 A1 | 10/2004 | Milosavljevic |
| 2004/0218759 A1 | 11/2004 | Yacobi |
| 2004/0259604 A1 | 12/2004 | Mickle et al. |
| 2004/0263124 A1 | 12/2004 | Wieck et al. |
| 2005/0007276 A1 | 1/2005 | Barrick et al. |
| 2005/0030118 A1 | 2/2005 | Wang |

(56) References Cited

U.S. PATENT DOCUMENTS

| | | |
|---|---|---|
| 2005/0046584 A1 | 3/2005 | Breed |
| 2005/0055316 A1 | 3/2005 | Williams |
| 2005/0077872 A1 | 4/2005 | Single |
| 2005/0093766 A1 | 5/2005 | Turner |
| 2005/0116683 A1 | 6/2005 | Cheng |
| 2005/0117660 A1 | 6/2005 | Vialle et al. |
| 2005/0134517 A1 | 6/2005 | Gottl |
| 2005/0171411 A1 | 8/2005 | KenKnight |
| 2005/0198673 A1 | 9/2005 | Kit et al. |
| 2005/0227619 A1 | 10/2005 | Lee et al. |
| 2005/0232469 A1 | 10/2005 | Schofield |
| 2005/0237249 A1 | 10/2005 | Nagel |
| 2005/0237258 A1 | 10/2005 | Abramov et al. |
| 2005/0282591 A1 | 12/2005 | Shaff |
| 2006/0013335 A1 | 1/2006 | Leabman |
| 2006/0019712 A1 | 1/2006 | Choi |
| 2006/0030279 A1 | 2/2006 | Leabman et al. |
| 2006/0033674 A1 | 2/2006 | Essig, Jr. et al. |
| 2006/0071308 A1 | 4/2006 | Tang et al. |
| 2006/0092079 A1 | 5/2006 | de Rochemont |
| 2006/0094425 A1 | 5/2006 | Mickle et al. |
| 2006/0113955 A1 | 6/2006 | Nunally |
| 2006/0119532 A1 | 6/2006 | Yun et al. |
| 2006/0136004 A1 | 6/2006 | Cowan et al. |
| 2006/0160517 A1 | 7/2006 | Yoon |
| 2006/0183473 A1 | 8/2006 | Ukon |
| 2006/0190063 A1 | 8/2006 | Kanzius |
| 2006/0192913 A1 | 8/2006 | Shutou et al. |
| 2006/0199620 A1 | 9/2006 | Greene et al. |
| 2006/0238365 A1 | 10/2006 | Vecchione et al. |
| 2006/0266564 A1 | 11/2006 | Perlman et al. |
| 2006/0266917 A1 | 11/2006 | Baldis et al. |
| 2006/0278706 A1 | 12/2006 | Hatakayama et al. |
| 2006/0284593 A1 | 12/2006 | Nagy et al. |
| 2006/0287094 A1 | 12/2006 | Mahaffey et al. |
| 2007/0007821 A1 | 1/2007 | Rossetti |
| 2007/0019693 A1 | 1/2007 | Graham |
| 2007/0021140 A1 | 1/2007 | Keyes, IV et al. |
| 2007/0060185 A1 | 3/2007 | Simon et al. |
| 2007/0070490 A1 | 3/2007 | Tsunoda et al. |
| 2007/0090997 A1 | 4/2007 | Brown et al. |
| 2007/0093269 A1 | 4/2007 | Leabman et al. |
| 2007/0097653 A1 | 5/2007 | Gilliland et al. |
| 2007/0103110 A1 | 5/2007 | Sagoo |
| 2007/0106894 A1 | 5/2007 | Zhang |
| 2007/0109121 A1 | 5/2007 | Cohen |
| 2007/0139000 A1 | 6/2007 | Kozuma |
| 2007/0149162 A1 | 6/2007 | Greene et al. |
| 2007/0164868 A1 | 7/2007 | Deavours et al. |
| 2007/0173196 A1 | 7/2007 | Gallic |
| 2007/0173214 A1 | 7/2007 | Mickle et al. |
| 2007/0178857 A1 | 8/2007 | Greene et al. |
| 2007/0178945 A1 | 8/2007 | Cook et al. |
| 2007/0182367 A1 | 8/2007 | Partovi |
| 2007/0191074 A1 | 8/2007 | Harrist et al. |
| 2007/0191075 A1 | 8/2007 | Greene et al. |
| 2007/0197281 A1 | 8/2007 | Stronach |
| 2007/0210960 A1 | 9/2007 | Rofougaran et al. |
| 2007/0222681 A1 | 9/2007 | Greene et al. |
| 2007/0228833 A1 | 10/2007 | Stevens et al. |
| 2007/0257634 A1 | 11/2007 | Leschin et al. |
| 2007/0273486 A1 | 11/2007 | Shiotsu |
| 2007/0291165 A1 | 12/2007 | Wang |
| 2007/0296639 A1 | 12/2007 | Hook et al. |
| 2007/0298846 A1 | 12/2007 | Greene et al. |
| 2008/0014897 A1 | 1/2008 | Cook et al. |
| 2008/0024376 A1 | 1/2008 | Norris et al. |
| 2008/0048917 A1 | 2/2008 | Achour et al. |
| 2008/0062062 A1 | 3/2008 | Borau et al. |
| 2008/0062255 A1 | 3/2008 | Gal |
| 2008/0067874 A1 | 3/2008 | Tseng |
| 2008/0074324 A1 | 3/2008 | Puzella et al. |
| 2008/0089277 A1 | 4/2008 | Alexander et al. |
| 2008/0110263 A1 | 5/2008 | Klessel et al. |
| 2008/0113816 A1 | 5/2008 | Mahaffey et al. |
| 2008/0122297 A1 | 5/2008 | Arai |
| 2008/0123383 A1 | 5/2008 | Shionoiri |
| 2008/0129536 A1 | 6/2008 | Randall et al. |
| 2008/0140278 A1 | 6/2008 | Breed |
| 2008/0169910 A1 | 7/2008 | Greene et al. |
| 2008/0197802 A1 | 8/2008 | Onishi |
| 2008/0204342 A1 | 8/2008 | Kharadly |
| 2008/0204350 A1 | 8/2008 | Tam et al. |
| 2008/0210762 A1 | 9/2008 | Osada et al. |
| 2008/0211458 A1 | 9/2008 | Lawther et al. |
| 2008/0233890 A1 | 9/2008 | Baker |
| 2008/0248758 A1 | 10/2008 | Schedelbeck et al. |
| 2008/0248846 A1 | 10/2008 | Stronach et al. |
| 2008/0252532 A1* | 10/2008 | Oh .................... H01Q 5/371 343/700 MS |
| 2008/0258993 A1 | 10/2008 | Gummalla et al. |
| 2008/0266191 A1 | 10/2008 | Hilgers |
| 2008/0278378 A1 | 11/2008 | Chang et al. |
| 2008/0309452 A1 | 12/2008 | Zeine |
| 2009/0002493 A1 | 1/2009 | Kates |
| 2009/0009401 A1 | 1/2009 | Suzuki et al. |
| 2009/0010316 A1 | 1/2009 | Rofougaran et al. |
| 2009/0019183 A1 | 1/2009 | Wu et al. |
| 2009/0036065 A1 | 2/2009 | Siu |
| 2009/0039828 A1 | 2/2009 | Jakubowski |
| 2009/0047998 A1 | 2/2009 | Alberth, Jr. |
| 2009/0058354 A1 | 3/2009 | Harrison |
| 2009/0058361 A1 | 3/2009 | John |
| 2009/0058731 A1 | 3/2009 | Geary et al. |
| 2009/0060012 A1 | 3/2009 | Gresset et al. |
| 2009/0067198 A1 | 3/2009 | Graham et al. |
| 2009/0067208 A1 | 3/2009 | Martin et al. |
| 2009/0073066 A1 | 3/2009 | Jordon et al. |
| 2009/0096412 A1 | 4/2009 | Huang |
| 2009/0096413 A1 | 4/2009 | Partovi |
| 2009/0102292 A1 | 4/2009 | Cook et al. |
| 2009/0102296 A1 | 4/2009 | Greene et al. |
| 2009/0108679 A1 | 4/2009 | Porwal |
| 2009/0122847 A1 | 5/2009 | Nysen et al. |
| 2009/0128262 A1 | 5/2009 | Lee et al. |
| 2009/0157911 A1 | 6/2009 | Aihara |
| 2009/0179815 A1 | 7/2009 | Sotoma et al. |
| 2009/0200985 A1 | 8/2009 | Zane et al. |
| 2009/0206791 A1 | 8/2009 | Jung |
| 2009/0207090 A1 | 8/2009 | Pettus et al. |
| 2009/0207092 A1 | 8/2009 | Nysen et al. |
| 2009/0218884 A1 | 9/2009 | Soar |
| 2009/0218891 A1 | 9/2009 | McCollough |
| 2009/0219903 A1 | 9/2009 | Alamouti et al. |
| 2009/0243397 A1 | 10/2009 | Cook et al. |
| 2009/0264069 A1 | 10/2009 | Yamasuge |
| 2009/0271048 A1 | 10/2009 | Wakamatsu |
| 2009/0280866 A1 | 11/2009 | Lo et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284220 A1 | 11/2009 | Toncich et al. |
| 2009/0284227 A1 | 11/2009 | Mohammadian et al. |
| 2009/0284325 A1 | 11/2009 | Rossiter et al. |
| 2009/0286475 A1 | 11/2009 | Toncich et al. |
| 2009/0286476 A1 | 11/2009 | Toncich et al. |
| 2009/0291634 A1 | 11/2009 | Saarisalo |
| 2009/0299175 A1 | 12/2009 | Bernstein et al. |
| 2009/0308936 A1 | 12/2009 | Nitzan et al. |
| 2009/0312046 A1 | 12/2009 | Clevenger et al. |
| 2009/0315412 A1 | 12/2009 | Yamamoto et al. |
| 2009/0322281 A1 | 12/2009 | Kamijo et al. |
| 2010/0001683 A1 | 1/2010 | Huang et al. |
| 2010/0007307 A1 | 1/2010 | Baarman et al. |
| 2010/0007569 A1 | 1/2010 | Sim et al. |
| 2010/0019686 A1 | 1/2010 | Gutierrez, Jr. |
| 2010/0019908 A1 | 1/2010 | Cho et al. |
| 2010/0026605 A1 | 2/2010 | Yang et al. |
| 2010/0027379 A1 | 2/2010 | Saulnier et al. |
| 2010/0029383 A1 | 2/2010 | Dai |
| 2010/0033021 A1 | 2/2010 | Bennett |
| 2010/0033390 A1 | 2/2010 | Alamouti et al. |
| 2010/0034238 A1 | 2/2010 | Bennett |
| 2010/0041453 A1 | 2/2010 | Grimm, Jr. |

(56) References Cited

U.S. PATENT DOCUMENTS

| | | |
|---|---|---|
| 2010/0044123 A1 | 2/2010 | Perlman et al. |
| 2010/0054200 A1 | 3/2010 | Tsai |
| 2010/0060534 A1 | 3/2010 | Oodachi |
| 2010/0066631 A1 | 3/2010 | Puzella et al. |
| 2010/0075607 A1 | 3/2010 | Hosoya |
| 2010/0079005 A1 | 4/2010 | Hyde et al. |
| 2010/0082193 A1 | 4/2010 | Chiappetta |
| 2010/0087227 A1 | 4/2010 | Francos et al. |
| 2010/0090524 A1 | 4/2010 | Obayashi |
| 2010/0090656 A1 | 4/2010 | Shearer et al. |
| 2010/0109443 A1 | 5/2010 | Cook et al. |
| 2010/0117926 A1 | 5/2010 | DeJean, II |
| 2010/0119234 A1 | 5/2010 | Suematsu et al. |
| 2010/0123618 A1 | 5/2010 | Martin et al. |
| 2010/0123624 A1 | 5/2010 | Minear et al. |
| 2010/0124040 A1 | 5/2010 | Diebel et al. |
| 2010/0127660 A1 | 5/2010 | Cook et al. |
| 2010/0142418 A1 | 6/2010 | Nishioka et al. |
| 2010/0142509 A1 | 6/2010 | Zhu et al. |
| 2010/0148723 A1 | 6/2010 | Cook et al. |
| 2010/0151808 A1 | 6/2010 | Toncich et al. |
| 2010/0156721 A1 | 6/2010 | Alamouti et al. |
| 2010/0156741 A1 | 6/2010 | Vazquez et al. |
| 2010/0164296 A1 | 7/2010 | Kurs et al. |
| 2010/0164433 A1 | 7/2010 | Janefalker et al. |
| 2010/0167664 A1 | 7/2010 | Szini |
| 2010/0171461 A1 | 7/2010 | Baarman et al. |
| 2010/0171676 A1 | 7/2010 | Tani et al. |
| 2010/0174629 A1 | 7/2010 | Taylor et al. |
| 2010/0176934 A1 | 7/2010 | Chou et al. |
| 2010/0181961 A1 | 7/2010 | Novak et al. |
| 2010/0181964 A1 | 7/2010 | Huggins et al. |
| 2010/0194206 A1 | 8/2010 | Burdo et al. |
| 2010/0201189 A1 | 8/2010 | Kirby et al. |
| 2010/0201201 A1 | 8/2010 | Mobarhan et al. |
| 2010/0201314 A1 | 8/2010 | Toncich et al. |
| 2010/0207572 A1 | 8/2010 | Kirby et al. |
| 2010/0210233 A1 | 8/2010 | Cook et al. |
| 2010/0213895 A1 | 8/2010 | Keating et al. |
| 2010/0214177 A1 | 8/2010 | Parsche |
| 2010/0222010 A1 | 9/2010 | Ozaki et al. |
| 2010/0225270 A1 | 9/2010 | Jacobs et al. |
| 2010/0227570 A1 | 9/2010 | Hendin |
| 2010/0231470 A1 | 9/2010 | Lee et al. |
| 2010/0237709 A1 | 9/2010 | Hall et al. |
| 2010/0244576 A1 | 9/2010 | Hillan et al. |
| 2010/0256831 A1 | 10/2010 | Abramo et al. |
| 2010/0259110 A1 | 10/2010 | Kurs et al. |
| 2010/0259447 A1 | 10/2010 | Crouch |
| 2010/0264747 A1 | 10/2010 | Hall et al. |
| 2010/0277003 A1 | 11/2010 | Von Novak et al. |
| 2010/0277121 A1 | 11/2010 | Hall et al. |
| 2010/0279606 A1 | 11/2010 | Hillan et al. |
| 2010/0295372 A1 | 11/2010 | Hyde et al. |
| 2010/0308651 A1 | 12/2010 | Rofougaran et al. |
| 2010/0308767 A1 | 12/2010 | Rofougaran et al. |
| 2010/0309079 A1 | 12/2010 | Rofougaran et al. |
| 2010/0309088 A1 | 12/2010 | Hyvonen et al. |
| 2010/0315045 A1 | 12/2010 | Zeine |
| 2010/0316163 A1 | 12/2010 | Forenza et al. |
| 2010/0327766 A1 | 12/2010 | Recker et al. |
| 2010/0328044 A1 | 12/2010 | Waffenschmidt et al. |
| 2010/0332401 A1 | 12/2010 | Prahlad et al. |
| 2011/0013198 A1 | 1/2011 | Shirley |
| 2011/0018360 A1 | 1/2011 | Baarman et al. |
| 2011/0028114 A1 | 2/2011 | Kerselaers |
| 2011/0031928 A1 | 2/2011 | Soar |
| 2011/0032149 A1 | 2/2011 | Leabman |
| 2011/0032866 A1 | 2/2011 | Leabman |
| 2011/0034190 A1 | 2/2011 | Leabman |
| 2011/0034191 A1 | 2/2011 | Leabman |
| 2011/0043047 A1 | 2/2011 | Karalis et al. |
| 2011/0043163 A1 | 2/2011 | Baarman et al. |
| 2011/0043327 A1 | 2/2011 | Baarman et al. |
| 2011/0050166 A1 | 3/2011 | Cook et al. |
| 2011/0055037 A1 | 3/2011 | Hayashigawa et al. |
| 2011/0056215 A1 | 3/2011 | Ham |
| 2011/0057607 A1 | 3/2011 | Carobolante |
| 2011/0057853 A1 | 3/2011 | Kim et al. |
| 2011/0062788 A1 | 3/2011 | Chen et al. |
| 2011/0074342 A1 | 3/2011 | MacLaughlin |
| 2011/0074349 A1 | 3/2011 | Ghovanloo |
| 2011/0074620 A1 | 3/2011 | Wintermantel |
| 2011/0078092 A1 | 3/2011 | Kim et al. |
| 2011/0090126 A1 | 4/2011 | Szini et al. |
| 2011/0109167 A1 | 5/2011 | Park et al. |
| 2011/0114401 A1 | 5/2011 | Kanno |
| 2011/0115303 A1 | 5/2011 | Baarman et al. |
| 2011/0115432 A1 | 5/2011 | El-Maleh |
| 2011/0115605 A1 | 5/2011 | Dimig et al. |
| 2011/0121660 A1 | 5/2011 | Azancot et al. |
| 2011/0122018 A1 | 5/2011 | Tarng et al. |
| 2011/0122026 A1 | 5/2011 | DeLaquil et al. |
| 2011/0127845 A1 | 6/2011 | Walley et al. |
| 2011/0127952 A1 | 6/2011 | Walley et al. |
| 2011/0133655 A1 | 6/2011 | Recker et al. |
| 2011/0133691 A1 | 6/2011 | Hautanen |
| 2011/0148578 A1 | 6/2011 | Aloi et al. |
| 2011/0148595 A1 | 6/2011 | Miller et al. |
| 2011/0151789 A1 | 6/2011 | Viglione et al. |
| 2011/0154429 A1 | 6/2011 | Stantchev |
| 2011/0156494 A1 | 6/2011 | Mashinsky |
| 2011/0156640 A1 | 6/2011 | Moshfeghi |
| 2011/0163128 A1 | 7/2011 | Taguchi et al. |
| 2011/0175455 A1 | 7/2011 | Hashiguchi |
| 2011/0175461 A1 | 7/2011 | Tinaphong |
| 2011/0181120 A1 | 7/2011 | Liu et al. |
| 2011/0182245 A1 | 7/2011 | Malkamaki et al. |
| 2011/0184842 A1 | 7/2011 | Melen |
| 2011/0188207 A1 | 8/2011 | Won et al. |
| 2011/0193688 A1 | 8/2011 | Forsell |
| 2011/0194543 A1 | 8/2011 | Zhao et al. |
| 2011/0195722 A1 | 8/2011 | Walter et al. |
| 2011/0199046 A1 | 8/2011 | Tsai et al. |
| 2011/0215086 A1 | 9/2011 | Yeh |
| 2011/0217923 A1 | 9/2011 | Ma |
| 2011/0220634 A1 | 9/2011 | Yeh |
| 2011/0221389 A1 | 9/2011 | Won et al. |
| 2011/0222272 A1 | 9/2011 | Yeh |
| 2011/0243040 A1 | 10/2011 | Khan et al. |
| 2011/0243050 A1 | 10/2011 | Yanover |
| 2011/0244913 A1 | 10/2011 | Kim et al. |
| 2011/0248573 A1 | 10/2011 | Kanno et al. |
| 2011/0248575 A1 | 10/2011 | Kim et al. |
| 2011/0249678 A1 | 10/2011 | Bonicatto |
| 2011/0254377 A1 | 10/2011 | Wildmer et al. |
| 2011/0254503 A1 | 10/2011 | Widmer et al. |
| 2011/0259953 A1 | 10/2011 | Baarman et al. |
| 2011/0273977 A1 | 11/2011 | Shapira et al. |
| 2011/0278941 A1 | 11/2011 | Krishna et al. |
| 2011/0279226 A1 | 11/2011 | Chen et al. |
| 2011/0281535 A1 | 11/2011 | Low et al. |
| 2011/0282415 A1 | 11/2011 | Eckhoff et al. |
| 2011/0285213 A1 | 11/2011 | Kowalewski |
| 2011/0286374 A1 | 11/2011 | Shin et al. |
| 2011/0291489 A1 | 12/2011 | Tsai et al. |
| 2011/0302078 A1 | 12/2011 | Failing |
| 2011/0304216 A1 | 12/2011 | Baarman |
| 2011/0304437 A1 | 12/2011 | Beeler |
| 2011/0304521 A1 | 12/2011 | Ando et al. |
| 2012/0007441 A1 | 1/2012 | John |
| 2012/0013196 A1 | 1/2012 | Kim et al. |
| 2012/0013198 A1 | 1/2012 | Uramoto et al. |
| 2012/0013296 A1 | 1/2012 | Heydari et al. |
| 2012/0019419 A1 | 1/2012 | Prat et al. |
| 2012/0043887 A1 | 2/2012 | Mesibov |
| 2012/0051109 A1 | 3/2012 | Kim et al. |
| 2012/0051294 A1 | 3/2012 | Guillouard |
| 2012/0056486 A1 | 3/2012 | Endo et al. |
| 2012/0056741 A1 | 3/2012 | Zhu et al. |
| 2012/0068906 A1 | 3/2012 | Asher et al. |
| 2012/0074891 A1 | 3/2012 | Anderson et al. |
| 2012/0080944 A1 | 4/2012 | Recker et al. |
| 2012/0080957 A1 | 4/2012 | Cooper et al. |

(56) References Cited

U.S. PATENT DOCUMENTS

| | | |
|---|---|---|
| 2012/0086284 A1 | 4/2012 | Capanella et al. |
| 2012/0086615 A1 | 4/2012 | Norair |
| 2012/0095617 A1 | 4/2012 | Martin et al. |
| 2012/0098350 A1 | 4/2012 | Campanella et al. |
| 2012/0098485 A1 | 4/2012 | Kang et al. |
| 2012/0099675 A1 | 4/2012 | Kitamura et al. |
| 2012/0103562 A1 | 5/2012 | Alexander |
| 2012/0104849 A1 | 5/2012 | Jackson |
| 2012/0105252 A1 | 5/2012 | Wang |
| 2012/0112532 A1 | 5/2012 | Kesler et al. |
| 2012/0119914 A1 | 5/2012 | Uchida |
| 2012/0126743 A1 | 5/2012 | Rivers, Jr. |
| 2012/0132647 A1 | 5/2012 | Beverly et al. |
| 2012/0133214 A1 | 5/2012 | Yun et al. |
| 2012/0142291 A1 | 6/2012 | Rath et al. |
| 2012/0146426 A1 | 6/2012 | Sabo |
| 2012/0146576 A1 | 6/2012 | Partovi |
| 2012/0146577 A1 | 6/2012 | Tanabe |
| 2012/0147802 A1 | 6/2012 | Ukita et al. |
| 2012/0149307 A1 | 6/2012 | Terada et al. |
| 2012/0150670 A1 | 6/2012 | Taylor et al. |
| 2012/0153894 A1 | 6/2012 | Widmer et al. |
| 2012/0157019 A1 | 6/2012 | Li |
| 2012/0161531 A1 | 6/2012 | Kim et al. |
| 2012/0161544 A1 | 6/2012 | Kashiwagi et al. |
| 2012/0169276 A1 | 7/2012 | Wang |
| 2012/0169278 A1 | 7/2012 | Choi |
| 2012/0173418 A1 | 7/2012 | Beardsmore et al. |
| 2012/0179004 A1 | 7/2012 | Roesicke et al. |
| 2012/0181973 A1 | 7/2012 | Lyden |
| 2012/0182427 A1 | 7/2012 | Marshall |
| 2012/0188142 A1 | 7/2012 | Shashi et al. |
| 2012/0193999 A1 | 8/2012 | Zeine |
| 2012/0200399 A1 | 8/2012 | Chae |
| 2012/0201153 A1 | 8/2012 | Bharadia et al. |
| 2012/0201173 A1 | 8/2012 | Jain et al. |
| 2012/0206299 A1 | 8/2012 | Valdes-Garcia |
| 2012/0211214 A1 | 8/2012 | Phan |
| 2012/0212071 A1 | 8/2012 | Miyabayashi et al. |
| 2012/0212072 A1 | 8/2012 | Miyabayashi et al. |
| 2012/0214462 A1 | 8/2012 | Chu et al. |
| 2012/0214536 A1 | 8/2012 | Kim et al. |
| 2012/0228392 A1 | 9/2012 | Cameron et al. |
| 2012/0228956 A1 | 9/2012 | Kamata |
| 2012/0231856 A1 | 9/2012 | Lee et al. |
| 2012/0235636 A1 | 9/2012 | Partovi |
| 2012/0242283 A1 | 9/2012 | Kim et al. |
| 2012/0248886 A1 | 10/2012 | Kesler et al. |
| 2012/0248888 A1 | 10/2012 | Kesler et al. |
| 2012/0248891 A1 | 10/2012 | Drennen |
| 2012/0249051 A1 | 10/2012 | Son et al. |
| 2012/0262002 A1 | 10/2012 | Widmer et al. |
| 2012/0265272 A1 | 10/2012 | Judkins |
| 2012/0267900 A1 | 10/2012 | Huffman et al. |
| 2012/0268238 A1 | 10/2012 | Park et al. |
| 2012/0274154 A1 | 11/2012 | DeLuca |
| 2012/0280650 A1 | 11/2012 | Kim et al. |
| 2012/0286582 A1 | 11/2012 | Kim et al. |
| 2012/0292993 A1 | 11/2012 | Mettler et al. |
| 2012/0293021 A1 | 11/2012 | Teggatz et al. |
| 2012/0293119 A1 | 11/2012 | Park et al. |
| 2012/0299389 A1 | 11/2012 | Lee et al. |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0306433 A1 | 12/2012 | Kim et al. |
| 2012/0306705 A1 | 12/2012 | Sakurai et al. |
| 2012/0306707 A1 | 12/2012 | Yang et al. |
| 2012/0306720 A1 | 12/2012 | Tamai et al. |
| 2012/0309295 A1 | 12/2012 | Maguire |
| 2012/0309308 A1 | 12/2012 | Kim et al. |
| 2012/0309332 A1 | 12/2012 | Liao |
| 2012/0313449 A1 | 12/2012 | Kurs |
| 2012/0313835 A1 | 12/2012 | Gebretnsae |
| 2012/0326660 A1 | 12/2012 | Lu et al. |
| 2013/0002550 A1 | 1/2013 | Zalewski |
| 2013/0018439 A1 | 1/2013 | Chow et al. |
| 2013/0024059 A1 | 1/2013 | Miller et al. |
| 2013/0026981 A1 | 1/2013 | Van Der Lee |
| 2013/0026982 A1 | 1/2013 | Rothenbaum |
| 2013/0032589 A1 | 2/2013 | Chung |
| 2013/0033571 A1 | 2/2013 | Steen |
| 2013/0038124 A1 | 2/2013 | Newdoll et al. |
| 2013/0038402 A1 | 2/2013 | Karalis et al. |
| 2013/0043738 A1 | 2/2013 | Park et al. |
| 2013/0044035 A1 | 2/2013 | Zhuang |
| 2013/0049471 A1 | 2/2013 | Oleynik |
| 2013/0049475 A1 | 2/2013 | Kim et al. |
| 2013/0049484 A1 | 2/2013 | Weissentern et al. |
| 2013/0057078 A1 | 3/2013 | Lee |
| 2013/0057205 A1 | 3/2013 | Lee et al. |
| 2013/0057210 A1 | 3/2013 | Nergaard et al. |
| 2013/0057364 A1 | 3/2013 | Kesler et al. |
| 2013/0058379 A1 | 3/2013 | Kim et al. |
| 2013/0063082 A1 | 3/2013 | Lee et al. |
| 2013/0063143 A1 | 3/2013 | Adalsteinsson et al. |
| 2013/0069444 A1 | 3/2013 | Waffenschmidt et al. |
| 2013/0076308 A1 | 3/2013 | Niskala et al. |
| 2013/0077650 A1 | 3/2013 | Traxler et al. |
| 2013/0078918 A1 | 3/2013 | Crowley et al. |
| 2013/0082651 A1 | 4/2013 | Park et al. |
| 2013/0082653 A1 | 4/2013 | Lee et al. |
| 2013/0083774 A1 | 4/2013 | Son et al. |
| 2013/0088082 A1 | 4/2013 | Kang et al. |
| 2013/0088090 A1 | 4/2013 | Wu |
| 2013/0088192 A1 | 4/2013 | Eaton |
| 2013/0088331 A1 | 4/2013 | Cho |
| 2013/0093388 A1 | 4/2013 | Partovi |
| 2013/0099389 A1 | 4/2013 | Hong et al. |
| 2013/0099586 A1 | 4/2013 | Kato |
| 2013/0106197 A1 | 5/2013 | Bae et al. |
| 2013/0107023 A1 | 5/2013 | Tanaka et al. |
| 2013/0119777 A1 | 5/2013 | Rees |
| 2013/0119778 A1 | 5/2013 | Jung |
| 2013/0119929 A1 | 5/2013 | Partovi |
| 2013/0120217 A1 | 5/2013 | Ueda et al. |
| 2013/0132010 A1 | 5/2013 | Winger et al. |
| 2013/0134923 A1 | 5/2013 | Smith |
| 2013/0137455 A1 | 5/2013 | Xia |
| 2013/0141037 A1 | 6/2013 | Jenwatanavet et al. |
| 2013/0148341 A1 | 6/2013 | Williams |
| 2013/0149975 A1 | 6/2013 | Yu et al. |
| 2013/0154387 A1 | 6/2013 | Lee et al. |
| 2013/0155748 A1 | 6/2013 | Sundstrom |
| 2013/0157729 A1 | 6/2013 | Tabe |
| 2013/0162335 A1 | 6/2013 | Kim et al. |
| 2013/0169061 A1 | 7/2013 | Miroshnichenko et al. |
| 2013/0169219 A1 | 7/2013 | Gray |
| 2013/0169348 A1 | 7/2013 | Shi |
| 2013/0171939 A1 | 7/2013 | Tian et al. |
| 2013/0175877 A1 | 7/2013 | Abe et al. |
| 2013/0178253 A1 | 7/2013 | Karaoguz |
| 2013/0181881 A1 | 7/2013 | Christie et al. |
| 2013/0187475 A1 | 7/2013 | Vendik |
| 2013/0190031 A1 | 7/2013 | Persson et al. |
| 2013/0193769 A1 | 8/2013 | Mehta et al. |
| 2013/0197320 A1 | 8/2013 | Albert et al. |
| 2013/0200064 A1 | 8/2013 | Alexander |
| 2013/0207477 A1 | 8/2013 | Nam et al. |
| 2013/0207604 A1 | 8/2013 | Zeine |
| 2013/0207879 A1 | 8/2013 | Rada et al. |
| 2013/0210357 A1 | 8/2013 | Qin et al. |
| 2013/0221757 A1 | 8/2013 | Cho et al. |
| 2013/0223538 A1 | 8/2013 | Wang et al. |
| 2013/0234530 A1 | 9/2013 | Miyauchi |
| 2013/0234536 A1 | 9/2013 | Chemishkian et al. |
| 2013/0234658 A1 | 9/2013 | Endo et al. |
| 2013/0241306 A1 | 9/2013 | Aber et al. |
| 2013/0241468 A1 | 9/2013 | Moshfeghi |
| 2013/0241474 A1 | 9/2013 | Moshfeghi |
| 2013/0249478 A1 | 9/2013 | Hirano |

(56) References Cited

U.S. PATENT DOCUMENTS

| | | |
|---|---|---|
| 2013/0249479 A1 | 9/2013 | Partovi |
| 2013/0250102 A1 | 9/2013 | Scanlon et al. |
| 2013/0254578 A1 | 9/2013 | Huang et al. |
| 2013/0264997 A1 | 10/2013 | Lee et al. |
| 2013/0268782 A1 | 10/2013 | Tam et al. |
| 2013/0270923 A1 | 10/2013 | Cook et al. |
| 2013/0278076 A1 | 10/2013 | Proud |
| 2013/0278209 A1 | 10/2013 | Von Novak, III et al. |
| 2013/0285464 A1 | 10/2013 | Miwa |
| 2013/0285477 A1 | 10/2013 | Lo et al. |
| 2013/0285606 A1 | 10/2013 | Ben-Shalom et al. |
| 2013/0288600 A1 | 10/2013 | Kuusilinna et al. |
| 2013/0288617 A1 | 10/2013 | Kim et al. |
| 2013/0293423 A1 | 11/2013 | Moshfeghi |
| 2013/0307751 A1 | 11/2013 | Yu-Juin et al. |
| 2013/0310020 A1 | 11/2013 | Kazuhiro |
| 2013/0311798 A1 | 11/2013 | Sultenfuss |
| 2013/0328417 A1 | 12/2013 | Takeuchi |
| 2013/0334883 A1 | 12/2013 | Kim et al. |
| 2013/0339108 A1 | 12/2013 | Ryder et al. |
| 2013/0343208 A1 | 12/2013 | Sexton et al. |
| 2013/0343251 A1 | 12/2013 | Zhang |
| 2014/0001846 A1 | 1/2014 | Mosebrook |
| 2014/0001875 A1 | 1/2014 | Nahidipour |
| 2014/0001876 A1 | 1/2014 | Fujiwara et al. |
| 2014/0006017 A1 | 1/2014 | Sen |
| 2014/0008993 A1 | 1/2014 | Leabman |
| 2014/0009110 A1 | 1/2014 | Lee |
| 2014/0011531 A1 | 1/2014 | Burstrom et al. |
| 2014/0015336 A1 | 1/2014 | Weber et al. |
| 2014/0015344 A1 | 1/2014 | Mohamadi |
| 2014/0021907 A1 | 1/2014 | Yu et al. |
| 2014/0021908 A1 | 1/2014 | McCool |
| 2014/0035524 A1 | 2/2014 | Zeine |
| 2014/0035526 A1 | 2/2014 | Tripathi et al. |
| 2014/0035786 A1 | 2/2014 | Ley |
| 2014/0043248 A1 | 2/2014 | Yeh |
| 2014/0049422 A1 | 2/2014 | Von Novak et al. |
| 2014/0054971 A1 | 2/2014 | Kissin |
| 2014/0055098 A1 | 2/2014 | Lee et al. |
| 2014/0057618 A1 | 2/2014 | Zirwas et al. |
| 2014/0062395 A1 | 3/2014 | Kwon et al. |
| 2014/0082435 A1 | 3/2014 | Kitgawa |
| 2014/0086125 A1 | 3/2014 | Polo et al. |
| 2014/0086592 A1 | 3/2014 | Nakahara et al. |
| 2014/0091756 A1 | 4/2014 | Ofstein et al. |
| 2014/0091968 A1 | 4/2014 | Harel et al. |
| 2014/0091974 A1 | 4/2014 | Desclos et al. |
| 2014/0103869 A1 | 4/2014 | Radovic |
| 2014/0104157 A1 | 4/2014 | Burns |
| 2014/0111147 A1 | 4/2014 | Soar |
| 2014/0113689 A1 | 4/2014 | Lee |
| 2014/0117946 A1 | 5/2014 | Muller et al. |
| 2014/0118140 A1 | 5/2014 | Amis |
| 2014/0128107 A1 | 5/2014 | An |
| 2014/0132210 A1 | 5/2014 | Partovi |
| 2014/0133279 A1 | 5/2014 | Khuri-Yakub |
| 2014/0139034 A1 | 5/2014 | Sankar et al. |
| 2014/0139039 A1 | 5/2014 | Cook et al. |
| 2014/0139180 A1 | 5/2014 | Kim et al. |
| 2014/0141838 A1 | 5/2014 | Cai et al. |
| 2014/0142876 A1 | 5/2014 | John et al. |
| 2014/0143933 A1 | 5/2014 | Low et al. |
| 2014/0145879 A1 | 5/2014 | Pan |
| 2014/0145884 A1 | 5/2014 | Dang et al. |
| 2014/0152117 A1 | 6/2014 | Sanker |
| 2014/0159651 A1 | 6/2014 | Von Novak et al. |
| 2014/0159652 A1 | 6/2014 | Hall et al. |
| 2014/0159662 A1 | 6/2014 | Furui |
| 2014/0159667 A1 | 6/2014 | Kim et al. |
| 2014/0169385 A1 | 6/2014 | Hadani et al. |
| 2014/0175893 A1 | 6/2014 | Sengupta et al. |
| 2014/0176054 A1 | 6/2014 | Porat et al. |
| 2014/0176061 A1 | 6/2014 | Cheatham, III et al. |
| 2014/0176082 A1 | 6/2014 | Visser |
| 2014/0177399 A1 | 6/2014 | Teng et al. |
| 2014/0184148 A1 | 7/2014 | Van Der Lee et al. |
| 2014/0184155 A1 | 7/2014 | Cha |
| 2014/0184163 A1 | 7/2014 | Das et al. |
| 2014/0184170 A1 | 7/2014 | Jeong |
| 2014/0191568 A1 | 7/2014 | Partovi |
| 2014/0194092 A1 | 7/2014 | Wanstedt et al. |
| 2014/0194095 A1 | 7/2014 | Wynne et al. |
| 2014/0197691 A1 | 7/2014 | Wang |
| 2014/0206384 A1 | 7/2014 | Kim et al. |
| 2014/0210281 A1 | 7/2014 | Ito et al. |
| 2014/0217955 A1 | 8/2014 | Lin |
| 2014/0217967 A1 | 8/2014 | Zeine et al. |
| 2014/0225805 A1 | 8/2014 | Pan et al. |
| 2014/0232320 A1 | 8/2014 | Ento July et al. |
| 2014/0232610 A1 | 8/2014 | Shigemoto et al. |
| 2014/0239733 A1 | 8/2014 | Mach et al. |
| 2014/0241231 A1 | 8/2014 | Zeine |
| 2014/0245036 A1 | 8/2014 | Oishi |
| 2014/0246416 A1 | 9/2014 | White |
| 2014/0247152 A1 | 9/2014 | Proud |
| 2014/0252813 A1 | 9/2014 | Lee et al. |
| 2014/0252866 A1 | 9/2014 | Walsh et al. |
| 2014/0265725 A1 | 9/2014 | Angle et al. |
| 2014/0265727 A1 | 9/2014 | Berte |
| 2014/0265943 A1 | 9/2014 | Angle et al. |
| 2014/0266025 A1 | 9/2014 | Jakubowski |
| 2014/0266946 A1 | 9/2014 | Bily et al. |
| 2014/0273892 A1 | 9/2014 | Nourbakhsh |
| 2014/0281655 A1 | 9/2014 | Angle et al. |
| 2014/0292090 A1 | 10/2014 | Cordeiro et al. |
| 2014/0300452 A1 | 10/2014 | Rofe et al. |
| 2014/0312706 A1 | 10/2014 | Fiorello et al. |
| 2014/0325218 A1 | 10/2014 | Shimizu et al. |
| 2014/0327320 A1 | 11/2014 | Muhs et al. |
| 2014/0327390 A1 | 11/2014 | Park et al. |
| 2014/0333142 A1 | 11/2014 | Desrosiers |
| 2014/0346860 A1 | 11/2014 | Aubry et al. |
| 2014/0354063 A1 | 12/2014 | Leabman et al. |
| 2014/0354221 A1 | 12/2014 | Leabman et al. |
| 2014/0355718 A1 | 12/2014 | Guan et al. |
| 2014/0368048 A1 | 12/2014 | Leabman et al. |
| 2014/0368161 A1 | 12/2014 | Leabman et al. |
| 2014/0368405 A1 | 12/2014 | Ek et al. |
| 2014/0375139 A1 | 12/2014 | Tsukamoto |
| 2014/0375253 A1 | 12/2014 | Leabman et al. |
| 2014/0375258 A1 | 12/2014 | Arkhipenkov |
| 2014/0375261 A1 | 12/2014 | Manova-Elssibony et al. |
| 2015/0001949 A1 | 1/2015 | Leabman et al. |
| 2015/0002086 A1 | 1/2015 | Matos et al. |
| 2015/0003207 A1 | 1/2015 | Lee et al. |
| 2015/0008980 A1 | 1/2015 | Kim et al. |
| 2015/0011160 A1 | 1/2015 | Jurgovan et al. |
| 2015/0015180 A1 | 1/2015 | Miller et al. |
| 2015/0015182 A1 | 1/2015 | Brandtman et al. |
| 2015/0015192 A1 | 1/2015 | Leabman et al. |
| 2015/0021990 A1 | 1/2015 | Myer et al. |
| 2015/0022008 A1 | 1/2015 | Leabman et al. |
| 2015/0022010 A1 | 1/2015 | Leabman et al. |
| 2015/0022194 A1 | 1/2015 | Almalki et al. |
| 2015/0023204 A1 | 1/2015 | Wik et al. |
| 2015/0028688 A1 | 1/2015 | Masaoka |
| 2015/0028694 A1 | 1/2015 | Leabman et al. |
| 2015/0028697 A1 | 1/2015 | Makino et al. |
| 2015/0028875 A1 | 1/2015 | Irie et al. |
| 2015/0035378 A1 | 2/2015 | Calhoun et al. |
| 2015/0035715 A1 | 2/2015 | Kim et al. |
| 2015/0039482 A1 | 2/2015 | Fujinaga |
| 2015/0041459 A1 | 2/2015 | Leabman et al. |
| 2015/0042265 A1 | 2/2015 | Leabman et al. |
| 2015/0044977 A1 | 2/2015 | Ramasamy et al. |
| 2015/0046526 A1 | 2/2015 | Bush et al. |
| 2015/0061404 A1 | 3/2015 | Lamenza et al. |
| 2015/0076917 A1 | 3/2015 | Leabman et al. |
| 2015/0076927 A1 | 3/2015 | Leabman et al. |
| 2015/0077036 A1 | 3/2015 | Leabman et al. |
| 2015/0077037 A1 | 3/2015 | Leabman et al. |
| 2015/0091520 A1 | 4/2015 | Blum et al. |
| 2015/0091706 A1 | 4/2015 | Chemishkian et al. |

(56) References Cited

U.S. PATENT DOCUMENTS

| | | |
|---|---|---|
| 2015/0097442 A1 | 4/2015 | Muurinen |
| 2015/0097663 A1 | 4/2015 | Sloo et al. |
| 2015/0102764 A1 | 4/2015 | Leabman et al. |
| 2015/0102769 A1 | 4/2015 | Leabman et al. |
| 2015/0102973 A1 | 4/2015 | Hand et al. |
| 2015/0108848 A1 | 4/2015 | Joehren |
| 2015/0109171 A1 | 4/2015 | Lin |
| 2015/0109181 A1 | 4/2015 | Hyde et al. |
| 2015/0115877 A1 | 4/2015 | Arai et al. |
| 2015/0115878 A1 | 4/2015 | Park |
| 2015/0128733 A1 | 5/2015 | Taylor et al. |
| 2015/0130285 A1 | 5/2015 | Leabman et al. |
| 2015/0130293 A1 | 5/2015 | Hajimiri et al. |
| 2015/0137612 A1 | 5/2015 | Yamakawa et al. |
| 2015/0148664 A1 | 5/2015 | Stolka et al. |
| 2015/0155737 A1 | 6/2015 | Mayo |
| 2015/0155738 A1 | 6/2015 | Leabman et al. |
| 2015/0162662 A1 | 6/2015 | Chen et al. |
| 2015/0162751 A1 | 6/2015 | Leabman et al. |
| 2015/0162779 A1 | 6/2015 | Lee et al. |
| 2015/0171513 A1 | 6/2015 | Chen et al. |
| 2015/0171656 A1 | 6/2015 | Leabman et al. |
| 2015/0171658 A1 | 6/2015 | Manova-Elssibony et al. |
| 2015/0171931 A1 | 6/2015 | Won et al. |
| 2015/0177326 A1 | 6/2015 | Chakraborty et al. |
| 2015/0180133 A1 | 6/2015 | Hunt |
| 2015/0180249 A1 | 6/2015 | Jeon et al. |
| 2015/0181117 A1 | 6/2015 | Park et al. |
| 2015/0187491 A1 | 7/2015 | Yanagawa |
| 2015/0188352 A1 | 7/2015 | Peek et al. |
| 2015/0199665 A1 | 7/2015 | Chu |
| 2015/0201385 A1 | 7/2015 | Mercer et al. |
| 2015/0207333 A1 | 7/2015 | Baarman et al. |
| 2015/0207542 A1 | 7/2015 | Zeine |
| 2015/0222126 A1 | 8/2015 | Leabman et al. |
| 2015/0233987 A1 | 8/2015 | Von Novak, III et al. |
| 2015/0234144 A1 | 8/2015 | Cameron et al. |
| 2015/0236520 A1 | 8/2015 | Baarman |
| 2015/0244070 A1 | 8/2015 | Cheng et al. |
| 2015/0244080 A1 | 8/2015 | Gregoire |
| 2015/0244187 A1 | 8/2015 | Horie |
| 2015/0244201 A1 | 8/2015 | Chu |
| 2015/0244341 A1 | 8/2015 | Ritter et al. |
| 2015/0249484 A1 | 9/2015 | Mach et al. |
| 2015/0255989 A1 | 9/2015 | Walley et al. |
| 2015/0256097 A1 | 9/2015 | Gudan et al. |
| 2015/0263534 A1 | 9/2015 | Lee et al. |
| 2015/0263548 A1 | 9/2015 | Cooper |
| 2015/0270618 A1 | 9/2015 | Zhu et al. |
| 2015/0270622 A1 | 9/2015 | Takasaki et al. |
| 2015/0270741 A1 | 9/2015 | Leabman et al. |
| 2015/0280484 A1 | 10/2015 | Radziemski et al. |
| 2015/0288074 A1 | 10/2015 | Harper et al. |
| 2015/0288438 A1 | 10/2015 | Maltsev et al. |
| 2015/0311585 A1 | 10/2015 | Church et al. |
| 2015/0312721 A1 | 10/2015 | Singh |
| 2015/0318729 A1 | 11/2015 | Leabman |
| 2015/0326024 A1 | 11/2015 | Bell et al. |
| 2015/0326070 A1 | 11/2015 | Petras et al. |
| 2015/0326072 A1 | 11/2015 | Petras et al. |
| 2015/0326143 A1 | 11/2015 | Petras et al. |
| 2015/0327085 A1 | 11/2015 | Hadani |
| 2015/0333528 A1 | 11/2015 | Leabman |
| 2015/0333573 A1 | 11/2015 | Leabman |
| 2015/0333800 A1 | 11/2015 | Perry et al. |
| 2015/0340759 A1 | 11/2015 | Bridgelall et al. |
| 2015/0340903 A1 | 11/2015 | Bell et al. |
| 2015/0341087 A1 | 11/2015 | Moore et al. |
| 2015/0358222 A1 | 12/2015 | Berger et al. |
| 2015/0365137 A1 | 12/2015 | Miller et al. |
| 2015/0365138 A1 | 12/2015 | Miller et al. |
| 2016/0005068 A1 | 1/2016 | Im et al. |
| 2016/0012695 A1 | 1/2016 | Bell et al. |
| 2016/0013677 A1 | 1/2016 | Bell et al. |
| 2016/0013855 A1 | 1/2016 | Campos |
| 2016/0020636 A1 | 1/2016 | Khlat |
| 2016/0042206 A1 | 2/2016 | Pesavento et al. |
| 2016/0054440 A1 | 2/2016 | Younis |
| 2016/0056635 A1 | 2/2016 | Bell |
| 2016/0056640 A1 | 2/2016 | Mao |
| 2016/0056966 A1 | 2/2016 | Bell |
| 2016/0065005 A1 | 3/2016 | Won et al. |
| 2016/0079799 A1 | 3/2016 | Khlat |
| 2016/0087483 A1 | 3/2016 | Hietala et al. |
| 2016/0087486 A1 | 3/2016 | Pogorelik et al. |
| 2016/0087687 A1 | 3/2016 | Kesler et al. |
| 2016/0093953 A1 | 3/2016 | Ban et al. |
| 2016/0094074 A1 | 3/2016 | Alves et al. |
| 2016/0094092 A1 | 3/2016 | Davlantes et al. |
| 2016/0099601 A1 | 4/2016 | Leabman et al. |
| 2016/0099614 A1 | 4/2016 | Leabman et al. |
| 2016/0099755 A1 | 4/2016 | Leabman et al. |
| 2016/0099757 A1 | 4/2016 | Leabman et al. |
| 2016/0112787 A1 | 4/2016 | Rich |
| 2016/0126752 A1 | 5/2016 | Vuori et al. |
| 2016/0126776 A1 | 5/2016 | Kim et al. |
| 2016/0141908 A1 | 5/2016 | Jakl et al. |
| 2016/0164563 A1 | 6/2016 | Khawand et al. |
| 2016/0181849 A1 | 6/2016 | Govindaraj |
| 2016/0181867 A1 | 6/2016 | Daniel et al. |
| 2016/0181873 A1 | 6/2016 | Mitcheson et al. |
| 2016/0191121 A1 | 6/2016 | Bell |
| 2016/0202343 A1 | 7/2016 | Okutsu |
| 2016/0204642 A1 | 7/2016 | Oh |
| 2016/0233582 A1 | 8/2016 | Piskun |
| 2016/0238365 A1 | 8/2016 | Wixey et al. |
| 2016/0240908 A1 | 8/2016 | Strong |
| 2016/0248276 A1 | 8/2016 | Hong et al. |
| 2016/0294225 A1 | 10/2016 | Blum et al. |
| 2016/0299210 A1 | 10/2016 | Zeine |
| 2016/0301240 A1 | 10/2016 | Zeine |
| 2016/0323000 A1 | 11/2016 | Liu et al. |
| 2016/0336804 A1 | 11/2016 | Son et al. |
| 2016/0339258 A1 | 11/2016 | Perryman et al. |
| 2016/0359367 A1 | 12/2016 | Rothschild |
| 2016/0380464 A1 | 12/2016 | Chin et al. |
| 2016/0380466 A1 | 12/2016 | Yang et al. |
| 2017/0005481 A1 | 1/2017 | Von Novak, III |
| 2017/0005516 A9 | 1/2017 | Leabman et al. |
| 2017/0005524 A1 | 1/2017 | Akuzawa et al. |
| 2017/0005530 A1 | 1/2017 | Zeine et al. |
| 2017/0012448 A1 | 1/2017 | Miller et al. |
| 2017/0025903 A1 | 1/2017 | Song et al. |
| 2017/0026087 A1 | 1/2017 | Tanabe |
| 2017/0040700 A1 | 2/2017 | Leung |
| 2017/0043675 A1 | 2/2017 | Jones et al. |
| 2017/0047784 A1 | 2/2017 | Jung et al. |
| 2017/0077733 A1 | 3/2017 | Jeong et al. |
| 2017/0077734 A1 | 3/2017 | Nokkonen et al. |
| 2017/0077979 A1 | 3/2017 | Papa et al. |
| 2017/0092115 A1 | 3/2017 | Sloo et al. |
| 2017/0093229 A1 | 3/2017 | Sindia et al. |
| 2017/0134686 A9 | 5/2017 | Leabman |
| 2017/0141582 A1 | 5/2017 | Adolf et al. |
| 2017/0168595 A1 | 6/2017 | Sakaguchi et al. |
| 2017/0179763 A9 | 6/2017 | Leabman |
| 2017/0179771 A1 | 6/2017 | Leabman |
| 2017/0214422 A1 | 7/2017 | Na et al. |
| 2017/0331332 A1 | 11/2017 | Lee et al. |
| 2017/0338695 A1 | 11/2017 | Port |
| 2018/0040929 A1 | 2/2018 | Chappelle |
| 2018/0048178 A1 | 2/2018 | Leabman |
| 2018/0248409 A1 | 8/2018 | Johnston |
| 2019/0393729 A1 | 12/2019 | Contopanagos et al. |
| 2019/0393928 A1 | 12/2019 | Leabman |
| 2020/0112204 A1 | 4/2020 | Hosseini et al. |

FOREIGN PATENT DOCUMENTS

| | | |
|---|---|---|
| CN | 102860037 A | 1/2013 |
| CN | 203826555 U | 9/2014 |
| CN | 104090265 A | 10/2014 |
| CN | 106329116 A | 1/2017 |
| CN | 103380561 B | 9/2017 |

(56) References Cited

FOREIGN PATENT DOCUMENTS

| | | |
|---|---|---|
| DE | 20016655 U1 | 2/2002 |
| EP | 1028482 A2 | 8/2000 |
| EP | 1081506 A1 | 3/2001 |
| EP | 2346136 A1 | 7/2011 |
| EP | 2397973 A1 | 2/2012 |
| EP | 2545635 A2 | 1/2013 |
| EP | 3067983 A1 | 9/2016 |
| EP | 3145052 A1 | 3/2017 |
| GB | 2404497 A | 2/2005 |
| GB | 2556620 A | 6/2018 |
| JP | 2002319816 A | 10/2002 |
| JP | 2006157586 A | 6/2006 |
| JP | 2007043432 A | 2/2007 |
| JP | 2008167017 A | 7/2008 |
| JP | 2013162624 A | 8/2013 |
| JP | 2015128349 A | 7/2015 |
| JP | 2016208229 A | 12/2016 |
| JP | WO2015177859 A1 | 4/2017 |
| KR | 20060061776 A | 6/2006 |
| KR | 20070044302 A | 4/2007 |
| KR | 100755144 B1 | 9/2007 |
| KR | 20110132059 A | 12/2011 |
| KR | 20110135540 A1 | 12/2011 |
| KR | 20120009843 A | 2/2012 |
| KR | 20120108759 A | 10/2012 |
| KR | 20130026977 A | 3/2013 |
| WO | WO 199952173 A1 | 10/1999 |
| WO | WO 2000111716 A1 | 2/2001 |
| WO | WO 2003091943 A1 | 11/2003 |
| WO | WO 2004077550 A1 | 9/2004 |
| WO | WO 2006122783 A2 | 11/2006 |
| WO | WO 2008156571 A2 | 12/2008 |
| WO | WO 2010022181 A1 | 2/2010 |
| WO | WO 2010039246 A1 | 4/2010 |
| WO | WO 2010138994 A1 | 12/2010 |
| WO | WO 2011112022 A2 | 9/2011 |
| WO | WO 2012177283 A1 | 12/2012 |
| WO | WO 2013031988 A1 | 3/2013 |
| WO | WO 2013035190 A1 | 3/2013 |
| WO | WO 2013038074 A2 | 3/2013 |
| WO | WO 2013042399 A1 | 3/2013 |
| WO | WO 2013052950 A1 | 4/2013 |
| WO | WO 2013105920 A2 | 7/2013 |
| WO | WO 2014075103 A1 | 5/2014 |
| WO | WO 2014132258 A1 | 9/2014 |
| WO | WO 2014182788 A2 | 11/2014 |
| WO | WO 2014182788 A3 | 11/2014 |
| WO | WO 2014197472 A1 | 12/2014 |
| WO | WO 2014209587 A1 | 12/2014 |
| WO | WO 2015038773 A1 | 3/2015 |
| WO | WO 2015097809 A1 | 7/2015 |
| WO | WO 2015161323 A1 | 10/2015 |
| WO | WO 2016024869 A1 | 2/2016 |
| WO | WO 2016048512 A1 | 3/2016 |
| WO | WO 2016187357 A1 | 11/2016 |
| WO | WO 2017053631 A1 | 3/2017 |

OTHER PUBLICATIONS

Energous Corp., IPRP, PCT/US2014/037109, Apr. 12, 2016, 9 pgs.
Energous Corp., IPRP, PCT/US2014/037170, Nov. 10, 2015, 8 pgs.
Energous Corp., IPRP, PCT/US2014/040648, Dec. 8, 2015, 8 pgs.
Energous Corp., IPRP, PCT/US2014/040697, Dec. 8, 2015, 9 pgs.
Energous Corp., IPRP, PCT/US2014/040705, Dec. 8, 2015, 6 pgs.
Energous Corp., IPRP, PCT/US2014/041323, Dec. 22, 2015, 7 pgs.
Energous Corp., IPRP, PCT/US2014/041342, Dec. 15, 2015, 8 pgs.
Energous Corp., IPRP, PCT/US2014/041534, Dec. 29, 2015, 7 pgs.
Energous Corp., IPRP, PCT/US2014/041546, Dec. 29, 2015, 9 pgs.
Energous Corp., IPRP, PCT/US2014/041558, Dec. 29, 2015, 6 pgs.
Energous Corp., IPRP, PCT/US2014/044810, Jan. 5, 2016, 10 pgs.
Energous Corp., IPRP, PCT/US2014/045102, Jan. 12, 2016, 11 pgs.
Energous Corp., IPRP, PCT/US2014/045119, Jan. 12, 2016, 9 pgs.
Energous Corp., IPRP, PCT/US2014/045237, Jan. 12, 2016, 12 pgs.
Energous Corp., IPRP, PCT/US2014/046941, Jan. 19, 2016, 9 pgs.
Energous Corp., IPRP, PCT/US2014/046956, Jan. 19, 2016, 7 pgs.
Energous Corp., IPRP, PCT/US2014/046961, Jan. 19, 2016, 8 pgs.
Energous Corp., IPRP, PCT/US2014/047963, Jan. 26, 2016, 10 pgs.
Energous Corp., IPRP, PCT/US2014/048002, Feb. 12, 2015 8 pgs.
Energous Corp., IPRP, PCT/US2014/049666, Feb. 9, 2016, 5 pgs.
Energous Corp., IPRP, PCT/US2014/049669, Feb. 9, 2016, 8 pgs.
Energous Corp., IPRP, PCT/US2014/049673, Feb. 9, 2016, 6 pgs.
Energous Corp., IPRP, PCT/US2014/054891, Mar. 15, 2016, 10 pgs.
Energous Corp., IPRP, PCT/US2014/054897, Mar. 15, 2016, 8 pgs.
Energous Corp., IPRP, PCT/US2014/054953, Mar. 22, 2016, 5 pgs.
Energous Corp., IPRP, PCT/US2014/055195, Mar. 22, 2016, 9 pgs.
Energous Corp., IPRP, PCT/US2014/059317, Apr. 12, 2016, 10 pgs.
Energous Corp., IPRP, PCT/US2014/059340, Apr. 12, 2016, 11 pgs.
Energous Corp., IPRP, PCT/US2014/059871, Apr. 12, 2016, 9 pgs.
Energous Corp., IPRP, PCT/US2014/062661, May 3, 2016, 10 pgs.
Energous Corp., IPRP, PCT/US2014/062672, May 10, 2016, 8 pgs.
Energous Corp., IPRP, PCT/US2014/062682, May 3, 2016, 8 pgs.
Energous Corp., IPRP, PCT/US2014/068282, Jun. 7, 2016, 10 pgs.
Energous Corp., IPRP, PCT/US2014/068568, Jun. 14, 2016, 8 pgs.
Energous Corp., IPRP, PCT/US2014/068586, Jun. 14, 2016, 8 pgs.
Energous Corp., IPRP, PCT/US2015/067242, Jun. 27, 2017, 7 pgs.
Energous Corp., IPRP, PCT/US2015/067243, Jun. 27, 2017, 7 pgs.
Energous Corp., IPRP, PCT/US2015/067245, Jun. 27, 2017, 7 pgs.
Energous Corp., IPRP, PCT/US2015/067246, Jun. 27, 2017, 9 pgs.
Energous Corp., IPRP, PCT/US2015/067249, Jun. 27, 2017, 7 pgs.
Energous Corp., IPRP, PCT/US2015/067250, Mar. 30, 2016, 10 pgs.
Energous Corp., IPRP, PCT/US2015/067271, Jul. 4, 2017, 5 pgs.
Energous Corp., IPRP, PCT/US2015/067275, Jul. 4, 2017, 7 pgs.
Energous Corp., IPRP, PCT/US2015/067279, Jul. 4, 2017, 7 pgs.
Energous Corp., IPRP, PCT/US2015/067282, Jul. 4, 2017, 6 pgs.
Energous Corp., IPRP, PCT/US2015/067287, Jul. 4, 2017, 6 pgs.
Energous Corp., IPRP, PCT/US2015/067291, Jul. 4, 2017, 4 pgs.
Energous Corp., IPRP, PCT/US2015/067294, Jul. 4, 2017, 6 pgs.
Energous Corp., IPRP, PCT/US2015/067325, Jul. 4, 2017, 8 pgs.
Energous Corp., IPRP, PCT/US2015/067334, Jul. 4, 2017, 5 pgs.
Energous Corp., IPRP, PCT/US2016/068495, Jun. 26, 2018, 7 pgs.
Energous Corp., IPRP, PCT/US2016/068498, Jun. 26, 2018, 6 pgs.
Energous Corp., IPRP, PCT/US2016/068504, Jun. 26, 2018, 5 pgs.
Energous Corp., IPRP, PCT/US2016/068551, Jun. 26, 2018, 6 pgs.
Energous Corp., IPRP, PCT/US2016/068565, Jun. 26, 2018, 9 pgs.
Energous Corp., IPRP, PCT/US2016/068987, Jul. 3, 2018, 7 pgs.
Energous Corp., IPRP, PCT/US2016/068993, Jul. 3, 2018, 10 pgs.
Energous Corp., IPRP, PCT/US2016/069313, Jul. 3, 2018, 7 pgs.
Energous Corp., IPRP, PCT/US2016/069316, Jul. 3, 2018, 12 pgs.
Energous Corp., IPRP, PCT/US2017/046800, Feb. 12, 2019, 10 pgs.
Energous Corp., IPRP, PCT/US2019/039014, Dec. 29, 2020, 10 pgs.
Energous Corp., ISRWO, PCT/US2014/037072, Sep. 12, 2014, 8 pgs.
Energous Corp., ISRWO, PCT/US2014/037109, Apr. 8, 2016, 12 pgs.
Energous Corp., ISRWO, PCT/US2014/037170, Sep. 15, 2014, 11 pgs.
Energous Corp., ISRWO, PCT/US2014/040648, Oct. 10, 2014, 11 pgs.
Energous Corp., ISRWO, PCT/US2014/040697, Oct. 1, 2014, 12 pgs.
Energous Corp., ISRWO, PCT/US2014/040705, Sep. 23, 2014, 8 pgs.
Energous Corp., ISRWO, PCT/US2014/041323, Oct. 1, 2014, 10 pgs.
Energous Corp., ISRWO, PCT/US2014/041342, Jan. 27, 2015, 10 pgs.
Energous Corp., ISRWO, PCT/US2014/041534, Oct. 13, 2014, 10 pgs.
Energous Corp., ISRWO, PCT/US2014/041546, Oct. 16, 2014, 12 pgs.
Energous Corp., ISRWO, PCT/US2014/041558, Oct. 10, 2014, 8 pgs.

(56) References Cited

OTHER PUBLICATIONS

Energous Corp., ISRWO, PCT/US2014/044810 Oct. 21, 2014, 12 pgs.
Energous Corp., ISRWO, PCT/US2014/045102, Oct. 28, 2014, 14 pgs.
Energous Corp., ISRWO, PCT/US2014/045119, Oct. 13, 2014, 11 pgs.
Energous Corp., ISRWO, PCT/US2014/045237, Oct. 13, 2014, 16 pgs.
Energous Corp., ISRWO, PCT/US2014/046941, Nov. 6, 2014, 11 pgs.
Energous Corp., ISRWO, PCT/US2014/046956, Nov. 12, 2014, 10 pgs.
Energous Corp., ISRWO, PCT/US2014/046961, Nov. 24, 2014, 16 pgs.
Energous Corp., ISRWO, PCT/US2014/047963, Nov. 7, 2014, 13 pgs.
Energous Corp., ISRWO, PCT/US2014/048002, Nov. 13, 2014, 11 pgs.
Energous Corp., ISRWO, PCT/US2014/049666, Nov. 10, 2014, 7 pgs.
Energous Corp., ISRWO, PCT/US2014/049669, Nov. 13, 2014, 10 pgs.
Energous Corp., ISRWO, PCT/US2014/049673, Nov. 18, 2014, 10 pgs.
Energous Corp., ISRWO, PCT/US2014/054891, Dec. 18, 2014, 12 pgs.
Energous Corp., ISRWO, PCT/US2014/054897, Feb. 17, 2015, 10 pgs.
Energous Corp., ISRWO, PCT/US2014/054953, Dec. 4, 2014, 7 pgs.
Energous Corp., ISRWO, PCT/US2014/055195, Dec. 22, 2014, 11 pgs.
Energous Corp., ISRWO, PCT/US2014/059317, Feb. 24, 2015, 13 pgs.
Energous Corp., ISRWO, PCT/US2014/059340, Jan. 15, 2015, 13 pgs.
Energous Corp., ISRWO, PCT/US2014/059871, Jan. 23, 2015, 12 pgs.
Energous Corp., ISRWO, PCT/US2014/062661, Jan. 27, 2015, 12 pgs.
Energous Corp., ISRWO, PCT/US2014/062672, Jan. 26, 2015, 11 pgs.
Energous Corp., ISRWO, PCT/US2014/062682, Feb. 12, 2015, 10 pgs.
Energous Corp., ISRWO, PCT/US2014/068282, Mar. 19, 2015, 13 pgs.
Energous Corp., ISRWO, PCT/US2014/068568, Mar. 20, 2015, 10 pgs.
Energous Corp., ISRWO, PCT/US2014/068586, Mar. 20, 2015, 11 pgs.
Energous Corp., ISRWO, PCT/US2015/067242, Mar. 16, 2016, 9 pgs.
Energous Corp., ISRWO, PCT/US2015/067243, Mar. 10, 2016, 11 pgs.
Energous Corp., ISRWO, PCT/US2015/067245, Mar. 17, 2016, 8 pgs.
Energous Corp., ISRWO, PCT/US2015/067246, May 11, 2016, 18 pgs.
Energous Corp., ISRWO, PCT/US2015/067249, Mar. 29, 2016, 8 pgs.
Energous Corp., ISRWO, PCT/US2015/067250, Mar. 30, 2016, 11 pgs.
Energous Corp., ISRWO, PCT/US2015/067271, Mar. 11, 2016, 6 pgs.
Energous Corp., ISRWO, PCT/US2015/067275, Mar. 3, 2016, 8 pgs.
Energous Corp., ISRWO, PCT/US2015/067279, Mar. 11, 2015, 13 pgs.
Energous Corp., ISRWO, PCT/US2015/067282, Jul. 5, 2016, 7 pgs.
Energous Corp., ISRWO, PCT/US2015/067287, Feb. 2, 2016, 8 pgs.
Energous Corp., ISRWO, PCT/US2015/067291, Mar. 4, 2016, 10 pgs.
Energous Corp., ISRWO, PCT/US2015/067294, Mar. 29, 2016, 7 pgs.
Energous Corp., ISRWO, PCT/US2015/067325, Mar. 10, 2016, 9 pgs.
Energous Corp., ISRWO, PCT/US2015/067334, Mar. 3, 2016, 6 pgs.
Energous Corp., ISRWO, PCT/US2016/068495, Mar. 30, 2017, 9 pgs.
Energous Corp., ISRWO, PCT/US2016/068498, May 17, 2017, 8 pgs.
Energous Corp., ISRWO, PCT/US2016/068504, Mar. 30, 2017, 8 pgs.
Energous Corp., ISRWO, PCT/US2016/068551, Mar. 17, 2017, 8 pgs.
Energous Corp., ISRWO, PCT/US2016/068565, Mar. 8, 2017, 11 pgs.
Energous Corp., ISRWO, PCT/US2016/068987, May 8, 2017, 10 pgs.
Energous Corp., ISRWO, PCT/US2016/068993, Mar. 13, 2017, 12 pgs.
Energous Corp., ISRWO, PCT/US2016/069313, Nov. 13, 2017, 10 pgs.
Energous Corp., ISRWO, PCT/US2016/069316, Mar. 16, 2017, 15 pgs.
Energous Corp., ISRWO, PCT/US2017/046800, Sep. 11, 2017, 13 pgs.
Energous Corp., ISRWO, PCT/US2017/065886, Apr. 6, 2018, 13 pgs.
Energous Corp., ISRWO, PCT/US2018/012806, Mar. 23, 2018, 9 pgs.
Energous Corp., ISRWO, PCT/US2018/031768, Jul. 3, 2018, 9 pgs.
Energous Corp., ISRWO, PCT/US2018/031786, Aug. 8, 2018, 9 pgs.
Energous Corp., ISRWO, PCT/US2018/051082, Dec. 12, 2018, 9 pgs.
Energous Corp., ISRWO, PCT/US2019/021817, Apr. 6, 2019, 11 pgs.
Energous Corp., ISRWO, PCT/US2019/039014, Oct. 4, 2019, 15 pgs.
Notice of Intent to Issue Reexam Certificate: U.S. Appl. No. 90/013,793 Feb. 2, 2017, 8 pgs.
Order Granting Reexamination Request, U.S. Appl. No. 90/013,793 Aug. 31, 2016, 23 pgs.
*Ossia Inc.* vs *Energous Corp.*, Declaration of Stephen B. Heppe in Support of Petition for Post-Grant Review of U.S. Pat. No. 9,124,125, PGR2016-00023, May 31, 2016, 144 pgs.
*Ossia Inc.* vs *Energous Corp.*, Declaration of Stephen B. Heppe in Support of Petition for Post-Grant Review of U.S. Pat. No. 9,124,125, PGR2016-00024, May 31, 2016, 122 pgs.
*Ossia Inc.* vs *Energous Corp.*, Patent Owner Preliminary Response, Sep. 8, 2016, 95 pgs.
*Ossia Inc.* vs *Energous Corp.*, Petition for Post Grant Review of U.S. Pat. No. 9,124,125, May 31, 2016, 86 pgs.
*Ossia Inc.* vs *Energous Corp.*, Petition for Post-Grant Review of U.S. Pat. No. 9,124,125, May 31, 2016, 92 pgs.
*Ossia Inc.* vs *Energous Corp.*, PGR2016-00023—Institution Decision, Nov. 29, 2016, 29 pgs.
*Ossia Inc.* vs *Energous Corp.*, PGR2016-00024—Institution Decision, Nov. 29, 2016, 50 pgs.
*Ossia Inc.* vs *Energous Corp.*, PGR2016-00024—Judgement-Adverse, Jan. 20, 2017, 3 pgs.
Extended European Search Report, EP14818136.5, dated Jul. 21, 2016, 9 pgs.
Extended European Search Report, EP14822971.9, dated Feb. 10, 2017, 10 pgs.
Extended European Search Report, EP14868901.1, dated Jul. 17, 2017, 6 pgs.
Extended European Search Report, EP15874273.4, dated May 11, 2018, 7 pgs.

(56) References Cited

OTHER PUBLICATIONS

Extended European Search Report, EP15876033.0, dated Jun. 13, 2018, 10 pgs.
Extended European Search Report, EP15876036.3, dated May 3, 2018, 9 pgs.
Extended European Search Report, EP15876043.9, dated Aug. 9, 2018, 9 pgs.
Extended European Search Report, EP16189052.0, dated Feb. 10, 2017, 13 pgs.
Extended European Search Report, EP16189300.3, dated Mar. 24, 2017, 6 pgs.
Extended European Search Report, EP16189319.3, dated Feb. 10, 2017, 11 pgs.
Extended European Search Report, EP16189974.5, dated Mar. 13, 2017, 7 pgs.
Extended European Search Report, EP16189982.8, dated Feb. 7, 2017, 11 pgs.
Extended European Search Report, EP16189987.7, dated Feb. 9, 2017, 10 pgs.
Extended European Search Report, EP16189988.5, dated Mar. 13, 2017, 6 pgs.
Extended European Search Report, EP16193743.8, dated Feb. 8, 2017, 9 pgs.
Extended European Search Report, EP16196205.5, dated Apr. 7, 2017, 9 pgs.
Extended European Search Report, EP18204043.6, dated Feb. 14, 2019, 5 pgs.
Adamiuk et al., "Compact, Dual-Polarized UWB-Antanna, Embedded in a Dielectric," IEEE Transactions on Antenna and Propagation, IEEE Service Center, Piscataway, NJ, US vol. 56, No. 2, Feb. 1, 2010, 8 pgs.
Gill et al., "A System for Change Detection and Human Recognition in Voxel Space using the Microsoft Kinect Sensor," 2011 IEEE Applied Imagery Pattern Recognition Workshop. 8 pgs.
Han et al., Enhanced Computer Vision with Microsoft Kinect Sensor: A Review, IEEE Transactions on Cybernetics vol. 43, No. 5., pp. 1318-1334, Oct. 3, 2013.
Hsieh et al., "Development of a Retrodirective Wireless Microwave Power Transmission System", IEEE, 2003, pp. 393-396.
Leabman, "Adaptive Band-partitioning for Interference Cancellation in Communication System," Thesis Massachusetts Institute of Technology, Feb. 1997, pp. 1-70.
Li et al., "High-Efficiency Switching-Mode Charger System Design Considerations with Dynamic Power Path Management," Mar./Apr. 2012 Issue, 8 pgs.
Mao et al., "BeamStar: An Edge-Based Approach to Routing in Wireless Sensors Networks", IEEE Transactions on Mobile Computing, IEEE Service Center, Los Alamitos, CA, vol. 6, No. 11, Nov. 1, 2007, 13 pgs.
Mascarenas et al., "Experimental Studies of Using Wireless Energy Transmission for Powering Embedded Sensor Nodes," Nov. 28, 2009, Journal of Sound and Vibration, 13 pgs.
Mishra et al., "SIW-based Slot Array Antenna and Power Management Circuit for Wireless Energy Harvesting Applications", IEEE APSURSI, Jul. 2012, 2 pgs.
Nenzi et al., "U-Helix: On-Chip Short Conical Antenna", 7th European Conference on Antennas and Propagation (EUCAP), ISBN: 978-1-4673-2187-7, IEEE, Apr. 8, 2013, 5 pgs.
Singh, "Wireless Power Transfer Using Metamaterial Bonded Microstrip Antenna for Smart Grid WSN", 4th International Conference on Advances in Computing and Communications (ICACC), Aug. 27-29, 2014, 1 pg.
Smolders, "Broadband Microstrip Array Antennas", Institute of Electrical and Electronics Engineers, Digest of the Antennas and Propagation Society International Symposium, Seattle, WA, Jun. 19-24, 1994, 3 pgs.
Van Veen et al., "Beamforming: A Versatile Approach to Spatial Filtering", IEEE, ASSP Magazine, Apr. 1988, pp. 4-24.
Zhai et al., "A Practical Wireless Charging System Based on Ultra-Wideband Retro-Reflective Beamforming", 2010 IEEE Antennas and Propagation Society International Symposium, Toronto, ON, 2010, 4 pgs.

* cited by examiner

Radiation Pattern Cross-Section 330

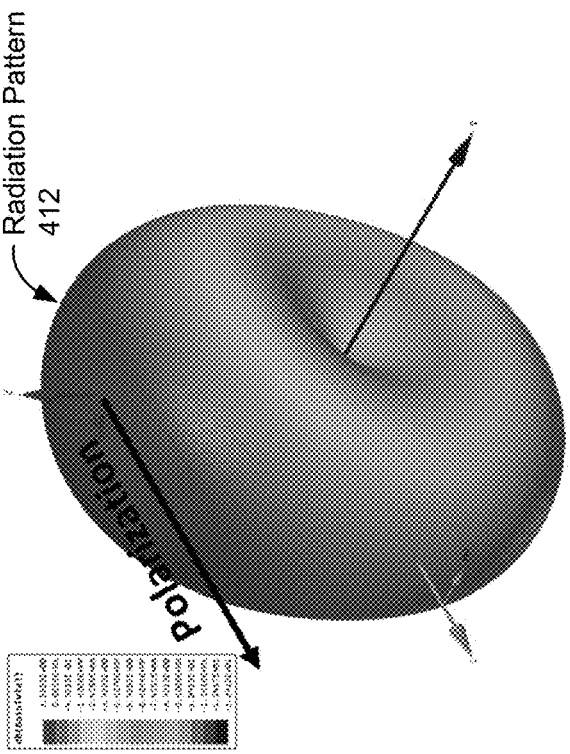
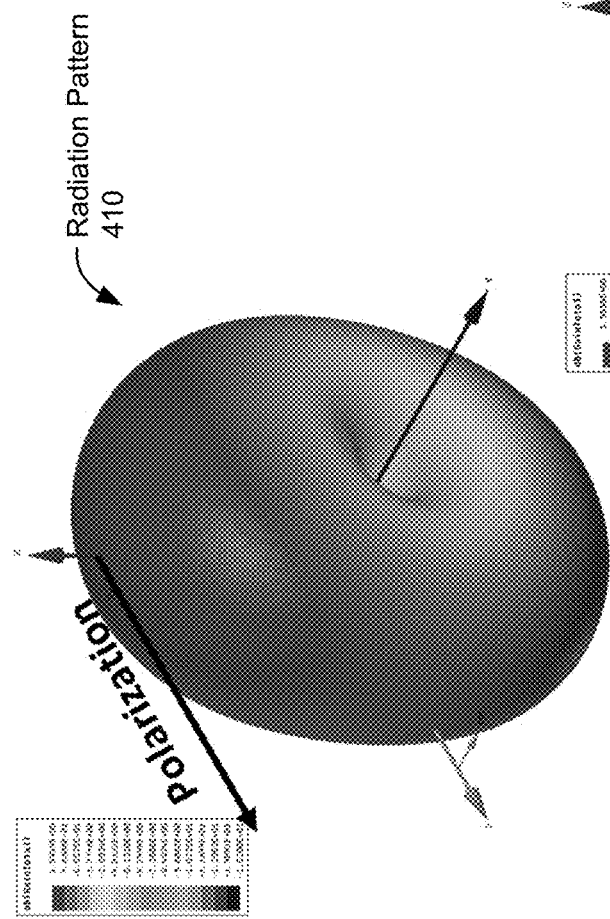
FIGURE 4B-1
FIGURE 4B-2
FIGURE 4C

Radiation Pattern Cross-Section
820

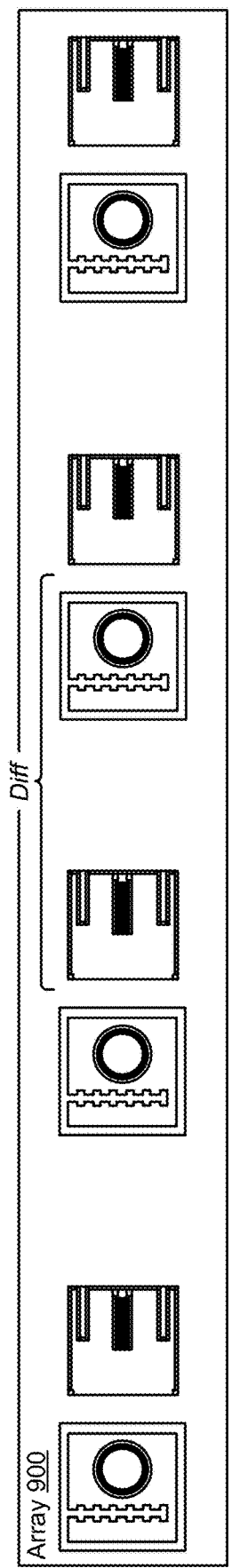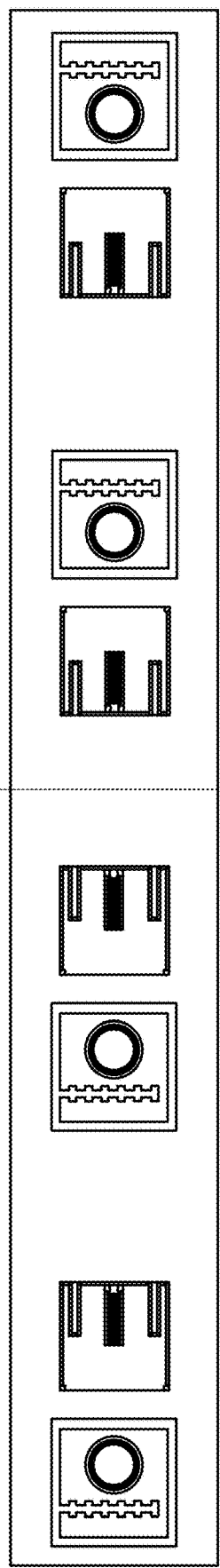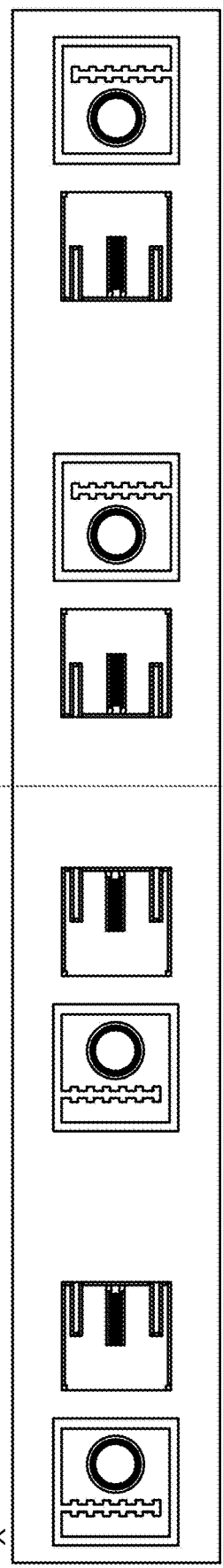
FIGURE 9A-1
FIGURE 9A-2
FIGURE 9A-3

Radiation Pattern Cross-Section 940

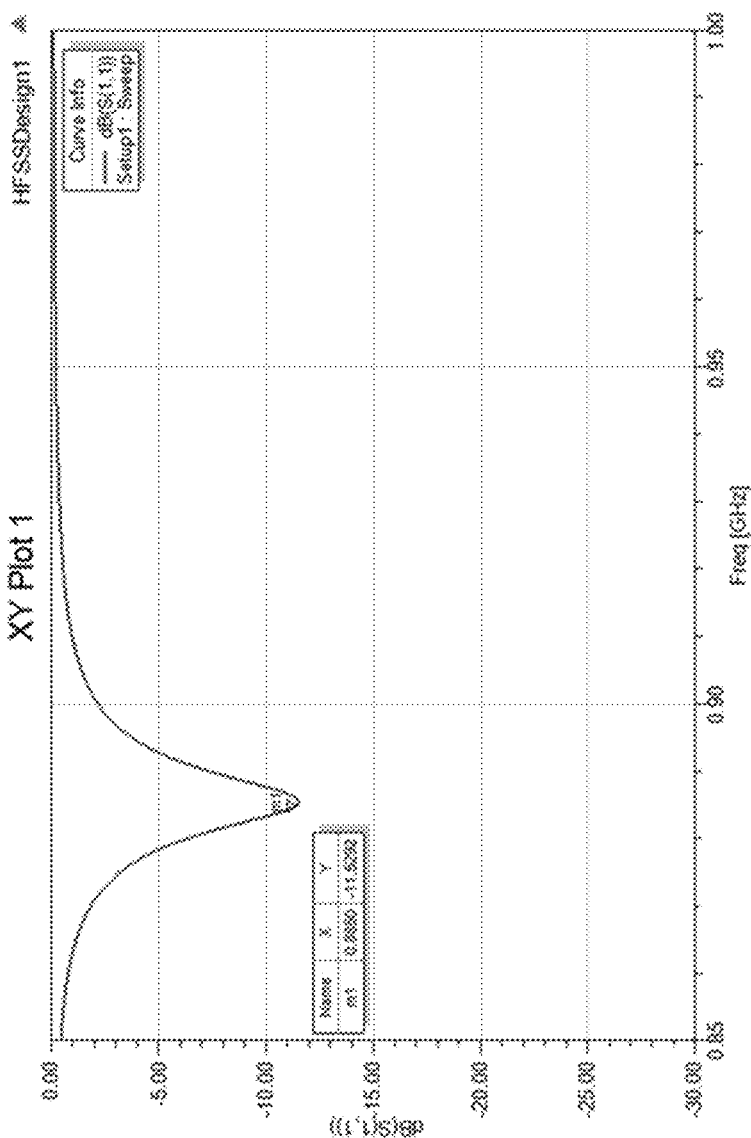
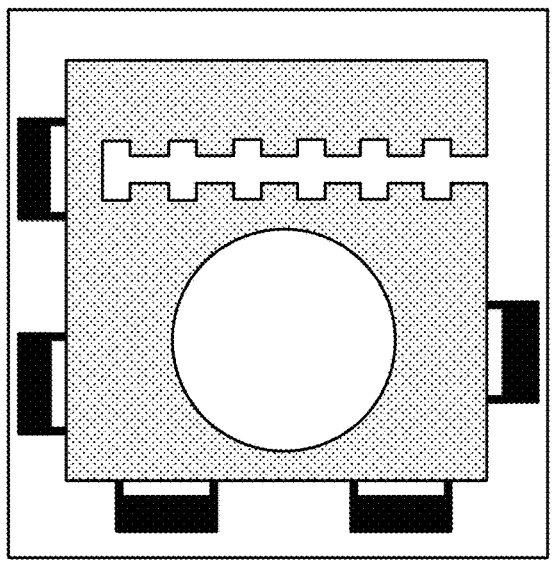
FIGURE 12F

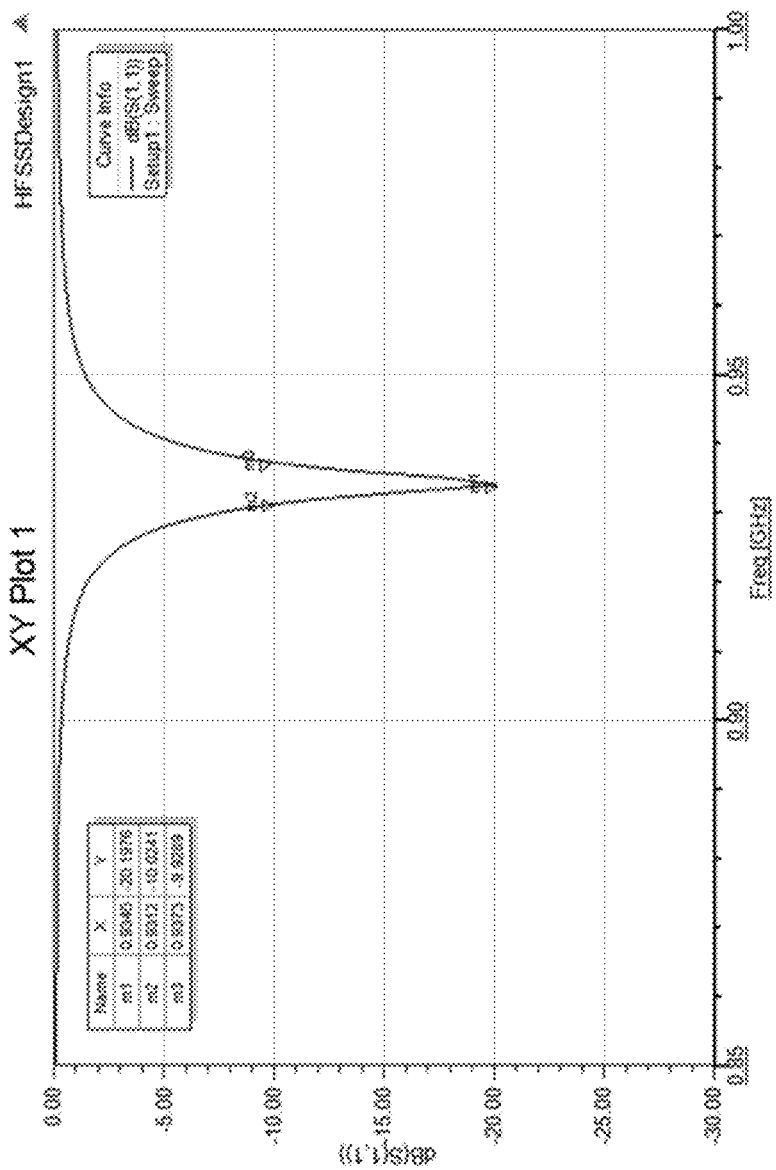
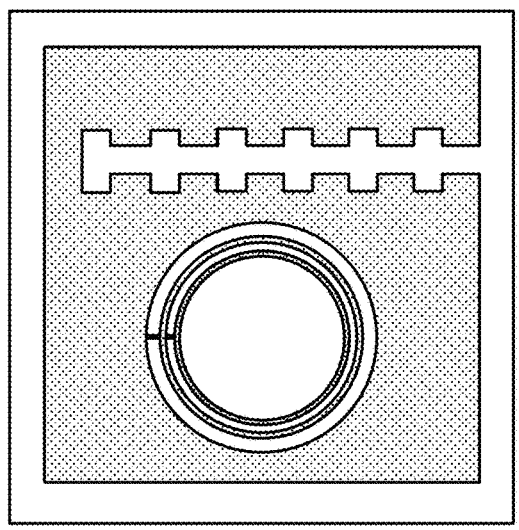
FIGURE 12G

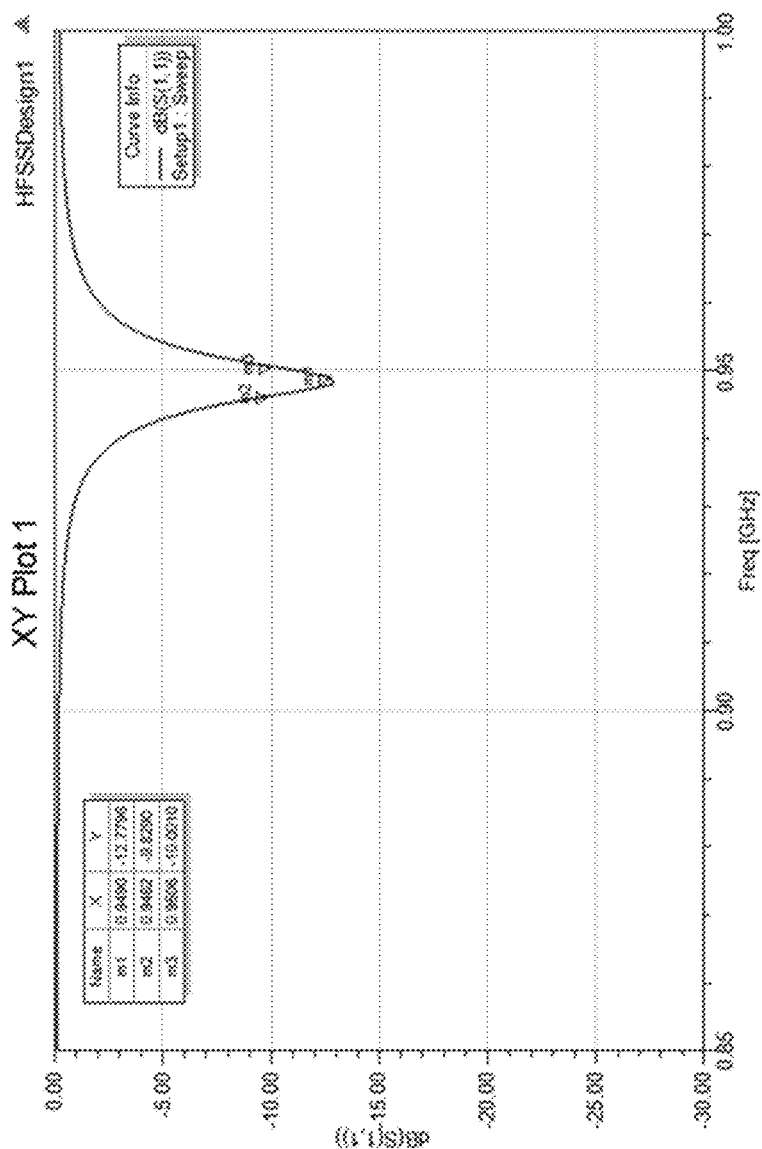
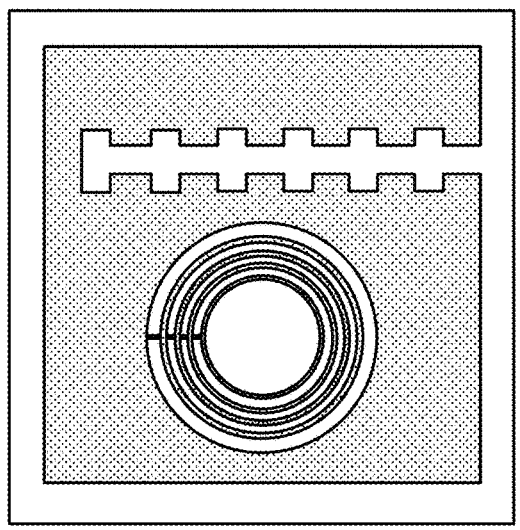
FIGURE 12H

Radiation Pattern
1320

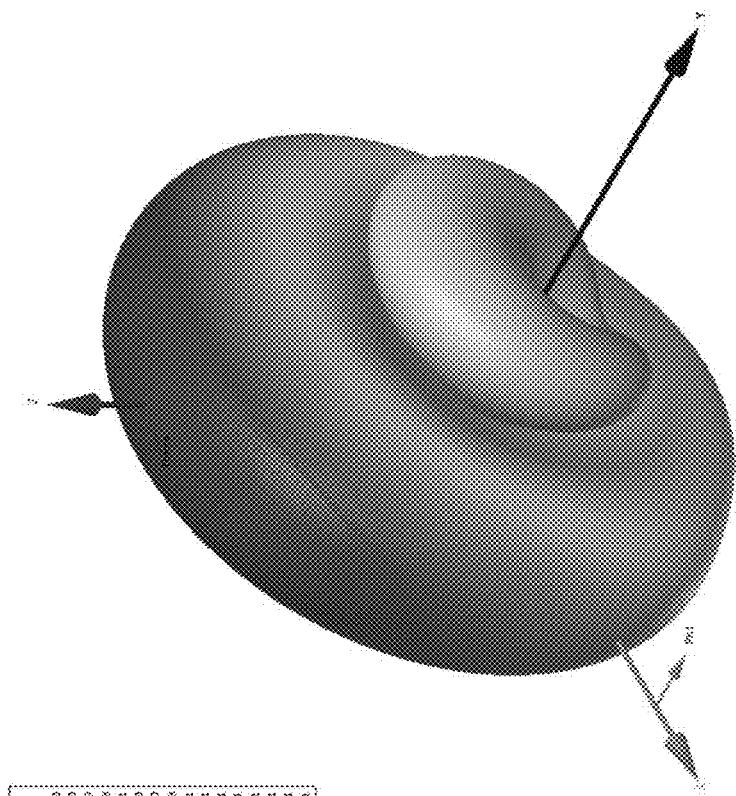
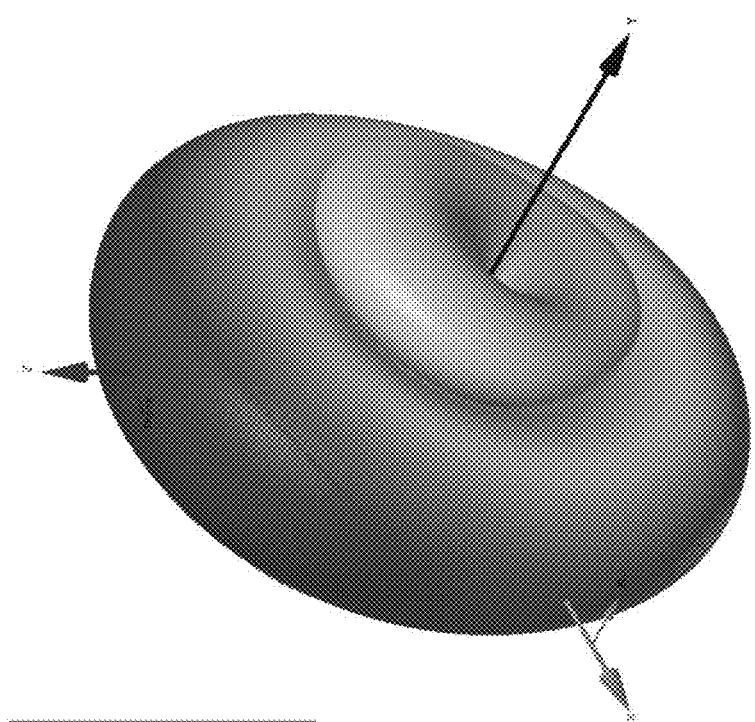
FIGURE 13G

Coupling Diagram 1450

Radiation Pattern Cross-Section 1630

2000

```
┌─────────────────────────────────────────────────────────────────┐
│ At a wireless-power-transmitting device that includes an antenna │
│ array, the antenna array including a first antenna group of at   │──2002
│ least two antennas and a second antenna group of at least two    │
│ antennas distinct from the first antenna group                   │
└─────────────────────────────────────────────────────────────────┘
                                  │
                                  ▼
┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
│   Receive a signal from a wireless-power-receiving device         │──2004
│   indicating a location of the wireless-power-receiving device    │
└─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
```

Based on the location of the wireless-power-receiving device, select: (i) a first value for a first transmission characteristic that is used for transmission of electromagnetic waves by the at least two antennas in the first antenna group, and (ii) a second value, distinct from the first value, for the first transmission characteristic that is used for transmission of electromagnetic waves by the at least two antennas in the second antenna group ──2006

Transmit to the location of the wireless-power-receiving device, by the at least two antennas in the first antenna group, first electromagnetic waves with the first value for the first transmission characteristic ──2008

Transmit to a focal point that is further from the wireless-power-transmitting device than the location of the wireless-power-receiving device, by the at least two antennas in the second antenna group, second electromagnetic waves with the second value for the first transmission characteristic ──2010

Transmit to the focal point, by at least two antennas in a third antenna group of the wireless-power-transmitting device, third electromagnetic waves with the second value for the first transmission characteristic ──2012

FIGURE 20

POWER WAVE TRANSMISSION TECHNIQUES TO FOCUS WIRELESSLY DELIVERED POWER AT A LOCATION TO PROVIDE USABLE ENERGY TO A RECEIVING DEVICE

RELATED APPLICATION

This application is a continuation of U.S. patent application Ser. No. 17/964,731, which is a divisional of U.S. patent application Ser. No. 16/405,900, filed May 7, 2019 (now U.S. Pat. No. 11,515,732), and entitled "Power Wave Transmission Techniques To Focus Wirelessly Delivered Power At A Receiving Device," which claims priority to U.S. Provisional Patent Application No. 62/689,745, filed Jun. 25, 2018, entitled "Antenna Structures, Antenna Array Configurations, and Power Wave Transmission Techniques to Focus Wirelessly Delivered Power at a Receiving Device," each of which is hereby incorporated by reference in their entirety.

TECHNICAL FIELD

The present disclosure also relates generally to antenna structures, antenna array configurations (e.g., arrays with co-polarized antenna groups that produce perpendicularly oriented radiation patterns), and power wave transmission techniques to focus wirelessly-delivered power at a receiving device.

BACKGROUND

Portable electronic devices such as smartphones, tablets, notebooks and other electronic devices have become a necessity for communicating and interacting with others. The frequent use of portable electronic devices, however, uses a significant amount of power, which quickly depletes the batteries attached to these devices. Inductive charging pads and corresponding inductive coils in portable devices allow users to wirelessly charge a device by placing the device at a particular position on an inductive pad to allow for a contact-based charging of the device due to magnetic coupling between respective coils in the inductive pad and in the device.

Conventional inductive charging pads, however, suffer from many drawbacks. For one, users typically must place their devices at a specific position and in a certain orientation on the charging pad because gaps ("dead zones" or "cold zones") exist on the surface of the charging pad. In other words, for optimal charging, the coil in the charging pad needs to be aligned with the coil in the device in order for the required coupling to occur. This results in a frustrating experience for many users as they may be unable to properly charge their devices, or may assume that their device is charging but will later find out that the device was not properly positioned on an inductive charging pad and therefore did not receive any charge at all.

Charging using electromagnetic radiation (e.g., microwave radiation power waves) offers promise, but antenna elements used in antenna arrays for RF, at-a-distance charging typically suffer from inefficiencies caused by mutual coupling between neighboring antenna elements, especially when spacing between adjacent elements is minimized (e.g., smaller than a half-wavelength). Moreover, evolving government regulations from governments around the world (which must be complied with to legally sell products in various jurisdictions around the world, and to ensure that the radiation is transmitted in a safe manner) typically require that wireless power transfer using electromagnetic radiation focus power around a receiving element and suppress radiation elsewhere. Because these regulations are not well-defined and are constantly evolving and because of physical constraints of conventional transmission techniques (e.g., defocusing effects), designing a power-transmission device that will comply with these regulations is a very difficult proposition.

SUMMARY

Accordingly, there is a need for a wireless transmission solution that substantially reduces mutual coupling between neighboring (e.g., adjacent) antenna elements in densely populated antenna arrays. One solution, as disclosed herein, is for neighboring antenna elements to be co-polarized, and also for the neighboring antenna elements to produce first and second electromagnetic radiation patterns that are perpendicularly oriented relative to one another. In such a configuration, it has been discovered that mutual coupling between neighboring antenna elements is reduced substantially, such that effects caused by mutual coupling are negligible. In light of this, antenna arrays that implement this principle can be miniaturized as the antenna elements that compose the antenna array are less susceptible to mutual coupling (which would further negatively impact antenna performance (e.g., radiation efficiency), especially for very small antenna elements), and therefore can be tightly packed together. Example antenna array designs for accomplishing the solution are described below.

(A1) In some embodiments, an antenna array (e.g., antenna array 110-1, FIG. 1) includes first and second antennas that: (i) are spaced-apart, (ii) co-polarized, and (iii) are configured to produce first and second electromagnetic ("EM") radiation patterns, respectively. The first EM radiation pattern has a higher concentration of EM energy produced along orthogonal first and second axes relative to a concentration of EM energy produced along a third axis orthogonal to the first and second axes, and the second EM radiation pattern has a higher concentration of EM energy produced along the first and third axes relative to a concentration of EM energy produced along the second axis. The first and second antennas, at least in some embodiments, are the antenna structures discussed below in Section C. Further, non-limiting examples arrangement of the first and second antennas are illustrated in FIGS. 5, 6A, 7A, 8A, and 9A-1 to 9A-3.

(A2) In some embodiments of the antenna array of A1, the first antenna is a first antenna type, and the second antenna is a second antenna type different from the first antenna type.

(A3) In some embodiments of the antenna array of any of A1-A2, the first and second EM radiation patterns are formed by EM waves having a frequency and a wavelength (k). Further, the first and second antennas are spaced-part by a distance that is less than ($\lambda/2$) and a coupling effect between the first and second antennas is less than −10 decibels (dB) when the first and second antennas are respectively radiating the EM waves that form the first and second radiation patterns.

(A4) In some embodiments of the antenna array of any of A1-A3, the distance is less than $\frac{1}{10}$ lambda.

(A5) In some embodiments of the antenna array of any of A1-A4, the distance is less than $\frac{1}{15}$ lambda.

(A6) In some embodiments of the antenna array of any of A1-A5, the distance is less than $\frac{1}{30}$ lambda.

(A7) In some embodiments of the antenna array of any of A1-A6, the coupling effect between the first and second antennas is between approximately −10 dB to −24 dB.

(A8) In some embodiments of the antenna array of any of A1-A7, the coupling effect between the first and second antennas is between approximately −15 dB to −24 dB.

(A9) In some embodiments of the antenna array of any of A1-A8, the coupling effect between the first and second antennas is between approximately −20 dB to −24 dB.

(A10) In some embodiments of the antenna array of any of A1-A9, the first and second antennas each include (i) opposing first and second surfaces and (ii) a transmitting element. Further, the respective first surfaces are coupled to a base through which a feeding element extends to provide an EM signal to the respective transmitting element positioned on the respective second surfaces. In some embodiments, the respective second surfaces are substantially co-planar with one another.

(A11) In some embodiments of the antenna array of any of A1-A10, the first and second antennas form a first antenna group and the antenna array further includes a second antenna group, including: (i) a third antenna configured to radiate one or more third EM waves that form a third radiation pattern, and (ii) a fourth antenna, spaced-apart from the third antenna by the distance, configured to radiate one or more fourth EM waves that form a fourth radiation pattern. The first, second, third, and fourth antennas are co-polarized.

(A12) In some embodiments of the antenna array of A11, the first and second antennas are spaced apart by a first non-zero distance, and the first antenna group is spaced-apart from the second antenna group by a second non-zero distance greater than the first non-zero distance.

(A13) In some embodiments of the antenna array of any of A11-A12, the first and second antenna groups are collinearly aligned along a first axis, and the first and second antenna groups are offset along a second axis, orthogonal to the first axis, by the second distance.

(A14) In some embodiments of the antenna array of any of A11-A13, the first and third antennas have a first orientation, and the second and fourth antennas have a second orientation.

(A15) In some embodiments of the antenna array of any of A11-A13, an orientation of the first and second antennas mirrors an orientation of the third and fourth antennas, respectively.

(A16) In some embodiments of the antenna array of any of A11-A13, an orientation of the first and second antennas is rotated 180 degrees relative to an orientation of the third and fourth antennas, respectively.

(A17) In some embodiments of the antenna array of A11, the first and second antennas are spaced apart by a first non-zero distance, and the first antenna group is spaced-apart from the second antenna group by a second non-zero distance less than the first non-zero distance.

(A18) In some embodiments of the antenna array of A17, the first and fourth antennas are adjacent to one another and spaced-apart by the second non-zero distance, and the second and third antennas are adjacent to one another and spaced-apart by the second non-zero distance.

(A19) In some embodiments of the antenna array of any of A1-A18, the first and second EM radiation patterns combine to form a third EM radiation pattern when the first and second antennas produce the first and second EM radiation patterns, respectively. Further, when a receiver device is positioned within a predefined distance from the antenna array and in the path of the third EM radiation pattern, the receiver device uses energy from the third EM radiation pattern to power or charge the receiver device.

Below are some example antennas that can be used in the antenna array of any of A1-A19.

(B1) In some embodiments, an antenna (e.g., antenna 1000, antenna 1100, antenna 1500, or antenna 1600) for radiating electromagnetic waves having a wavelength ($\lambda$), includes: (i) a substrate having a largest dimension (e.g., a cross-sectional dimension) that is less than approximately $0.25\lambda$ in length, (ii) first and second pins extending from the substrate, (iii) a first radiating element offset from the substrate by a first distance and coupled to the first and second pins, the first radiating element following a first meandering pattern, and (iv) a second radiating element offset from the substrate by a second distance greater than the first distance and coupled to the first radiating element, the second radiating element following a second meandering pattern. In some embodiments, the first and second radiating elements are positioned within a border of the substrate. Furthermore, in some embodiments, the first radiating element includes first and second elements (e.g., arms, branches) that can be symmetrical (e.g., first and second radiating elements 1004 and 1006, FIG. 10A; lower elements 1518-1 and 1518-2, FIG. 15D) or unsymmetrical. In some embodiments, the substrate includes one or more traces adapted to apply a phase shift to some of the electromagnetic waves radiated by the antenna (e.g., phase shifting line 1508, FIG. 15B).

(C1) In some embodiments, an antenna (e.g., antenna 1000, antenna 1100, antenna 1500, or antenna 1600) for radiating electromagnetic waves having a wavelength ($\lambda$), includes (i) a substrate having a largest dimension (e.g., a cross-sectional dimension) that is less than approximately $0.25\lambda$ in length, (ii) first and second pins that are coupled to the substrate, (iii) a first radiating element, offset from the substrate by a first distance and coupled to the first pin, that follows a first meandering pattern, (iv) a second radiating element, offset from the substrate by a second distance and coupled to the second pin, that follows a second meandering pattern mirroring the first meandering pattern, and (v) a third radiating element, offset from the substrate by a third distance greater than the first and second distances, that follows a third meandering pattern.

Furthermore, in some embodiments, (i) the first radiating element is coupled to a first end portion of the third radiating element, (ii) the second radiating element is coupled to a second end portion, different from the first end portion, of the third radiating element, and (iii) the first, second, and third radiating elements are positioned within a border of the substrate.

(C2) In some embodiments of the antenna of C1, the first and second radiating elements are co-planar, and the first and second distances are the same.

(C3) In some embodiments of the antenna of any of C1-C2, the third meandering pattern substantially mirrors a combination of the first and second meandering patterns. In some embodiments, an overall length of the third meandering pattern is approximately $1\lambda$. Alternatively, in some embodiments, an overall length of the third meandering pattern is greater than (or less than) $1\lambda$.

(C4) In some embodiments of the antenna of any of C1-C3, the substrate includes a first half and a second half, the first pin is positioned in the first half of the substrate, and the second pin is positioned in the second half of the substrate. Further, the first radiating element is positioned in the first half of the substrate, and the second radiating element is positioned in the second half of the substrate.

(C5) In some embodiments of the antenna of any of C1-C4, the first, second, and third radiating elements include a plurality of coplanar segments, each of the plurality of coplanar segments including: a first segment defined in a first direction, a second segment defined in a second direction perpendicular to the first direction, and a third segment defined in the first direction.

(C6) In some embodiments of the antenna of C5, the plurality of coplanar segments is a plurality of continuous segments.

(C7) In some embodiments of the antenna of C5, the plurality of coplanar segments is a plurality of contiguous segments.

(C8) In some embodiments of the antenna of any of C1-C7, the first pin is coupled to an EM (e.g., a radio frequency) signal port and the second pin is a grounding pin. For example, the first pin may be coupled, via the EM port, to one or more power amplifiers and/or power feeding circuitry.

(C9) In some embodiments of the antenna of any of C1-C8, the third radiating element includes first and second end pieces (e.g., tabs 1010-A, 1010-B, FIG. 10A; folds 1517, FIG. 15D) coupled with the first and second radiating elements, respectively, and the first and second end pieces differ in shape from a body of the third radiating element. Alternatively, in some embodiments, the end pieces are distinct pieces of the antenna. Alternatively, in some embodiments, the end pieces are part of the first and/or second radiating elements.

(C10) In some embodiments of the antenna of any of C1-C9, the substrate is a first substrate, and the antenna further includes a second substrate having opposing first and second surfaces, offset from the first substrate. Moreover, the first and second radiating elements are attached to the first surface of the second substrate, and the third radiating element is attached to the second surface of the second substrate.

(C11) In some embodiments of the antenna of C10, the first and second radiating elements each includes (i): two parallel segments spaced apart and not directly coupled to each other, and (ii) a plurality of connectors (e.g., tuning elements 1120 and 1122, FIG. 11A) disposed in an area between the two parallel segments, where each of the plurality of connectors is (i) perpendicular to the two parallel segments and (ii) switchably coupled to the two parallel segments. Alternatively or in addition, in some embodiments, the third radiating element includes (i): two parallel segments spaced apart and not directly coupled to each other, and (ii) a plurality of connectors (e.g., tuning elements 1120 and 1122, FIG. 11A) disposed in an area between the two parallel segments, where each of the plurality of connectors is (i) perpendicular to the two parallel segments and (ii) switchably coupled to the two parallel segments.

(C12) In some embodiments of the antenna of C11, the first and second radiating elements are tuned to a first frequency when a first connector of the plurality of connectors is switchably coupled to the two parallel segments, and the first and second radiating elements are tuned to a second frequency, different from the first frequency, when a second connector, different from the first connector, of the plurality of connectors is switchably coupled to the two parallel segments. Further, in those embodiments where the third radiating element includes the plurality of connectors, the third radiating element may also be tuned to various frequencies.

(C13) In some embodiments of the antenna of any of C10-C12, the first and second radiating elements (and/or the third radiating element) each includes a plurality of tuning elements switchably coupled to one another in series (e.g., tuning elements 1124 and 1126, FIG. 11A).

(C14) In some embodiments of the antenna of any of C10-C13, further including first and second vias extending through the second substrate to couple the first radiating element with the third radiating element and the second radiating element with the third radiating element, respectively.

(C15) In some embodiments of the antenna of any of C1-C9, the first, second, and third radiating elements are made from stamped metal.

(C16) In some embodiments of the antenna of any of C1-C9 and C15, further including dielectric support material disposed periodically between (i) the first radiating element and the third radiating element, and (ii) the second radiating element and the third radiating element.

(C17) In some embodiments of the antenna of any of C1-C9 and C15-C16, further including additional dielectric support material disposed periodically between the first and second radiating elements and the substrate.

(D1) In some embodiments, an antenna (e.g., antenna 1200 and antenna 1400) for radiating electromagnetic waves having a wavelength ($\lambda$), includes (i) a substrate including first and second opposing surfaces, the first surface including at least one edge that is less than approximately 0.2$\lambda$ in length, (ii) a radiating element coupled to the first surface of the substrate and separated from the at least one edge by a non-zero distance, the radiating element defining first and second distinct cutouts, and (iii) a feed, defined through the substrate, coupling the radiating element to transmission circuitry. In some embodiments, the antenna further includes one or more tuning elements switchably (or non-switchably) connected to the radiating element, the one or more tuning elements being configured to adjust an operating frequency of the radiating element.

(D2) In some embodiments of the antenna of D1, the first cutout has a first shape, and the second cutout has a second shape distinct from the first shape.

(D3) In some embodiments of the antenna of any of D1-D2, wherein a length of an edge of the radiating element is shorter than the length of the at least one edge.

(D4) In some embodiments of the antenna of any of D1-D3, the first cutout is a circular cutout, and the one or more tuning elements include a plurality of concentric rings positioned within the circular cutout.

(D5) In some embodiments of the antenna of D4, adjusting the operating frequency of the radiating element includes connecting a first concentric ring of the plurality of concentric rings to the radiating element, and connecting the first concentric ring changes the operating frequency of the radiating element from a first frequency to a second frequency greater than the first frequency. In some embodiments, changing the number of points connecting the first concentric ring to the radiating element changes the value of the frequency (i.e., changes a difference between the first and second frequencies).

(D6) In some embodiments of the antenna of D5, adjusting the operating frequency of the radiating element further includes connecting two or more concentric rings of the plurality of concentric rings to the radiating element, the two or more concentric rings including the first concentric ring, and connecting the two or more concentric rings changes the operating frequency of the radiating element from the second frequency to a third frequency greater than the second frequency.

(D7) In some embodiments of the antenna of D4, the circular cutout has a first radius, and the plurality of concentric rings includes: (i) a first concentric ring, switchably connected to the radiating element, having a second radius smaller than the first radius, and a second concentric ring, switchably connected to the first concentric ring, having a third radius smaller than the second radius.

(D8) In some embodiments of the antenna of D4, the plurality of concentric rings includes four concentric rings.

(D9) In some embodiments of the antenna of any of D1-D3, the one or more tuning elements include a plurality of rectangular segments on the first surface of the substrate, and at least one of the plurality of rectangular segments is positioned along the at least one edge of the first surface of the substrate.

(D10) In some embodiments of the antenna of D9, adjusting the operating frequency of the radiating element includes connecting a first rectangular segment of the plurality of rectangular segments to the radiating element, and connecting the first rectangular segment changes the operating frequency of the radiating element from a first frequency to a second frequency less than the first frequency. The first rectangular segment may be switchably connected to or non-switchably connected to the radiating element.

(D11) In some embodiments of the antenna of D10, adjusting the operating frequency of the radiating element further includes connecting two or more rectangular segments of the plurality of rectangular segments to the radiating element, the two or more rectangular segments including the first rectangular segment, and connecting the two or more rectangular segments changes the operating frequency of the radiating element from the second frequency to a third frequency less than the second frequency.

(D12) In some embodiments of the antenna of any of D1-D3, the one or more tuning elements include: (i) a plurality of concentric rings positioned within the first cutout, and (ii) a plurality of rectangular segments on the first surface of the substrate. Furthermore, adjusting the operating frequency of the radiating element includes: (i) connecting at least one of the plurality of concentric rings to the radiating element, and (ii) connecting at least one of the plurality of rectangular segments to the radiating element.

(D13) In some embodiments of the antenna of D12, said connecting changes the operating frequency of the radiating element from a first frequency to a second frequency different from the first frequency.

(D14) In some embodiments of the antenna of any of D1-D13, the one or more tuning elements are configured to adjust the operating frequency of the radiating element based on signals from a controller managing operation of the antenna.

(D15) In some embodiments of the antenna of any of D1-D14, the substrate further includes a plurality of layers, and each layer of the plurality of layers has at least one edge that is aligned with the at least one edge of the first surface. The plurality of layers is stacked between the first and seconds surfaces of the substrate.

(D16) In some embodiments of the antenna of D15, further including one or more shorting vias, defined through the substrate, for coupling the first surface with the plurality of layers.

(D17) In some embodiments of the antenna of any of D1-D16, the radiating element is printed onto the first surface of the substrate, and the second surface of the substrate operates as a ground plane.

Further, there is also a need for a wireless transmission solution that complies with regulations that are constantly evolving and that overcomes physical constraints of conventional transmission techniques (e.g., defocusing effects). One solution is for antenna arrays (e.g., the antenna array of any of A1-A19) to compensate for anticipated defocusing by transmitting electromagnetic waves to different focal points. The precise locations of the different focal points are determined by a transmitter (e.g., transmitter 102, FIG. 2A) based on a location of a receiver device relative to the antenna array. In doing so, the transmitter is able to diminish effects of defocusing, and as a result, the transmitter's antenna array is able to transmit electromagnetic waves that sufficiently focus radiated energy at a receiver's location in compliance with respective governing regulations set by various agencies, e.g., the Federal Communications Commission (FCC) in the United States or the European Commission in the European Union. Methods of operating one such example transmitter (a "wireless-power-transmitting device") are described below.

(E1) In some embodiments, a method of wirelessly charging a wireless-power-receiving device includes, providing a wireless-power-transmitting device including an antenna array, the antenna array including a first antenna group of at least two antennas and a second antenna group of at least two antennas distinct from the first antenna group, where the wireless-power-transmitting device is in communication with a controller. The method further includes, based on a location of a wireless-power-receiving device, selecting by the controller: (i) a first value for a first transmission characteristic that is used for transmission of electromagnetic waves by the at least two antennas in the first antenna group, and (ii) a second value, distinct from the first value, for the first transmission characteristic that is used for transmission of electromagnetic waves by the at least two antennas in the second antenna group. The method further includes (i) transmitting to the location of the wireless-power-receiving device, by the at least two antennas in the first antenna group, first electromagnetic waves with the first value for the first transmission characteristic, and (ii) transmitting to a focal point that is further from the wireless-power-transmitting device than the location of the wireless-power-receiving device, by the at least two antennas in the second antenna group, second electromagnetic waves with the second value for the first transmission characteristic. The wireless-power-receiving device uses energy from at least the first electromagnetic waves to power or charge the wireless-power-receiving device.

(E2) In some embodiments of the method of E1, the antenna array further includes a third antenna group of at least two antenna elements, and the method further includes: transmitting, to the focal point that is further from the wireless-power-transmitting device than the location of the wireless-power-receiving device, by the at least two antennas in the third antenna group, third electromagnetic waves with the second value for the first transmission characteristic. Alternatively, in some embodiments, the method further includes: transmitting, to the focal point that is further from the wireless-power-transmitting device than the location of the wireless-power-receiving device, by the at least two antennas in the third antenna group, third electromagnetic waves with a third value for the first transmission characteristic, where the third value is different from the second value.

(E3) In some embodiments of the method of E2, the first antenna group is positioned between the second and third antenna groups within the antenna array, and the first antenna group is separated from the second and third antenna groups by at least a non-zero spacing distance.

(E4) In some embodiments of the method of any of E2-E3, the second value is greater than the first value.

(E5) In some embodiments of the method of any of E2-E4, the first transmission characteristic is amplitude. As one example, the first transmission characteristic is amplitude (e.g., to manipulate power levels) for the transmission of electromagnetic waves, and the controller selects the values to be used by each of the groups of antennas for this first transmission characteristic. In some embodiments, the controller may select additional values for other transmission characteristics as well. For example, the controller may also select respective values for phase, gain, polarization, frequency, etc.

(E6) In some embodiments of the method of any of E2-E5, the selecting also includes selecting respective phase settings for (i) each antenna of the at least two antennas in the first antenna group, (ii) each antenna of the at least two antennas in the second antenna group, and (iii) each antenna of the at least two antennas in the third antenna group. The first, second, and third electromagnetic waves are transmitted using the respective phase settings.

(E7) In some embodiments of the method of E6, respective phase settings for the at least two antennas in the second antenna group and respective phase settings for the at least two antennas of the third antenna group are the same.

(E8) In some embodiments of the method of any of E3-E7, the second and third antenna groups include a same number of antennas, and the first antenna group includes fewer than the same number of antennas.

(E9) In some embodiments of the method of any of E1-E8, the location of the wireless-power-receiving device is positioned along an axis extending away from the antenna array, and the focal point is further from the antenna array along the axis.

(E10) In some embodiments of the method of any of E1-E9, the at least two antennas in the first antenna group and the at least two antennas in the second antenna group are co-planar. Further, in some embodiments, antennas within each group are also co-polarized and have perpendicular radiation patterns, such as the antenna array of any of A1-A19.

(E11) In some embodiments of the method of any of E1-E10, the first and second values are predetermined.

(E12) In some embodiments of the method of any of E1-E11, the first and second values are stored in a lookup table, and selecting the first and second values includes obtaining, by the controller, the first and second values from the lookup table.

(E13) In some embodiments of the method of any of E1-E12, transmission of the first and second electromagnetic waves generates: (i) a local minimum of electromagnetic energy at a first distance from the antenna array, and (ii) a local maximum of electromagnetic energy at a second distance greater than the first distance from the antenna array. The location of the wireless-power-receiving device is at a third distance greater that the second distance from the antenna array.

(E14) In some embodiments of the method of E13, the first and second electromagnetic waves have a wavelength ($\lambda$), and a difference between the second and third distances is less than or equal to $1\lambda$.

(E15) In some embodiments of the method of E14, the local maximum of electromagnetic energy has a first power level, and transmission of the first and second electromagnetic waves generates a sphere of electromagnetic energy having a second power level at a distance of $1\lambda$ from the local maximum. The second power level is less than the first power level by a predetermined amount (in other words, the wireless-power-transmitting device is able to produce a roll-off of power level away from the local maximum of electromagnetic energy and that roll-off is by, e.g., 3 dB (an example of the predetermined amount) at $1\lambda$ from the local maximum.

(E16) In some embodiments of the method of any of E2-E7, the at least two antennas in the first antenna group are positioned in a central region of the antenna array, and respective at least two antennas of each of the second and third antenna groups are positioned in opposing edge regions of the antenna array.

(E17) In some embodiments of the method of any of E1-E16, the selecting is performed upon determining that the wireless-power-receiving device is located within a wireless-power-transmission range of the wireless-power-transmitting device.

(E18) In some embodiments of the method of any of E1-E17, further including receiving, via an antenna of the antenna array, a signal from the wireless-power-receiving device, detecting a phase of the signal, and determining, by the controller, the location of the wireless-power-receiving device relative to the antenna array based on the phase of the signal.

(E19) In some embodiments of the method of any of E1-E18, the electromagnetic waves are transmitted at a frequency of approximately 5.8 GHz, 2.4 GHz, or 900 MHz.

In some embodiments, the first and second antenna groups of the wireless-power-transmitting device described in E1-E19 above each respectively include the first and second antennas described in A1. Various modifications may also be made to the wireless-power-transmitting device to include the features described in A2-A19.

(E20) In one other aspect, a wireless power transmitter is provided, and the wireless power transmitter includes the structural characteristics for a wireless-power-transmitting device described above in any of E1-E19 or below in any of F1-F10, and the wireless power transmitter is also configured to perform the method steps described above in any of E1-E19 or below in any of F1-F10.

(E21) In another aspect, a wireless power transmitter that includes one or more of the antenna arrays described in any of A1-A19 is provided. In some embodiments, the wireless power transmitter is in communication with one or more processors and memory storing one or more programs which, when executed by the one or more processors, cause the wireless power transmitter to perform the method described in any one of E1-E19 or below in any of F1-F10.

(E22) In yet another aspect, a wireless power transmitter (that includes one or more of the antenna arrays described in any of A1-A19) is provided and the wireless power transmitter includes means for performing the method described in any one of E1-E19 or below in any of F1-F10.

(E23) In still another aspect, a non-transitory computer-readable storage medium is provided (e.g., as a memory device, such as external or internal storage, that is in communication with a wireless power transmitter). The non-transitory computer-readable storage medium stores executable instructions that, when executed by a wireless power transmitter (that includes one or more of the antenna arrays described in any of A1-A19) with one or more processors/cores, cause the wireless power transmitter to perform the method described in any one of E1-E19 or below in any of F1-F10.

(F1) In some embodiments, another method of wirelessly charging a wireless-power-receiving device includes providing a wireless-power-transmitting device that includes an antenna array (e.g., antenna array of any of A1-A19). The method includes radiating electromagnetic waves that form a maximum power level at a first distance away (e.g., 1 wavelength away from the wireless-power-transmitting device, the wavelength being defined based on an operating frequency of the antenna array) from the antenna array. Further, a power level of the radiated electromagnetic waves decreases, relative to the maximum power level, by at least a predefined amount (e.g., 3 dB, 2 dB, 1 dB, 0.5 dB, or another predefined amount based on governing regulations and desired power focusing) at a radial distance away from the maximum power level. The radial distance may be predefined.

(F2) In some embodiments of the method of F1, a wireless-power-receiving device is located a second distance, greater than the first distance, away from the antenna array, and the wireless-power-receiving device is located within, at least partially, the predefined radial distance away from the maximum power level.

(F3) In some embodiments of the method of F2, the wireless-power-receiving device uses energy from the radiated electromagnetic waves to power or charge the wireless-power-receiving device.

(F4) In some embodiments of the method of any of F1-F3, the decrease in the power level of the radiated electromagnetic from the maximum power level is a monotonic decrease.

(F5) In some embodiments of the method of any of F1-F4, the radiated electromagnetic waves have a frequency and a wavelength ($\lambda$), and the predefined radial distance ranges from approximately $0.5\lambda$ to $2\lambda$. Alternatively, in some embodiments, the predefined radial distance ranges from approximately 0.5 feet to 2 feet.

(F6) In some embodiments of the method of F5, the predefined radial distance is approximately $1\lambda$.

(F7) In some embodiments of the method of any of F1-F6, the method also includes, before radiating the electromagnetic waves: detecting (or determining) a location of a wireless-power-receiving device. The location of the wireless-power-receiving device is further from the antenna array than a location of the maximum power level.

(F8) In some embodiments of the method of F7, the method further includes, after detecting the location of the wireless-power-receiving device and before radiating the electromagnetic waves: determining settings for the electromagnetic waves based on the location of the wireless-power-receiving device relative to the antenna array. The determined settings for the electromagnetic waves may include values for one or more transmission characteristics.

(F9) In some embodiments of the method of F8, the electromagnetic waves are radiated using the determined settings.

(F10) In some embodiments of the method of F9, the antenna array includes first and second groups of antennas and radiating the electromagnetic waves includes: (i) radiating a first plurality of electromagnetic waves from antenna elements in the first group of antennas using first settings from the determined settings, wherein a first transmission focal point for the antenna elements in the first group of antennas is the location of the wireless-power-receiving device, and (ii) radiating a second plurality of electromagnetic waves from antenna elements in the second group of antennas using second settings, different from the first settings, from the determined settings. The antenna elements in the second group of antennas have a second transmission focal point that is another location that is further from the antenna array than the location of the wireless-power-receiving device.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 3B-1 and 3B-2 illustrate radiation patterns generated by the first and second antennas of FIG. 3A, respectively, in accordance with some embodiments.

FIGS. 4A-4E illustrate the detrimental effects caused by mutual coupling in antenna arrays using some conventional antennas.

FIGS. 6B-1 and 6B-2 illustrate radiation patterns generated by individual antennas of the example antenna duplet of FIG. 6A, respectively, in accordance with some embodiments.

FIGS. 11C-1 to 11C-3 illustrate various coupling diagrams for the second embodiment of the drop-in antenna when it is operating at different frequencies.

FIGS. 12E-1 and 12E-2 illustrate various configurations of tuning elements of the third embodiment of the drop-in antenna in accordance with some embodiments.

FIGS. 12F-12H illustrate various coupling diagrams for the third embodiment of the drop-in antenna when it is operating at different frequencies.

FIG. 13B-1 shows a radiation pattern produced by the dual-polarized antenna depicted in FIG. 13A.

FIG. 13B-2 is a diagram that shows mutual coupling effects for the dual-polarized antenna, in accordance with some embodiments.

FIG. 13G shows radiation patterns produced by the antenna array of FIG. 13E.

FIGS. 14A-1 and 14A-2 illustrate embodiments of an air-suspended capacitor-loaded patch antenna in accordance with some embodiments.

FIGS. 15A-15E illustrate a first embodiment of a multi-dimensional dipole antenna over folded shield an.

FIGS. 15H-1 to 15H-3 show various example array configurations, in accordance with some embodiments.

FIG. 20 is a flow diagram showing a method of wireless power transmission in accordance with some embodiments.

Figure 1:
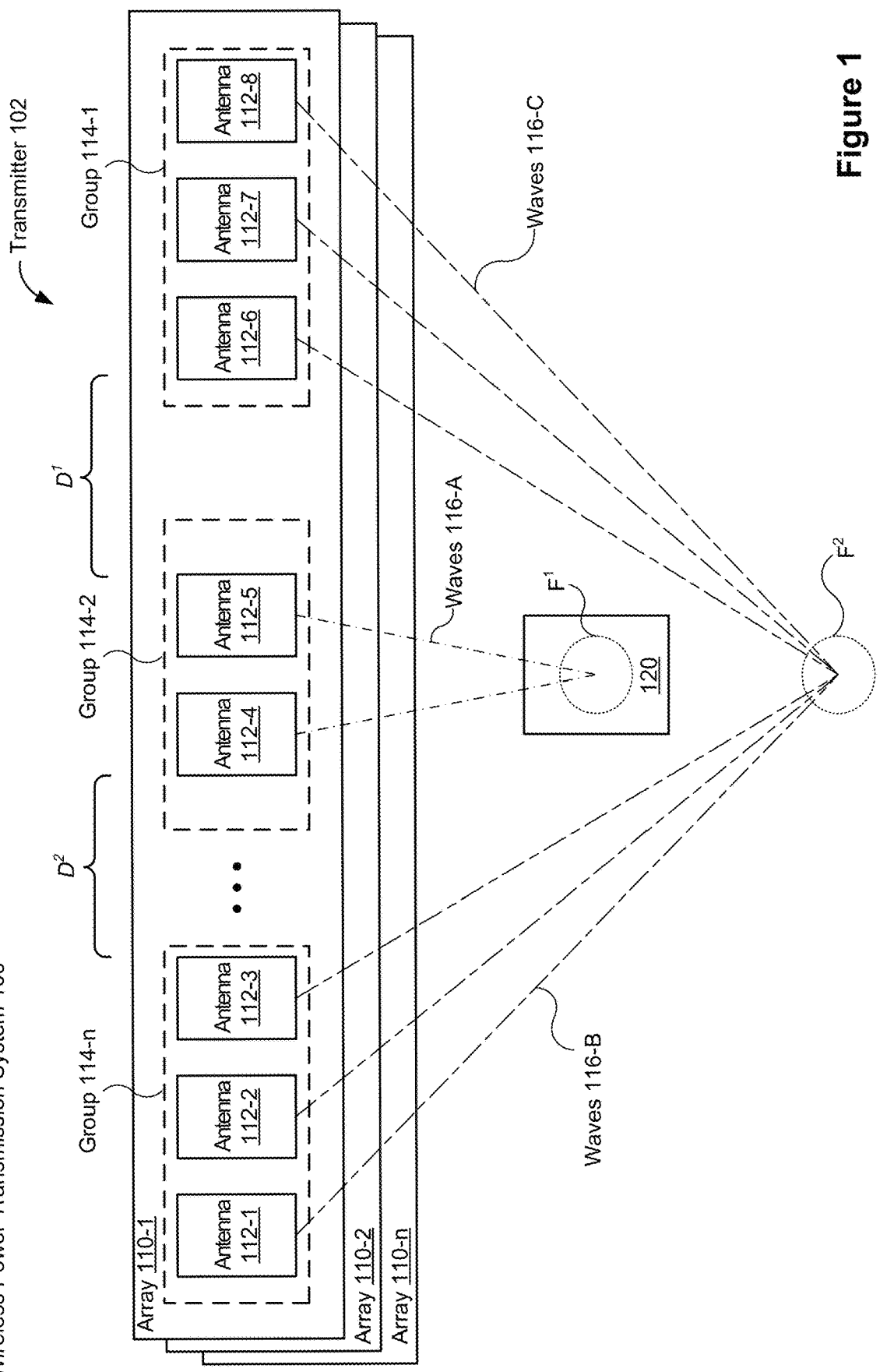
FIG. 1 is a block diagram illustrating a representative wireless power transmission system that produces a desired power focusing in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

For ease of explanation, the description that follows is broken into the following sections: A) Example Wireless Power Transmission Systems; B) Example Antenna Array Configurations, Including Example Antenna Arrays with Co-Polarized Antenna Groups that Produce Perpendicularly Oriented Radiation Patterns, C) Drop-in Antenna Structures, D) Dual-Polarized Antenna, E) Embodiments of Multidimensional Dipole Antennas Over Folded Shield, and F) Power Wave Transmission Techniques to Focus Wirelessly Delivered Power at a Receiving Device.

Section A: Example Wireless Power Transmission Systems

FIG. 1 is a high-level block diagram of a wireless power transmission system 100, in accordance with some embodiments. The wireless power transmission system 100 includes, for example, one or more wireless-power-transmitting devices 102 and one or more wireless-power-receiving devices 120 (FIG. 1 depicts one wireless-power-transmitting device 102 and one wireless-power-receiving device 102 for ease of illustration and discussion). In some embodiments, each wireless-power-receiving device 102 includes a respective electronic device 122 (FIG. 2B) and appropriate circuitry for receiving and using wireless power waves (e.g., antennas 252 and power harvesting circuitry 256). For example, the appropriate circuitry may be coupled to and/or embedded in the electronic device 122, thereby enabling the device 122 to be charged using wirelessly-delivered power waves. For simplicity, the wireless-power-transmitting device 102 is also referred to more simply as a transmitter 102, and the wireless-power-receiving device 120 is also referred to more simply as a receiver 120.

An example transmitter 102 includes one or more antenna arrays 110-1, 110-2, . . . 110-$n$. Further, each antenna array 110 includes a plurality of antenna groups 114-1, 114-2, . . . 114-$n$, where each antenna group 114 includes a plurality of antennas 112. The number of antennas shown in each of the plurality of antenna groups 114-1, 114-2, . . . 114-$n$ is merely one example configuration. As shown, the plurality of antenna groups 114-1, 114-2, . . . 114-$n$ are spaced-apart by distances ($D^1$ and $D^2$), which may be the same or different distances. Antennas 112 within each of the antenna groups 114 are configured to transmit (e.g., radiate) electromagnetic power transmission waves (e.g., electromagnetic waves 116-A, 116-B, and 116-C) to a focal point (e.g., $F^1$ or $F^2$). In some embodiments, antennas 112 from one or more antenna groups 114 transmit electromagnetic waves to a first focal point ($F^1$) while antennas 112 from one or more other antenna groups 114 transmit electromagnetic waves to a second focal point ($F^2$) that is further from the antenna array 110 relative to a location of the first focal point ($F^1$). In this way, the transmitter diminishes defocusing effects. As a result, the transmitter 102 is able to transmit electromagnetic waves in compliance with governing regulations set by various agencies around the world (e.g., the Federal Communications Commission (FCC) in the United States). Governing regulations are discussed in further detail below with reference to FIGS. 17-20.

Furthermore, depending on values of particular transmission characteristics (e.g., phase, amplitude, gain, polarization, frequency, etc.) of the electromagnetic waves transmitted by antennas 112 in the various antenna groups 114, some of the electromagnetic waves "constructively interfere" at a focal point while some of the electromagnetic waves "destructively interfere" at (or around) a focal point. To provide some context, constructive interference of electromagnetic waves (e.g., radio frequency waves) typically occurs when two or more electromagnetic waves 116 are in phase with each other and converge into a combined wave such that an amplitude of the combined wave is greater than amplitude of a single one of the electromagnetic waves. For example, the positive and negative peaks of sinusoidal waveforms arriving at a location from multiple antennas "add together" to create larger positive and negative peaks. In some embodiments, a focal point is a point in a transmission field to which antennas are transmitting power waves to thereby cause constructive interference of electromagnetic waves at or very close to (e.g., within 0.1 wavelength of a frequency of the EM waves) the focal point. In contrast, destructive interference of electromagnetic waves occurs when two or more electromagnetic waves are out of phase and converge into a combined wave such that the amplitude of the combined wave is less than the amplitude of a single one of the electromagnetic waves. For example, the electromagnetic waves "cancel each other out," thereby diminishing the amount of energy concentrated at a location in the transmission field. In some embodiments, destructive interference is used to generate a negligible amount of energy or "null" at locations within the transmission field that are outside of the target focal points (e.g., by at least 1 wavelength of distance away from each respective focal point).

In some embodiments, values for transmission characteristics of the electromagnetic waves transmitted by antennas 112-6 to 112-8 in a first group 114-1 are the same as values for transmission characteristics of the electromagnetic waves transmitted by antennas 112-4, 112-5 in a second group 114-2 and different from values for transmission characteristics of the electromagnetic waves transmitted by antennas 112-1 to 112-3 in a third group 114-$n$. Alternatively, in some embodiments, the values for transmission characteristics of the electromagnetic waves transmitted by the antennas in each respective group are different, at least partially. In certain embodiments or circumstances, some of the transmission characteristics used within antenna groups may also vary (e.g., amplitude settings may by the same for antennas within an antenna group, but phase settings may vary). Values for transmission characteristics are discussed in further detail below with reference to FIGS. 17-20.

Figure 2A:
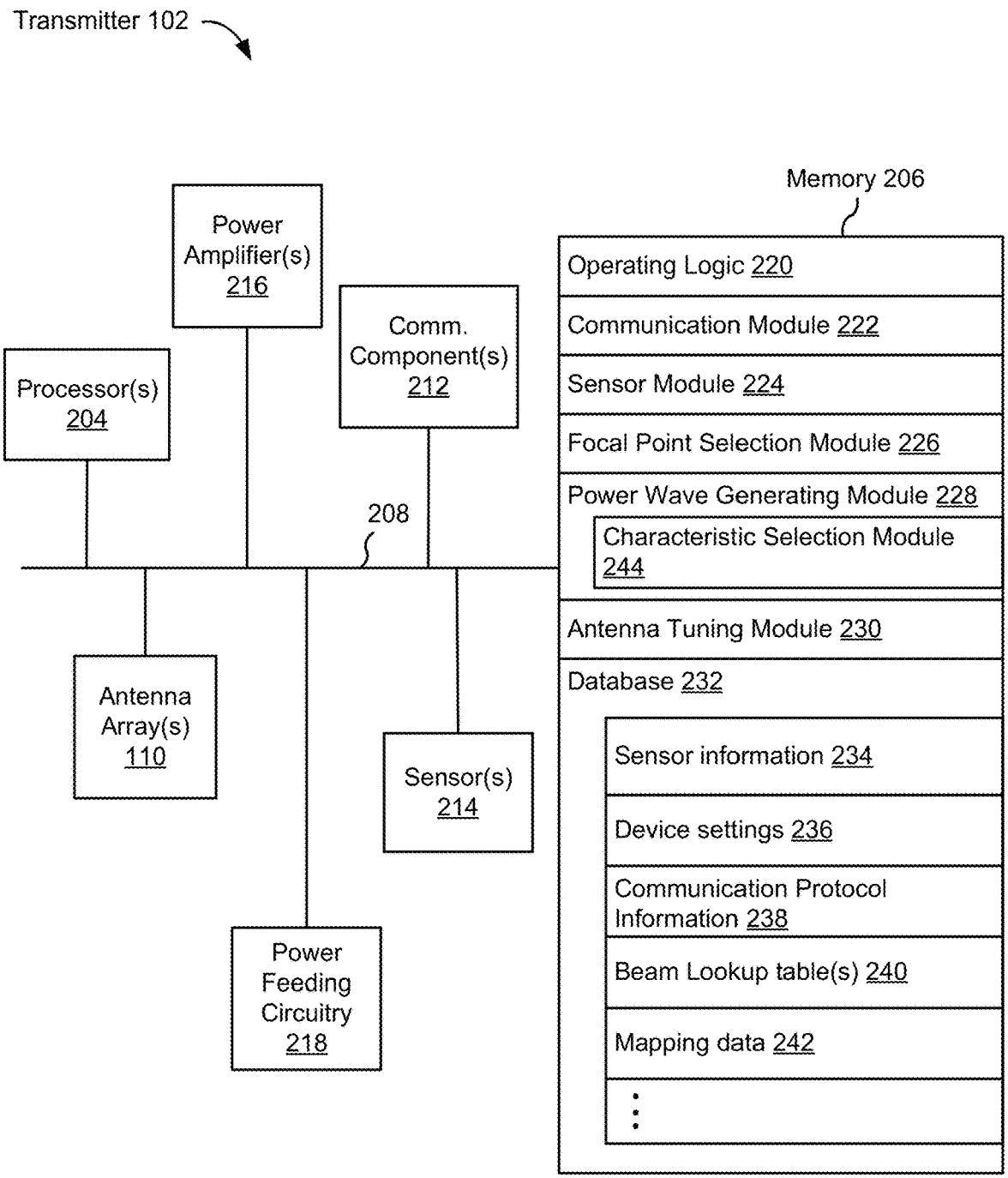
FIG. 2A is a block diagram illustrating a representative wireless-power-transmitting device in accordance with some embodiments.

FIG. 2A is a block diagram illustrating a representative transmitter device 102 (also sometimes referred to interchangeably herein as a transmitter 102 and a wireless-power-transmitting device 102) in accordance with some embodiments. The transmitter device 102 includes one or more processing units 204 (e.g., CPUs, ASICs, FPGAs, microprocessors, and the like), memory 206, one or more antenna arrays 110, and one or more communication buses 208 for interconnecting these components (sometimes called a chipset). Further, the transmitter device 102 may include one or more communication components 212, one or more sensors 214, one or more power amplifiers 216, and power feeding circuitry 218. In some embodiments, the transmitter device 102 further includes a location detection device, such as a GPS (global positioning satellite) or other geo-location receiver, for determining the location of the transmitter device 102. The one or more processing units 204 are sometimes referred to herein as "processors" or "controllers."

In some embodiments, a single processor 204 executes software modules for controlling multiple transmitters 102. In some embodiments, a single transmitter 102 includes multiple processors 204, such as one or more transmitter processors (configured to, e.g., control transmission of signals by one or more antenna arrays 110), one or more communications component processors (configured to, e.g., control communications transmitted by communications component 212 and/or receive communications by way of communications component 212) and/or one or more sensor processors (configured to, e.g., control operation of transmitter sensor 214 and/or receive output from transmitter sensor 214). Furthermore, a single transmitter 102 may be configured to control one or more antenna arrays 110.

The one or more antenna arrays 110 are configured to transmit electromagnetic waves to one or more focal points (e.g., $F^1$ and $F^2$, FIG. 1), depending on instructions received from the one or more processing units 204. Each of the one or more antenna arrays 110 includes a plurality of antennas arranged in a plurality of antenna groups, as explained above with reference to FIG. 1. Various antenna array configurations and structural antenna designs are provided below.

The one or more communication components 212 (e.g., also referred to as "communication radios," or simply "radios") enable communication between the transmitter 102 and other devices and networks. In some embodiments, the one or more communication component 212 include, e.g., hardware capable of data communications using any of a variety of wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) wired protocols (e.g., Ethernet, HomePlug, etc.), and/or any other suitable communication protocol, including communication protocols not yet developed as of the filing date of this document.

In various embodiments, the one or more sensors 214 include but are not limited to one or more: thermal radiation sensors, ambient temperature sensors, humidity sensors, IR sensors, occupancy sensors (e.g., RFID sensors), ambient light sensors, pressure sensors, motion detectors, accelerometers, and/or gyroscopes.

The one or more power amplifiers 216 may be coupled with a power supply (not shown), and a respective power amplifier 216 draws energy from the power supply to provide electromagnetic waves to one or more of the antenna array(s) 110. Moreover, the respective power amplifier 216 may be coupled with the power feeding circuitry 218, which is configured to generate a suitable electromagnetic wave and provide that electromagnetic wave to the one or more power amplifier 216, where at least one power amplifier 216 in turn provides the electromagnetic wave to at least one antenna array 110. In some embodiments, the power feeding circuitry 218 includes an oscillator and/or a frequency modulator that is used to generate the electromagnetic wave so that it is appropriate for transmission (e.g., the electromagnetic wave has an appropriate power level, phase, frequency, etc. to ensure that a maximum amount of energy is transferred from the transmitter 102 to the receiver 120). Further, the power feeding circuitry 218 may include a combiner and one or more additional components to facilitate transmission of electromagnetic waves from antennas of the one or more antenna arrays.

Further, the one or more processors 204 may send an instruction to the one or more power amplifiers 216 that causes at least some of the one or more power amplifiers 216 to feed one or more electromagnetic signals to one or more of the antenna array(s) 110, e.g., based on the location of the receiver. Additionally, the transmitter 102 may include a switch that switchably couples the one or more power amplifiers 216 to a respective group (or groups) 114 of a respective antenna array (or antenna arrays) 110.

The memory 206 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 206, or alternatively the non-volatile memory within memory 206, includes a non-transitory computer-readable storage medium. In some embodiments, the memory 206, or the non-transitory computer-readable storage medium of the memory 206, stores the following programs, modules, and data structures, or a subset or superset thereof:

- operating logic 220 including procedures for handling various basic system services and for performing hardware dependent tasks;
- communication module 222 for coupling to and/or communicating with remote devices (e.g., remote sensors, transmitters, receivers, servers, mapping memories, etc.) in conjunction with communication component(s) 212;
- sensor module 224 for obtaining and processing sensor data (e.g., in conjunction with sensor(s) 214) to, for example, determine the presence, velocity, and/or positioning of objects in the vicinity of the transmitter 102;
- focal point selection module 226 for determining where to respective focal point(s) to use for transmission of electromagnetic waves based on information obtained by the communication module 222, the sensor module 224, and/or the antenna array(s) 110;
- power wave generating module 228 for generating and transmitting (e.g., in conjunction with antenna(s) 110) electromagnetic waves, including but not limited to, forming pocket(s) of energy at given locations (e.g., at one or more focal points). In some embodiments, the power wave generating module 228 also includes or is associated with a characteristic selection module 244 that is used to select values for transmission characteristics of transmitted electromagnetic waves;
- antenna tuning module 230 for tuning (e.g., up-tuning and down-tuning) antenna elements of the antenna array(s) 110, in conjunction with one or more electrical switches (e.g., switches 1120, 1122, 1124, and 1126, FIG. 11A); and
- database 232, including but not limited to:
  - sensor information 234 for storing and managing data received, detected, and/or transmitted by one or more sensors (e.g., sensors 114 and/or one or more remote sensors);
  - device settings 236 for storing operational settings for the transmitter 102 and/or one or more remote devices (e.g., sets of characteristics for the transmitter);
  - communication protocol information 238 for storing and managing protocol information for one or more protocols (e.g., custom or standard wireless protocols, such as ZigBee, Z-Wave, etc., and/or custom or standard wired protocols, such as Ethernet);
  - beam lookup table(s) 240 for storing values of transmission characteristics information that are selected based on a receiver's location (e.g., storing values for various waveform characteristics); and
  - mapping data 242 for storing and managing mapping data (e.g., mapping one or more transmission fields, and zones within respective transmission fields).

In some embodiments, the characteristic selection module 244 of the electromagnetic wave generating module 228 may be used to select values for particular transmission characteristics (also referred to herein as waveform characteristics) of transmitted electromagnetic waves. The waveform characteristics may include phase, gain, amplitude, direction, frequency, and polarization, and the selection module 244 may select particular values for each of those characteristics. In some embodiments, the selection module 244 may select the waveform characteristics based on information received from the receiver device 120 (or the electronic device 122), and/or using information stored in the beam lookup tables 240. In some embodiments, the selection module 244 and the antenna tuning module 230 work in tandem to select particular values for each of the characteristics. In some embodiments, many of the components described with reference to FIG. 2A are implemented on single integrated circuit, such as that described in detail in U.S. patent application Ser. No. 15/963,959, and the descriptions of this single integrated circuit (provided with reference to FIGS. 1A-1C in U.S. patent application Ser. No. 15/963,959) are incorporated by reference herein. Any of the antenna arrays or individual antennas described herein may be controlled by this single integrated circuit, which may also implement and control the power transmission techniques that are discussed below.

Each of the above-identified elements (e.g., modules stored in memory 206 of the transmitter 102) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 206, optionally, stores a subset of the modules and data structures identified above. Furthermore, the memory 206, optionally, stores additional modules and data structures not described above.

Figure 2B:
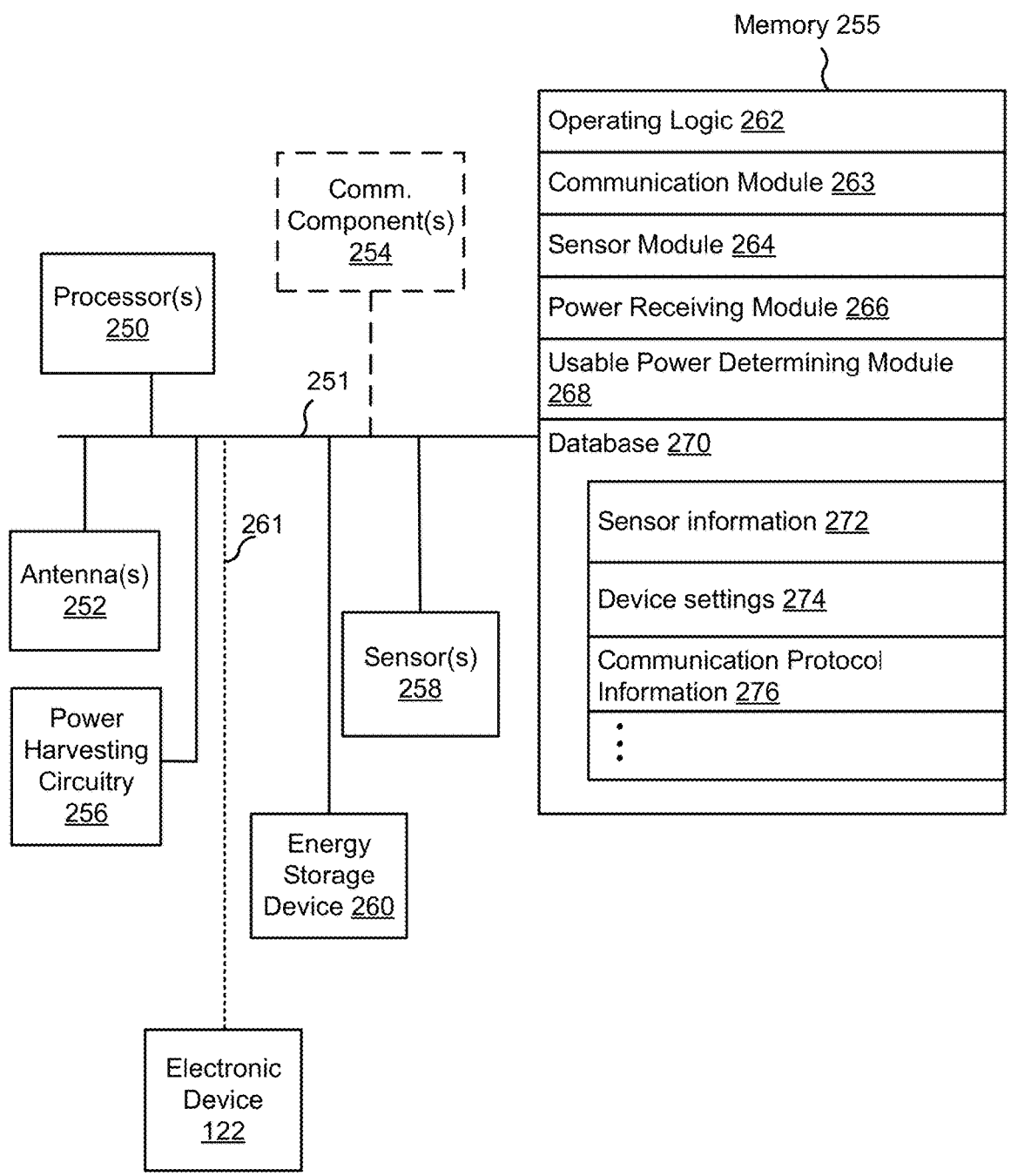
FIG. 2B is a block diagram illustrating a representative wireless-power-receiving device (also referred to simply as a receiver in this description) in accordance with some embodiments.

FIG. 2B is a block diagram illustrating a representative receiver device 120 (also referred to herein as a receiver 120 or a wireless power receiver/wireless-power-receiving device 120) in accordance with some embodiments. In some embodiments, the receiver device 120 includes one or more processing units 250 (e.g., CPUs, ASICs, FPGAs, microprocessors, and the like), one or more antenna 252, one or more communication components 254, memory 255, power harvesting circuitry 256, and one or more communication buses 251 for interconnecting these components (sometimes called a chipset). In some embodiments, the receiver device 120 includes one or more sensors 258. In some embodiments, the receiver device 120 includes an energy storage device 260 for storing energy harvested via the power harvesting circuitry 256. In various embodiments, the energy storage device 260 includes one or more batteries, one or more capacitors, one or more inductors, and the like. The one or more processing units 250 are sometimes referred to herein as "processors" or "controllers." The receiver 120 may be internally or externally connected to an electronic device 122 via a connection (e.g., a bus) 261. A combination of the receiver 120 and the electronic device 122 is sometimes referred to herein as a "wireless-power-receiving device."

In some embodiments, the power harvesting circuitry 256 includes one or more rectifying circuits and/or one or more power converters. In some embodiments, the power harvesting circuitry 256 includes one or more components (e.g., a power converter) configured to convert energy from electromagnetic waves to electrical energy (e.g., electricity). In some embodiments, the power harvesting circuitry 256 is further configured to supply power to a coupled electronic device 122, such as a laptop or phone. In some embodiments, supplying power to a coupled electronic device 112 includes translating electrical energy from an AC form to a DC form (e.g., usable by the electronic device 122).

In some embodiments, the receiver device 120 includes one or more output devices such as one or more indicator lights, a sound card, a speaker, a small display for displaying textual information and error codes, etc. (in some embodiments, the receiver device 120 sends information for display at an output device of an associated electronic device). In some embodiments, the receiver device 120 includes a location detection device, such as a GPS (global positioning satellite) or other geo-location receiver, for determining the location of the receiver device 120.

In various embodiments, the one or more sensors 258 include one or more thermal radiation sensors, ambient temperature sensors, humidity sensors, IR sensors, occupancy sensors (e.g., RFID sensors), ambient light sensors, motion detectors, accelerometers, and/or gyroscopes.

The optional communication component(s) 254 enable communication between the receiver 120 and other devices and networks. In some embodiments, the communication component(s) 254 include, e.g., hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) custom or standard wired protocols (e.g., Ethernet, HomePlug, etc.), and/or any other suitable communication protocol, including communication protocols not yet developed as of the filing date of this document. In some embodiments, the receiver 120 may utilize a built-in communication component (e.g., a Bluetooth radio) of the electronic device 122 with which the receiver 120 is coupled, and therefore, in these embodiments, the receiver 120 may not include its own communication component.

The memory 255 includes high-speed random access memory, such as DRAM, SRAM, DDR SRAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 255, or alternatively the non-volatile memory within memory 255, includes a non-transitory computer-readable storage medium. In some embodiments, the memory 255, or the non-transitory computer-readable storage medium of the memory 255, stores the following programs, modules, and data structures, or a subset or superset thereof:

operating logic 262 including procedures for handling various basic system services and for performing hardware dependent tasks;

communication module 263 for coupling to and/or communicating with remote devices (e.g., remote sensors, transmitters, receivers, servers, electronic devices, mapping memories, etc.) in conjunction with communication component(s) 254;

sensor module 264 for obtaining and processing sensor data (e.g., in conjunction with sensor(s) 258) to, for example, determine the presence, velocity, and/or positioning of the receiver 120, a transmitter 102, or an object in the vicinity of the receiver 120;

power receiving module 266 for receiving (e.g., in conjunction with antenna(s) 252 and/or power harvesting circuitry 256) electromagnetic waves and optionally converting (e.g., in conjunction with power harvesting circuitry 256) the electromagnetic waves into usable energy (e.g., to direct current); transferring the energy to a coupled electronic device (e.g., an electronic device 122); and optionally storing the energy (e.g., in conjunction with energy storage device 260)

usable power determining module 268 for determining (in conjunction with operation of the power receiving module 266) an amount of usable power received by the receiver 120 based on energy extracted from electromagnetic waves; and database 270, including but not limited to:

sensor information 272 for storing and managing data received, detected, and/or transmitted by one or more sensors (e.g., sensors 258 and/or one or more remote sensors);

device settings 274 for storing operational settings for the receiver 120, a coupled electronic device (e.g., an electronic device 122), and/or one or more remote devices; and communication protocol information 276 for storing and managing protocol information for one or more protocols (e.g., custom or standard wireless protocols, such as ZigBee, Z-Wave, etc., and/or custom or standard wired protocols, such as Ethernet).

In some embodiments, the usable power receiving module 268 communicates the amount of usable power to the communication module 263, which communicates (e.g., in conjunction with communication component(s) 254) the amount of usable power to other remote devices (e.g., transmitter 102, FIG. 2A). Moreover, in some embodiments, the usable power receiving module 268 communicates the amount of usable power to the database 270 (e.g., the database 270 stores the amount of usable power derived from electromagnetic waves). In some embodiments, the usable power receiving module 268 instructs the communication module 263 to transmit distinct transmissions to the remote devices (e.g., a first communication signal that indicates a first amount of usable power received by the receiver 120 and a second communication signal that indicates a second amount of usable power received by the receiver 120).

Each of the above identified elements (e.g., modules stored in memory 255 of the receiver 120) is optionally stored in one or more of the previously mentioned memory devices, and corresponds to a set of instructions for performing the function(s) described above. The above identified modules or programs (e.g., sets of instructions) need not be implemented as separate software programs, procedures, or modules, and thus various subsets of these modules are optionally combined or otherwise rearranged in various embodiments. In some embodiments, the memory 255, optionally, stores a subset of the modules and data structures identified above. Furthermore, the memory 255, optionally, stores additional modules and data structures not described above.

Figure 3A:
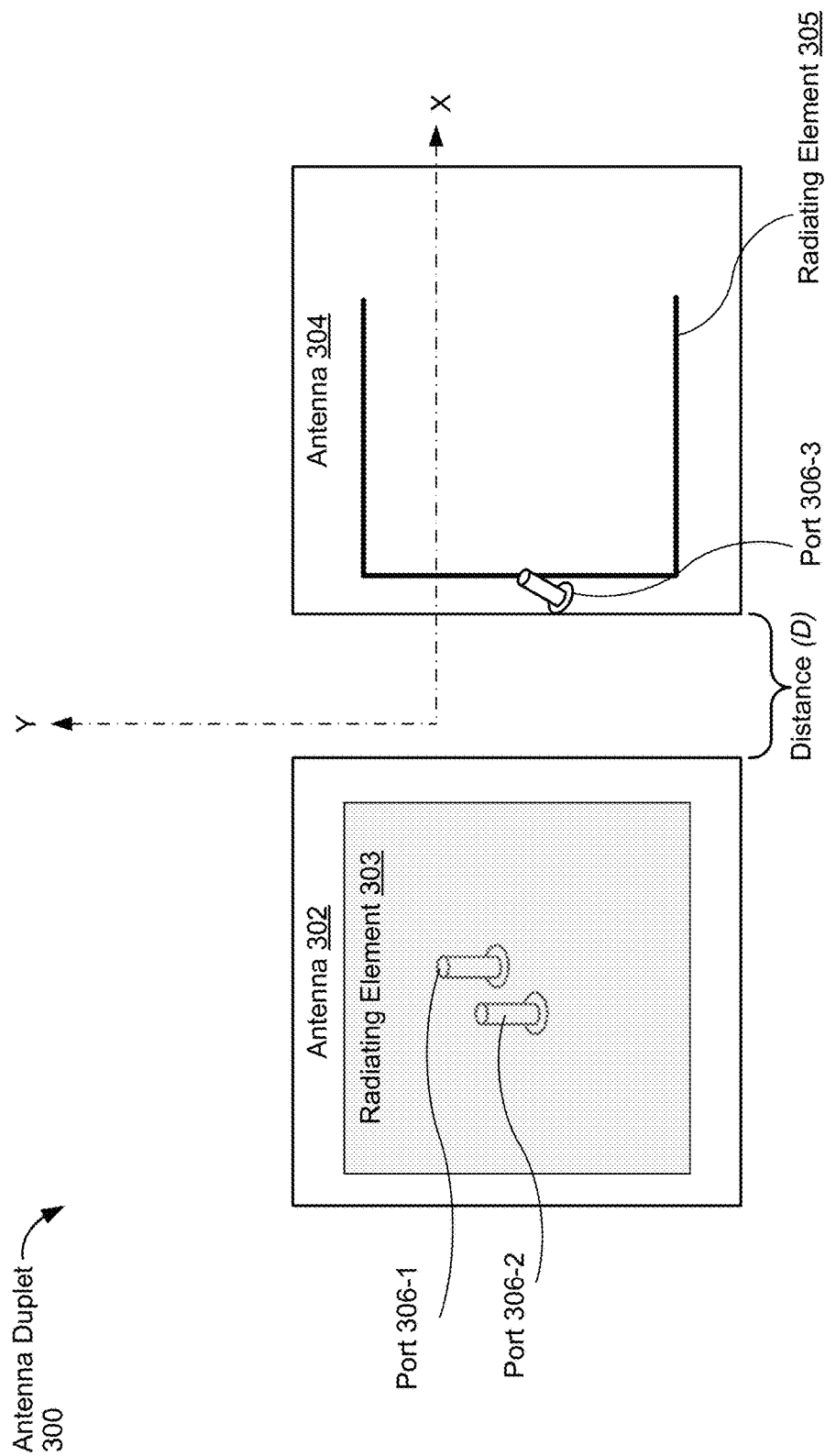
FIG. 3A illustrates an example duplet of co-polarized antennas that produce perpendicularly-oriented radiation patterns in accordance with some embodiments.

Section B: Example Antenna Array Configurations, Including Example Antenna Arrays with Co-Polarized Antenna Groups that Produce Perpendicularly Oriented Radiation Patterns FIG. 3A illustrates an example duplet 300 of co-polarized antennas 302, 304 that produce perpendicularly-oriented radiation patterns, in accordance with some embodiments. As shown, the antenna duplet 300 includes a first antenna 302 and a second antenna 304 spaced-apart by a distance (D) that is determined relative to an operating frequency (f) and associated wavelength ($\lambda$) of the antenna duplet 300. The distance between the first antenna 302 and the second antenna 304 can range from approximately $1/30\lambda$ (or less) to $\lambda/2$. In certain embodiments, the range can be larger, such as $1/50\lambda$ to $\lambda/2$ or may be smaller, such as $1/10\lambda$ to $\lambda/2$. The antenna duplet 300 may be part of an antenna array (e.g., antenna array 110, FIG. 1) that includes a plurality of antenna duplets (e.g., duplets 702 and 704, FIG. 7A). Although not shown in FIG. 3A, the antenna duplet 300 may be positioned on a metal reflector (which as discussed in more detail below does not alter the respective polarizations and/or radiation patterns of the antennas 302, 304).

Densely populated antenna arrays typically suffer from undesired mutual coupling between neighboring antenna elements, which limits the antenna array's radiation efficiency and its beamforming capabilities (this problem is particularly acute when the antenna elements are placed closed together and when the antenna elements are miniaturized). "Mutual coupling" refers to energy being absorbed by one antenna when another nearby antenna is radiating. When individual antennas are miniaturized, a certain amount of radiation efficiency is also sacrificed and, therefore, mutual coupling effects for miniaturized antennas further degrade an individual antenna's radiation efficiency making it difficult, if not impossible, for miniaturized antennas to transfer sufficient energy to a receiver that is located at a non-trivial distance away from the individual antenna (e.g., one-three feet away from the individual antenna).

By pairing together antennas that exhibit specific properties (e.g., co-polarization and perpendicularly-oriented radiation patterns), it has been discovered that mutual coupling between neighboring antenna elements is reduced substantially, such that mutual coupling between neighboring antenna elements is negligible (e.g., mutual coupling may be reduced to less than −20 dB, and, in some instances, to below −25 dB). In light of this discovery, the antenna array 110 (which includes pairs of antennas that exhibit these specific properties) can be miniaturized (e.g., to include smaller antennas that are placed closer together), without further impacting the array's radiation efficiency. Although miniaturized antennas are the primary examples utilized in the present description, the principles also apply to larger resonant antennas, such as half-wavelength antennas, possessing the equivalent co-polarization and radiation pattern orthogonality properties.

To provide some context for the distance (D), in some embodiments, the first and second antennas have operating frequencies that range from 400 MHz to 60 GHz. As an example, if the first and second antennas are operating at 915 MHz (e.g., radiating electromagnetic signals having a frequency of 915 MHz), then the distance (D) can range from approximately 1 cm to 16 cm when the distance (D) ranges from approximately $1/30\lambda$ to $\lambda/2$, respectively.

The various antenna types and combinations of antennas are discussed in detail below. Further, it is noted that an "antenna duplet" may be an example one of the plurality of antenna groups 114-1, . . . 114-n (FIG. 1).

Figures 2, 3B:
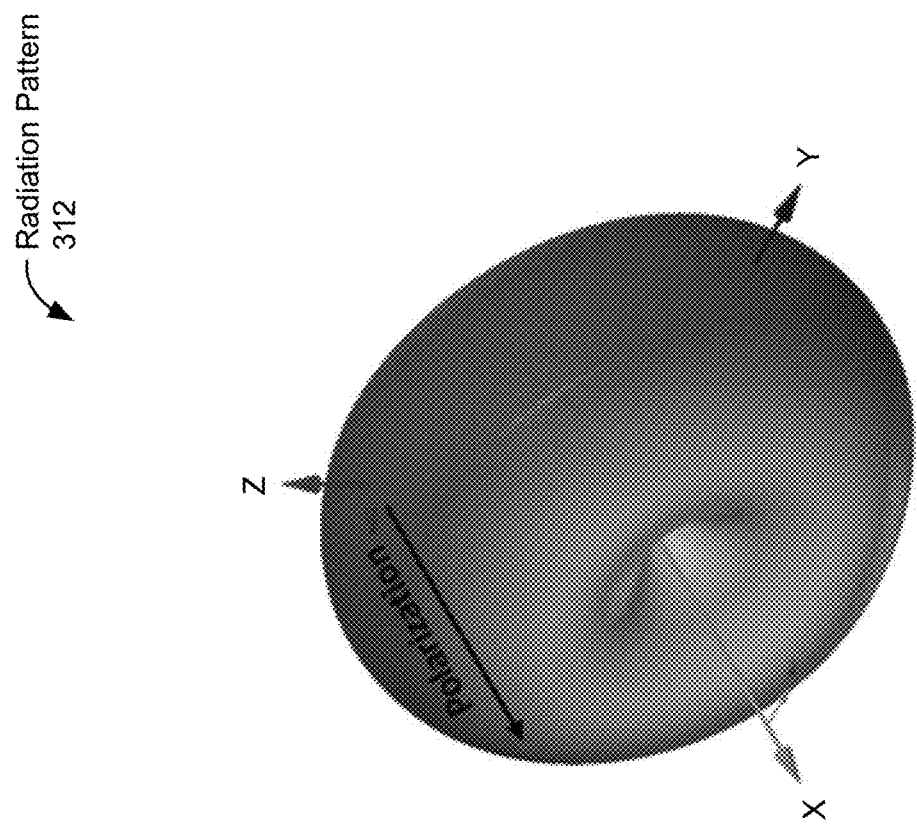
Figures 1, 3B:
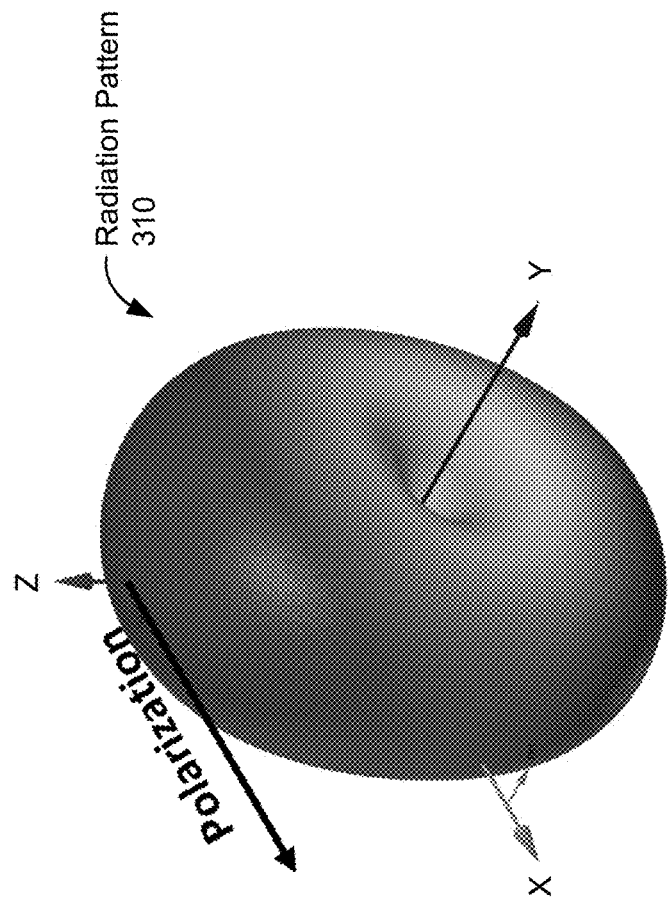

FIGS. 3B-1 and 3B-2 illustrate radiation patterns generated by the first antenna 302 (which includes ports 306-1 and 306-2, each respectively coupled with a radiating element 303) and the second antenna 304 (which includes port 306-3 that is coupled with a radiating element 305), respectively, in accordance with some embodiments. With reference to FIG. 3B-1, the first antenna 302 is configured to generate a first radiation pattern 310 polarized in a first direction (e.g., aligned with the X-axis), e.g., in response to electromagnetic waves being fed to the first antenna 302 (e.g., via one or more of the power amplifier(s) 216, FIG. 2A). As shown, the first radiation pattern 310 has a higher concentration of EM energy produced along the Z-axis and the X-axis (and has a radiation null along the Y-axis) and forms an overall torus shape. Now, with reference to FIG. 3B-2, the second antenna 304 is configured to generate a second radiation pattern 312 also polarized in the first direction, e.g., in response to electromagnetic waves being fed to the second antenna 304. Thus, the first and second antennas 302, 304 are both polarized in the first direction (e.g., both aligned with the X-axis), and therefore the two antennas are said to be "co-polarized." It is noted that a radiation pattern's orientation may be changed if, say, the antenna is rotated (e.g., rotated 90 degrees). Accordingly, orientations of the first and second antennas 302, 304 relative to each other are respectively selected to ensure that the antenna radiation patterns will be perpendicularly oriented relative to one another.

Further, the second radiation pattern 312 has a higher concentration of EM energy produced along the Z-axis and the Y-axis, and has a radiation null along the X-axis. Accordingly, while the first and second radiation patterns 310, 312 both form an overall torus shape, they are perpendicularly-oriented relative to one another. Stated another away, the first and second radiation patterns 310, 312 share a common axis with high concentrations of EM energy (e.g., both main lobes/beams in the first and second radiation patterns 310/312 travel along the Z-axis that moves away from a top surface of the antennas 302, 304), and also have high concentrations of EM energy on non-shared axes that are each orthogonal to the one shared axis. Because the respective non-shared axes are also perpendicular to one another, the first and second radiation patterns 310, 312 (e.g., their respective main lobes/beams) are said to be perpendicularly oriented relative to one another along at least one axis.

In such an arrangement, the first antenna 304 creates a radiation null along its Y-axis, which is the direction of maximum radiation of the second antenna 304. Therefore, the pair of adjacent antennas does not communicate, e.g., if the second antenna 304 is deemed a transmitter, then the first antenna 302 is arranged and configured relative to the second antenna 304 such that the first antenna 302 does not receive anything (or if it does receive some electromagnetic energy, its negligible. Thus, any mutual coupling between the two antennas 302, 304 in this configuration is minimal. Thus, the first and second antennas 302, 304 are configured to generate radiation patterns perpendicular to each other while also having electric field polarizations parallel to each other.

The discussion above can be summarized in the following way: the first radiation pattern 310 and the second radiation pattern 312 are both polarized along a first axis (e.g., the X-axis). Further, the first radiation pattern 310 is almost omnidirectional in the plane along the polarization direction and the second radiation pattern 312 is almost omnidirectional in a plane orthogonal to the first radiation pattern 310 and to the direction of the polarization, or interchangeably the first radiation pattern 310 is almost omnidirectional in a plane perpendicular to the polarization and the second radiation pattern 312 is almost omnidirectional in a plane co-planar with the polarization.

Figure 3C:
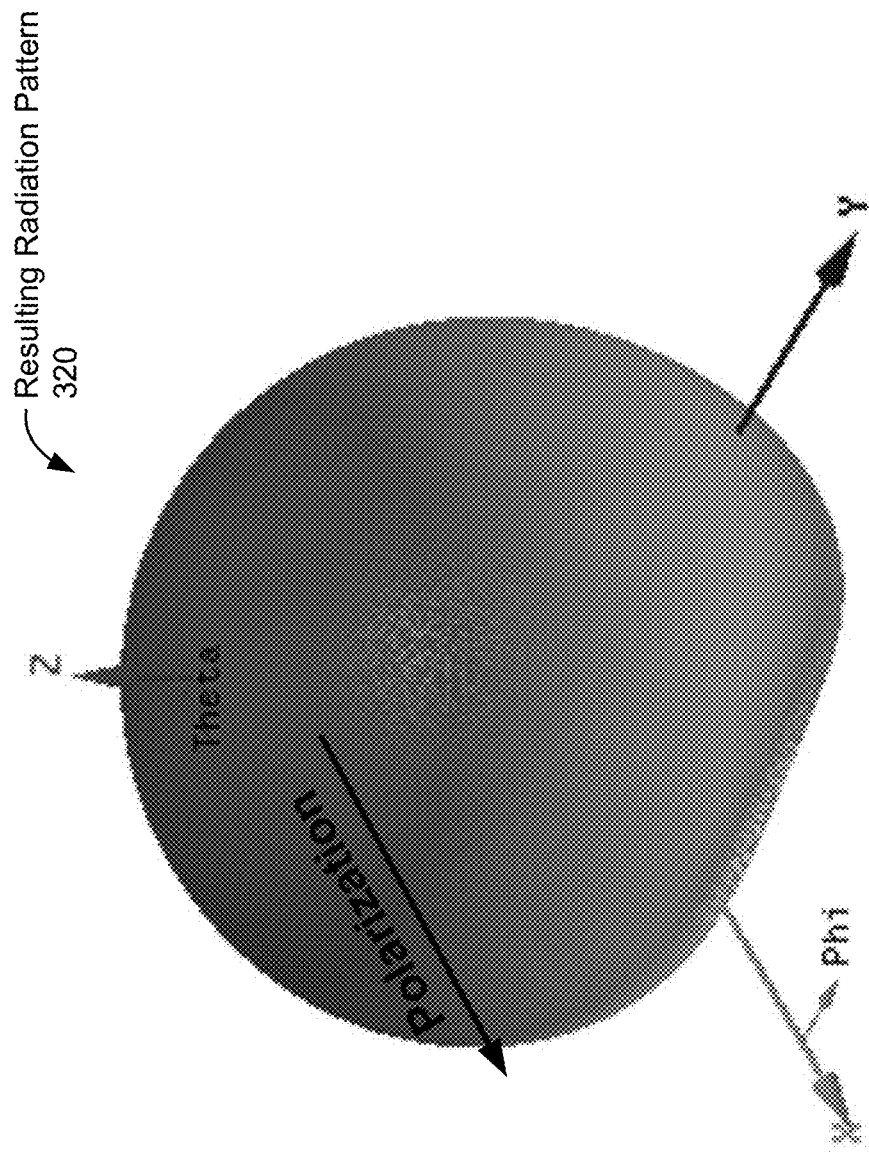
FIG. 3C illustrates a resulting radiation pattern produced by the first and second antennas of FIG. 3A in accordance with some embodiments.

FIG. 3C illustrates a resulting radiation pattern 320 in accordance with some embodiments. The resulting radiation pattern 320 is produced when the first and second antennas 302, 304 are radiating together. As shown, the resulting radiation pattern 320 does not have an overall torus shape but instead has a spherical shape. Further, the resulting radiation pattern 320 is polarized in the first direction (e.g., aligned with the X-axis), has most of its radiation focused in the forward direction (e.g., along the Z-axis), and has very little backwards radiation. It is noted that a total electric field vector of the resulting radiation pattern 320 has a magnitude equal to the sum of the magnitudes of the individual electric fields of the first and second antennas 302, 304 in the first direction, which contributes to the high gain for the antenna duplet. In some instances, the antenna duplet 300 is able to obtain a radiation efficiency of approximately 70%.

Figure 3D:
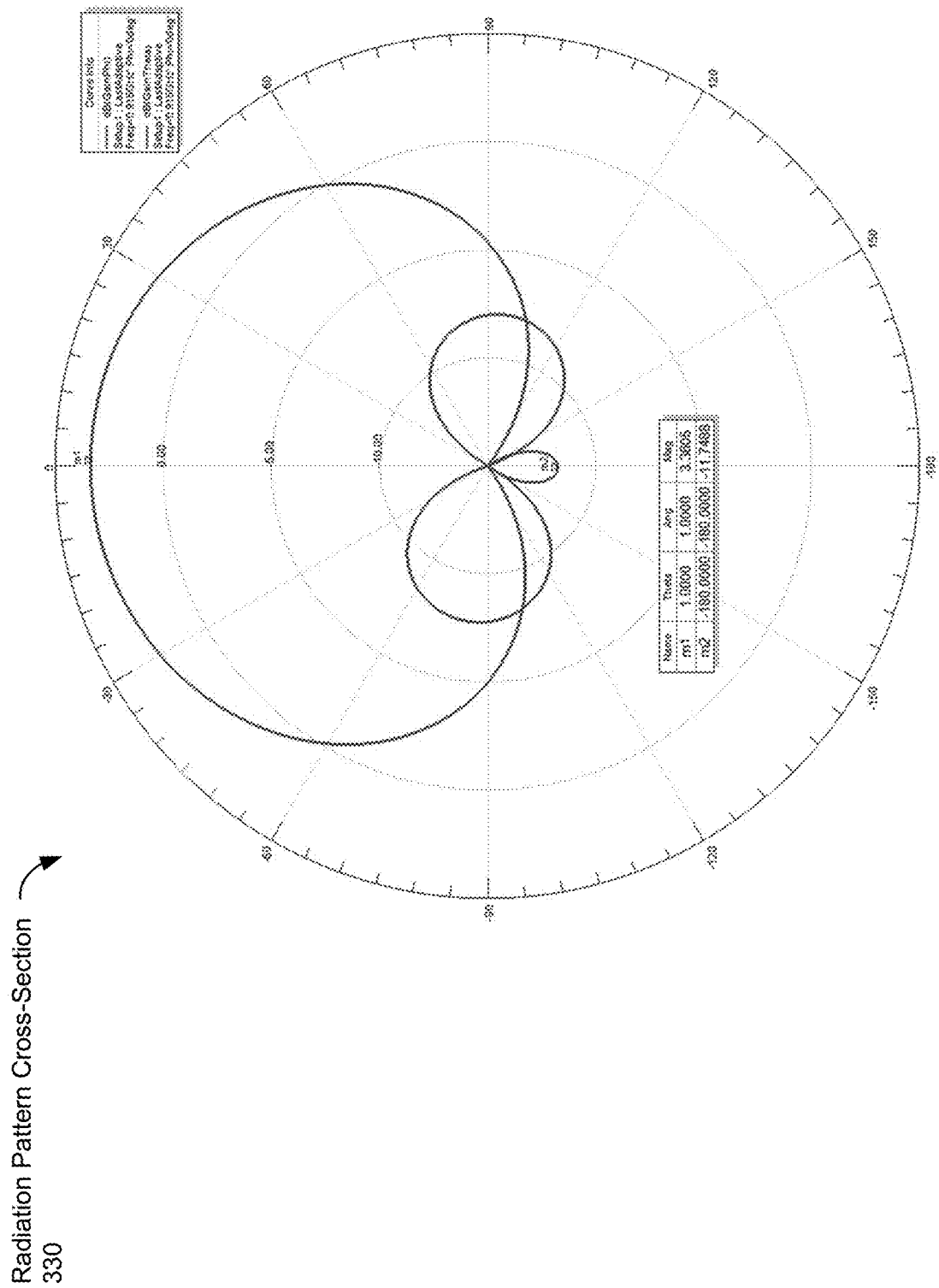
FIG. 3D illustrates a cross-sectional view of the resulting radiation pattern of FIG. 3C (taken along the X-Z plane shown in FIG. 3C), in accordance with some embodiments.

FIG. 3D illustrates a cross-sectional view 330 of the resulting radiation pattern 320 (taken along the X-Z plane shown in FIG. 3C), in accordance with some embodiments. The cross-sectional view 330 includes gain along the X-axis (Phi) and also gain along the Z-axis (Theta). As shown, the gain along the Z-axis (Theta) has an approximate value of 3.3605 dB at a first indicated marker point, m1, and has an approximate value of −11.7488 at a second indicated marker point, m2, resulting in an overall front-to-back ratio of approximately 15.1093 dB (e.g., the difference between gain at the indicated marker points, m1 and m2, in FIG. 3D). The "front-to-back ratio" compares antenna gain in a specified direction, e.g., usually the direction of maximum gain, to the gain in a direction 1800 from the specified direction. A positive front-to-back ratio indicates that more energy is radiated in the specified direction relative to an amount of energy radiated in the opposite direction. With this in mind, a front-to-back ratio of approximately 15 dB indicates that most of the radiated energy in the resulting radiation pattern 320 travelled away from the antenna duplet 300 along the Z-Axis (Theta), whereas a negligible amount travelled in the opposite direction (the "backwards" direction). This positive front-to-back ratio can be attributed to the first and second antennas 302, 304 having electric field vectors in the backwards direction that are anti-parallel (e.g., parallel along a common axis but moving in opposing directions along that common axis).

Furthermore, the gain along the X-axis (Phi) is fairly uniform (although not shown, the gain along the Y-axis is also fairly uniform). The resulting radiation pattern 320 achieves its spherical shape due to the uniform nature of the gains along the X-axis and Y-axis, and the lack of mutual coupling (discussed below) between the transmitting antennas 302, 304.

Figure 3E:
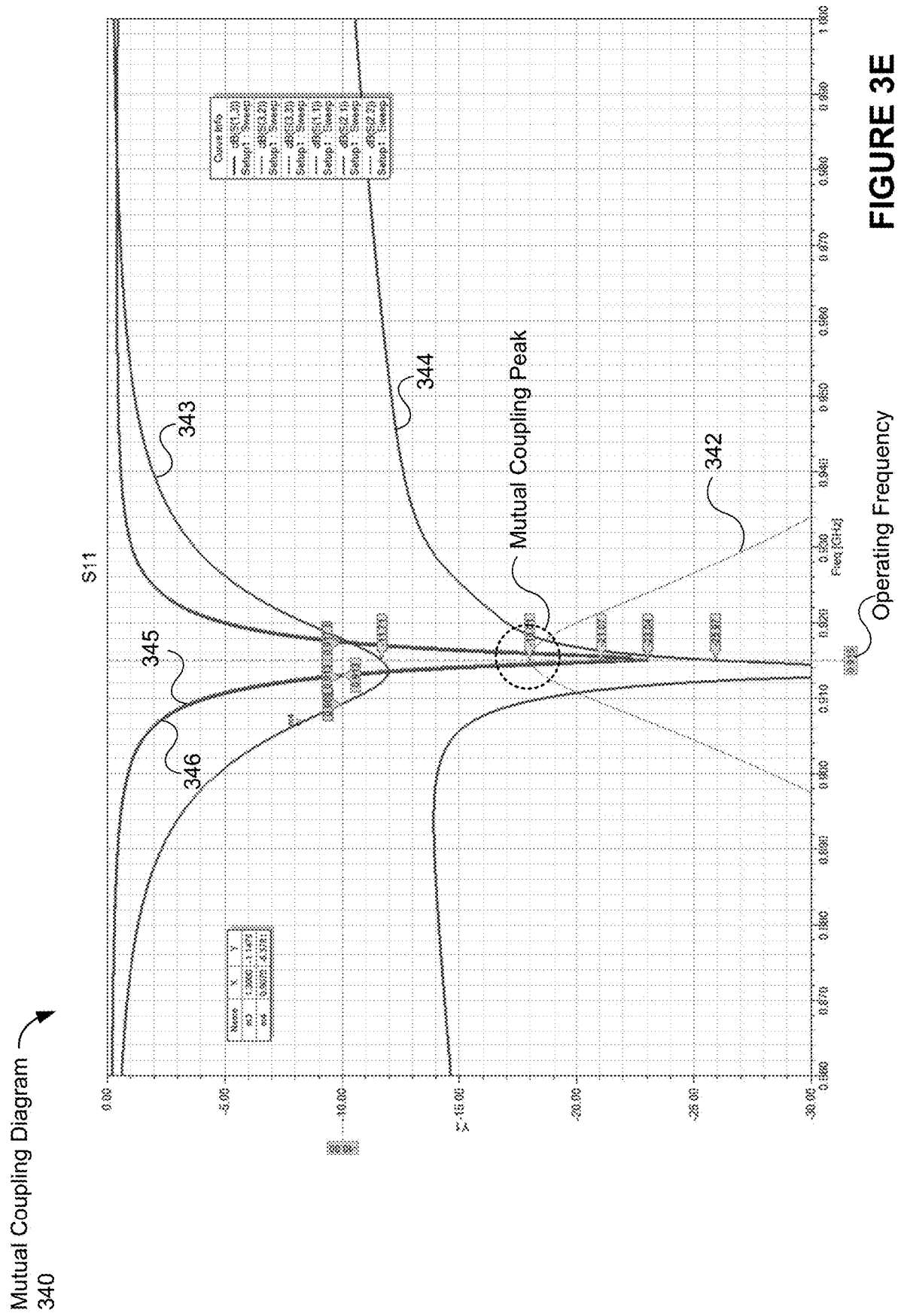
FIG. 3E is a diagram that illustrates mutual coupling between the first and second antennas depicted in FIG. 3A in accordance with some embodiments.

FIG. 3E is a diagram 340 that illustrates mutual coupling (curve 342) between the first and second antennas 302, 304, in accordance with some embodiments. In some embodiments, mutual coupling (i.e., the "coupling effect") is measured between respective ports/feeds of the first and second antennas 302, 304, and the coupling effect indicates an amount of radiated electromagnetic energy that is absorbed by, e.g., the antenna 304 when the antenna 302 is radiating electromagnetic signals (and vice versa). For example, the first antenna 302 has ports 1 and 2 (depicted as ports 306-1 and 306-2 in FIG. 3A) and the second antenna 304 has at least port 3 (depicted as portion 306-3 in FIG. 3A), and in this example, curve 342 in the diagram 340 illustrates that the coupling effect between ports 2 and 3 of the first and second antennas 302, 304, respectively, peaks at −18 dB when both antennas are radiating electromagnetic waves at approximately 915 MHz. As compared to some conventional antenna array designs, a coupling effect of −18 dB is very low, as certain conventional antenna arrays designs have coupling effects of 0.5 dB, which negatively impacts radiation efficiency (as well as negative heat absorption effects at the antennas in the array) that limit effectiveness of these array designs for wireless power applications, especially for implementations that require very small antennas. The other curves 343, 344, 345, and 346 show measurements of coupling effects between each of ports 3, 3; 2, 1; 2, 2; and 1, 1, respectively.

It is noted that the X-axis in the diagram 340 corresponds to an operating frequency of the antennas 302, 304, and the Y-axis corresponds to an amount of electromagnetic energy measured in decibels (dB). As shown, the coupling effect is negligible below approximately 900 MHz and above 930 MHz because the antennas 302, 304 are not tuned to radiate electromagnetic energy at those frequencies and, thus, feeding in signals with those frequencies does result in a low coupling effect because the signals are almost completely reflected back, therefore the amount of power entering the antennas is negligible: the amount of radiated energy is also very low, and hence, so is the coupling between the antennas. The important physics happen at the mutual matching band of the antennas, in the operating frequencies around 915 MHz, where the matching is good, and therefore reflected power is minimal the signal proceeds into the antennas), power is efficiently radiated by the antennas but the coupling remains at the level of −20 dB or smaller, which is equally negligible. This is the resultant operation of the present physical principle and corresponding embodiments of this invention.

An additional feature that is possible by pairing together co-polarized antennas that produce perpendicularly oriented radiation patterns is complete reversal of beam direction. In some embodiments, an electronic phase shift of 180° in any one of the two antennas (but not in both), reverses the direction of the corresponding electric field vector (e.g., reversing the regions of space where the fields add constructively or subtract). Accordingly, embodiments of transmitter 102 that include duplets of antennas as discussed herein (e.g., the duplets of FIG. 6A) can control whether the high-gain region is forward (low-gain region backward) or backward (low-gain region forward). This is electronic beam complete reversal, and is an additional unique feature exhibited by the pairing together of co-polarized antennas that produce perpendicular radiation patterns. Complete reversal of beam direction is also discussed in more detail below in reference to FIGS. 9D-9E.

Figure 4A:
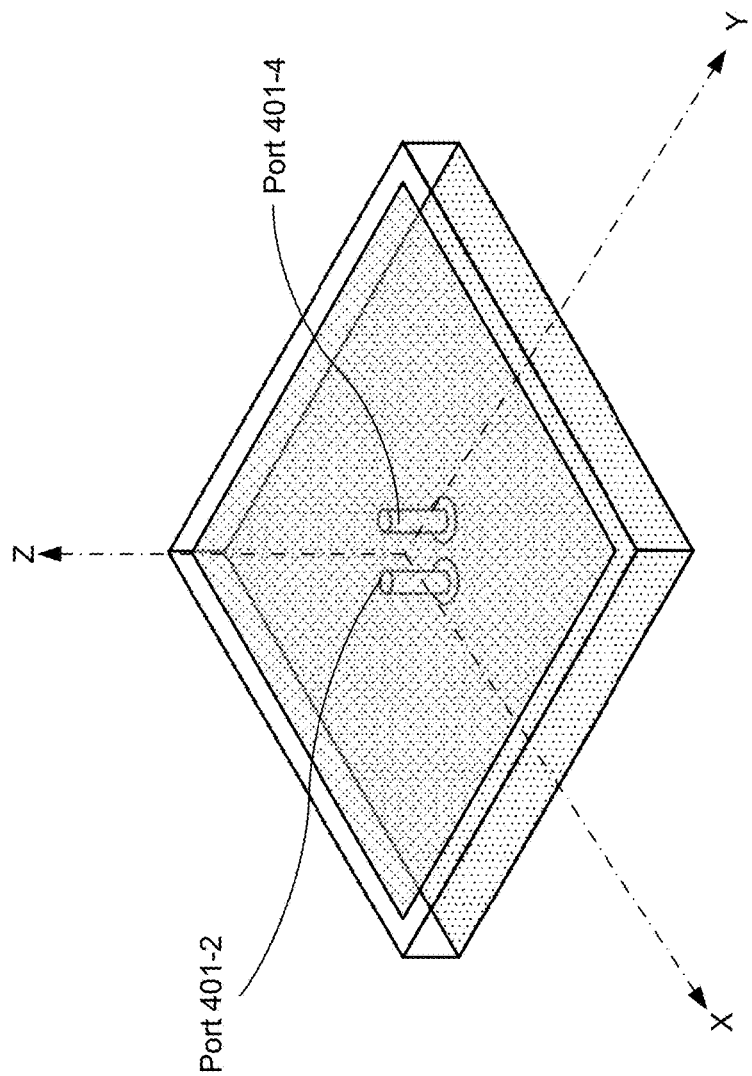

FIGS. 4A-4E are used to illustrate certain detrimental effects caused by mutual coupling in antenna arrays using conventional antennas. For example, FIGS. 4B-1 and 4B-2 illustrate radiation patterns generated by an antenna duplet that includes first and second patch antennas (e.g., instances of patch antenna 400, FIG. 4A, which includes respective ports 401-2 and 401-4). As shown, the first patch antenna generates a first radiation pattern 410, polarized in a first direction, and has a higher concentration of EM energy produced along the Z-axis and the X-axis (and has a radiation null along the Y-axis) and has a peak gain of 1.58 dB. Further, the second patch antenna generates a second radiation pattern 412, polarized in the first direction, and also has a higher concentration of EM energy produced along the Z-axis and the X-axis (and has a radiation null along the Y-axis) and has a peak gain of 1.57 dB. Thus, the first and second radiation patterns 410, 412 are oriented in parallel to one another. The parallelism of the first and second radiation patterns 410, 412 causes substantial mutual coupling effects between the two patch antennas, especially when they are placed close together (e.g., less than ½ of a wavelength of an operating frequency of the patch antennas).

The resulting radiation pattern 420 shown in FIG. 4C is a combination of the first and second radiation patterns 410, 412. The resulting radiation pattern 420 is polarized in the first direction, has a higher concentration of EM energy produced along the Z-axis and the X-axis (and has a radiation null along the Y-axis), and forms an overall torus shape having a peak gain of 1.95 dB.

Figure 4D:
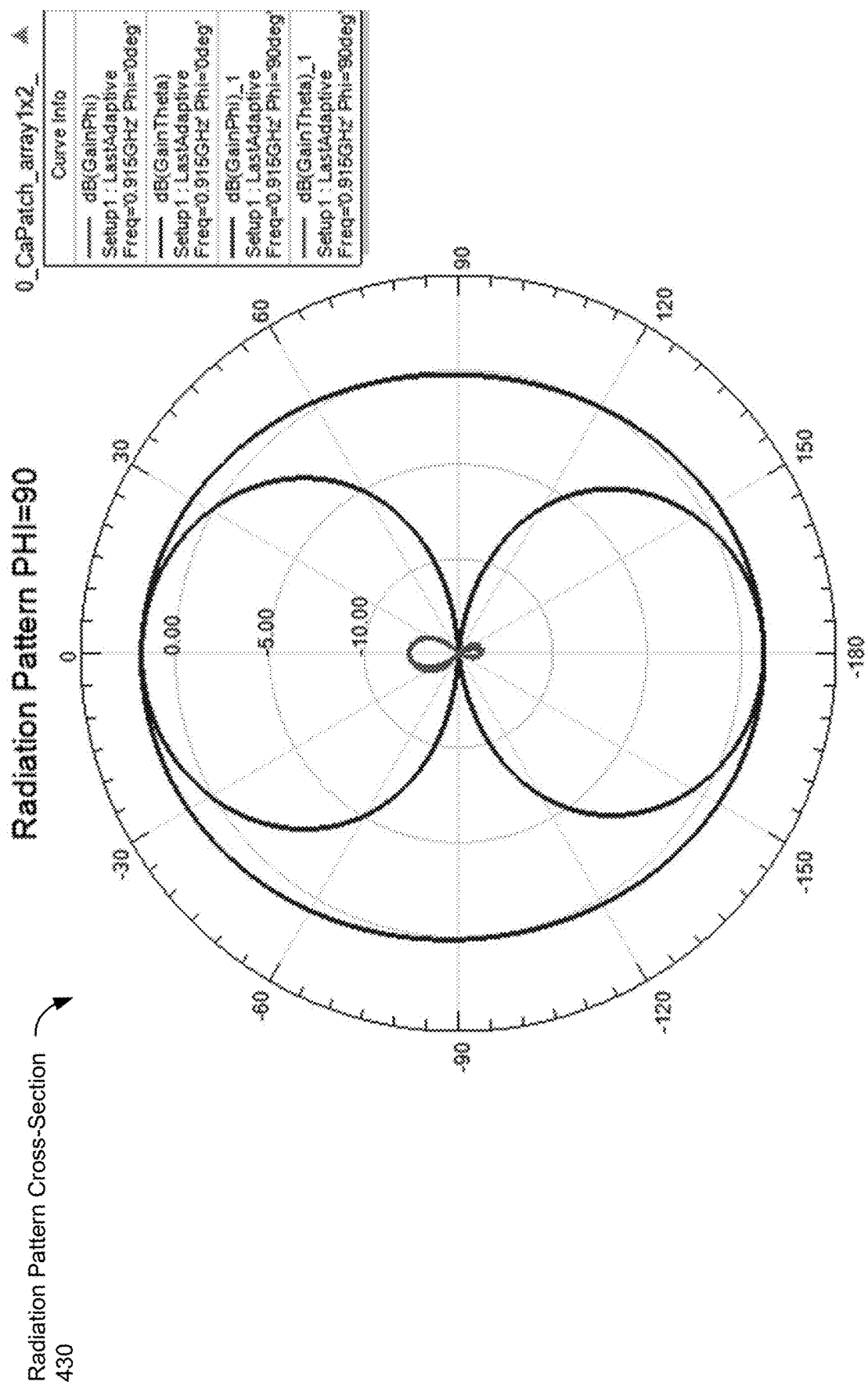

FIG. 4D illustrates a cross-sectional view of the resulting radiation pattern 420 (taken along the X-Z plane shown in FIG. 4C), in accordance with some embodiments. The cross-sectional view 430 includes gain along the X-axis (Phi) and also gain along the Z-Axis (Theta). As shown, the gain along the Z-Axis (Theta) has a front-to-back ratio of approximately 0.5 dB, which indicates that approximately equal amounts of energy radiates away from and towards the antenna duplet along the Z-Axis (Theta) (i.e., backwards radiation substantially equals forwards radiation). This result is expected as the resulting radiation pattern 420 forms an overall torus shape, as was discussed above. Further, with reference to FIG. 4E, curve $S_{42}$ of the diagram 440 illustrates a mutual coupling between the first and second patch antennas (measured between a respective port 401-4 of the first patch antenna and a respective port 401-2 of the second patch antenna) peaks at about −4 dB when both antennas are radiating electromagnetic waves at a center frequency of approximately 925 MHz (measured between port 4 and 2 of the antenna, respectively). Negative coupling effects, such as −4 dB, can cause damaging effects on radiation efficiency (as well as negative heat absorption effects at the antennas in the array) that limit effectiveness of the first and second patch antennas for wireless power applications. The other curves $S_{22}$ and $S_4$ show measurements of coupling effects between ports 2 (e.g., a respective port 401-2 of the first patch antenna) and 2 (e.g., a respective port 401-2 of the second patch antenna); and 4 (e.g., a respective port 401-4 of the first patch antenna) and 4 (e.g., a respective port 401-4 of the second patch antenna), respectively.

Figure 4E:
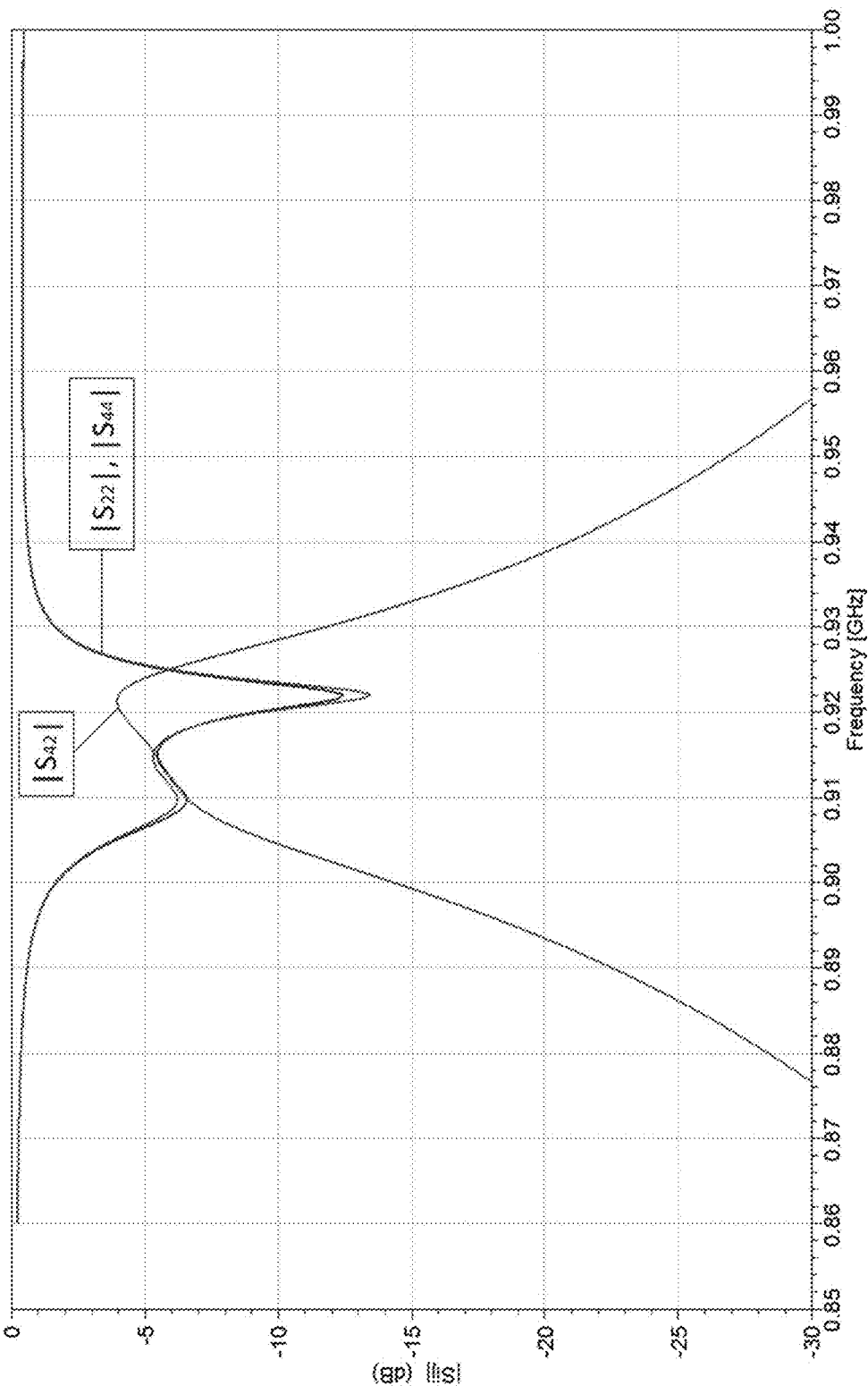

Accordingly, the results shown in FIGS. 4C-4E highlight the limitations of conventional antenna arrays. Antenna duplets (e.g., antenna duplet 300 described above and others described elsewhere herein) that exhibit co-polarization and perpendicular radiation patterns remedy the low radiation efficiency and poor front-to-back ratio exhibited by the pairing of conventional antennas explained with reference to FIGS. 4C-4E, and achieve other benefits (e.g., the ability to completely reverse beam direction).

Figure 5:
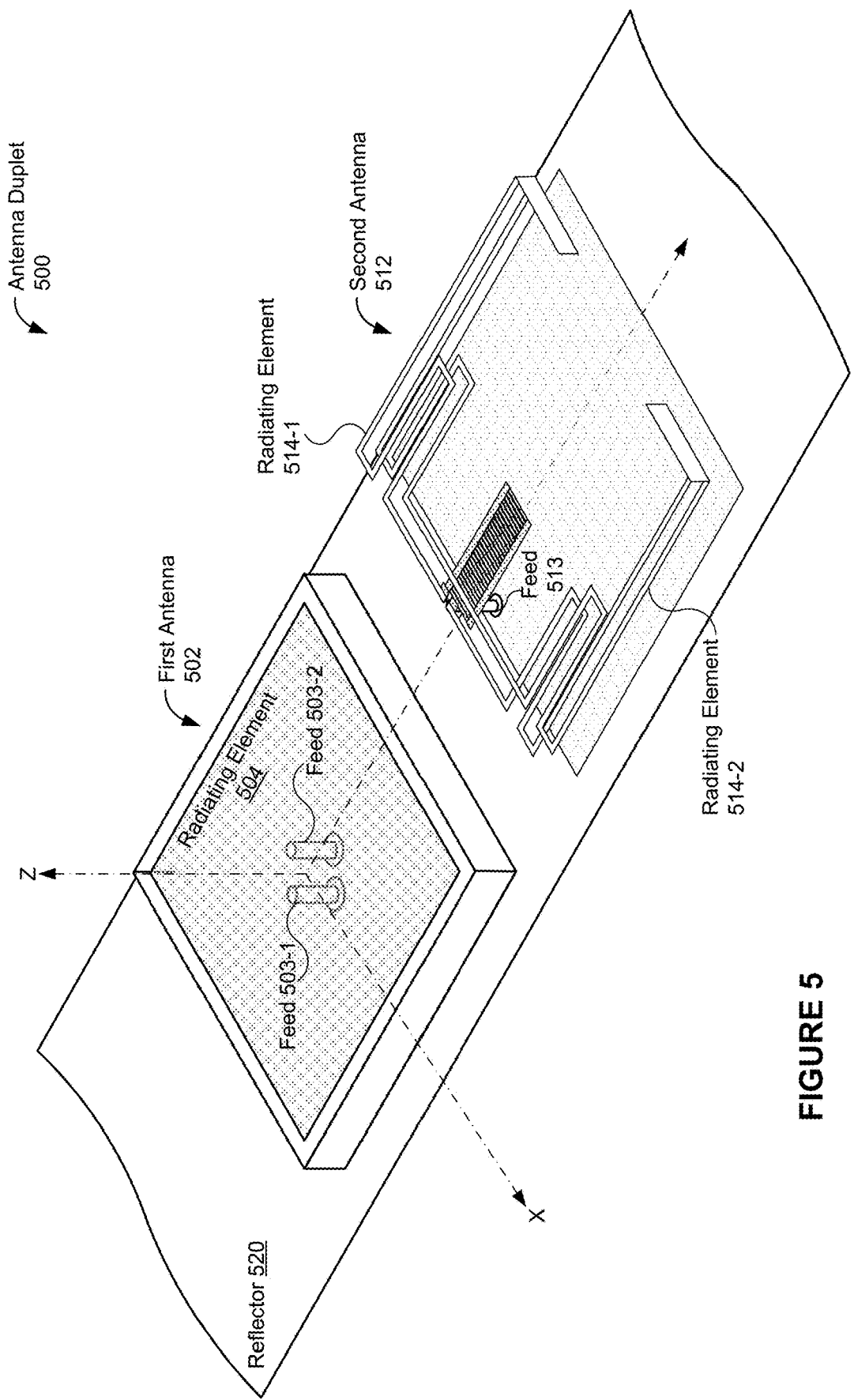
FIG. 5 illustrates an example antenna duplet in accordance with some embodiments.

FIG. 5 illustrates an example antenna duplet 500 in accordance with some embodiments. The antenna duplet 500 is an example of the antenna duplet 300 (FIG. 3A). In other words, the antenna duplet 500 includes co-polarized antennas that produce perpendicularly-oriented radiation patterns. In this particular example, the first antenna 502 is an instance of the patch antenna 400 (FIG. 4A) that includes multiple feeds 503-1, 503-2 and a radiating element 504 (e.g., a metal patch). The first antenna 502 is configured to generate a radiation pattern similar to the radiation pattern shown in FIG. 3B-1 (the first antenna 502 is illustrated as being semi-transparent for ease of illustration and discussion). In contrast, the second antenna 512 is a drop-in stamped antenna (which is the first embodiment of a drop-in antenna 1000, described in more detail below in reference to FIG. 10A) that includes at least one feed/port 513 and radiating elements 514-1, 514-2. The second antenna 512 is configured to generate a radiation pattern similar to the radiation pattern shown in FIG. 3B-2. In some embodiments, the first and second antennas 502, 512 are fixed to a reflector 520 (e.g., a metal plate). In this configuration, the antenna duplet 500 can create a resulting radiation pattern similar (if not the same) to the resulting radiation pattern 320 shown in FIG. 3C. The second antenna 512 is discussed in further detail below with reference to FIGS. 10A-10F.

Figure 6A:
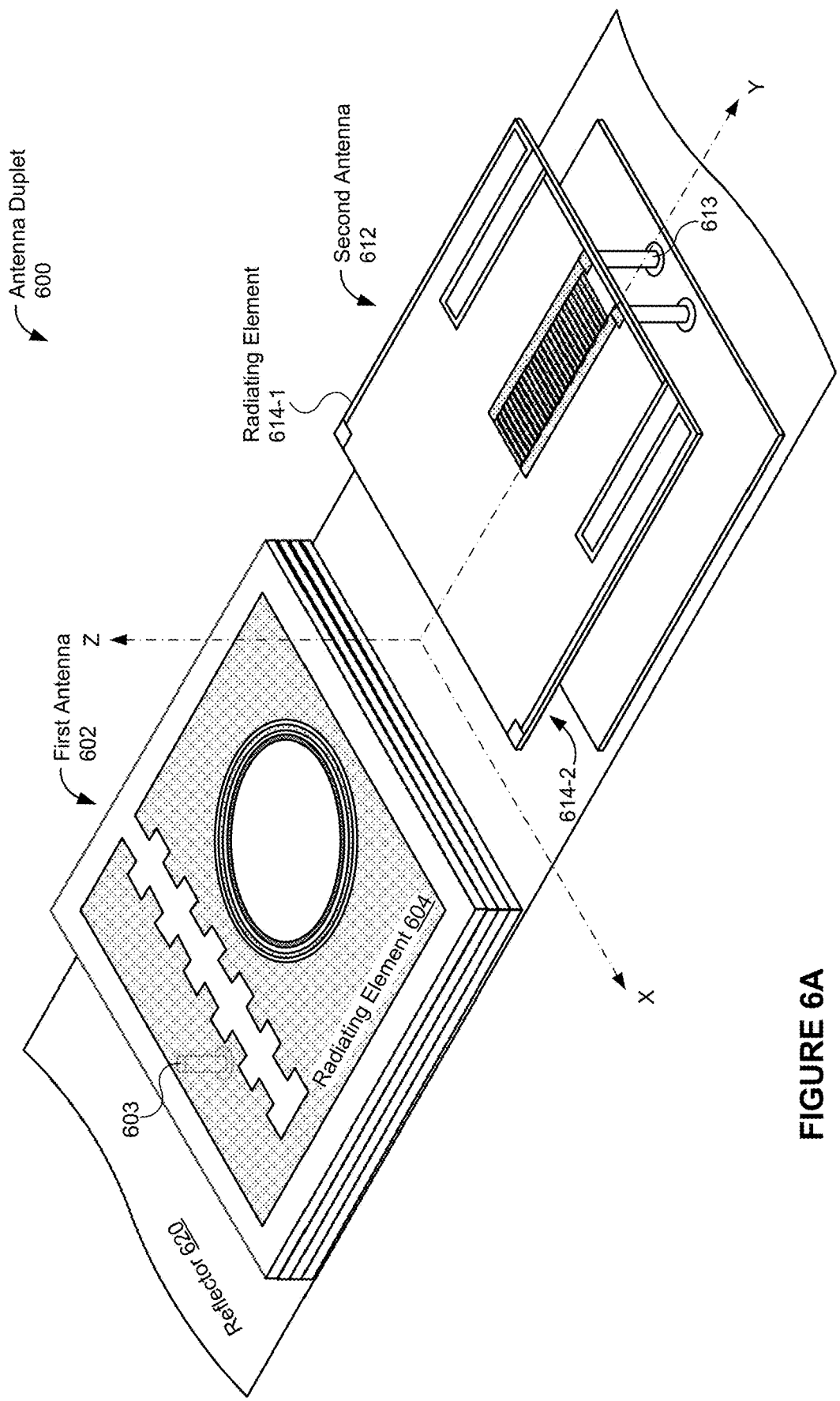
FIG. 6A illustrates an example antenna duplet in accordance with some embodiments.

FIG. 6A illustrates an example antenna duplet 600 in accordance with some embodiments. The antenna duplet 600 is an example of the antenna duplet 300 (FIG. 3A). In other words, the antenna duplet 600 includes co-polarized antennas that produce perpendicularly-oriented radiation patterns. In this particular example, the first antenna 602 is a drop-in tunable patch antenna (which is the third embodiment of a drop-in antenna, and is described in more detail in reference to FIG. 12A) that includes at least one port 603 (port 1) and a radiating element 604 (e.g., a metal patch) (the first antenna 602 is illustrated as being semi-transparent for ease of illustration and discussion). The second antenna 612 is a drop-in printed antenna (which is the second embodiment of a drop-in antenna, and is described in more detail in reference to FIG. 11A) that includes at least one port (port 2) and radiating elements 614-1, 614-2. The first and second antennas 602, 612 are fixed to a reflector 620 (e.g., a metal plate), which is optional. The first and second antennas 602 and 612 are discussed in further detail below with reference to FIGS. 12A-12D and 11A-11C-3, respectively.

Figures 1, 2, 6B:
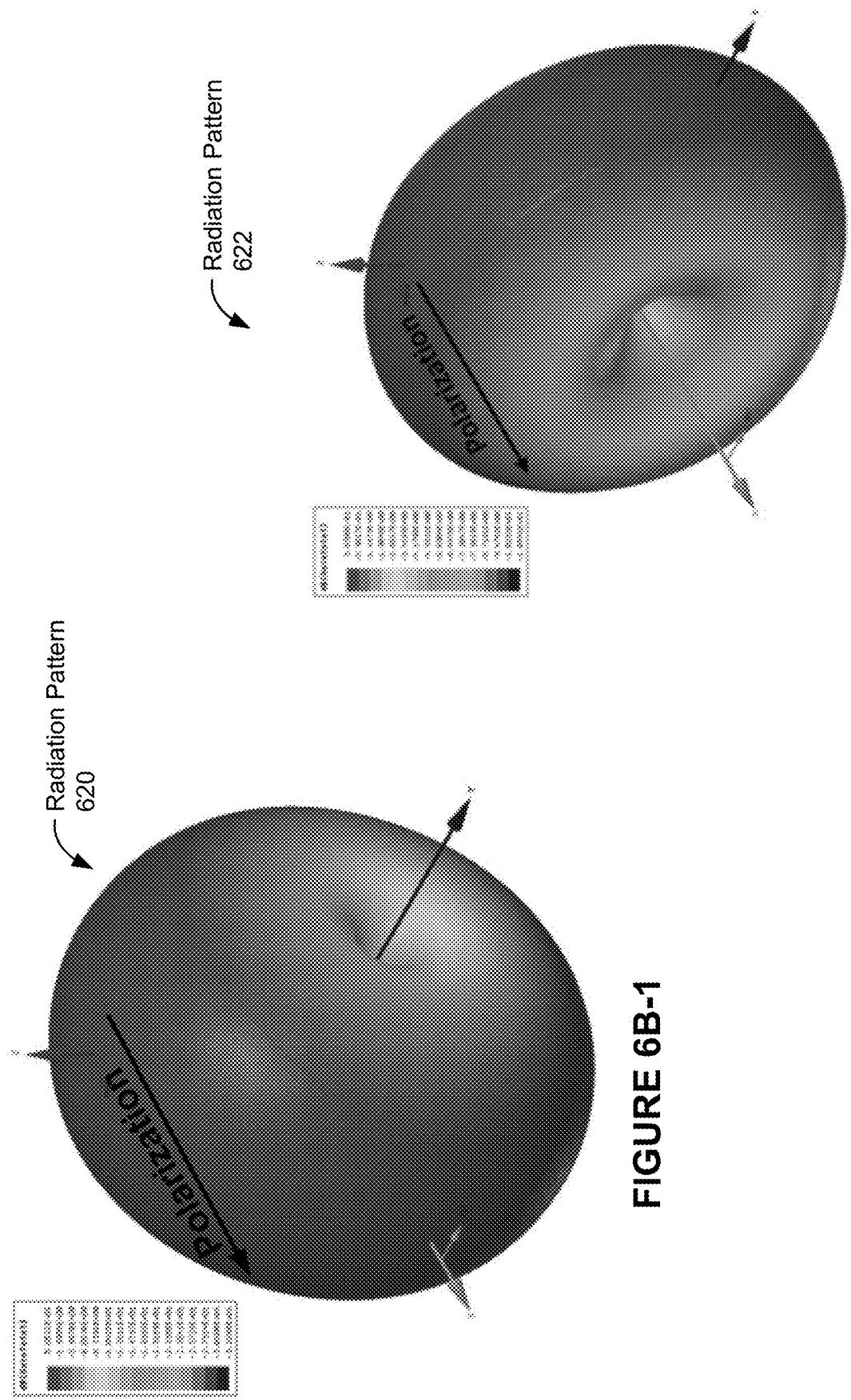

FIGS. 6B-1 and 6B-2 illustrate radiation patterns generated by the first and second antennas 602, 614, respectively, in accordance with some embodiments. With reference to FIG. 6B-1, the first antenna 602 is configured to generate a first radiation pattern 620 polarized in a first direction (e.g., aligned with the X-axis). Further, the first radiation pattern 620 has a higher concentration of EM energy produced along the Z-axis and the X-axis (and has a radiation null along the Y-axis) and forms an overall torus shape having a peak gain of approximately 0.505 dB. With reference to FIG. 6B-2, the second antenna 612 is configured to generate a second radiation pattern 622 also polarized in the first direction (i.e., the first and second antennas 602, 612 are co-polarized). Further, the second radiation pattern 622 has a higher concentration of EM energy produced along the Z-axis and the Y-axis (and has a radiation null along the X-axis) and forms an overall torus shape having a peak gain of 0.247 dB. Thus, while the first and second radiation patterns 620, 622 both form an overall torus shape, they are perpendicularly-oriented relative to one another.

Figure 6C:
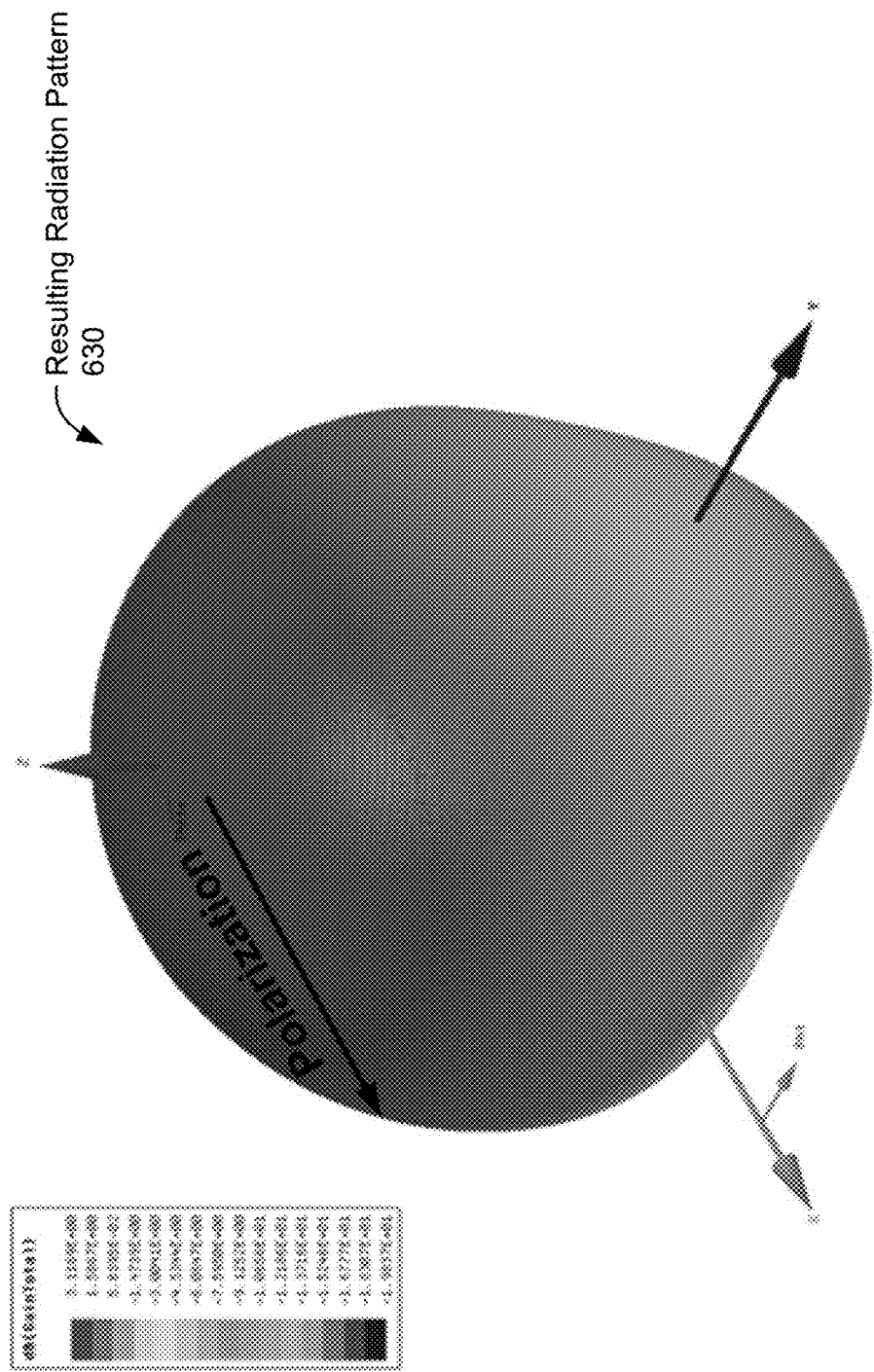
FIG. 6C illustrates a resulting radiation pattern for the example antenna duplet of FIG. 6A in accordance with some embodiments.

FIG. 6C illustrates a resulting radiation pattern 630 in accordance with some embodiments. The resulting radiation pattern 630 is produced when the first antenna 602 and the second antenna 612 are radiating together. As shown, the resulting radiation pattern 630 does not have an overall torus shape but instead has a spherical shape (e.g., similar to a shape of the resulting radiation pattern 320, FIG. 3C). Further, the resulting radiation pattern 630 is polarized in the first direction (e.g., aligned with the X-axis) and has a peak gain of 3.11 dB, which is substantially larger than the peak gains of the first and second radiation patterns 620, 622 individually, and the resulting radiation pattern 420 (FIG. 4C). In some instances, the antenna duplet 600 achieves a radiation efficiency of approximately 70%.

Figure 6D:
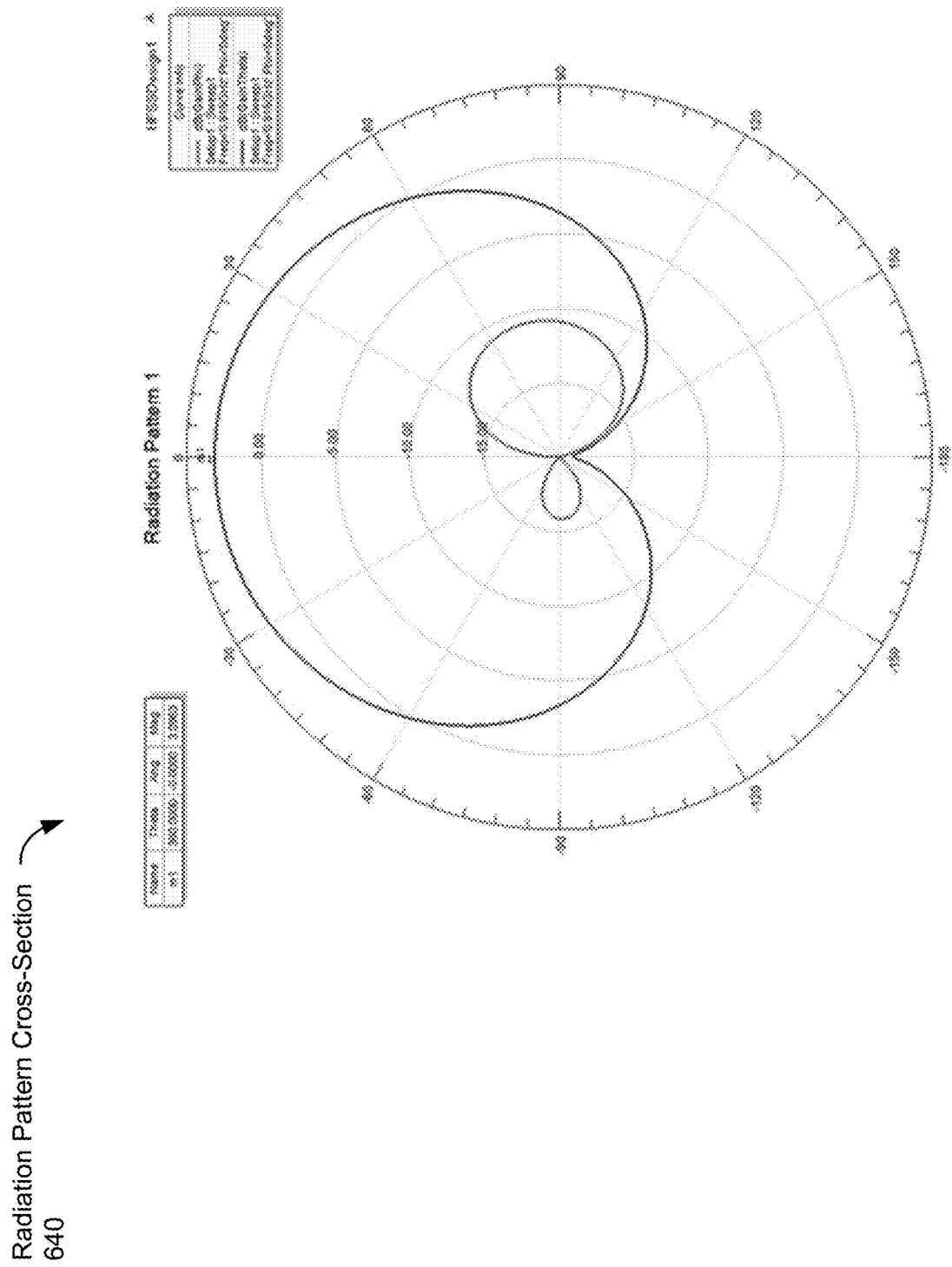
FIG. 6D illustrates a cross-sectional view of the resulting radiation pattern of FIG. 6C (taken along the X-Z plane shown in FIG. 6C), in accordance with some embodiments.

FIG. 6D illustrates a cross-sectional view 640 of the resulting radiation pattern 630 (taken along the X-Z plane shown in FIG. 6C), in accordance with some embodiments. The cross-sectional view 640 includes gain along the X-axis (Phi) and gain along the Z-Axis (Theta). As shown, the gain along the Z-Axis (Theta) has a front-to-back ratio of approximately 15 dB.

Figure 6E:
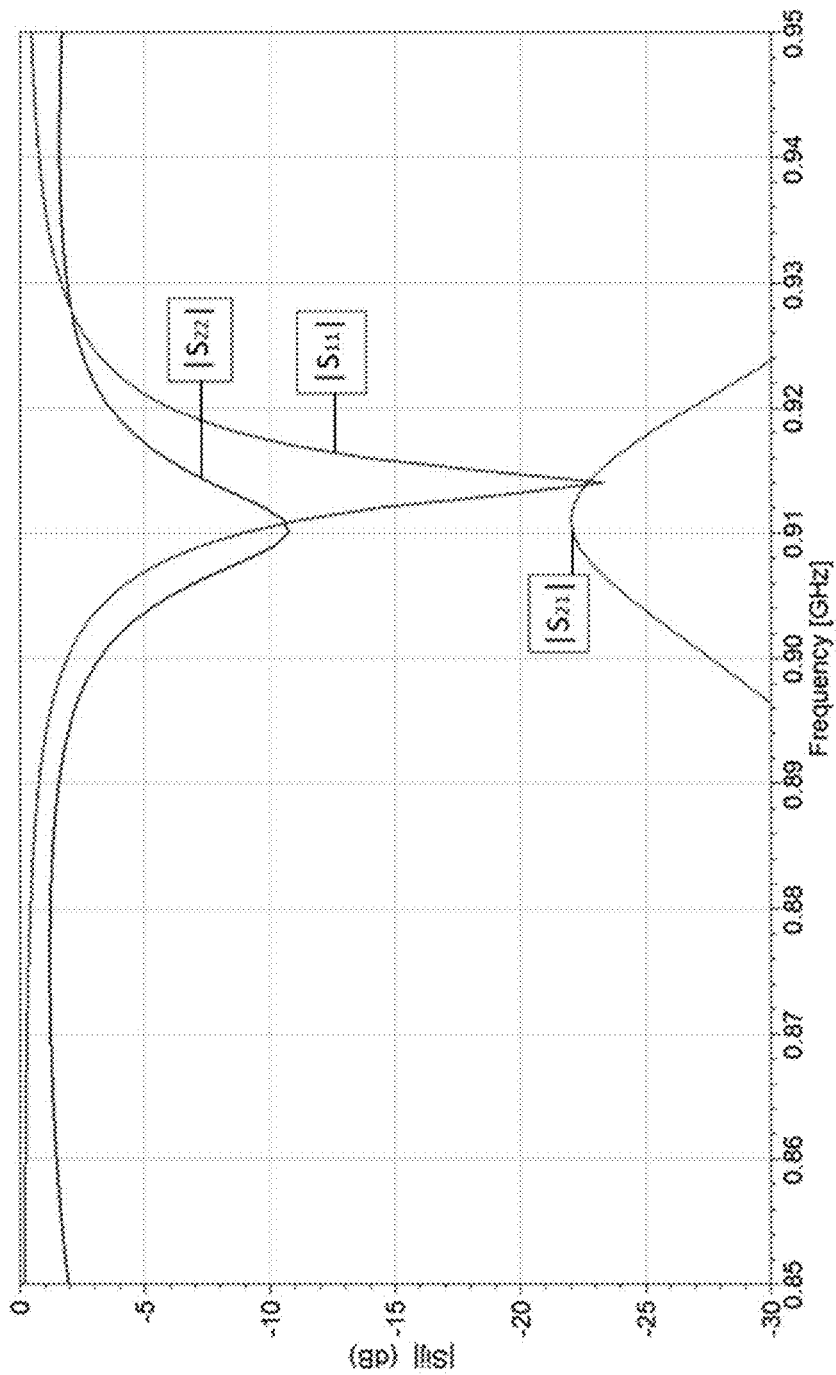
FIG. 6E is a diagram that illustrates beneficial mutual coupling effects between the individual antennas of the example antenna duplet depicted in FIG. 6A, in accordance with some embodiments.

FIG. 6E is a diagram that illustrates mutual coupling effects between the individual antennas (e.g., antenna 602, 612) of the example antenna duplet depicted in FIG. 6A, in accordance with some embodiments. Curve $S_{21}$ in the diagram 650 illustrates that mutual coupling (i.e., coupling effect) between the first and second antennas 602, 612 peaks at −24 dB when both antennas are radiating electromagnetic waves at 915 MHz (measured between ports 1 (illustrated as port 603 in FIG. 6A) and 2 (illustrated as port 613 in FIG. 6A) of antennas 602 and 612, respectively). Accordingly, the antenna duplet 600 achieves an even lower coupling than that achieved by the antenna duplet 500. The other curves $S_{11}$ and $S_{22}$ show measurements of coupling effects between ports 1, 1; and 2, 2, respectively.

Accordingly, the antenna duplet 600 includes two antennas that generate radiation patterns that are perpendicularly oriented relative to each other while also having electric field polarizations parallel to each other. In doing so, the antenna duplet 600 is able reduce mutual coupling between the two antennas to a negligible amount, while also maintaining or improving other radiation metrics (e.g., radiation efficiency of the antenna duplet).

FIGS. 7A-9E illustrate various antenna array configurations using the antenna duplet 600 illustrated in FIG. 6A (and associated characteristics of these various antenna array configurations) in accordance with some embodiments. It is noted that the antennas illustrated in FIGS. 7A-9E can be various sizes relative to one another, and the example sizes shown in FIGS. 7A-9E are not limiting (e.g., one antenna in each duplet has a smaller area than the other antenna in the duplet). Furthermore, while the antenna duplet 600 is used as an example in FIGS. 7A-9E, various other antennas and antenna duplets described herein could instead be used, along with other co-polarized antennas that produce perpendicularly-oriented radiation patterns (e.g., any of the embodiments of the drop-in antennas).

Figure 7A:
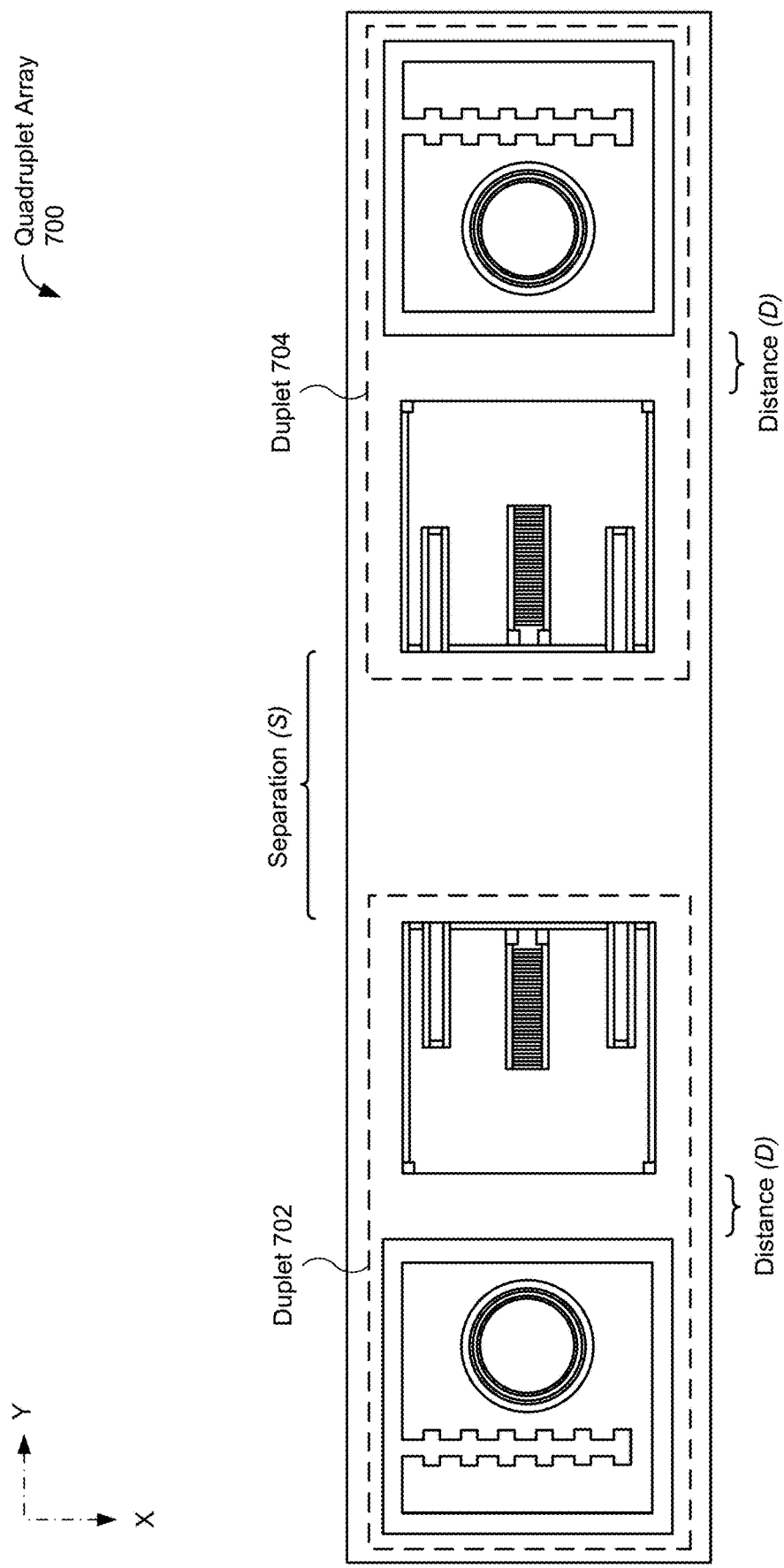
FIGS. 7A-9E illustrate various antenna array configurations using the antenna duplet illustrated in FIG. 6A (and associated characteristics of these various antenna array configurations) in accordance with some embodiments.

FIG. 7A illustrates an example quadruplet antenna array 700 in accordance with some embodiments. The quadruplet antenna array 700 includes a first antenna duplet 702 and a second antenna duplet 704 collinearly aligned along the Y-axis (e.g., the two antenna duplets are co-axial). The antenna duplets 702, 704 are positioned on a substrate (e.g., reflector 620, FIG. 6A), which is optional. In some embodiments, the first and second antenna duplets 702, 704 are different duplets. For example, the first antenna duplet 702 may be the antenna duplet 600 while the second antenna duplet 704 may be the antenna duplet 500, or some other combination of antenna duplets.

In the illustrated example, the first and second antenna duplets 702, 704 mirror each other along the X-axis (e.g., the first antenna duplet 702 is a mirror image of the second antenna duplet 704, and vice versa). Alternatively, the first and second antenna duplets 702, 704 may be positioned serially (i.e., each duplet has the same orientation and arrangement as shown in FIG. 9A-1). Alternatively, in some embodiments, the first and second antenna duplets 702, 704 are rotated relative to one another (e.g., the first antenna duplet 702 is rotated 180 degrees relative to the second antenna duplet 704). The particular arrangement of the first and second antenna duplets 702, 704 is chosen based, at least in part, on the charging environment (e.g., wireless charging versus some other application). Accordingly, each particular arrangement creates different radiation patterns and corresponding metrics/values (e.g., gain, back-to-front ratio, mutual coupling, etc.).

Figure 19A:
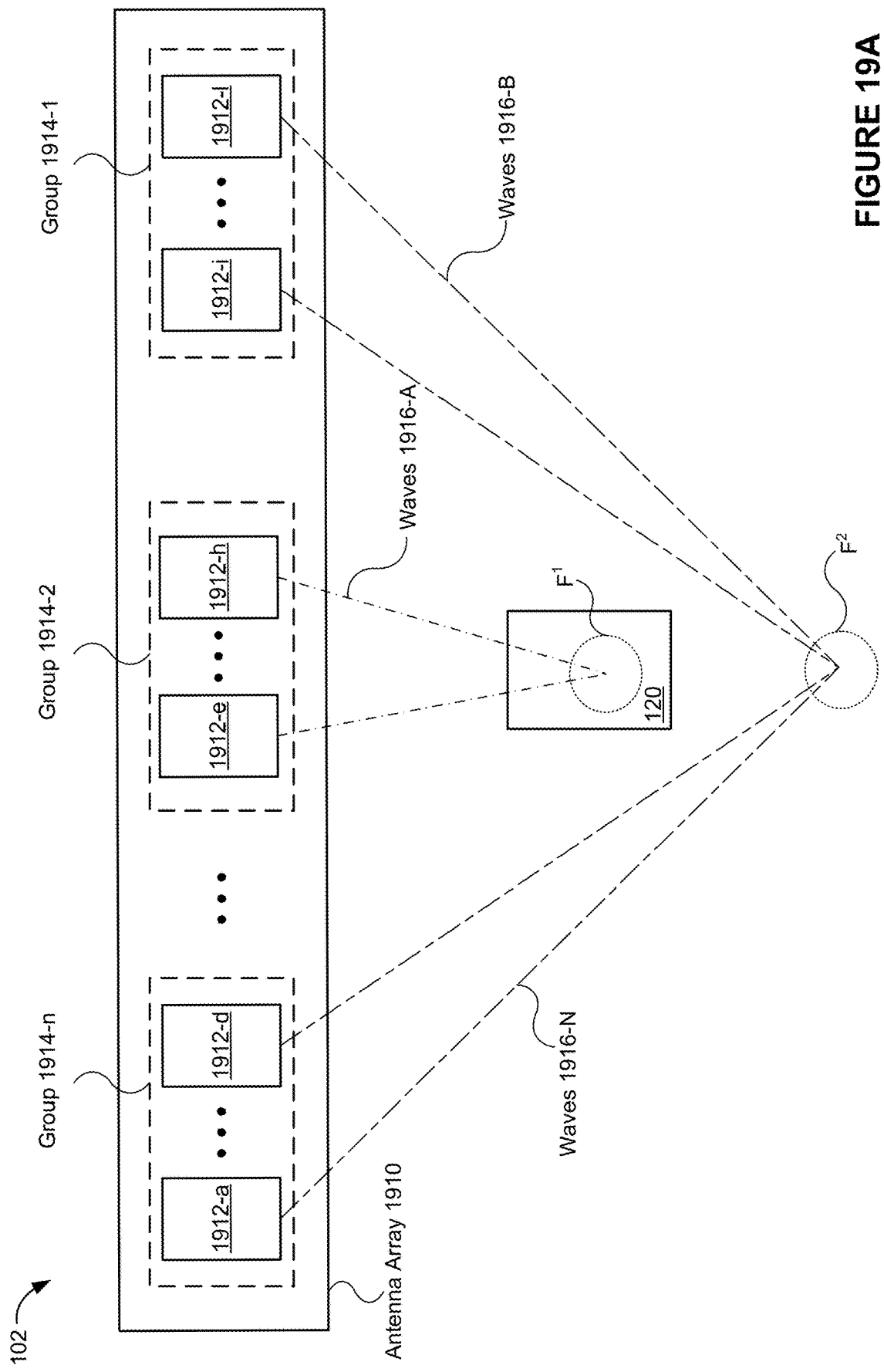
FIGS. 19A-19E are block diagrams illustrating a representative wireless power transmission system having an antenna array that uses different focal points for different antenna groups within the antenna array based on a receiver's location, in accordance with some embodiments.

In some embodiments, the serial arrangement in FIG. 19A is chosen because the maximum array gain may be obtained without a phase shift between the duplets. In other embodiments, the mirrored array of FIG. 19B may be chosen for a completely symmetrical transmitter system, which can execute near-field beam focusing with symmetric sets of phase shifts between mirror-symmetric pairs. In yet other embodiments, the rotated array of FIG. 19C may be chosen, which requires specific phase difference between rotated pairs.

Furthermore, antennas in the first antenna duplet 702 are spaced-apart by a distance (D) and antennas in the second antenna duplet 704 are spaced-apart by a distance (D). The two distances (D) can be the same distance or different distances. In some embodiments, the distance (D) is considerably less than 1λ (which is determined based on a center operating frequency of each of the antenna duplets 702, 704), e.g., D may be between ½λ to ⅟₃₀λ. Such close inter-element spacing is not currently feasible for conventional antenna structures (especially for miniaturized antenna structures), as the mutual coupling effects negatively impact radiation efficiency, rending these conventional duplets useful in densely packed antenna arrays.

Additional examples of the inter-element spacing distance (D) are provided above with reference to FIG. 3A. The first and second antenna duplets 702, 704 are also spaced-apart by a separation distance (S). The separation distance (S) may be an example of the distance ($D^1$) and/or the distance ($D^2$) (FIG. 1). As shown, the separation distance (S) is greater than the inter-element spacing distances (D). In some embodiments, however, the separation distance (S) is equal to or less than that the inter-element spacing distances (D). In general, the inter-element distance (D) is smaller than the separation distance (S). The separation distance (S) is the minimum acceptable distance where a set of antennas is grouped to form a single multiplet (e.g., duplet, etc.). The separation distance (S) is the distance that separates adjacent multiplets and therefore is typically greater than the inter-element distance (e.g., if it were smaller, then two multiplets would generally be grouped together, resulting in a single multiplet).

Figure 7B:
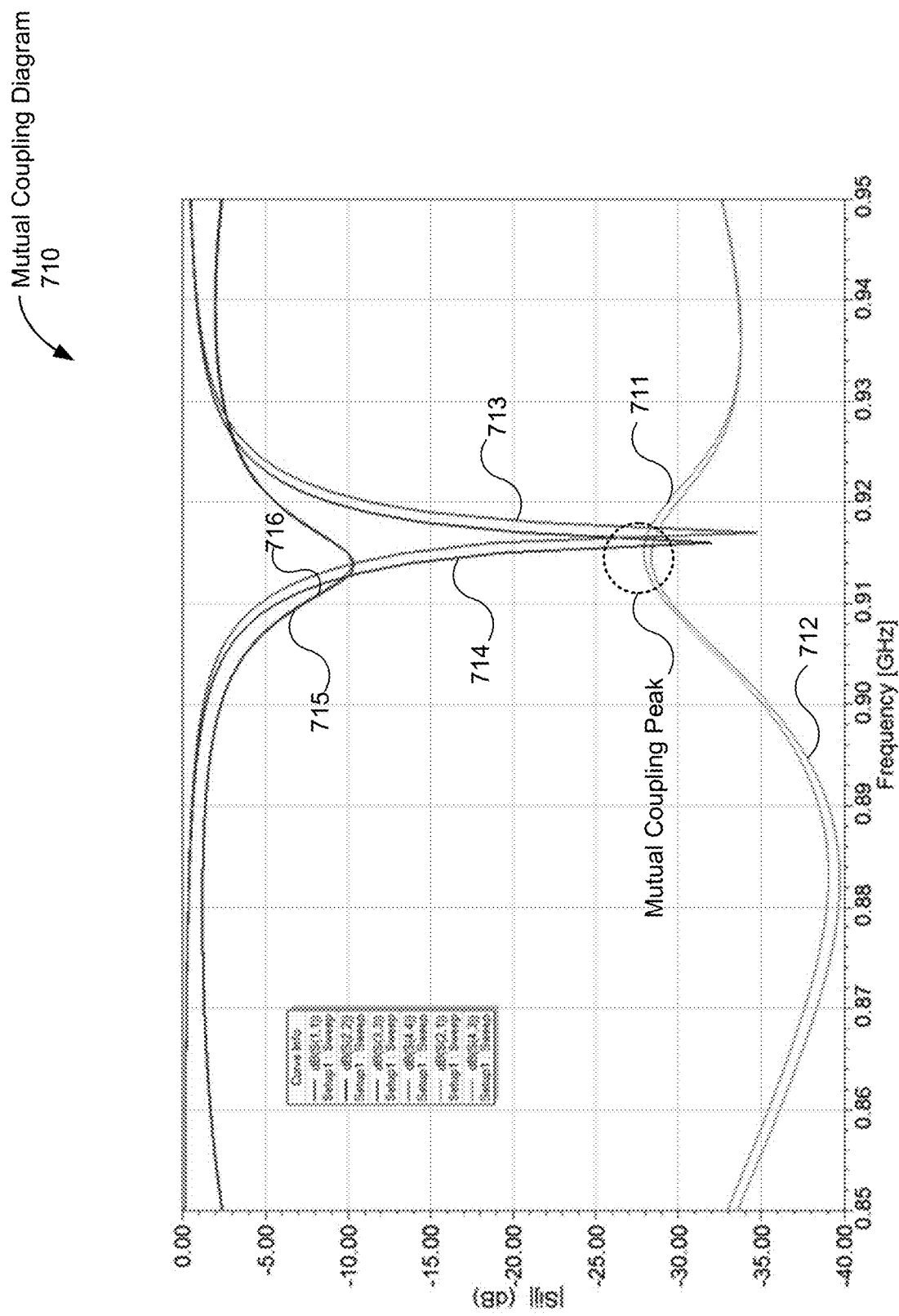

FIG. 7B is a diagram 710 that illustrates mutual coupling between the first and second antenna duplets 702, 704, in accordance with some embodiments. Curves 711 and 712 of the diagram 710 illustrate that mutual coupling between the first and second antenna duplets 702, 704 (and the antennas therein) peaks at −27 dB when the duplets' 702, 704 antennas are radiating electromagnetic waves at approximately 915 MHz (measured between ports 2 (illustrated as port 613 in FIG. 6A) and 1 (illustrated as port 603 in FIG. 6A) in the first antenna duplet 702 and ports 4 (illustrated as port 613 in FIG. 6A) and 3 (illustrated as port 603 in FIG. 6A) in the second antenna duplet 704). As compared to some conventional antenna array designs, a coupling effect of −27 dB is very low (essentially negligible), as explained above with reference to FIG. 3E. The other curves 713, 714, 715, and 716 show measurements of coupling effects between each of ports 1, 1; 2, 2; 3, 3; and 4, 4, respectively.

Figure 8A:
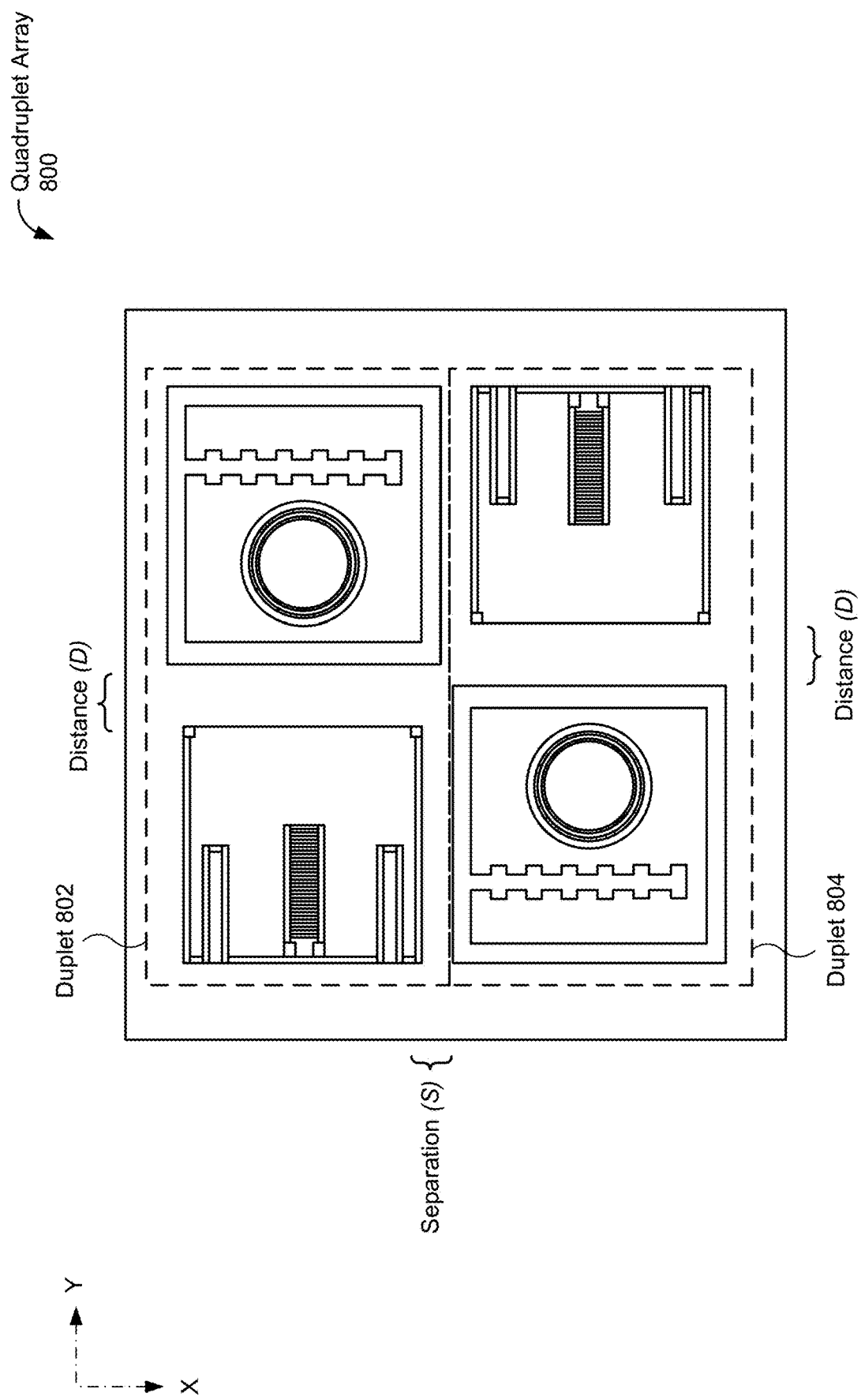

FIG. 8A illustrates an example quadruplet antenna array 800 in accordance with some embodiments. It is noted that the antennas illustrated in FIG. 8A can be various sizes relative to one another, and the sizes shown in FIG. 8A are not meant limiting (e.g., one antenna in each duplet has a smaller area than the other antenna in the duplet).

The quadruplet antenna array 800 includes a first antenna duplet 802 and a second antenna duplet 804 forming a substantially rectangular array. The antenna duplets 802, 804 are positioned on a substrate (e.g., reflector 620, FIG. 6A), which is optional. In some embodiments, the first and second antenna duplets 802, 804 are different duplets. For example, the first antenna duplet 802 may be the antenna duplet 600 while the second antenna duplet 804 may be the antenna duplet 500, or some other combination of antenna duplets.

In the illustrated example, a structure of the first antenna duplet 802 mirrors the structure of the second antenna duplet 804 (and vice versa). Moreover, the first and second antenna duplets 802, 804 are offset from each other along the X-axis, as opposed to being collinearly aligned along the Y-axis, as was shown for the example quadruplet array described in reference to FIG. 7A. Instead of being mirror images of one another, the first and second antenna duplets 802, 804 may have the same structure or may be rotated relative to one another. The particular arrangement of antenna duplets is chosen based, at least in part, on the charging environment, and each particular arrangement creates different radiation patterns and corresponding metrics/values (e.g., gain, back-to-front ratio, mutual coupling, etc.).

Antennas in the first antenna duplet 802 are spaced-apart by a distance (D) and antennas in the second antenna duplet 804 are spaced-apart by a distance (D). In some embodiments, the two distances (D) are the same while in other embodiments the two distances (D) are different. In some embodiments, the distance (D) is considerably less than 1λ (which is determined based on a center operating frequency of each of the antenna duplets 702, 704), e.g., D may be between ½λ to ⅟₃₀λ. Such close inter-element spacing is not currently feasible for conventional antenna structures (especially for miniaturized antenna structures), as the mutual coupling effects negatively impact radiation efficiency, rending these conventional duplets useful in densely packed antenna arrays.

Additional examples of the inter-element spacing distance (D) are provided above with reference to FIG. 3A. The first and second antenna duplets 802, 804 are also spaced-apart by a separation distance (S). The separation distance (S) may be an example of the distance ($D^1$) and/or the distance ($D^2$) (FIG. 1). In some embodiments, the separation distance (S) is greater that the inter-element spacing distances (D), while in other embodiments the separation distance (S) is equal to or less than the inter-element spacing distances (D).

Figure 8B:
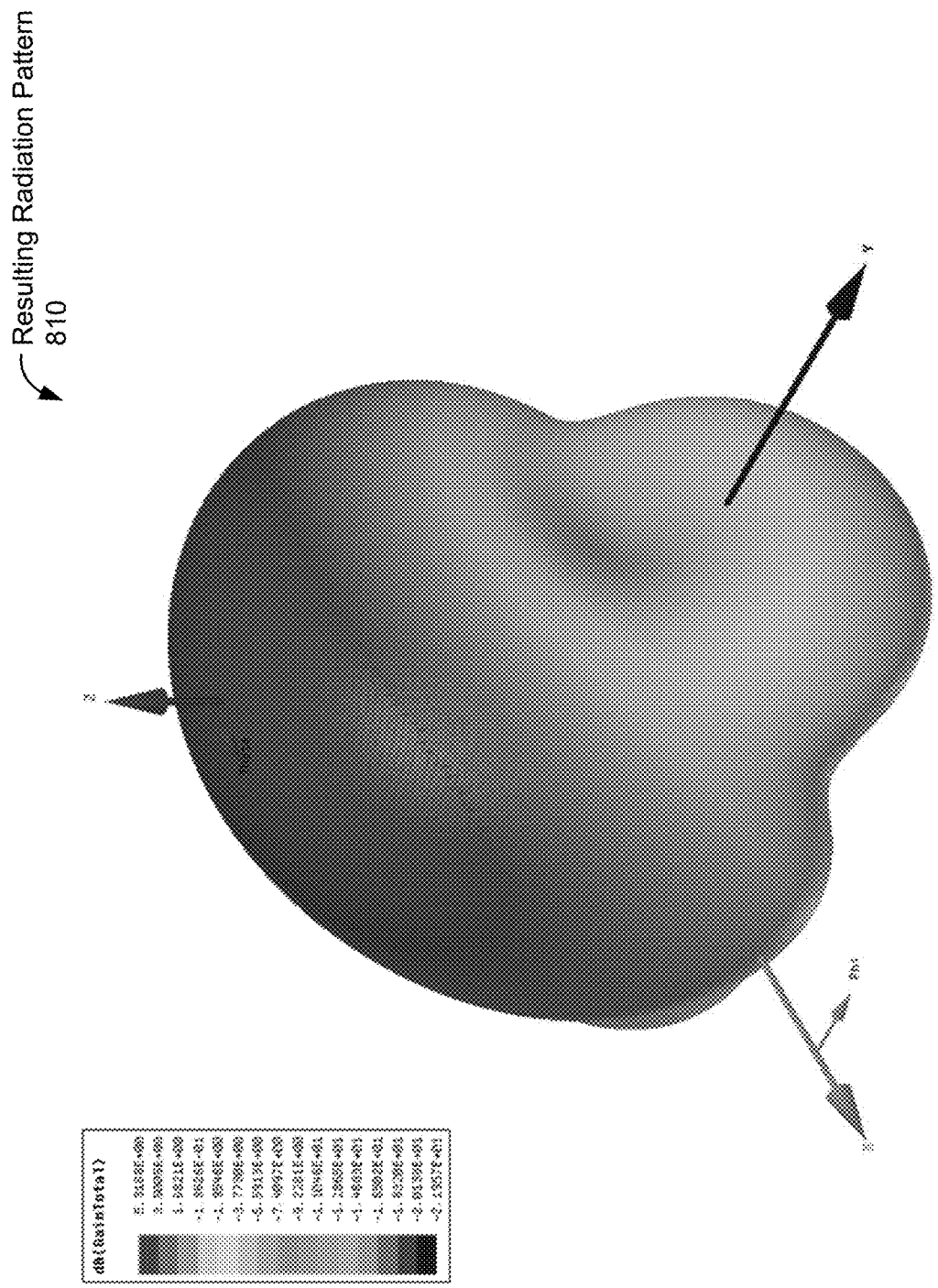

FIG. 8B illustrates a resulting radiation pattern 810 produced by the quadruplet array of FIG. 8A, in accordance with some embodiments. The resulting radiation pattern 810 is produced when the first and second antenna duplets 802, 804 are radiating together. The resulting radiation pattern 810 has a peak gain of 5.32 dB, as depicted in FIG. 8B.

Figure 8C:
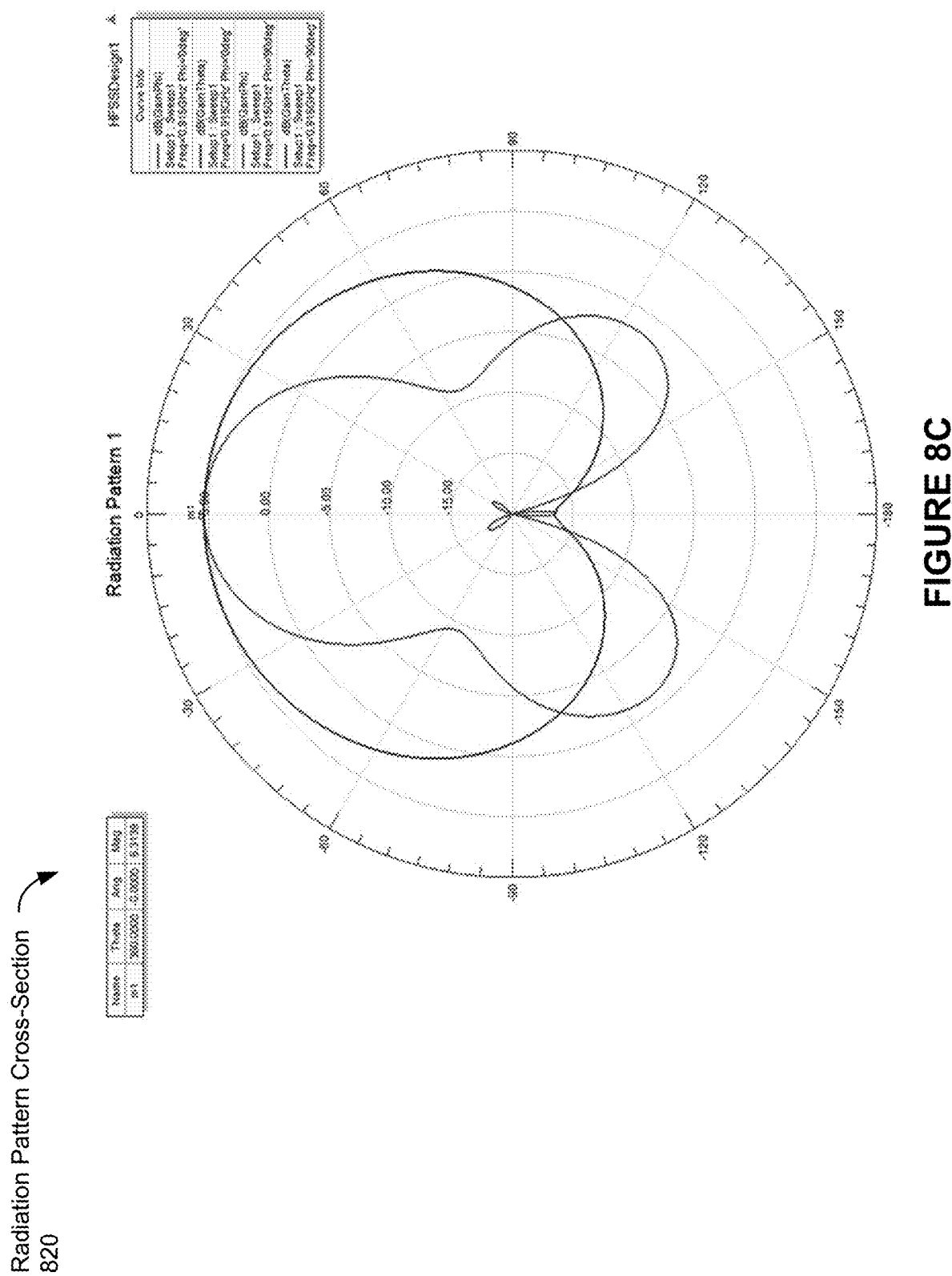

FIG. 8C illustrates a cross-sectional view 820 of the resulting radiation pattern 810 (taken along the X-Y plane shown in FIG. 8B), in accordance with some embodiments. The cross-sectional view 820 includes the gain on the X-Z plane (Phi=0), as that plane is swept with a position vector R of constant length |R|, originating at the axis' origin and rotating throughout that plane. During that operation, the tip of that vector indicates corresponding observation points on a circle of radius |R|, lying on the X-Z plane. The corresponding gain diagrams are the gains observed at the (swept) observation points generated from the component of the electric field along the Y-axis (GainPhi, Phi=0) (i.e., the red curve is shrunk to a point) and generated by the component of the electric field perpendicular to the position vector R as that vector sweeps the plane (GainTheta, Phi=0) (e.g., the blue curve). The cross-sectional view 820 also includes the gain on the Y-Z plane (Phi=90°), as that plane is swept with a position vector R of constant length |R|, originating at the axis' origin and rotating throughout that plane. During that operation, the tip of that vector indicates corresponding observation points on a circle of radius |R|, lying on the Y-Z plane. The corresponding gain diagrams are the gains observed at the (swept) observation points generated from the component of the electric field along the X-axis (GainPhi, Phi=90°) (e.g., the green curve) and generated by the component of the electric field perpendicular to the position vector R as that vector sweeps the plane (GainTheta, Phi=90°) (e.g., the purple curve is almost shrunk to a point). From the fourth gain curves shown in the cross-sectional view 820, (GainPhi, Phi=0) and (GainTheta, Phi=90°) are both negligible (very close to zero). The other two curves, (GainTheta, Phi=0) and (GainPhi, Phi=90°), show which electric field components the gain comes from, or what the polarization is of the radiation. On the Z-axis, the polarization is along the X-direction, as both curves indicate. Further, these gains show a large front-to-back ratio (e.g., a majority of the radiated energy in the resulting radiation pattern 810 travelled away from the antenna array 800 along the +Z-Axis, whereas a negligible amount travelled in the opposite direction). This description can be referenced and applied to the other cross-sectional views included herein, and for the sake of brevity, duplicative description will not be repeated when describing those other cross-sectional views included herein.

Figure 11A:
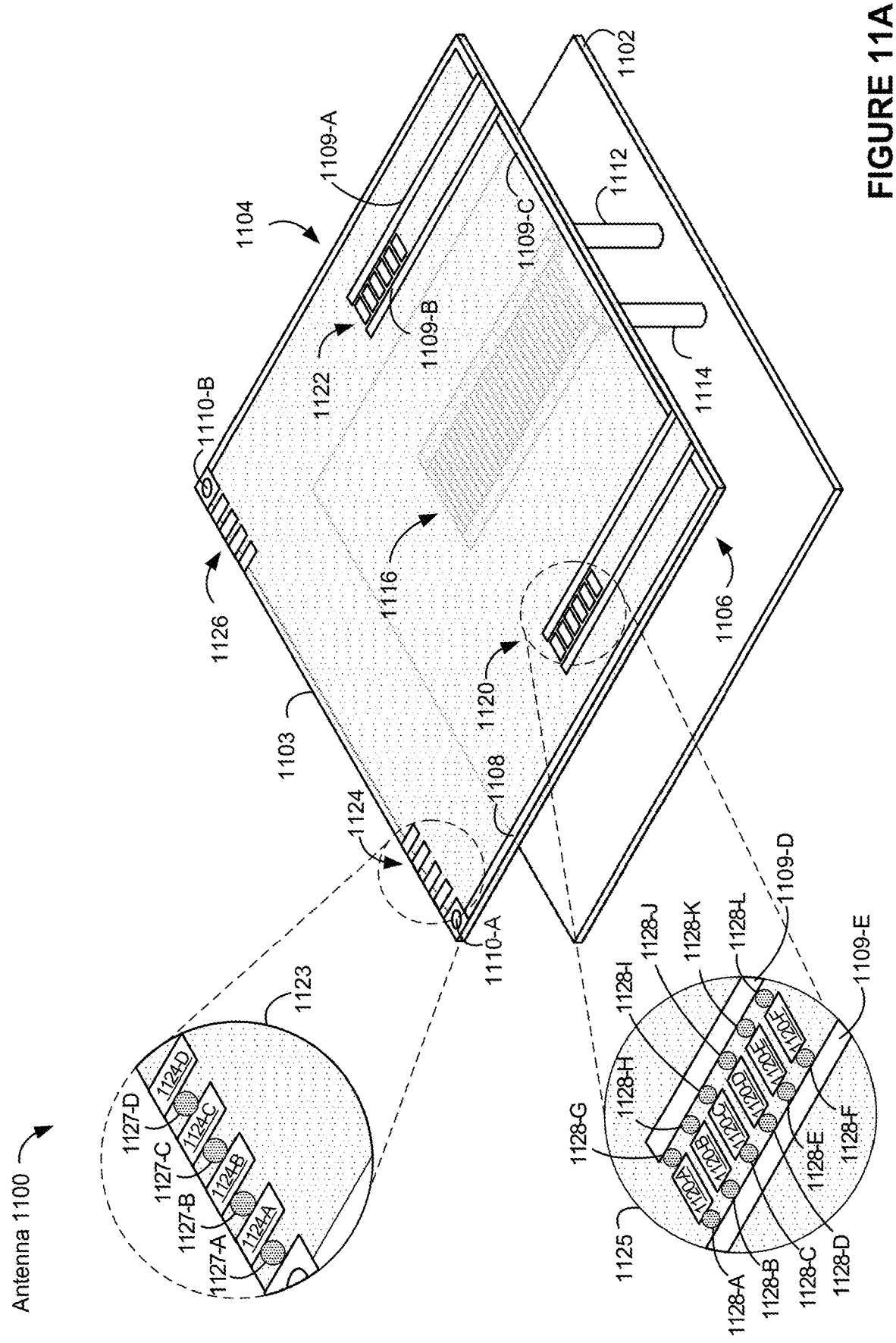
FIGS. 11A-11B illustrate various views showing a second embodiment of a drop-in antenna.
Figure 11B:
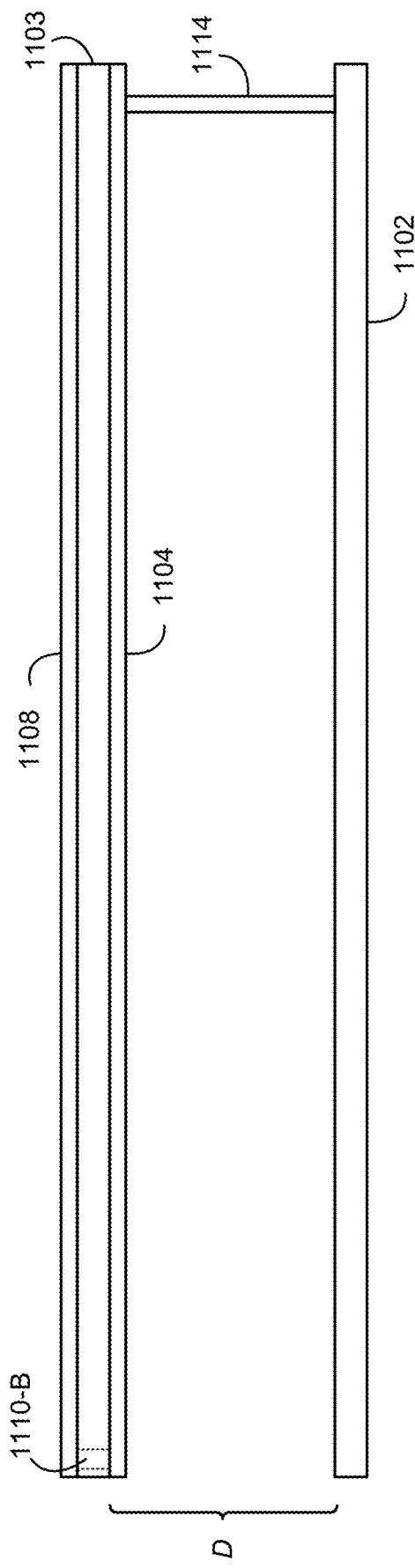
Figures 1, 11C:
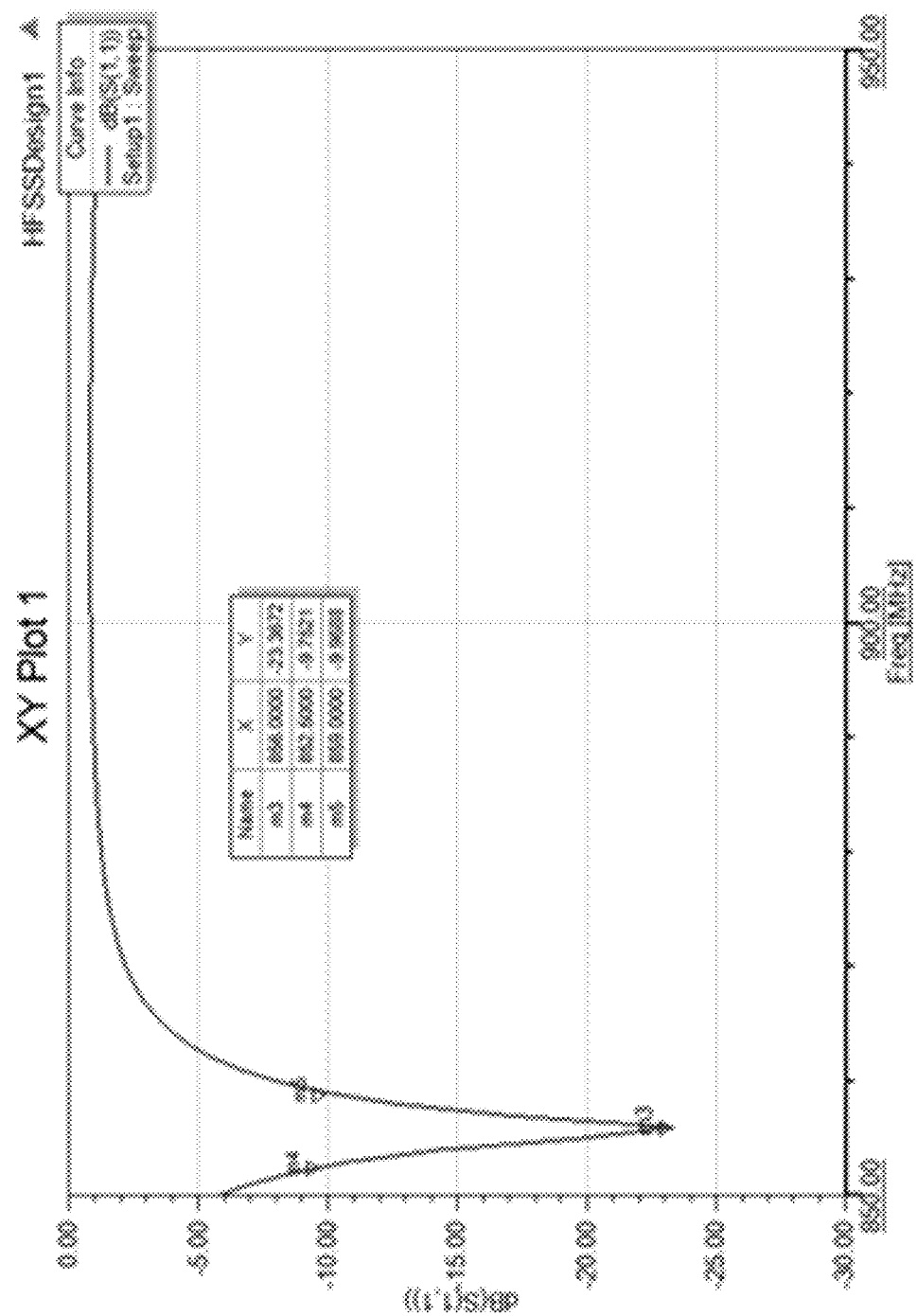
Figures 2, 11C:
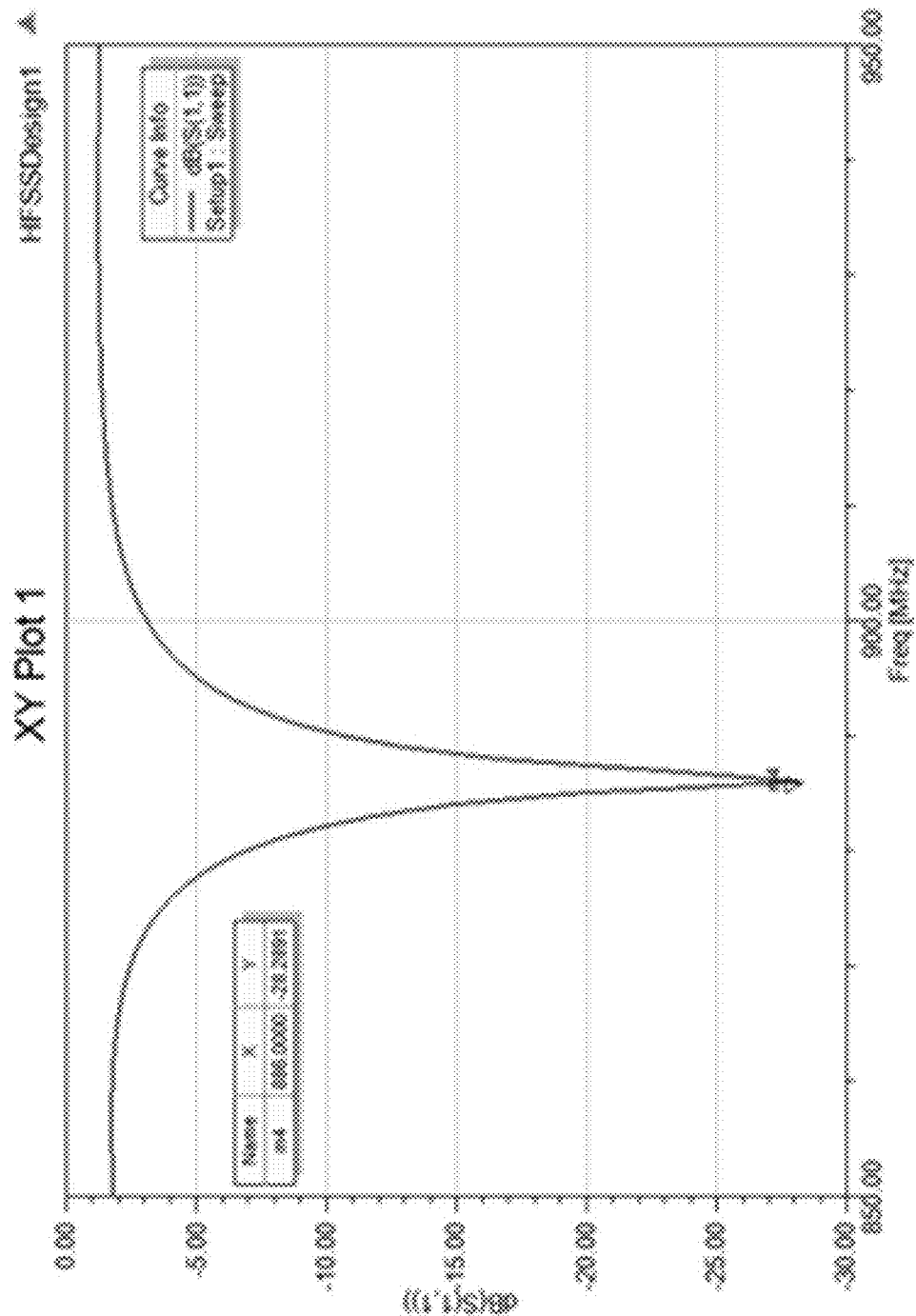
Figures 3, 11C:
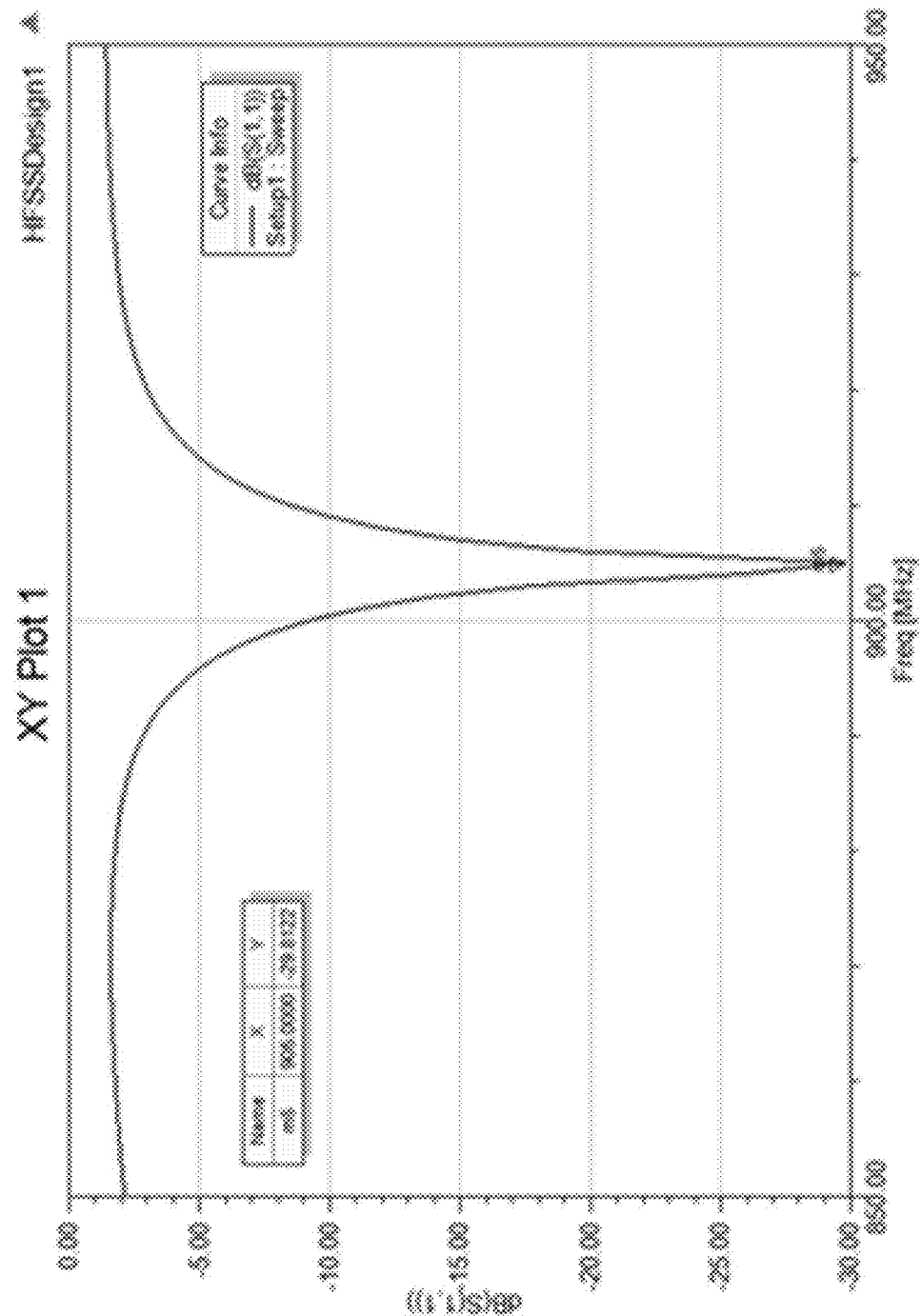

FIGS. 9A-1 to 9A-3 illustrate example octuplet antenna arrays, in accordance with some embodiments. It is noted that the antennas illustrated in FIGS. 9A-1 to 9A-3 can be various sizes relative to one another, and the sizes shown in FIGS. 9A-1 to 9A-3 are examples only, and are not limiting. Moreover, the octuplet antenna arrays may include four antenna duplets 600, some other antenna duplets, or various combinations of antenna duplets.

The octuplet arrays shown in FIGS. 9A-1 to 9A-3 have an overall length (L). In some embodiments, the overall length (L) is approximately 2λ (determined relative to a center operating frequency of each respective octuplet array, e.g., a length of 750 mm for an example octuplet array with a center operating frequency of about 900 MHz), while in some other embodiments the overall length (L) is substantially less (e.g., 1.5λ, 1λ, or even less, such as 300 mm to 500 mm for an octuplet array with a center operating frequency of about 900 MHz).

The octuplet arrays shown in FIGS. 9A-1 to 9A-3 also have a center-to-center separation difference (Diff) between each antenna duplet. In some embodiments, the Diff. between each antenna duplet is the same, while in other embodiments at last one Diff. is not the same. For example, a Diff between the first and second duplets in the octuplet of FIG. 9A-1 can be approximately 1λ (e.g., approximately 330 mm for the example octuplet with the center operating frequency of about 900 MHz), while a Diff between the second and third duplets in the octuplet of FIG. 9A-1 can be approximately ⅔λ (e.g., approximately 220 mm for the example octuplet with the center operating frequency of about 900 MHz).

In some embodiments, the center-to-center separation difference (Diff) is less than 1λ or even less than ¾ k (e.g., a Diff of approximately 200 mm between each respective duplet in the example octuplet with the center operating frequency of about 900 MHz), while in some other embodiments the center-to-center separation difference (Diff) is substantially less (e.g., less than 1 or even smaller, such as 10 mm to 100 mm for the example octuplet that has the center operating frequency of 900 MHz, or some other range) or greater.

Conventionally, as the center-to-center difference (Diff) decreases, mutual coupling between adjacent antenna duplets (and more particularly, the antenna elements therein) increases to the point where the antenna elements become essentially inoperable as little to no radiation is being transmitted away from the duplets (instead this is being absorbed by neighboring antenna elements). By implementing the principles described herein and discovered by the inventors, mutual coupling between adjacent antenna elements in octuplet arrays (such as those shown in FIG. 9A-1-9A-3, or any other arrays) remains at very low levels and, therefore, very densely packed antenna arrays can be constructed.

Each of the example octuplet arrays of FIGS. 9A-1 to 9A-3 illustrate different ways to position respective duplets within the respective octuplets. Various positioning arrangements are possible, including serial distributed doublet array (FIG. 9A-1), parity-symmetric distributed doublet array (FIG. 9A-2), rotation-symmetric distributed doublet array (FIG. 9A-3). In some embodiments, the octuplet arrays of FIGS. 9A-1 to 9A-3 are "uniformly distributed" (i.e., each of the Diff values is substantially equal to one another such that the center-to-center distance between the respective duplets are substantially the same). Alternatively, the octuplet arrays of FIGS. 9A-1 to 9A-3 can be "non-uniformly distributed" (i.e., at least one Diff value is not equal to the other Diff values such that the center-to-center distance between the respective duplets differs in some respect). In some embodiments, each of the example octuplet arrays 900, 910, 920 are placed on a substrate (e.g., reflector 620, FIG. 6A).

Figure 9B:
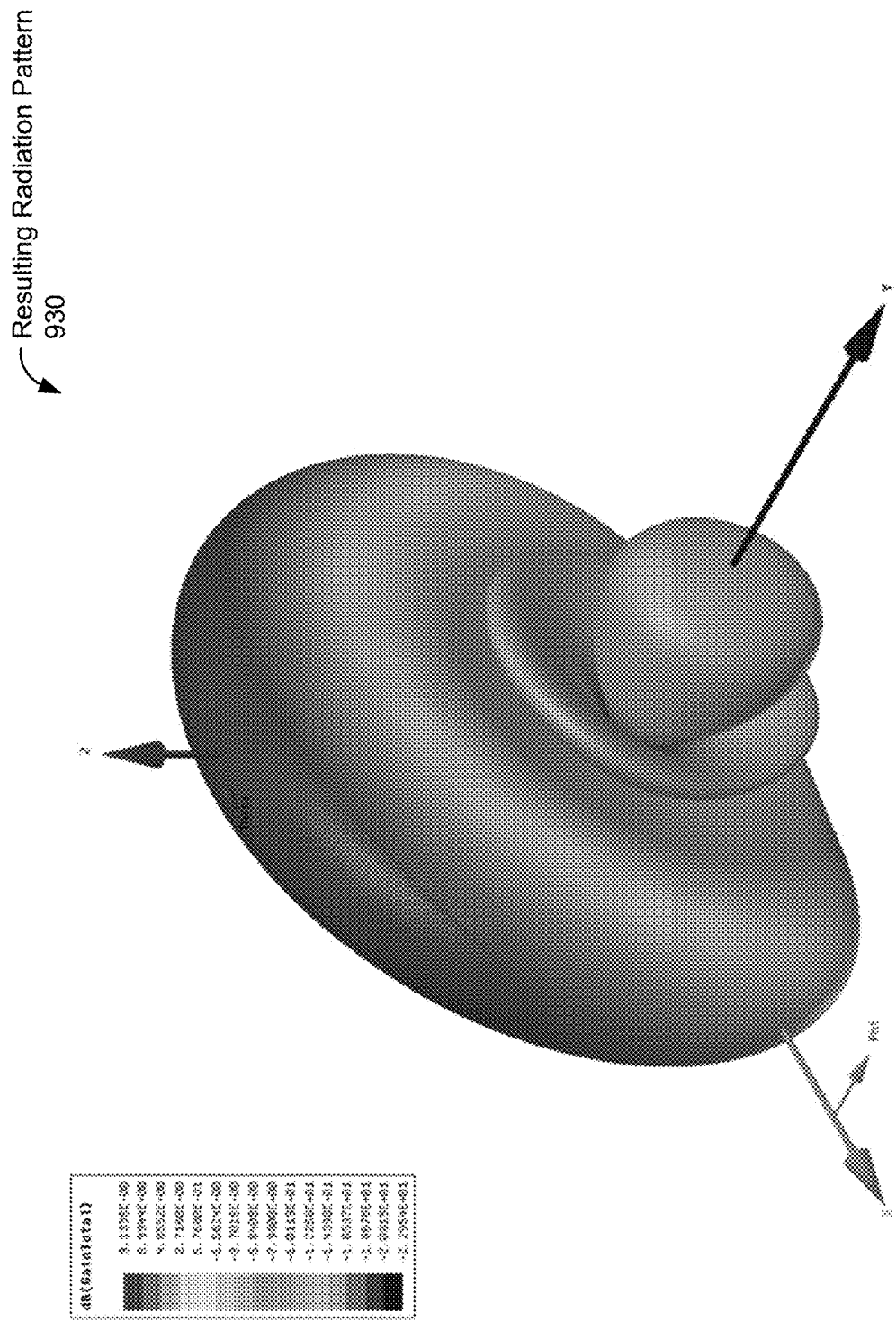

Turning to FIG. 9B, a resulting radiation pattern is illustrated and represents the radiation pattern produced when the plurality of antenna duplets of the octuplet array 900 (FIG. 9A-1) collectively radiate electromagnetic energy (i.e., the resulting radiation pattern 930 is a combination of radiation patterns generated by each of the plurality of antenna duplets). As shown, the resulting radiation pattern 930 has a peak gain of 9.13 dB.

Figure 9C:
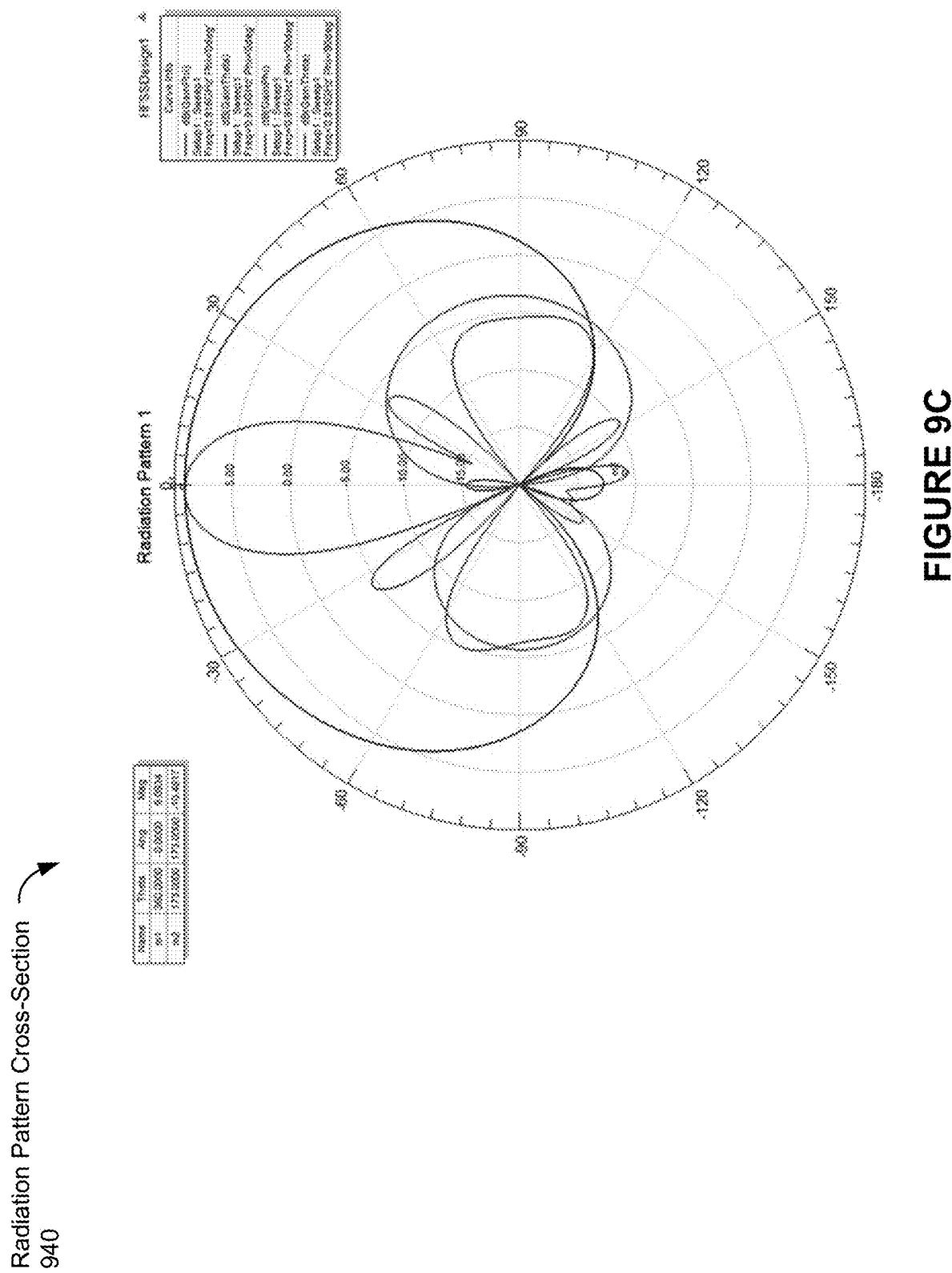

FIG. 9C illustrates a cross-sectional view 940 of the resulting radiation pattern 930 (taken along the X-Y plane shown in FIG. 9B). A cross-sectional view, similar to cross-sectional view 940, is described in further detail above with reference to FIG. 8C, and for the sake of brevity, said description is not repeated here.

Figure 9D:
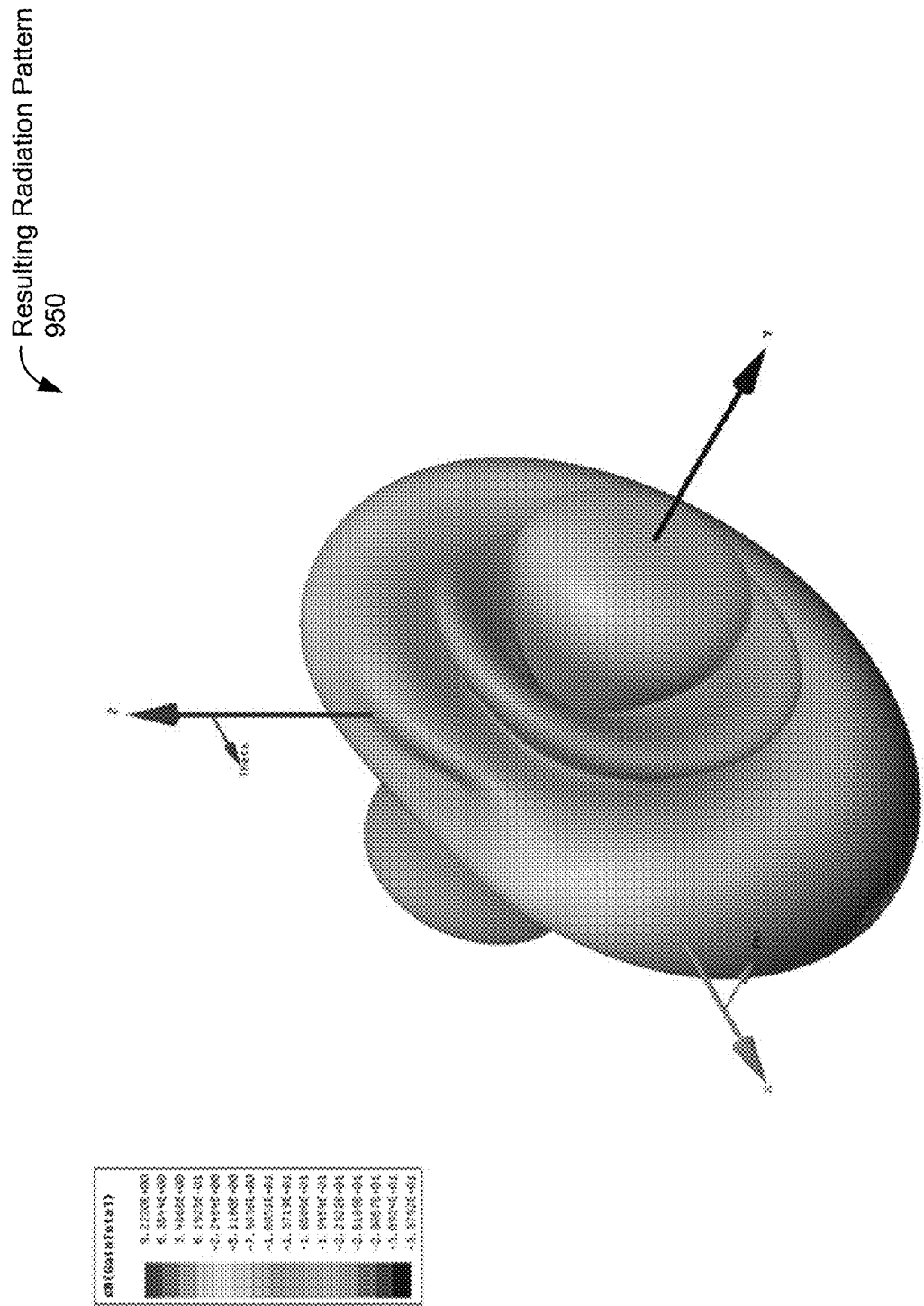
Figure 9E:
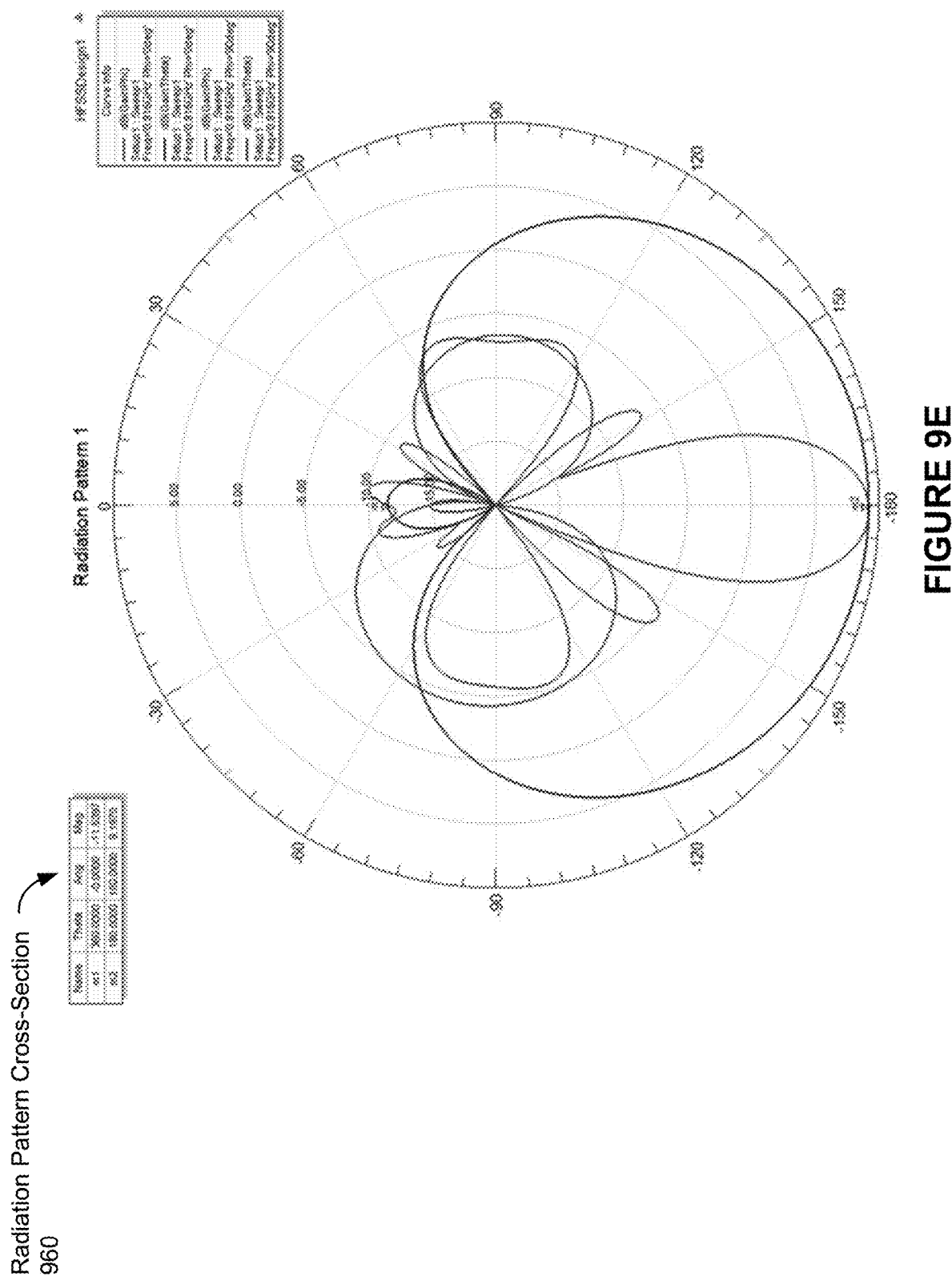

FIG. 9D illustrates another resulting radiation pattern 950 that forms when the plurality of antenna duplets of the antenna array 900 (FIG. 9A-1) radiate electromagnetic energy, and FIG. 9E illustrates a cross-sectional view 960 of the resulting radiation pattern 950 (taken along the X-Y plane shown in FIG. 9D). The results shown in FIGS. 9D and 9E are obtained by applying an electronic phase shift of 180° to any one of the two antennas (but not in both) in each respective duplet. In doing so, the radiation pattern 950 is an approximate mirror image of the radiation pattern 930. The cross-sectional view 960 includes gain along the X-axis (Phi) and gain along the Z-axis (Theta).

As such the antenna arrays described herein offer an additional advantage in that the transmitter 102 (FIG. 1) can now control whether the high-gain region is forward (low-gain region backward) or backward (low-gain region forward). This is electronic beam complete reversal, and is an additional unique feature exhibited by the pairing together of co-polarized antennas that produce perpendicularly oriented radiation patterns.

FIG. 9A-2 illustrates an octuplet array 910 placed on a substrate (e.g., reflector 620, FIG. 6A) with a first set of antenna duplets that mirror, relative to dotted line, a second set of antenna duplets (also referred to as a parity-symmetric doublet array 910). The array 910 includes two instances of the quadruplet antenna array 800 (FIG. 8A), wherein the two instances are collinearly aligned along the Y-axis. FIG. 9A-3 illustrates an octuplet array 920 placed on a substrate (e.g., reflector 620, FIG. 6A) with a first set of antenna duplets rotated 180 degrees relative to a second set of antenna duplets (e.g., rotated about the dotted line) (referred to as a rotation-symmetric doublet array).

Section C: Drop-In Antenna Structures

As described above, various improved antenna array designs are achieved by implementing the use of co-polarized antennas that produce perpendicularly oriented radiation patterns. The antenna structures that exhibit these needed characteristics are now going to be described in detail. In particular, five different embodiments of antenna structures that exhibit these characteristics are described below. As will be appreciated by one of skill in the art, the antenna arrays described above (and elsewhere herein) may be designed by selecting any two of these antenna structures (e.g., one of the first embodiment drop-in antennas and one of the second embodiment drop-in antennas) and building an array of duplets (or other configurations) of these two antenna structures. Additionally, as will also be appreciated by one of skill in the art, antenna arrays may also be built that include different duplets (e.g., a first duplet with the first and second embodiment drop-in antennas, a second duplet with the dual-polarized antennas, a third duplet with the two first embodiment antennas with decoupling mechanisms, and a fourth duplet that has the first embodiment drop-in antenna and the third embodiment drop-in antenna) and may be designed with any number of these duplets to suit desired system characteristics.

The term "drop-in antenna" refers to an antenna structure that is designed so that its radiation characteristics (polarization and orientation of radiation pattern) remain unaffected by presence of a large metal structure (e.g., a long rectangular metal reflector) that has a long axis that is much larger than any dimension of the antenna structure. Typically, when an antenna is positioned on such a reflector, the antenna aligns its polarization with the long axis of the reflector. Accordingly, the drop-in antennas described below do not act in the conventional manner. For example, an example antenna structure that may be termed a drop-in antenna structure may have a given polarization and a given orientation of radiation pattern, and this example antenna structure exhibits these same given radiation characteristics when that structure is place on top of a large metal structure.

Section C.1: First Embodiment of a Drop-In Antenna

Figure 10A:
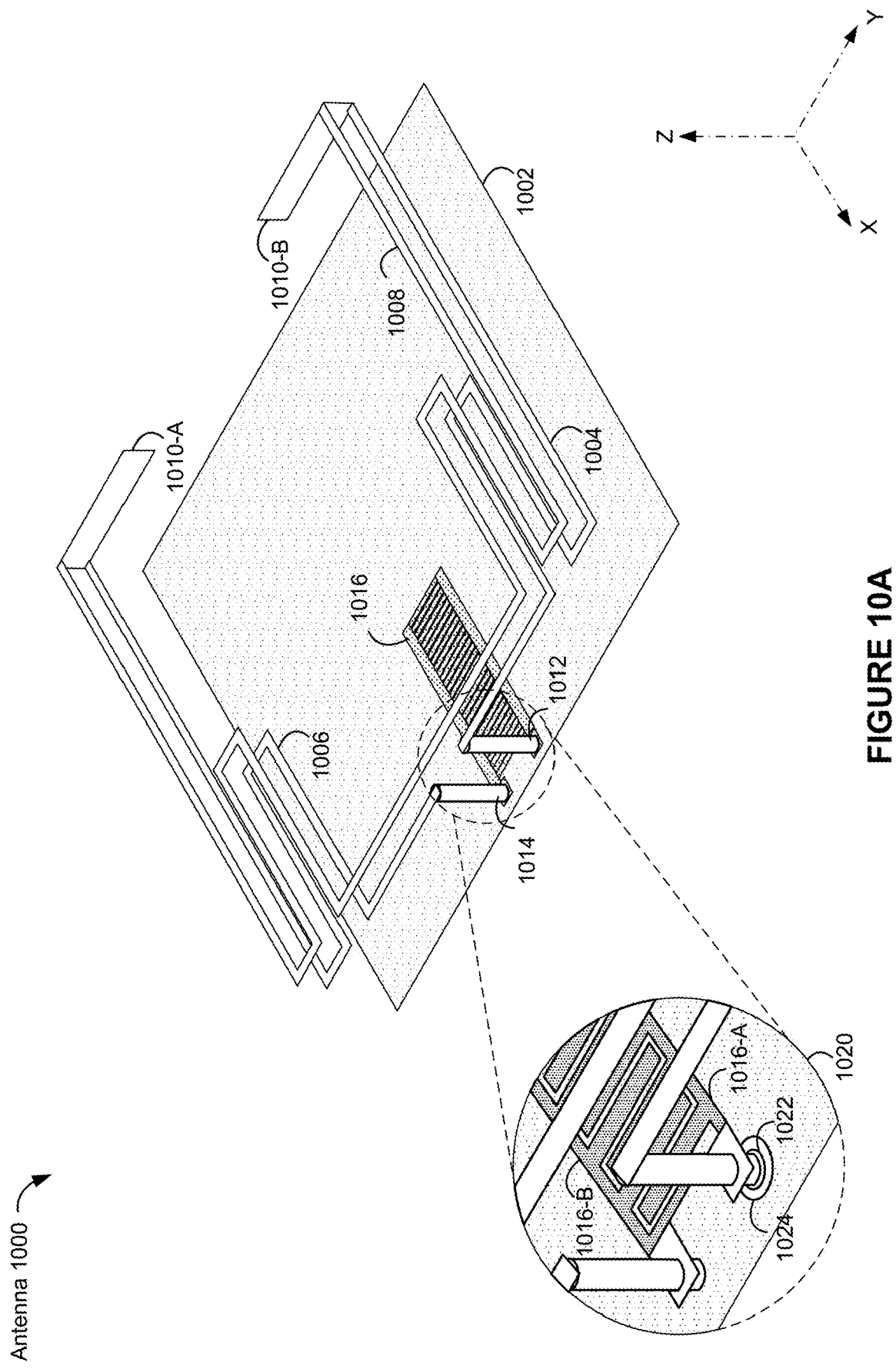
FIGS. 10A-10C illustrate various views showing a first embodiment of a drop-in antenna.
Figure 10B:
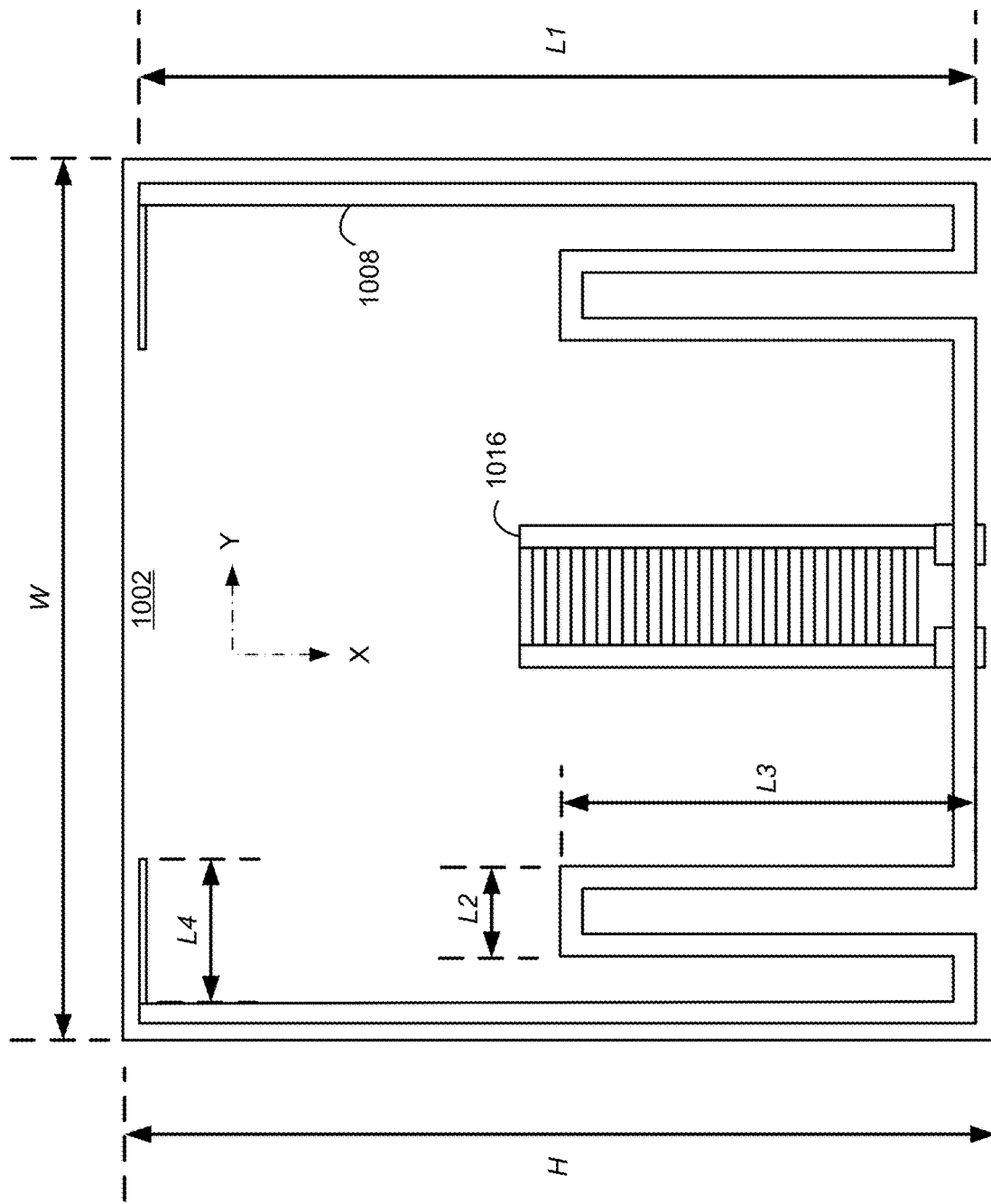
Figure 10C:
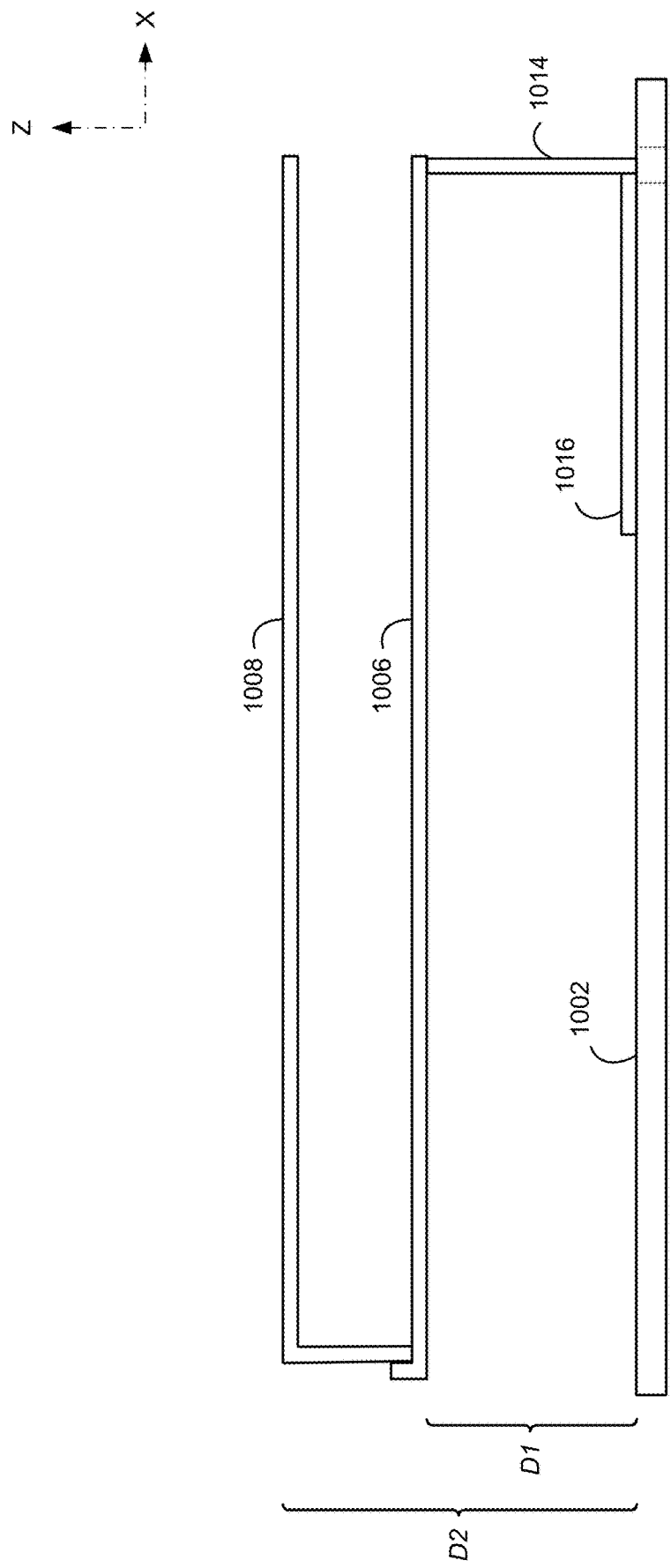

FIGS. 10A-10C illustrate various views showing a first embodiment of a drop-in antenna 1000. The first embodiment drop-in antenna 1000 may be referred to as a "stamped antenna" because antenna elements of the antenna 1000 are made from stamped metal. As shown in FIG. 10A, the antenna 1000 includes a substrate 1002 (e.g., a printed circuit board), a first radiating antenna element 1004, a second radiating antenna element 1006, a third radiating antenna element 1008, tabs 1010-A, 1010-B (also referred to herein as "folds" and "tuning stubs"), first and second pins 1012, 1014 (also referred to herein as "feeds" in some embodiments), and a capacitor 1016. Radiating antenna elements may also be referred to herein simply as "radiating elements" or "radiators."

The substrate 1002 has at least first and second orthogonal sides (e.g., edges) that are both less than approximately 0.2λ in length. For example, with reference to FIG. 10B, a height (H) and width (W) of the substrate 10002 may be less than approximately 0.15λ in length. To provide some context, the antenna 1000 may be configured to operate at frequencies ranging from one or more of 400 MHz (λ=0.75 meters) to 60 GHz (λ=0.005 meters), depending on the application. Accordingly, when the antenna 1000 is operating at a frequency of approximately 900 MHz, the height (H) and width (W) are 50 millimeters or less. Moreover, depending on a shape of the substrate 1002, the height (H) and width (W) may be the same size or different sizes.

The first and second pins 1012, 1014 are substantially perpendicular to a top surface of the substrate 1002. Further, the first and second pins 1012, 1014 are connected to and support the first and second antenna elements 1004, 1006, respectively (e.g., the substrate includes a first half and a second half, and the first pin 1012 is positioned in the first half and the second pin 1014 is positioned in the second half of the substrate). In some embodiments, the first pin 1012 is configured to provide electromagnetic signals to the first antenna element 1004 and the second pin 1014 is configured to serve as a ground for the antenna 1000. For example, the substrate 1002 may include a metal portion (i.e., a grounding portion) connected to the second pin 1014. The metal portion may serve to ground the antenna 1000 through its connection with the second pin 1014, and the substrate 1002 may also include an opening 1024 (shown in magnified view 1020), where the opening 1024 is sized to receive and accommodate the first pin 1012 (i.e., the opening isolates the first pin 1012 from the metal portion of the substrate 1002). In such embodiments, the first pin 1012 is connected to transmission circuitry 1022 (shown in magnified view 1020) that generates the electromagnetic signals. When the first and second pins 1012, 1014 are arranged in this manner, the antenna 1000 may be configured to operate as a folded monopole antenna. The transmission circuitry 1022 is coupled to one or more of the power amplifier(s) 216 and the power feeding circuitry 218.

Alternatively, in some embodiments, the first pin 1012 is configured to provide electromagnetic signals to the first antenna element 1004 and the second pin 1014 is configured to provide electromagnetic signals to the second antenna element 1006 (e.g., the first pin 1012 is coupled to a first signal pad (e.g., transmission circuitry 1022) of the substrate 1002 and the second pin 1014 is coupled to a second signal pad (e.g., transmission circuitry 1022) of the substrate 1002). In such embodiments, a voltage differential is created between the first pin 1012 and the second pin 1014. For example, the first pin 1012 may be configured to provide electromagnetic signals at a higher power level relative to the second pin 1014, or vice versa. When the first and second pins 1012, 1014 are arranged in this manner, the antenna 1000 may be configured to operate as a folded loop antenna. In some embodiments, the first antenna element 1004 is positioned in the first half of the substrate 1002, and the second antenna element 1006 is positioned in the second half of the substrate 1002.

As noted above, the first and second antenna elements 1004, 1006 are coupled to the first and second pins 1012, 1014, respectively. In the illustrated example, the antenna elements 1004, 1006 and the pins 1012, 1014 are coupled end-to-end. However, the first and second antenna elements 1004, 1006 may be coupled to the pins 1012, 1014 at various locations along a length of the antenna elements 1004, 1006. Further, in some embodiments, the antenna elements 1004, 1006 are both offset from the substrate 1002 (e.g., offset distance (D1), FIG. 10C). In such an arrangement, the substrate 1002 defines a first plane (e.g., a first horizontal plane: the bottom surface) and the first and second antenna elements 1004, 1006 define a second plane (e.g., a second horizontal plane: an intermediate surface) that is offset from the first plane. In such embodiments, the first and second antenna elements 1004, 1006 are co-planar (e.g., the first and second antenna elements 1004, 1006 are offset from the substrate 1002 by the same distance). However, in some embodiments, the first and second antenna elements 1004, 1006 are offset from the substrate 1002 by different distances.

The first antenna element 1004 follows a first meandering pattern and the second antenna element 1006 follows a second meandering pattern. In some embodiments, the first and second meandering patterns are the same while in other embodiments they differ. In those embodiments where the patterns are the same, the first and second antenna elements 1004, 1006 are mirror images of each other (e.g., symmetrical elements). The first and second antenna elements 1004, 1006 are sometimes referred to collectively as the "lower antenna element." Various meandering patterns may be used and the illustrated patterns are merely one set of examples.

The third antenna element 1008 is offset from the substrate 1002 (e.g., offset distance (D2), FIG. 10C). The third antenna element 1008 defines a third plane (e.g., a third horizontal plane: the top surface) that is offset from the second plane defined by the first and second antenna elements 1004, 1006. The third antenna element 1008 follows a third meandering pattern. In some embodiments, the third meandering pattern of the third antenna element 1008 mirrors a combination of the meandering patterns followed by the first and second antenna elements 1004, 1006. Alternatively, in some embodiments, the third meandering pattern is different from the meandering patterns followed by the first and second antenna elements 1004, 1006. The third antenna element is sometimes referred to as the "upper antenna element."

The first, second, and third antenna elements 1004, 1006, 1008 each follow a meandering pattern (as discussed above), which is used primarily to reduce an overall size of the antenna 1000. By using the meandering patterns, the antenna elements 1004, 1006, 1008 can be positioned within a boundary (i.e., a perimeter) of the substrate 1002. For example, with reference to FIG. 10B, a largest dimension (L1) of the illustrated antenna element is less than the height (H) (and in some embodiments the width (W)) of the substrate 1002. It is noted that meandering, antenna element widths, and upper-lower antenna element separations can be adjusted to optimize performance at other frequencies or when a substrate is used.

In some embodiments, each of the first, second, and third antenna elements 1004, 1006, 1008 includes a plurality of segments. In some embodiments, the plurality of segments are contiguous segments while in other embodiments the segments are continuous segments.

The tabs 1010-A, 1010-B connect the third antenna element 1008 with the first and second antenna elements 1004, 1006. In addition, the tabs 1010-A, 1010-B may be configured to adjust an operating frequency of the antenna 1000. For example, with reference to FIG. 10B, increasing (or decreasing) a magnitude of L4 adjusts the operating frequency of the antenna 1000. Accordingly, during manufacture of the antenna 1000, the antenna 1000 can be calibrated by attaching various tabs 1010-A, 1010-B to the antenna 1000 and measuring the operating frequency of the antenna 1000.

The capacitor 1016 is disposed on the substrate 1002 and coupled to one or more the first and second pins 1012, 1014. The capacitor 1016 is configured to facilitate impedance matching for the antenna 1000. In doing so, the capacitor 1016 ensures that the antenna 1000 radiates electromagnetic signals in an efficient manner. In some embodiments, the capacitor 1016 is an interdigital capacitor. In such embodiments, as shown in the magnified view 1020, the capacitor 1016 has an electrode pattern composed of two comb-like electrodes 1016-A and 1016-B.

In some embodiments, the antenna includes dielectric support material disposed periodically between (i) the first radiating element 1004 and the third radiating element 1008, and (ii) the second radiating element 1006 and the third radiating element 1008. Further, in some embodiments, the antenna includes additional dielectric support material disposed periodically between the first and second radiating elements 1004, 1006 and the substrate 1002. The various other antennas described herein may include similar arrangements of dielectric support material.

FIG. 10B is a top view of the antenna 1000 in accordance with some embodiments. In this example, the third antenna 1008 mirrors a combination of the meandering patterns followed by the first and second antenna elements 1004, 1006. As a result, the first and second antenna elements 1004, 1006 are not visible in the depicted top view of FIG. 10B. However, as discussed above, the first and second antenna elements 1004, 1006 may have meandering patterns that differ from the meandering pattern of the third antenna element 1008. In such cases, the first and/or second antenna elements 1004, 1006 would be visible in a top view.

As discussed above, a height (H) and width (W) of the substrate 10002 may be less than approximately 0.2λ in length. In some embodiments, the dimensions for the height (H) and width (W) of the substrate 1002 may range from approximately 0.05λ to 0.2λ, although other ranges are possible. Further, physical dimensions of the antenna element 1008 include but are not limited to a length (L1) of the antenna element 1008, a length (L2) of the antenna element 1008, and a length (L3) of the antenna element 1008. In some embodiments, a value for each of the physical dimensions is defined according to a wavelength (λ) and a center operating frequency of electromagnetic signals to be radiated by the antenna element. For example, the antenna 1000 can be dimensioned to cause transmission of electromagnetic signals at frequencies ranging from one or more of 400 MHz (λ=0.75 meters) to 60 GHz (λ=0.005 meters), depending on the application. Accordingly, when the antenna 1000 is operating at a center frequency of approximately 900 MHz, the length (L1) is approximately 44.8 mm, the length (L2) is approximately 4.5 mm, and the length (L3) is approximately 18.36 mm. One skilled in the art will appreciate that the dimensions above are merely one example. Various other dimensions are possible, depending on the circumstances.

FIG. 10C is a side view of the antenna 1000 in accordance with some embodiments. In this example, the first and second antennas 1004, 1006 are co-planar. As a result, the second antenna element 1006 is not visible in the depicted side view. However, as discussed above, the first and second antenna elements 1004, 1006 may not be co-planar, at least in some embodiments. In such cases, the first and second antenna elements 1004, 1006 would be visible in a side view. Using the example from above, when the antenna 1000 is operating at the center frequency of approximately 900 MHz, the offset distance (D1) is approximately 5.44 mm and the offset distance (D2) is approximately 8.1 mm. One skilled in the art will appreciate that the dimensions above are merely one example. Various other dimensions are possible, depending on the circumstances.

Figure 10D:
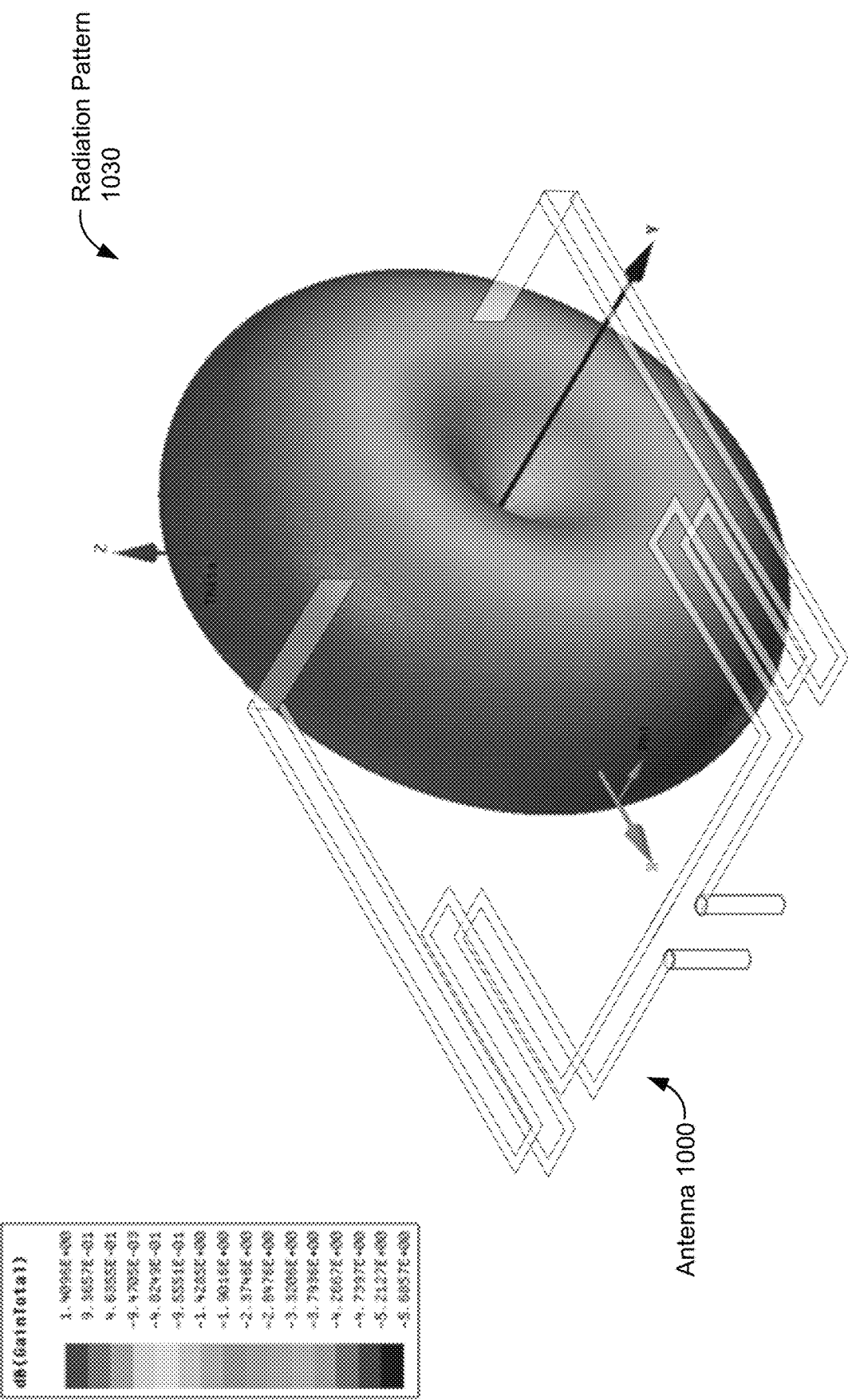
FIG. 10D illustrates a radiation pattern generated by the first embodiment of the drop-in antenna depicted in FIG. 10A.

FIG. 10D illustrates a radiation pattern 1030 generated by the antenna 1000 in accordance with some embodiments. The antenna 1000 is configured to generate a radiation pattern 1030 polarized in a first direction (e.g., along the Y-axis), e.g., in response to electromagnetic waves being fed to the antenna 1000 through the transmission circuitry 1022 (FIG. 10A). In this example, the radiation pattern 1030 has a higher concentration of EM energy produced along the Z-axis and the X-axis (and has a radiation null along the Y-axis) and forms an overall torus shape having a peak gain of approximately 1.41 decibels (dB).

Figure 10F:
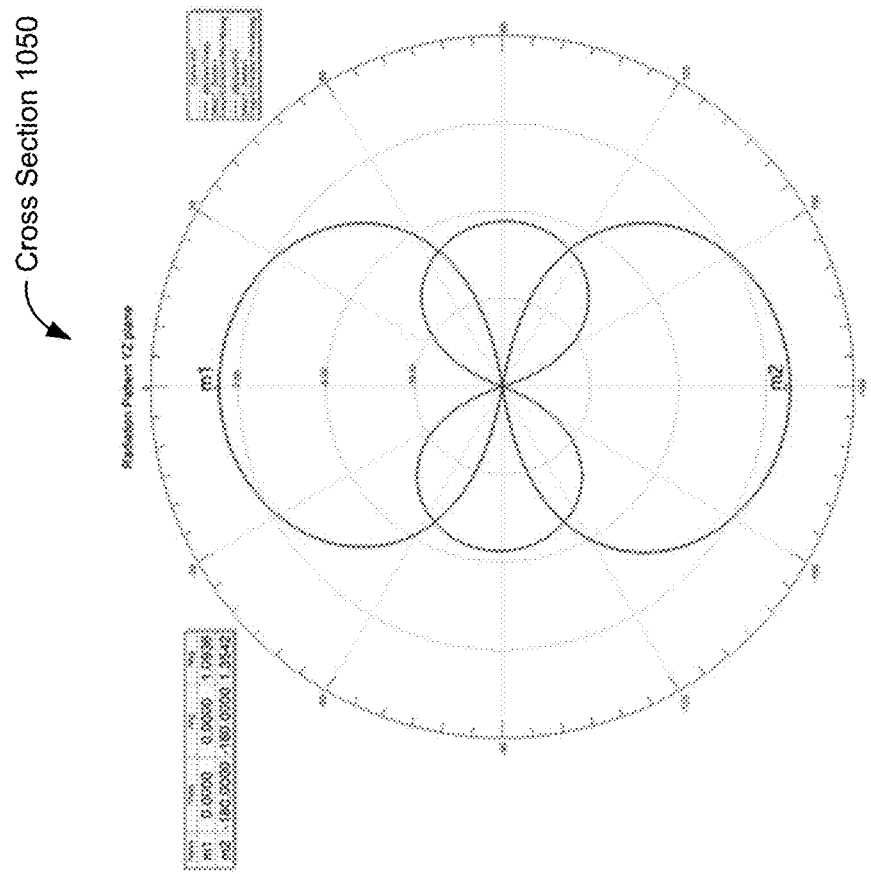
FIG. 10F illustrates a cross-sectional view of the radiation pattern shown in FIG. 10D (taken along the Y-Z plane shown in FIG. 10D), in accordance with some embodiments.
Figure 10E:
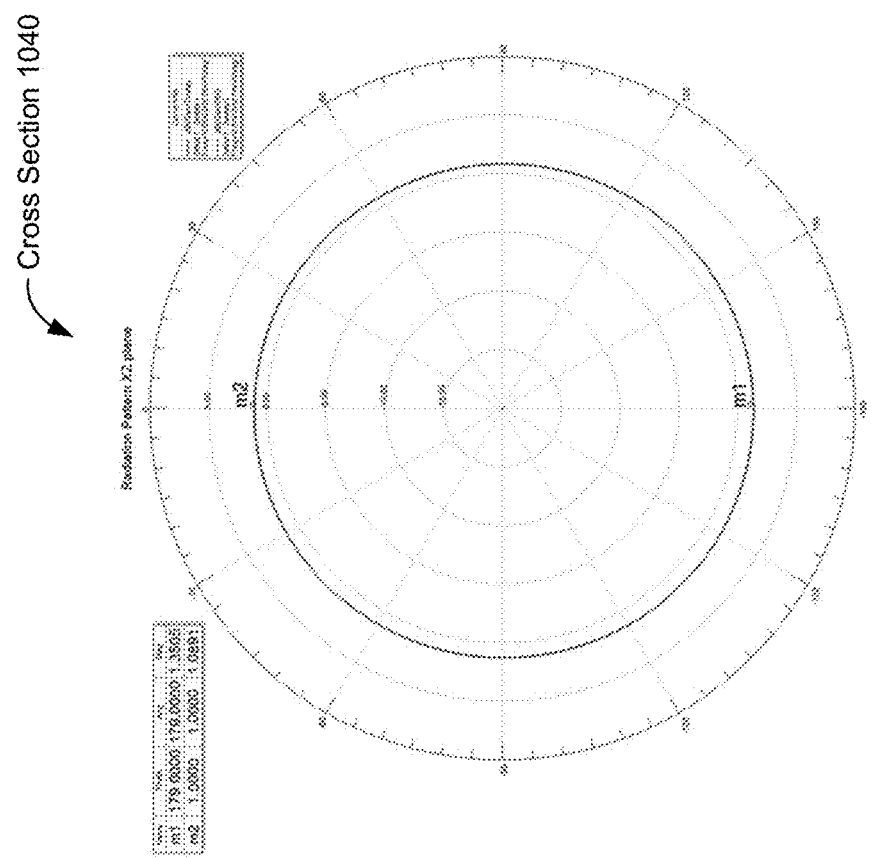
FIG. 10E illustrates a cross-sectional view of the radiation pattern shown in FIG. 10D (taken along the X-Z plane shown in FIG. 10D), in accordance with some embodiments.

FIG. 10E illustrates a cross-sectional view 1040 of the radiation pattern 1030 (taken along the X-Z plane shown in FIG. 10D). FIG. 10F illustrates a cross-sectional view of the radiation pattern 1030 (taken along the Y-Z plane shown in FIG. 10D). As shown in both cross-sectional views, the antenna 1000 creates a substantially uniform radiation pattern. Cross-sectional views of radiation patterns are discussed in further detail above with reference to FIGS. 3D and 6D.

Section C.2: Second Embodiment of a Drop-In Antenna

FIGS. 11A-11B illustrate various views showing a second embodiment of a drop-in antenna 1100. The antenna 1100 may replace the second antenna 612 (FIG. 6A). The antenna 1100 is a printed version of the antenna 1000 (FIG. 10A), and, thus, for the sake of brevity, features common to the antennas 1000, 1100 are given an abbreviated description below, when appropriate. Moreover, dimensions of the 1100 may be smaller (e.g., by a scaling fraction equal to the inverse index of refraction of the material on which the antenna is printed) to the dimensions discussed above with reference to the antenna 1000, unless specified otherwise.

The antenna 1100 may be referred to as a printed antenna 1100 because antenna elements of the antenna 1100 may be printed, at least partially. As shown in FIG. 11A, the antenna 1100 includes a first substrate 1102 (e.g., a printed circuit board), a second substrate 1103 (e.g., a printed circuit board), a first antenna element 1104, a second antenna element 1106, a third antenna element 1108, vias 1110-A, 1110-B, first and second pins 1112, 1114, and a capacitor 1116. Further, in some embodiments, the antenna 1100 includes first tuning elements 1120, 1122 and/or second tuning elements 1122, 1124.

The first substrate 1102 may be an example of the substrate 1002. The second substrate 1103, which is offset from the first substrate 1102, includes first and second opposing surfaces. As shown in FIG. 11B, the second substrate 1103 is offset from the first substrate 1102 by a distance (D). In some embodiments, the first substrate 1102 and the second substrate 1103 are the same while in other embodiments they differ in some respect. It is noted that the second substrate 1103 is semi-transparent in FIG. 11A for ease of discussion and illustration (e.g., to show the capacitor 1116, which is attached to the first surface of the second substrate 1103).

The second substrate 1103 is configured to receive the first, second, and third antenna elements 1104, 1106, and 1108. In the illustrated embodiment, the first antenna element 1104 is deposited (e.g., printed) onto the first surface of the second substrate 1103 and the second antenna element 1106 is also deposited onto the first surface of the second substrate 1103. Further, the third antenna element 1108 is deposited onto the second surface of the second substrate 1103. In some embodiments, the first and second antenna elements 1104, 1106 are similar to the first and second antenna elements 1004, 1006, and the third antenna element 1108 is similar to the third antenna element 1008. Accordingly, for the sake of brevity, any duplicative description of the antenna elements is not repeated here. It is noted that the antenna elements 1104, 1106, 1108 may be switched, such that the third antenna element 1108 is deposited on the first surface and the first and second antenna elements 1104, 1106 are deposited on the second surface of the second substrate 1103. Moreover, in some embodiments, the antenna elements 1104, 1006, 1108 are a continuous piece of material (e.g., similar to the antenna elements illustrated in FIG. 10A). Alternatively, the antenna elements 1104, 1006, 1108 may be separate segments that are contiguous (e.g., abutting end-to-end with one another).

In some embodiments, at least one antenna element in the antenna 1100 differs from the antenna elements in the antenna 1000. For example, aa shown in FIG. 11A, the third antenna element 1108 includes a plurality of segments 1109-A, 1109-B, 1109-C, etc., where some of the segments in the plurality (e.g., segments 1109-A, 1109-B) are separated from each other by tuning elements (e.g., tuning elements 1122). Although not shown, the first and second antenna elements 1104, 1106 may be deposited in the same manner. Alternatively, only one of the antenna elements includes tuning elements (e.g., the third antenna element 1108), in some other embodiments. The tuning elements used in the antenna 1100 are discussed below.

The first and second pins 1112, 1114 are substantially perpendicular to the first substrate 1102 and the second substrate 1103. Further, the pins 1112, 1114 are configured to support the second substrate 1103, along with the components on the second substrate 1103. The first and second pins 1112, 1114 are analogous to the first and second pins 1012, 1014 (FIG. 10A).

In the illustrated example, the capacitor 1116 is coupled to the first surface of the second substrate 1103. However, the capacitor 1116 may be attached to the second surface of the second substrate 1103, or may be attached to the first substrate 1102 (e.g., similar to the attachment between the substrate 1002 and the capacitor 1016, FIG. 10A). The capacitor 1116 is analogous to the capacitor 1016 (FIG. 10A).

The vias 1110-A, 1110-B connect the third antenna element 1008 with the first and second antenna elements 1004, 1006. The vias 1110-A, 1110-B pass through the second substrate 1103 and each end of each via 1110 contacts one of the antenna elements 1104, 1106, 1108. In some embodiments, instead of using the vias 1110, metal pieces (e.g., electrical traces) are coupled to (or deposited on) lateral surfaces of the second substrate 1103, and the metal pieces connect antenna elements deposited on opposing surfaces of the second substrate 1103.

As noted above, in some embodiments, the antenna 1100 includes tuning elements configured to adjust an operating frequency of the antenna 1100. In the illustrated embodiment, the antenna 1100 includes one or more first tuning elements 1120 positioned between first segments of the third antenna element 1108 and one or more second tuning elements 1122 positioned between second segments (e.g., segments 1109-A and 1109-B) of the third antenna element 1108. The first and second tuning elements 1120, 1122 can be used to adjust the operating frequency of the antenna 1100 by connecting a respective tuning element to the separated segments of the third antenna element 1108, thereby creating an electrical short across the respective tuning element, and modifying an overall length of the third antenna element 1108.

Further, in some embodiments, the antenna 1100 includes one or more third tuning elements 1124 positioned along an edge of the second substrate 1103 and one or more fourth tuning elements 1126 also positioned along the edge of the second substrate 1103. The third and fourth tuning elements 1124, 1126 can also be used to adjust the operating frequency of the antenna 1100 by connecting one or more of the third and fourth tuning elements to the third antenna element 1108. In the illustrated embodiment, the third and fourth tuning elements 1124, 1126 each includes four distinct tuning elements; however, the third and fourth tuning elements 1124 may include greater (or lesser) numbers of tuning elements.

The magnified views 1123 and 1125 of FIG. 11A illustrate connections between tuning elements and the third antenna element 1108. For ease of discussion below, connections 1127-A-1127-D and 1128-A-1128-L are electrical switches. The switches may include one or more transistors or diodes that selectively couple one or more of the tuning elements to the third antenna element 1108. The connections could also be metal deposits, such as solder. For example, the tuning elements may be manufactured without a connection to an antenna element and one or more of the tuning elements may be connected to (e.g., or disconnected from) by soldering a connection (e.g., or removing a soldered connection) to connect (e.g., or disconnect) the tuning element to the antenna element. In some embodiments (e.g., when solder is used), one or more of the connections 1127-A-1127-D and 1128-A-1128-L are not included in the antenna 1100.

With reference to magnified view 1123, an electrical switch 1127-A is positioned between an end portion of the third antenna element 1108 and a first tuning element 1124-A. The remaining electrical switches 1127-B, 1127-C, and 1127-D are positioned between the remaining tuning elements 1124-B, 1124-C, and 1124-D. Each electrical switch 1127 is switchably coupled to one or more of the tuning elements 1124-A-1124-D. In some embodiments, the switches 1127-A-1127-D are controlled by a controller of the transmitter 102 (FIG. 1), and the controller may adjust an operating frequency and/or bandwidth of the antenna 1100 by connecting one or more of the tuning elements 1124-A-1124-D through a corresponding switch (or switches). For example, the antenna 1100 has a first operating frequency when the first tuning element 1124-A is connected to the third antenna element 1108 through the first switch 1127-A, the antenna 1100 has a second operating frequency, different from the first operating frequency, when the first and second tuning elements 1124-A, 1124-B are connected to the third antenna element 1108 through the first and second switches 1127-A, 1127-B, respectively, and so on. Although not shown, the fourth tuning elements 1126 may include the same arrangement shown in the magnified view 1123.

With reference to magnified view 1125, electrical switches 1128-G-1128-L are disposed between segment 1109-D of the third antenna element 1108 and tuning elements 1120-A-1120-F. Further, electrical switches 1128-A-1128-F are disposed between segment 1109-E of the third antenna element 1108 and the tuning elements 1120-A-1120-F. In some embodiments, each electrical switch 1128 is switchably coupled to one of the tuning elements 1120-A-1120-F. In some embodiments, the switches 1127-A-1127-F and/or 1127-G-1127-L are controlled by a controller of the transmitter 102 (FIG. 1), and the controller may adjust an operating frequency of the antenna 1100 by connecting one of the tuning elements 1124-A-1124-E with the segments 1009-D and 1109-E through corresponding switches. For example, the antenna 1100 has a first operating frequency when the first tuning element 1120-A is connected with the two segments 1109-D, 1109-E of the third antenna element 1108 through switch 1127-A and switch 1128-G, the antenna 1100 has a second operating frequency, different from the first operating frequency, when the second tuning element 1120-B is connected with the two segments 1109-D, 1109-E of the third antenna element 1108 through switch 1127-B and switch 1128-H, and so on. Although not shown, the second tuning elements 1122 may include the same arrangement shown in the magnified view 1125.

It is noted that the electrical switches 1128-A-1128-F or the electrical switches 1128-G-1128-L are optional. For example, the electrical switches 1128-A-1128-F (or the switches 1128-G-1128-L) may be replaced with solder. Alternatively, the tuning elements 1120-A-1120-F may be integrally formed with a segment of the third antenna element 1108, thereby forming a comb-shaped segment (e.g., the segment 1109-D or the segment 1109-E would have a comb shape). In doing so, the antenna 1100 only includes a single set of switches (e.g., switches 1128-A-1128-F or switches 1128-G-1128-L), which simplifies manufacture of the antenna 1100. Further, when one segment is comb-shaped, then a single switch may be used to adjust the operating frequency of the antenna 1100.

In light of the above, in some embodiments, the controller of the transmitter 102 can adjust the operating frequency of the antenna 1100 using one or more sets of tuning elements (e.g., one or more of the first, second, third, and fourth tuning elements). In this way, the antenna 1100's operating frequency and/or bandwidth can be finely adjusted. In some embodiments, the level of adjustment is approximately +/−15 MHz (although greater and lesser ranges are possible).

FIGS. 11C-1 to 11C-3 illustrate various coupling diagrams for the second embodiment of the drop-in antenna 1100 when it is operating at different frequencies. The various operating frequencies can be obtained, at least in some embodiments, using the tuning elements discussed above. For example, with reference to FIG. 11C-1, the antenna 1100 is tuned to operate at approximately 856 MHz. As such, the coupling effect is the lowest when the antenna 1100 is operating at approximately 856 MHz. In contrast, the antenna 1100 is tuned to operate at approximately 886 MHz and 905 MHz in FIGS. 11C-2 and 11C-3, respectively. As such, the coupling effect is the lowest when the antenna 1100 is operating at those respective operating frequencies. The operating frequencies illustrated in FIGS. 11C-1-11C-3 are merely used to provide context, and the antenna 1100 is capable of operating at greater and lesser frequencies than those shown in FIGS. 11C-1-11C-3.

Section C.3: Third Embodiment of a Drop-In Antenna

FIGS. 12A-12D illustrate various views of a third embodiment of a drop-in antenna 1200 in accordance with some embodiments. The antenna 1200, when placed in an antenna duplet, is designed to generate a radiation pattern that is perpendicular to a radiating pattern generated by the other antenna in the antenna duplet, while also being co-polarized with the other antenna. For example, the antenna 1200 may be an example of the first antenna 602 (FIG. 6A).

The antenna 1200 includes a substrate 1208 including first and second opposing surfaces (e.g., the first opposing surface shown as an upward-facing surface of the top layer of the substrate). The first opposing surface of the substrate 1208 is shown from a top perspective view in FIGS. 12B-12D. The first surface includes at least one lateral edge extending end-to-end across the substrate 1208, and that one lateral edge is less than approximately 0.15λ in length (in certain cases, all four lateral edges are less than approximately 0.15λ in length.

In some embodiments, the substrate 1208 is composed of a dielectric material. In some embodiments, the substrate 1208 includes a single layer (e.g., the top layer shown in FIG. 12A). In some embodiments, the substrate 1208 includes a plurality of layers 1218 (as labeled in FIG. 12A).

The antenna 1200 further includes a radiating element 1202 coupled to the first surface of the substrate 1208 and separated from the at least one lateral edge by a non-zero distance. The radiating element 1202 may be a metal patch (e.g., of a patch antenna). In some embodiments, the radiating element 1202 is a metallization layer that is coupled to (e.g., on top of) the substrate 1208. In some embodiments, the radiating element 1202 (e.g., patch) is smaller (e.g., shorter in length on one or more of the edges and/or smaller by area) than the substrate 1208.

For example, as shown in FIGS. 12A-12D, there is a gap (e.g., a non-zero distance) between the edges of substrate 1208 and the radiating element 1202 (e.g., at least one edge of the radiating element does not extend to an edge of the substrate). In some embodiments, a length of an edge of the radiating element 1202 is shorter than the length of the at least one edge of the substrate 1208. The radiating element 1202 may be printed onto the first surface of the substrate 1208 and the second surface of the substrate 1208 operates as a ground plane (e.g., the antenna 1200 may be manufactured on a printed circuit board (PCB)).

In some embodiments, the substrate 1208 is substantially square or rectangular in shape. In some embodiments, the radiating element 1202 is substantially square or rectangular in shape (e.g., the shape may include cutouts on the edges and/or within the shape). In some embodiments, the substrate 1208 and the radiating element 1202 share the same shape (e.g., both have substantially square shapes).

Figure 12A:
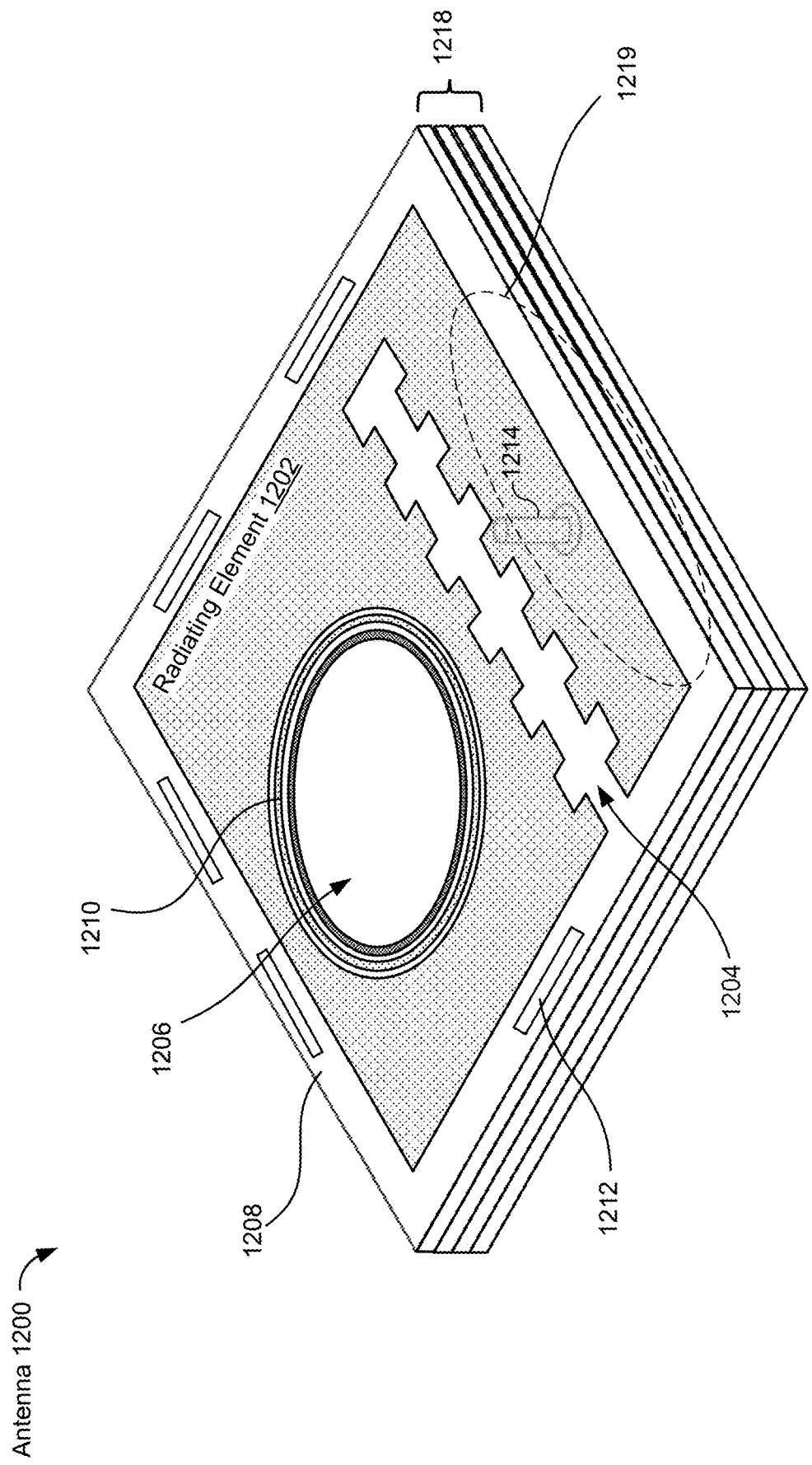
FIGS. 12A-12D illustrate various views showing a third embodiment of a drop-in antenna.

In some embodiments, as shown in FIG. 12A, the substrate 1208 further includes a plurality of layers 1218, where each layer of the plurality of layers 1218 has at least one edge that is aligned with the at least one lateral edge of the first surface of the substrate 1208. For example, as shown in FIG. 12A, the plurality of layers 1218 appears stacked between the first surface of the substrate 1208 (e.g., the top, upward-facing surface) and the second surface of the substrate 1208 (e.g., the bottom, downward-facing surface).

The radiating element 1202 defines a first cutout 1206 and a second cutout 1204, distinct from the first cutout 1206. In some embodiments, the second cutout 1204 has a second shape distinct from the first shape of the first cutout 1206. The second cutout 1204 can be a simple rectangle, a rectangular ellipsoid (e.g., a curved slot with a long axis following the long axis of the second cutout 1204), and various meandering shapes. The rectangles of the second cutout 1204 can be replaced with semi-circles.

Relative to a normal rectangular strip, the meandered shape of the second cutout 1204 (also referred to as a "meandering slot") increases the effective slot length, thus resulting in a lower resonant frequency of the antenna 1200 and reducing a size of the antenna 1200. It is noted that an increase in a size of the first cutout 1206 reduces an impedance matching bandwidth of the radiating element 1202. Therefore, a balance between increasing the size of the first cutout 1206 and reducing an area of the radiating element 1202 needs to be observed.

In some embodiments, the first cutout 1206 is a circular cutout (as shown in FIGS. 12A-12D) while in other embodiments the first cutout is some different shape (e.g., rectangular, triangular, etc.). The discussion above concerning the size of second cutout 1204 also applies to the first cutout 1206. For example, an increase in a size of the second cutout 1204 reduces an impedance matching bandwidth of the radiating element 1202.

Plane 1219 in FIG. 12A is referred to as a "Virtual Symmetry Plane," which is a plane of symmetry of the antenna 1200, given that the feed via 1214 (discussed below) is close to the plane 1219. The antenna 1200 effectively operates as if there are two antennas: the original one, and one that is reflected across the symmetry plane 1219, which is close to a top of the original one. The original antenna and its "image" obtained from this symmetry plane 1219 (virtual mirror) operate as if there are two real antennas connected.

The advantage of this virtual reflection is that, in practice, the existing antenna is much smaller because it works as if it coexists with its image. Therefore, the antenna 1200 operates as if it were double its actual size. Hence, the structure of the antenna 1200 reduces a size of the antenna 1200 significantly.

The antenna 1200 further includes the feed 1214 (the radiating element 1202 is shown as semi-transparent for ease of illustration and discussion), defined through the substrate 1208 (e.g., through the plurality of layers 1208), that couples the radiating element 1202 to transmission circuitry (e.g., power amplifier(s) 216 and power feeding circuitry 218, FIG. 2A) of the transmitter 102. In some embodiments, as shown in FIG. 12D, the antenna 1200 further includes one or more shorting vias 1216 that are defined through the substrate 1208 that couple the first surface with the plurality of layers 1218. In some embodiments, the one or more shorting vias 1216 are connected (e.g., shorted) through the plurality of layers 1218 of the substrate 1208 to create a cavity-backed antenna (e.g., the shorting vias 1216 can be all connected, and they also connect to the ground, which is the bottom metal layer of the antenna 1200). In some embodiments, the one or more shorting vias 1216 are not present (e.g., or are present but not electrically connected through the substrate) to create a non-cavity-backed antenna. It is noted that the cavity-backed (with shorting vias as shown) embodiments provide higher efficiency and lower resonant frequency (effectively reducing antenna size) than those embodiments without the shorting vias 1216.

When the shorting vias 1216 are absent, the only via is the feed 1214, which is a metal pin connecting the antenna 1200 to a hole in the ground. The electromagnetic signals will be applied in that hole, between the ground conductor and the feed 1214, which is the signal terminal of the antenna.

In some embodiments, the antenna 1200 further includes one or more tuning elements (e.g., tuning elements 1210 and 1212) switchably (or non-switchably) connected to the radiating element 1202. Any subset (from none to all) of the one or more tuning elements may connected to the radiating element 1202 at any given time. In some embodiments, the one or more tuning elements are connected to the radiating element 1202 using an electrical switch, as represented in FIG. 12D as the dashed circles, including switches 1220-1 and 1220-2. The switches may include one or more transistors or diodes that couple the one or more tuning elements to the radiating element 1202.

For example, the one or more transistors may be set to "on" to connect (e.g., electrically couple) the one or more tuning elements to the radiating element 1202. Conversely, the one or more transistors may be set to "off," such that the one or more tuning elements are not connected to the radiating element 1202. In some embodiments, some (e.g., from none to all) of the transistors are set to "on" and some (e.g., from none to all) of the transistors are set to "off," thus a subset of the one or more tuning elements may be connected to the radiating element 1202 at any given time. In some embodiments, the state of the transistors (e.g., "on" or "off") is controlled from an electronic device (e.g., a controller of the transmitter 102) remote from the antenna 1200. In some embodiments, the one or more tuning elements are switchably connected to the radiating element 1202 by soldering a connection between the one or more tuning elements and the radiating element 1202. For example, the one or more tuning elements may be manufactured without a connection to the radiating element and the one or more tuning elements may be connected to (e.g., or disconnected from) by soldering a connection (e.g., or removing a soldered connection) to connect (e.g., or disconnect) the one or more tuning elements to the radiating element.

The one or more tuning elements are configured to adjust an operating frequency and/or bandwidth of the radiating element 1202. In some embodiments, the one or more tuning elements are configured to adjust the operating frequency of the radiating element based on signals from a controller managing operation of the antenna (e.g., controlling whether to turn the transistors "on" or "off" by a controller). For example, if the controller turns a first transistor, coupled to a first tuning element, "on," the first tuning element is then connected to the radiating element 1202.

Figure 12B:
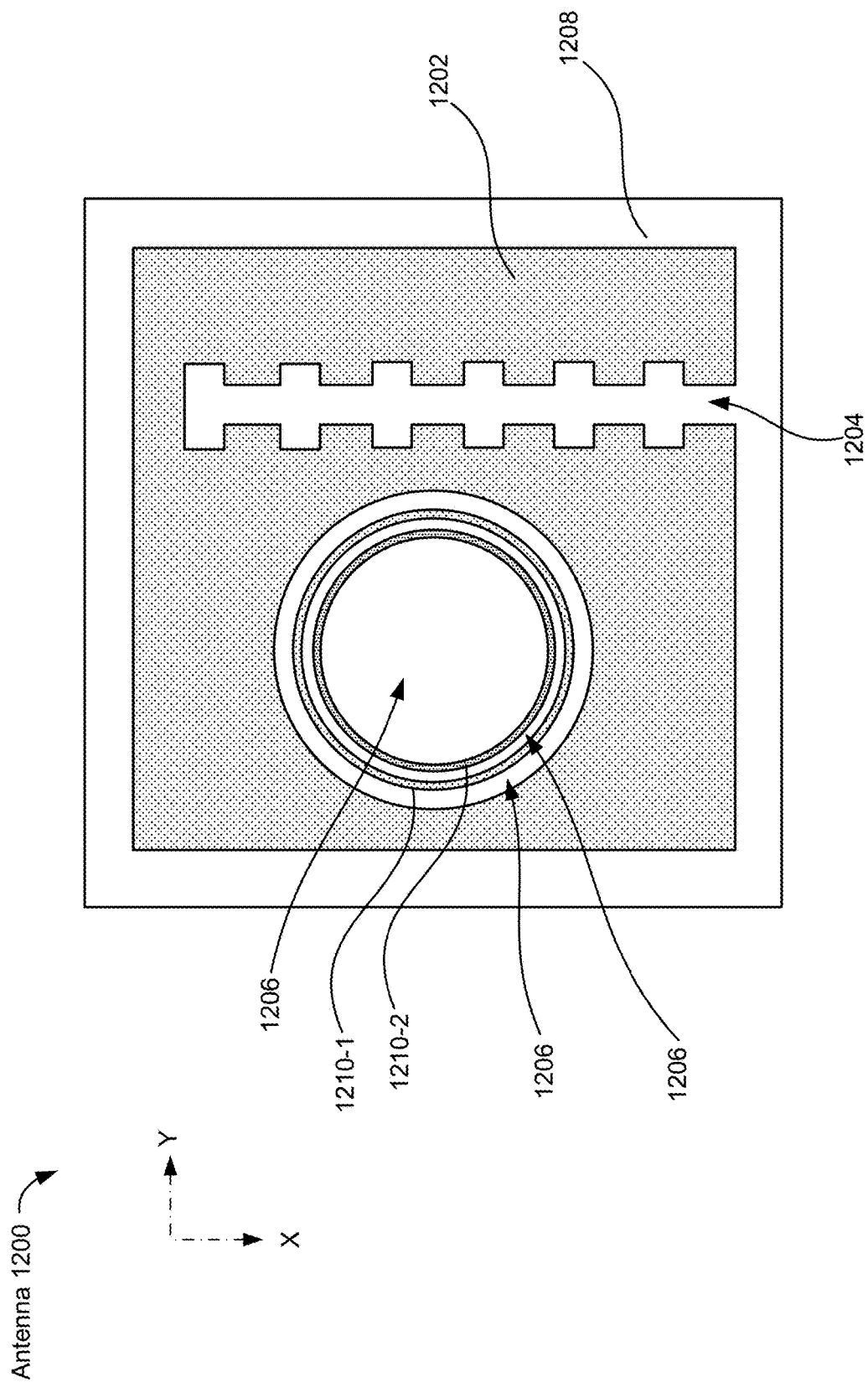

As shown in FIG. 12B, in some embodiments, the one or more tuning elements 1210-1, 1210-2 include a plurality of concentric rings positioned within the first cutout 1206 (e.g., a circular cutout). In some embodiments, the rings in the plurality of concentric rings do not overlap, as shown by the circular cutout areas 1206 shown between the radiating element and each of the concentric rings 1210-1 and 1210-2. In some embodiments, adjusting the frequency of the radiating element includes connecting a first concentric ring 1210-1 of the plurality of concentric rings to the radiating element 1202, and connecting the first concentric ring changes the operating frequency of the radiating element from a first frequency to a second frequency greater than the first frequency (e.g., up tunes the operating frequency). In some embodiments, adjusting the operating frequency of the radiating element further includes connecting two or more concentric rings of the plurality of concentric rings to the radiating element, where the two or more concentric rings include the first concentric ring. For example, the first concentric ring 1210-1 and second concentric ring 1210-2 may be connected using switch 1220-2. Connecting the two or more concentric rings changes the operating frequency of the radiating element from the second frequency to a third frequency greater than the second frequency (e.g., and greater than the first frequency from connecting the first concentric ring). In some embodiments, the first concentric ring 1210 is connected with the radiating element 1202 (e.g., along the edge of the cutout of the radiating element) by a switch.

In some embodiments, the first cutout 1206 (e.g., the circular cutout) has a first radius and the plurality of concentric rings include a first concentric ring that is switchably connected to the radiating element and has a second radius, smaller than the first radius. For example, the first concentric ring (e.g., concentric ring 1210-1) is smaller than the first cutout 1206. In some embodiments, the plurality of concentric rings further includes a second concentric ring (e.g., concentric ring 1210-2) that is switchably connected to the first concentric ring and has a third radius, smaller than the second radius. Accordingly, the second concentric ring is switchably connected to the radiating element 1202 through the first concentric ring (e.g., the first and second concentric ring may be serially connected to the radiating element). In some embodiments, the plurality of concentric rings includes more than two concentric rings, each subsequent ring having a smaller radius and switchably connected to its neighboring ring (e.g., the rings immediately next to the respective ring). In some embodiments, the plurality of concentric rings includes four concentric rings. In some embodiments, a number of possible tuning states to which the operating frequency of the antenna 1200 can be adjusted includes the number of concentric rings plus one. For example, if there are M (where M is an integer) concentric rings, the antenna has M+1 distinct tuning states.

In some embodiments (as an alternative or in addition to the serial connection described above), each ring is connected individually to the radiating element 1202. For example, a third ring may be connected to the radiating element 1202 without connecting the first and/or second concentric rings (that are positioned between the third ring and the radiating element 1202).

Figure 12C:
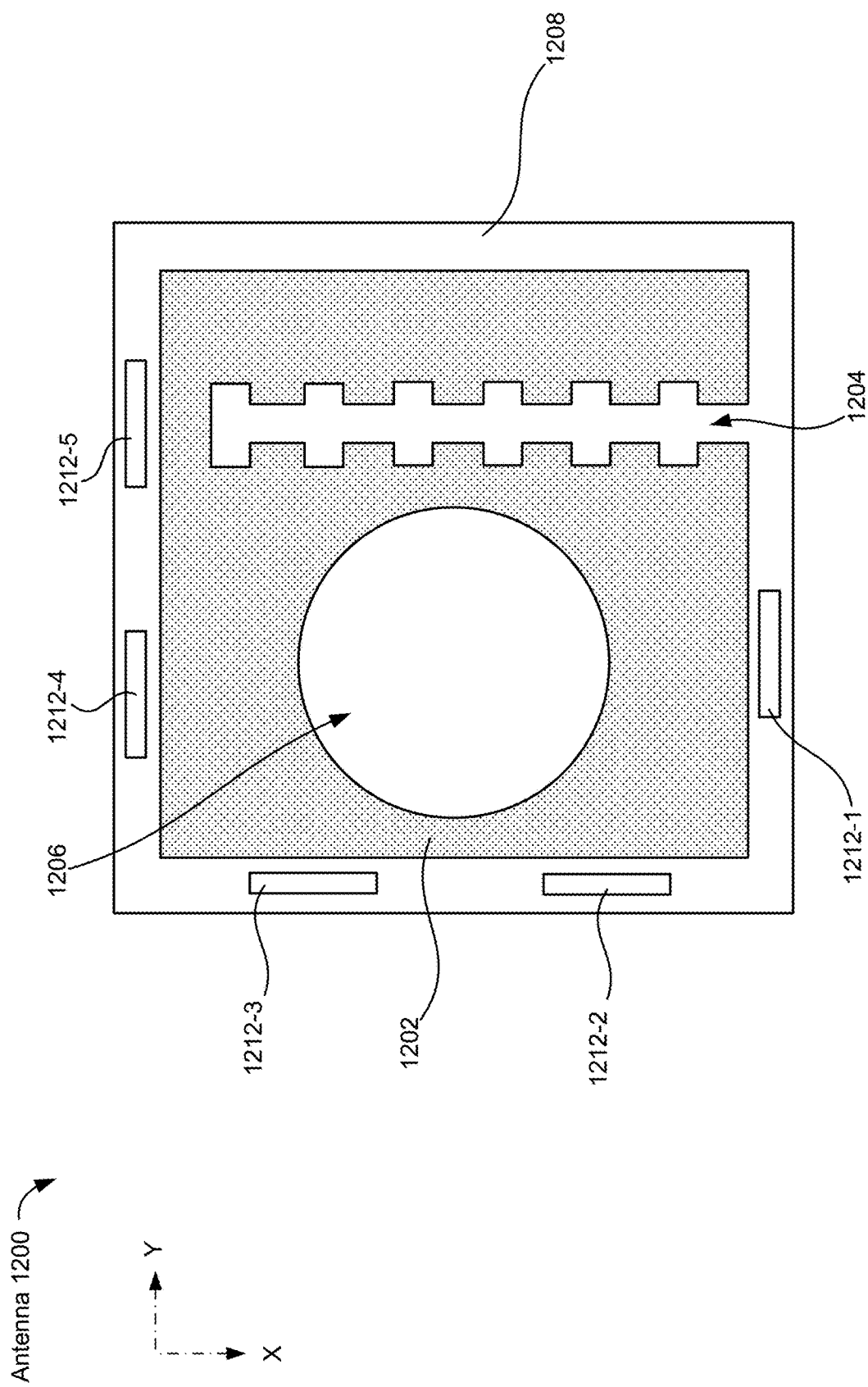
Figure 12D:
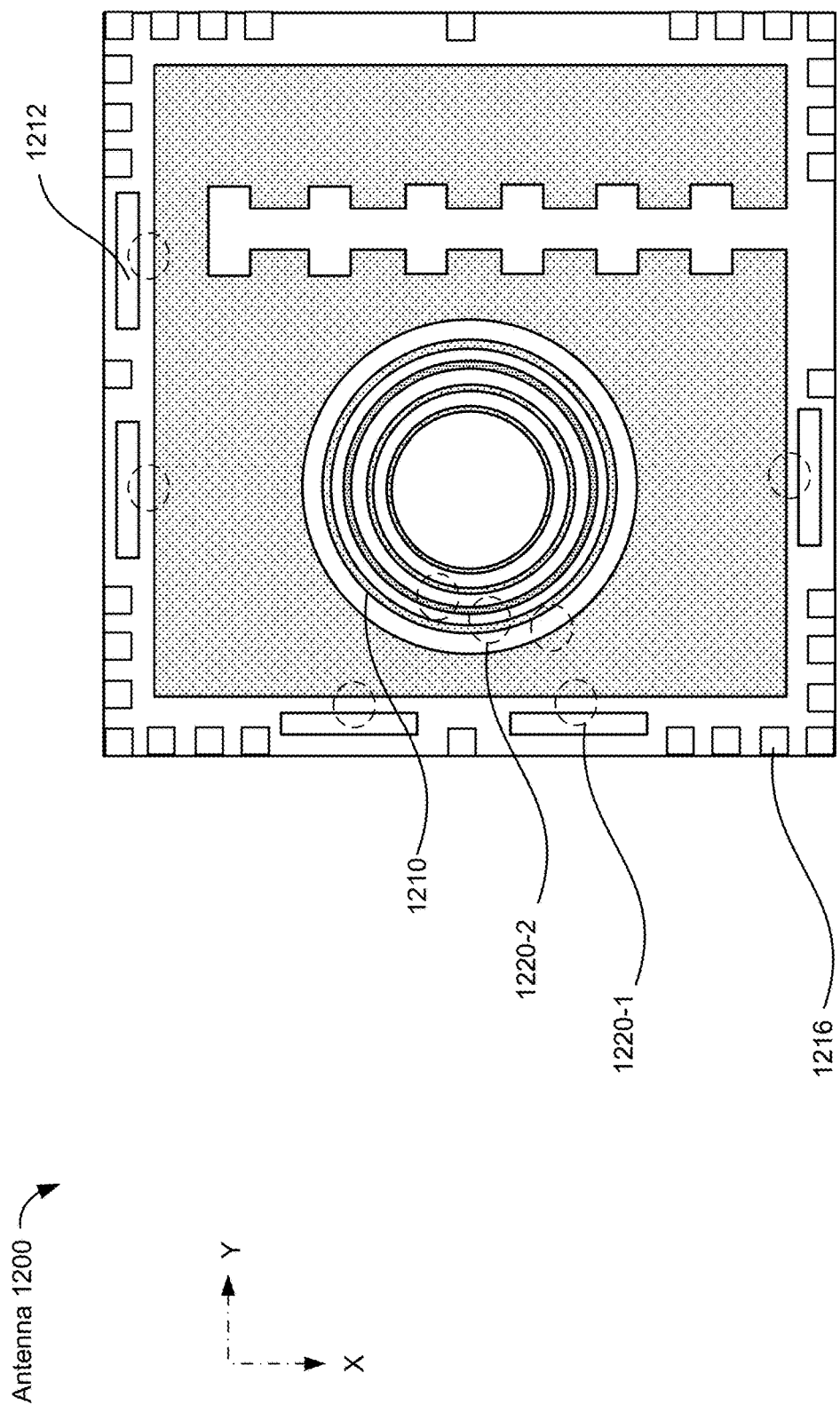

As shown in FIG. 12C, in some embodiments, the one or more tuning elements include a plurality of rectangular segments 1212 on the first surface of the substrate 1208. In some embodiments, at least one of the plurality of rectangular segments is positioned along the at least one edge of the first surface of the substrate, as shown in FIGS. 12C and 12D. In some embodiments, adjusting the operating frequency of the radiating element 1202 includes connecting a first rectangular segment of the plurality of rectangular segments, where connecting the first rectangular segment changes the operating frequency of the radiating element 1202 from a first frequency to a second frequency less than the first frequency (e.g., down tunes the operating frequency). In some embodiments, adjusting the operating frequency of the radiating element 1202 further includes connecting two or more rectangular segments of the plurality of rectangular segments to the radiating element 1202, where the two or more rectangular segments include the first rectangular segment.

For example, the first rectangular segment and a second rectangular segment are both connected. In some embodiments, a number of possible tuning states to which the operating frequency of the antenna can be adjusted includes 2 raised to the power of the number of rectangular segments of the antenna. For example, if there are N (where N is an integer) rectangles, the antenna has $2^N$ distinct tuning states.

In some embodiments, as shown in FIG. 12D, the one or more tuning elements include a combination of a plurality of concentric rings positioned within the first cutout and a plurality of rectangular segments on the first surface of the substrate. In some embodiments, adjusting the operating frequency of the radiating element 1202 includes connecting at least one of the plurality of concentric rings to the radiating element 1202 (e.g., to up-tune the operating frequency) and connecting at least one of the plurality of rectangular segments to the radiating element 1202 (e.g., to down-tune the operating frequency). In some embodiments, the tuning range for the operating frequency includes changing the starting operating frequency (e.g., without the tuning elements connected) by approximately 20% (e.g., by 10% in either direction, up-tuning or down-tuning). This allows for greater flexibility in tuning the operating frequency of the antenna 1200. In some embodiments, the amount that the operating frequency is adjusted is dependent upon how many of the concentric rings and/or how many of the rectangular segments are connected to the radiating element. Thus, by selectively connecting a combination of concentric rings and/or rectangular segments, the operating frequency may be tuned to a desired frequency.

Figures 1, 12E:
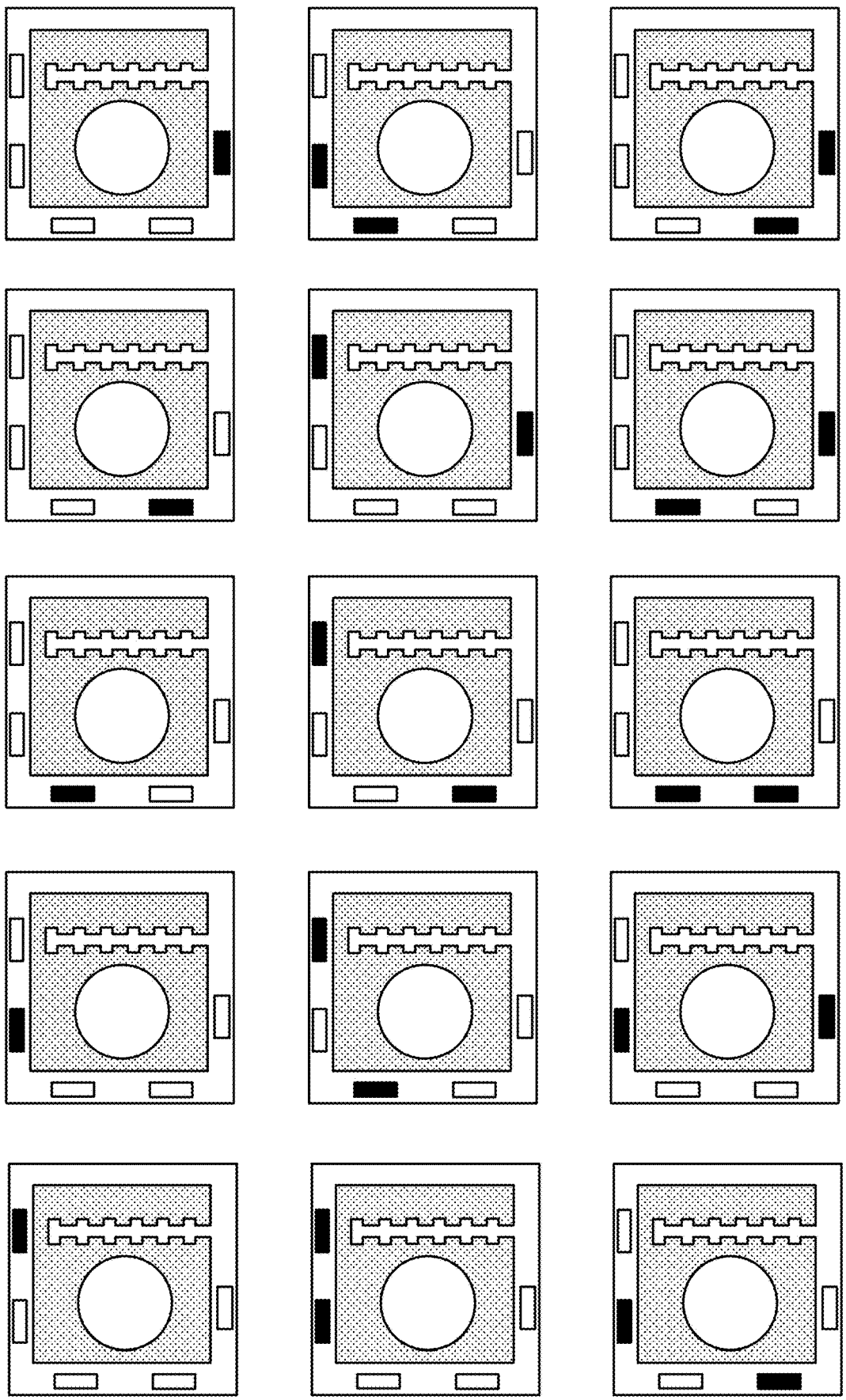
Figures 2, 12E:
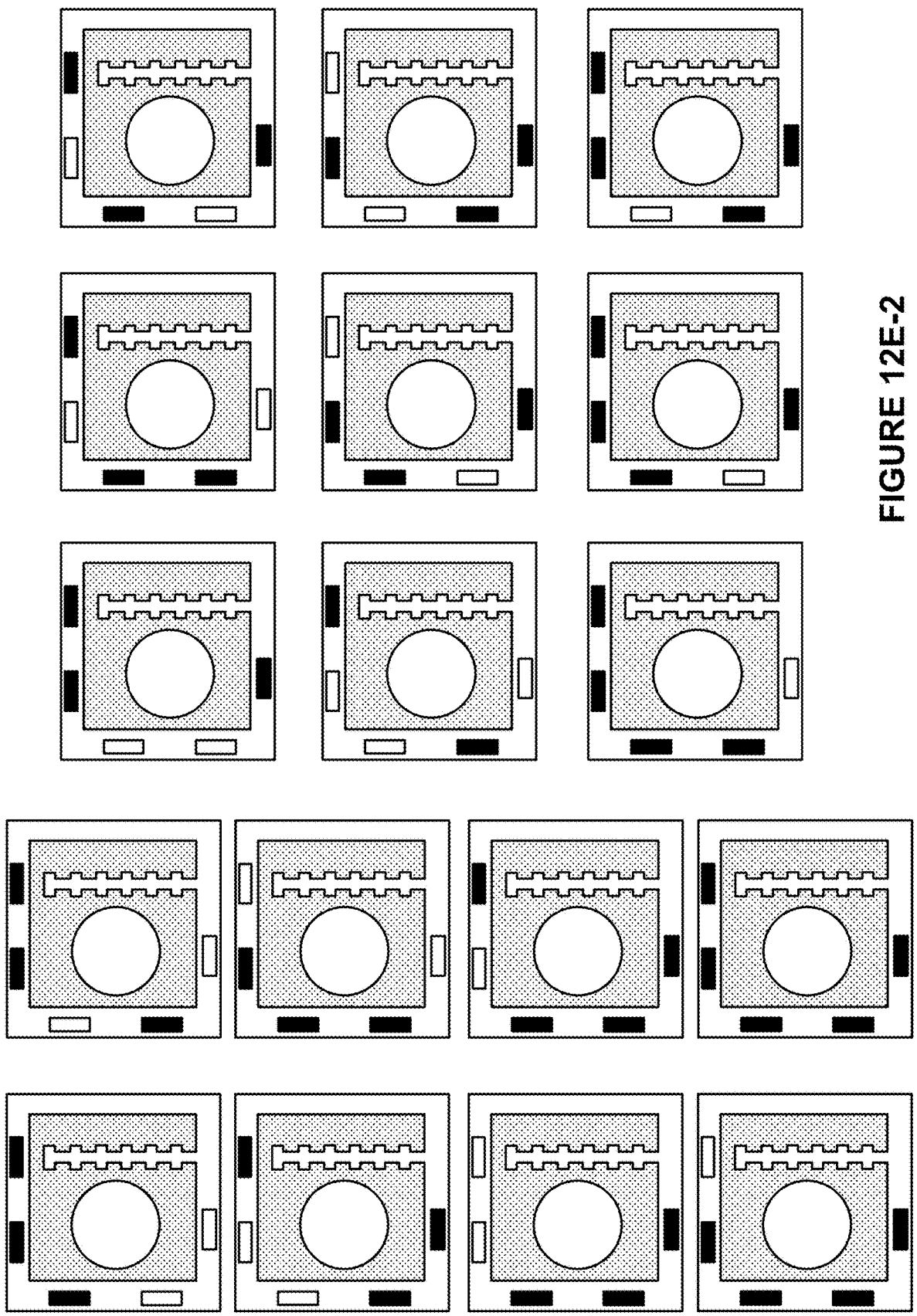

FIGS. 12E-1 and 12E-2 illustrate various configurations of the tuning elements 1212 in accordance with some embodiments. In this particular example, there are five tuning elements 1212, and the tuning elements 1212 that are connected to the radiating element 1202 in each shown configuration are colored black. Accordingly, from Newton's binomial theorem, there are 32 different combinations of the tuning elements 1212 (i.e., FIGS. 12E-1 and 12E-2 illustrate 32 different configurations). The number of tuning elements 1212 may of course change, depending on the circumstances, and therefore additional configurations are possible (i.e., $2^N$ distinct tuning states where N is the number of tuning elements, as discussed above). Further, assuming the antenna 1200 includes five of the tuning element 1210 (i.e., ring tuning elements), then a total of 160 different tuning configurations can be obtained. Thus, the antenna's 1200 operating frequency can be finely adjusted using the tuning elements 1212 (and the tuning elements 1210). In some embodiments, the level of adjustment is approximately +/−20% (although greater and lesser ranges are possible). It is noted that physical connections between the radiating element 1202 and the tuning elements 1212, e.g., as shown in FIG. 12F, are not shown in FIGS. 12E-1 and 12E-2 for ease of illustration. In practice, the tuning elements shown in FIGS. 12E-1 and 12E-2 are physically connected to the radiating element 1202.

FIGS. 12F-12H illustrate various coupling diagrams for the antenna 1200 when the antenna 1200 is operating at different frequencies. The various operating frequencies can be obtained, at least in some embodiments, using the tuning elements 1210, 1212 discussed above. For example, with reference to FIG. 12F, the antenna 1200 is tuned to operate at approximately 880 MHz (e.g., each of the tuning elements 1212 is coupled with the radiating element 1202). As such, the coupling effect is the lowest when the antenna 1200 is operating at approximately 880 MHz. In contrast, the antenna 1200 is tuned to operate at approximately 940 MHz and 950 MHz in FIGS. 12G and 12H, respectively. As such, the coupling effect is the lowest when the antenna 1200 is operating at those respective operating frequencies. The difference between FIGS. 12G and 12H is that the antenna 1200 in FIG. 12G includes two interconnected tuning elements 1210, whereas the antenna 1200 in FIG. 12H includes four interconnected tuning elements 1210. The operating frequencies illustrated in FIGS. 12F-12H, and the tuning element configurations, are merely used to provide context, and the antenna 1200 is capable of operating at greater and lesser frequencies than those shown in FIGS. 12F-12H.

Section C.4: Fourth Embodiment of a Drop-In Antenna

Figures 1, 14A:
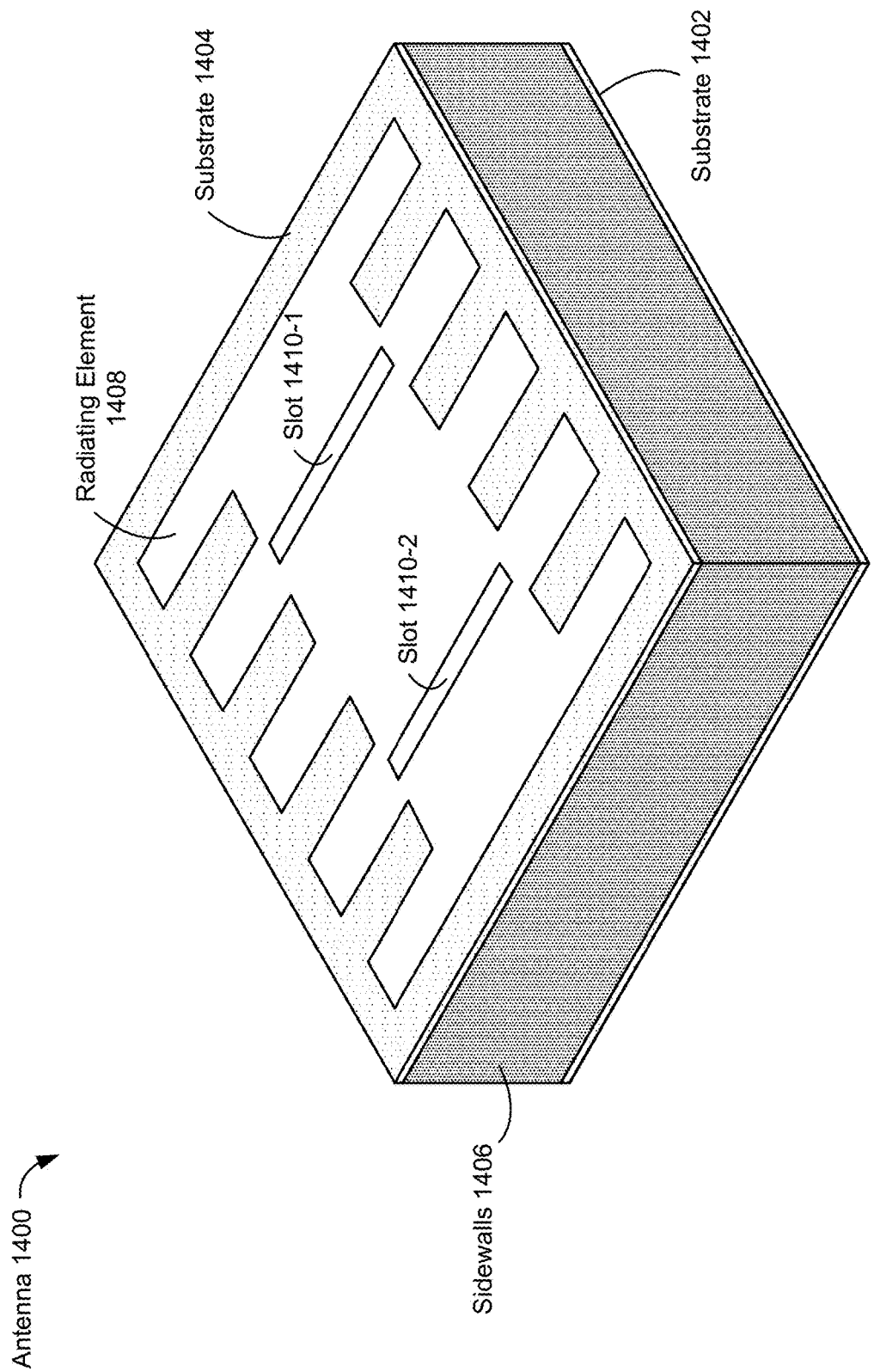
Figures 2, 14A:
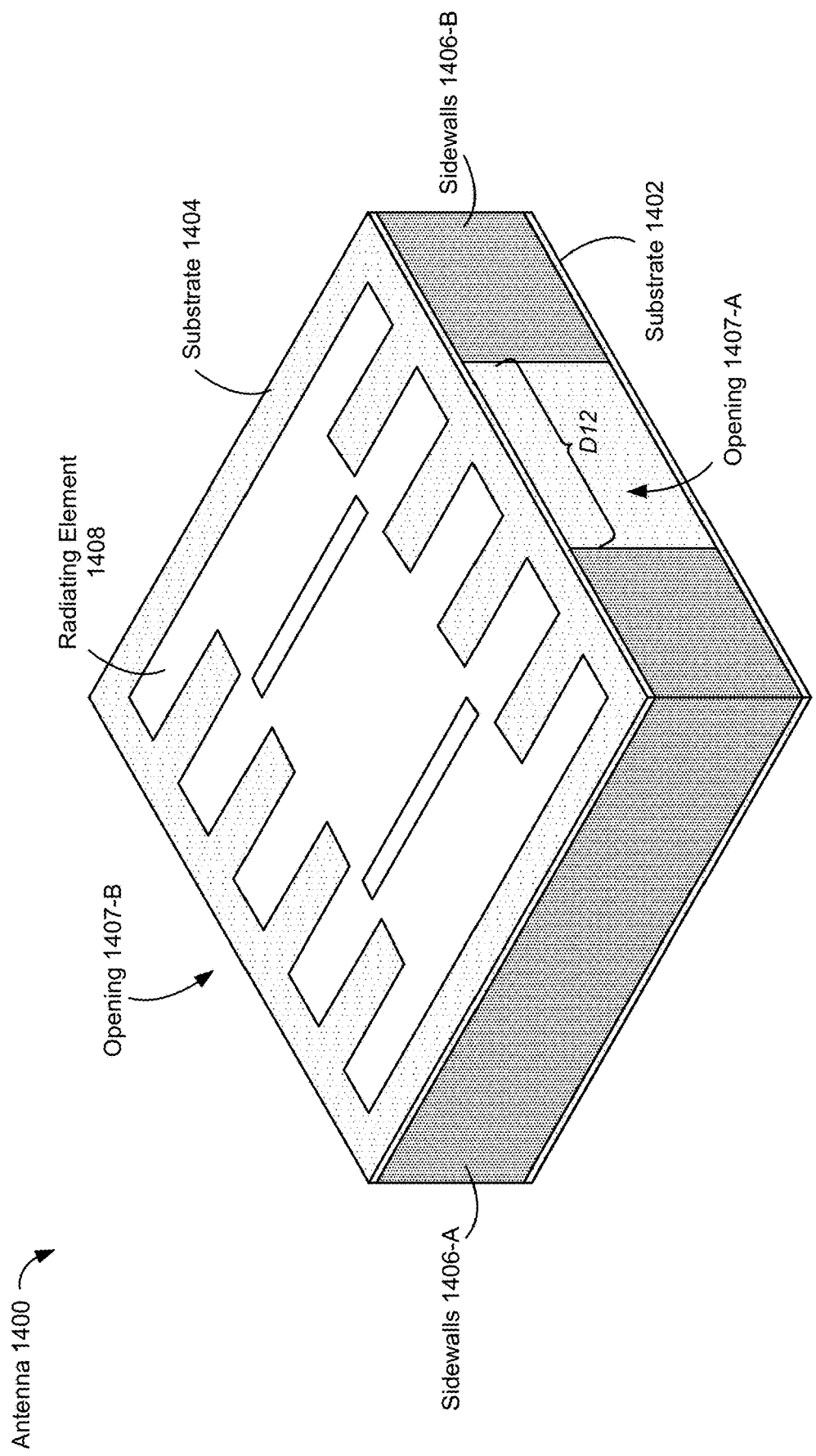

FIGS. 14A-1 and 14A-2 illustrate embodiments a fourth embodiment of a drop-in antenna 1400 in accordance with some embodiments. In some instances, the antenna 1400 may replace the first antenna 602 in the antenna duplet 600 (FIG. 6A). In such a configuration, the antenna 1400 is configured to generate a radiation pattern that is perpendicular to a radiating pattern generated by the other antenna in the antenna duplet 600. Configurations with various other antennas are also possible.

As shown in FIG. 14A-1, the antenna 1400 includes a first substrate 1402 having first and second opposing surfaces, and a second substrate 1404 having first and second opposing surfaces. The first and second substrates 1402, 1404 may be made from dielectric materials. In some embodiments, one or more of the first and second substrates 1402, 1404 is a printed circuit boards (PCB). In some embodiments, a largest cross-sectional dimension of the first and second substrates 1402, 1404 is less than approximately 0.25λ in length. For example, if the antenna 1400 is operating at 915 MHz, then a largest cross-sectional dimension of the first and second substrates 1402, 1404 is less than approximately 80 mm in length. Further, the first and second substrates 1402, 1404 may be the same and different sizes. In some embodiments, the first surface (e.g., the surface connected to a reflector) of the first substrate 1402 has a ground. The first substrate 1402 and the second substrate 1404 may have different characteristics. For example, the first substrate 1402 may have a lower permittivity relative to a permittivity of the second substrate 1404, or vice versa.

In some embodiments, the antenna 1400 includes sidewalls 1406 (e.g., four sides) extending from the first substrate 1402 to the second substrate 1404. Alternatively or in addition, the antenna 1400 includes a via fence 1412 (FIG. 14B) extending from the first substrate 1402 to the second substrate 1404. For instance, the via fence 1412 could be placed within the substrates 1402 and 1404, and when in the gap between the substrates, the via fence 1412 is implemented as a conductive wall. In some embodiments, the sidewalls 1406 and/or the via fence 1412 wraps around a perimeter of the antenna 1400 (as shown in FIG. 14A-1). Alternatively, in some embodiments, the sidewalls 1406 and/or the via fence 1412 partially wraps around a perimeter of the antenna 1400 (as shown in FIG. 14A-2). For example, sidewalls 1406-A and 1406-B are separated by openings 1407-A and 1407-B (FIG. 14A-2). The space between the first and second substrates 1402, 1404 forms a cavity, which may be filled with air or a dielectric. The sidewalls 1406 may be made from a conductive metal, such as copper, and may be mechanically and/or chemically (e.g., using an adhesive) attached to the first and second substrates 1402, 1404.

In some embodiments, using sidewalls 1406 and/or a via fence 1412 that partially wraps around the perimeter of the antenna 1400 changes a performance of the antenna 1400. For example, a gain and radiation efficiency of the antenna 1400 can be improved by using sidewalls 1406 and/or a via fence 1412 that partially wraps around the perimeter of the antenna 1400, relative to using sidewalls 1406 and/or a via fence 1412 that completely wraps around the perimeter of the antenna 1400.

The antenna 1400 also includes a radiating element 1408 (e.g., a patch antenna) coupled to the second surface of the second substrate 1404. One or more edges of the radiating element 1408 follow a meandering pattern. In the illustrated example, two edges of the radiating element 1408 follow symmetrical meandering patterns. The meandering serves the purpose of reducing the total antenna size. The radiating element 1408 is configured to generate a radiation pattern 1430 polarized in a first direction (e.g., aligned with the X-axis, FIG. 14D). In this illustrated example of FIG. 14D, the radiation pattern 1430 has a higher concentration of EM energy produced along the Z-axis and the X-axis (and has a radiation null along the Y-axis), and forms an overall torus shape having a peak gain of 1.7 dB (FIG. 14D). As discussed above, radiation pattern 1430 may be changed if, say, the antenna 1400 is rotated 90 degrees.

Further, the antenna 1400 can obtain a radiation efficiency of approximately 71%, depending on its configuration (e.g., its sidewall configuration).

In some embodiments, the radiating element 1408 includes one or more slots (e.g., slots 1410-1 and 1410-2). The antenna 1400 can be tuned in frequency by changing the length of the slots 1410-1 and 1410-2 on the radiating element 1408. For example, increasing a length (or an area) of one or more of the slots 1410-1 and 1410-2 can decrease an operating frequency of the antenna 1400, while decreasing a length (or an area) of one or more of the slots 1410-1 and 1410-2 can increase an operating frequency of the antenna 1400.

Figure 14B:
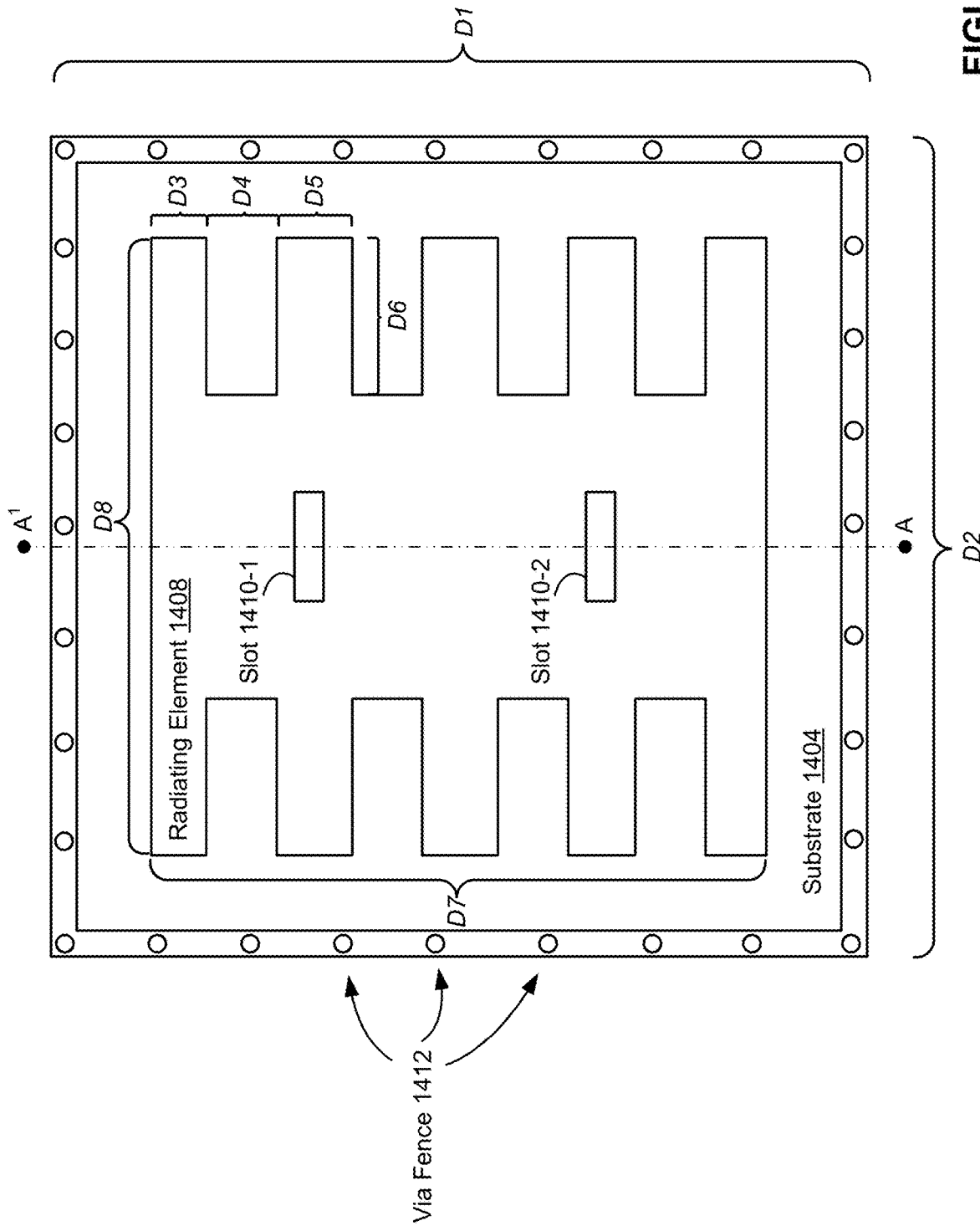
FIG. 14B illustrates a top view of the air-suspended capacitor-loaded patch antenna, in accordance with some embodiments.

FIG. 14B illustrates a top view of the antenna 1400, in accordance with some embodiments. In this particular example, the antenna 1400 includes a via fence 1412 that wraps around the perimeter of the antenna 1400. As discussed above, the via fence 1412 may wrap completely or partially around the perimeter of the antenna 1400. It is also noted that the slots 1410-1, 1410-2 are shortened relative to the slots 1410-1, 1410-2 shown in FIGS. 14A-1 and 14A-2.

Figure 14C:
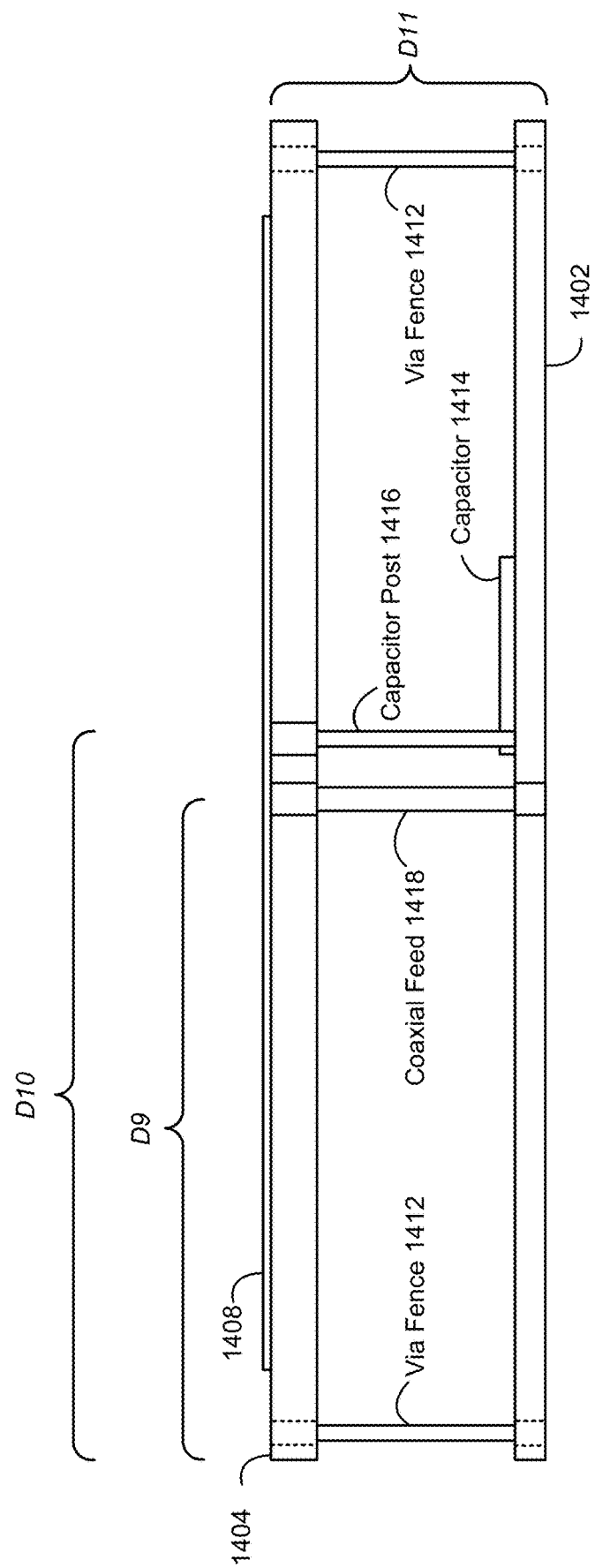
FIG. 14C illustrates a cross-sectional view of the air-suspended capacitor-loaded patch antenna, in accordance with some embodiments.
Figure 14D:
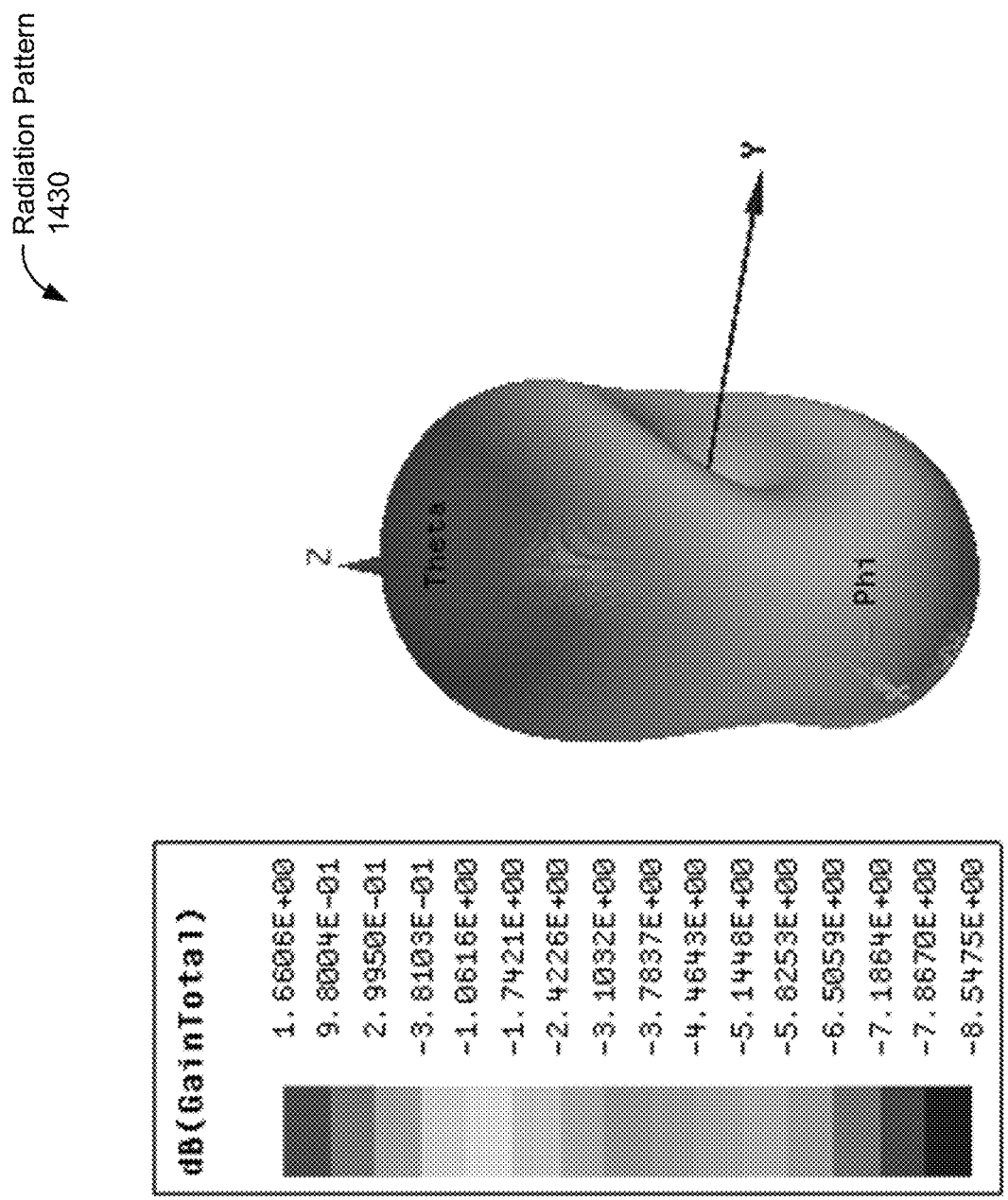
FIG. 14D shows a radiation pattern produced by the antenna 1400, in accordance with some embodiments.

FIG. 14C illustrates a cross-sectional view of the antenna 1400 (taken along line A-A[1], FIG. 14B), in accordance with some embodiments. As shown, the antenna 1400 includes a capacitor 1414 connected to the radiating element 1408 through a capacitor post 1416. The capacitor 1414 is configured to achieve overall size reduction of the antenna and facilitate impedance matching for the antenna 1400, and a size of the capacitor 1414 can be tailored during manufacturer to achieve said matching. The antenna 1400 also includes a coaxial feed 1418 connected to the radiating element 1408. The coaxial feed 1418 is configured to provide electromagnetic signals to the radiating element 1408. For example, the coaxial feed is configured to receive electromagnetic signals from one or more power amplifiers of the power amplifier(s) 216.

FIG. 14D shows a radiation pattern produced by the antenna 1400, in accordance with some embodiments. As explained above, the radiating element 1408 is configured to generate the radiation pattern 1430 polarized in a first direction (e.g., aligned with the X-axis, FIG. 14D). As also shown in FIG. 14D, the radiation pattern 1430 has a somewhat omnidirectional pattern in the XZ-plane, with maximum gain in the positive Z-direction (with a radiation null forming along the Y-axis) and forms an overall torus shape having a peak gain of 1.7 dB.

Figure 14E:
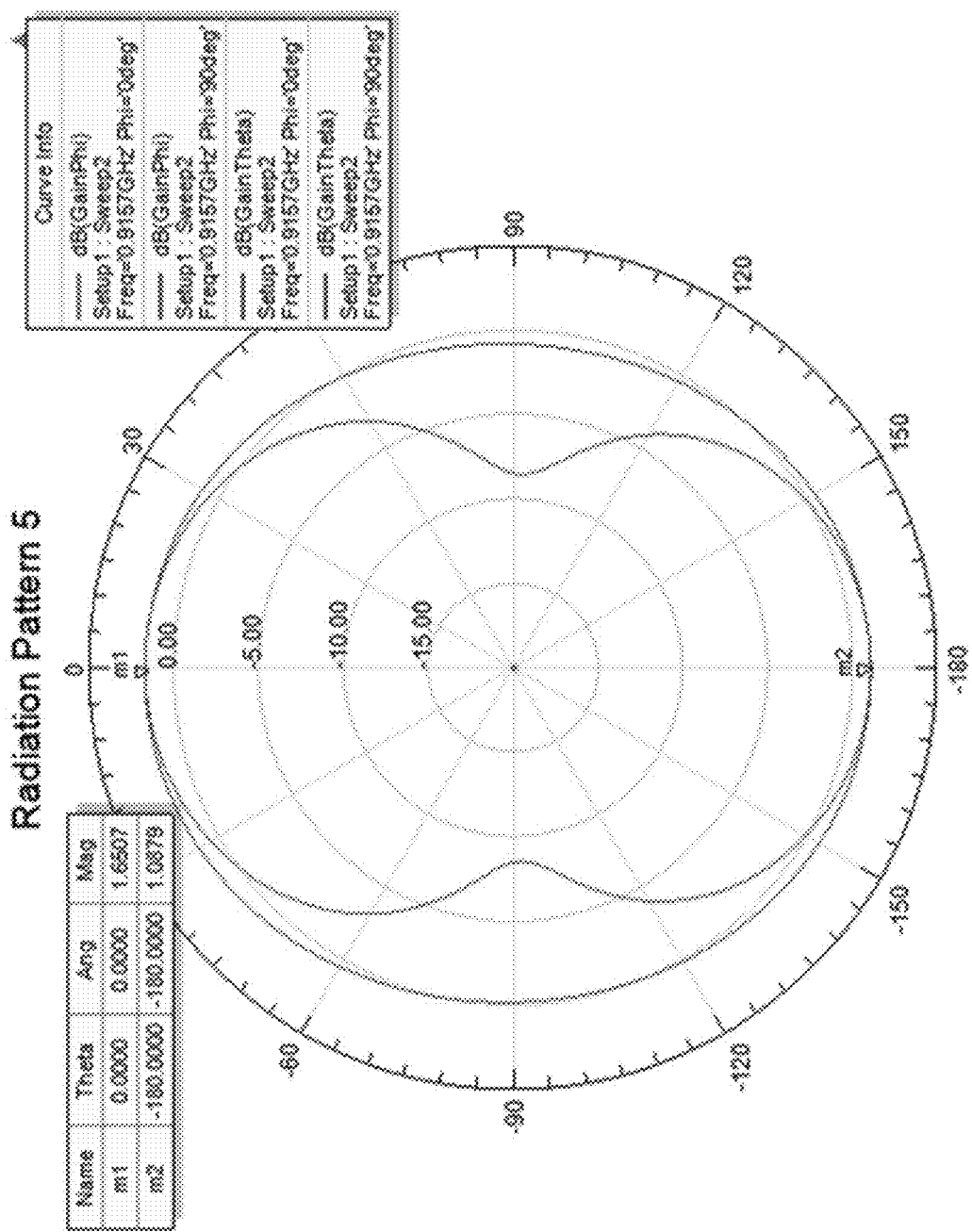
FIG. 14E is a cross-sectional view of the radiation pattern shown in FIG. 14D.

FIG. 14E illustrates a cross-sectional view 1440 of the resulting radiation pattern 1430 (taken along the X-Z plane shown in FIG. 14D), in accordance with some embodiments. The dimensions of the antenna 1400 can effect an operating frequency, radiation efficiency of the antenna 1400, and the resulting radiation pattern 1430, among other things. As one example, the antenna 1400, when operating at approximately 915 MHz and including a via fence 1412 that partially wraps around the perimeter of the antenna 1400 (e.g., as shown in FIG. 14A-2), achieved a radiation efficiency of approximately 71%. To obtain this operating frequency and radiation efficiency, the antenna 1400 had the following dimensions: D1=50.4 mm, D2=50.4 mm, D3=5.1 mm, D4=4.5 mm, D5=5.3 mm, D6=9.4 mm, D7=44.8 mm, D8=43 mm, D9=21.3 mm, D10=23.6 mm, D11=9.8 mm, and D12=28 mm. Further, each of the slots 1410-1 and 1410-2 were 2×8 mm and the capacitor 1414 was 7.2×7.2 mm. As shown in the cross-sectional view 1440, the antenna 1400 creates a substantially uniform radiation pattern.

Figure 14F:
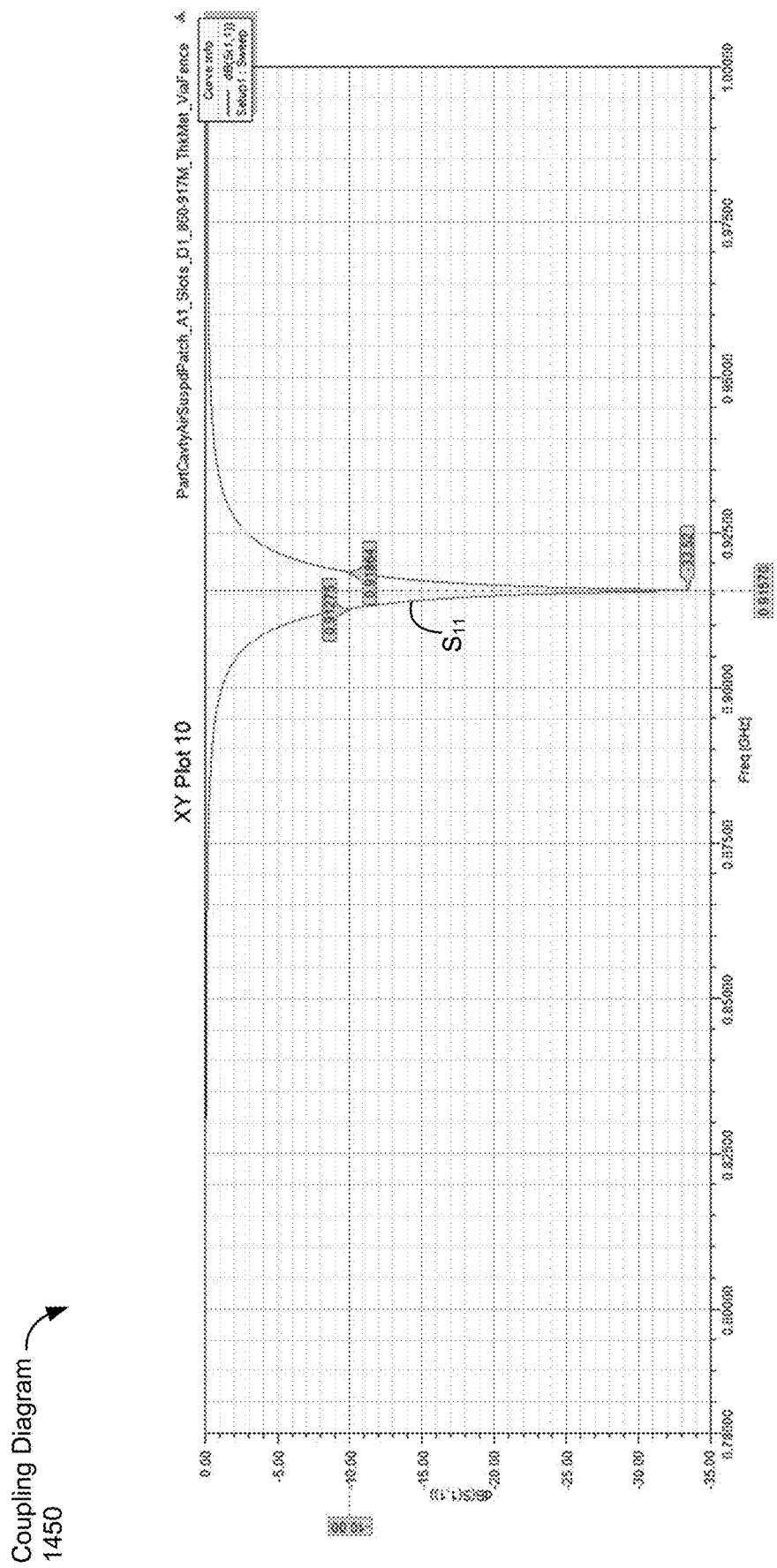
FIG. 14F shows a diagram representing the magnitude of the reflection coefficient measured at the feed port for the air-suspended capacitor-loaded patch antenna.

FIG. 14F is a diagram 1450 that shows impedance matching or the reflection coefficient at a feed for the antenna 1400, in accordance with some embodiments. The curve $S_{11}$ shows measurements of the magnitude of the reflection coefficient at the antenna 1400's feed port. As shown, the measurements of the reflection coefficient are very low. Accordingly, the antenna 1400 operates efficiency at its operating frequency of approximately 915 MHz (i.e., the antenna 1400 radiates electromagnetic waves outwards when operating at 915 MHz).

Section D: Dual-Polarized Antenna

Figure 13A:
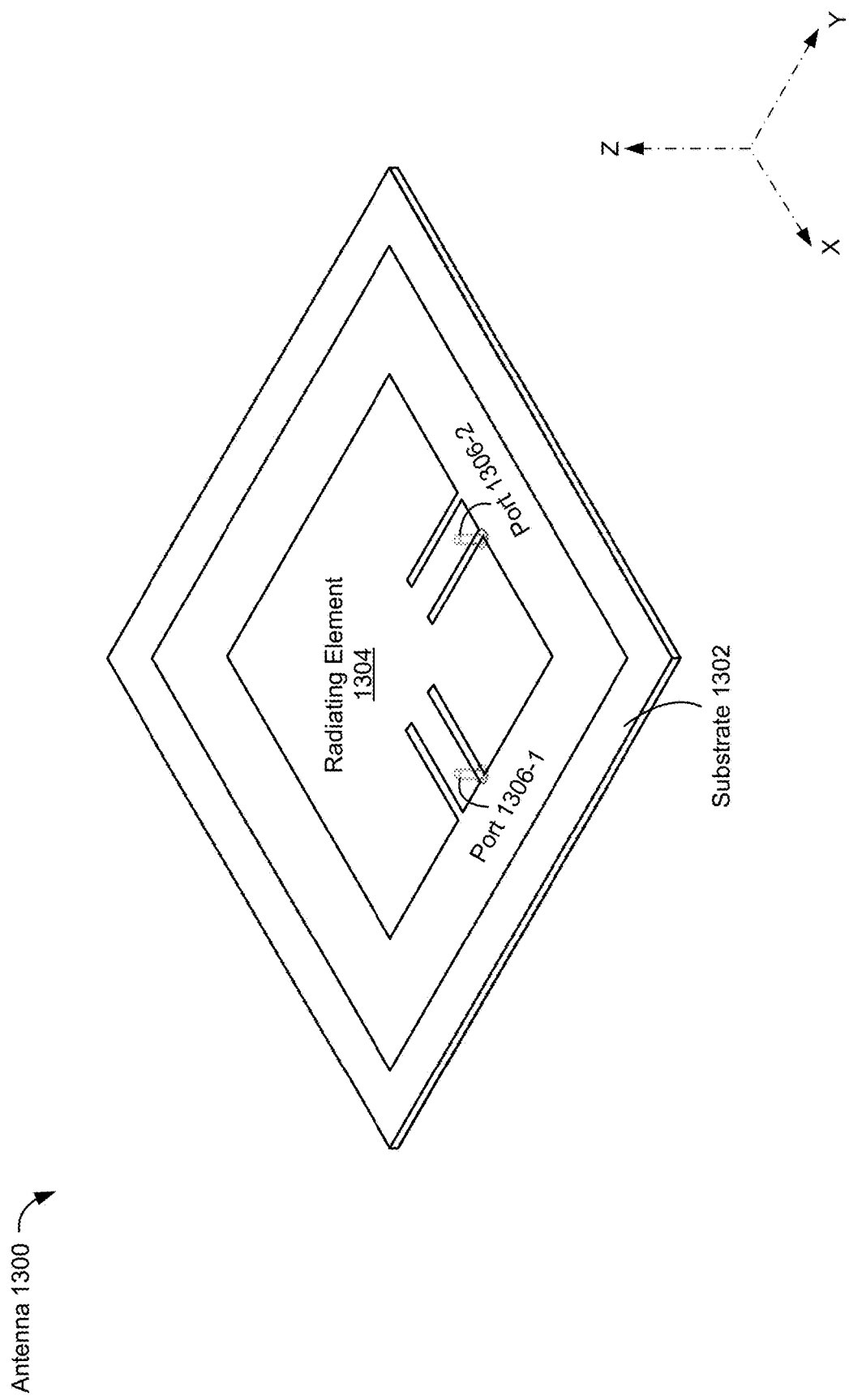
FIG. 13A illustrates a dual-polarized antenna, in accordance with some embodiments drop-in antenna.

FIG. 13A illustrates a dual-polarized antenna 1300, in accordance with some embodiments.

The antenna 1300 includes a substrate 1302 (e.g., a printed circuit board) having first and second opposing surfaces. In some embodiments, a largest cross-sectional dimension of the substrate 1302 is less than 0.25λ in length. The substrate 1302 may be made from a material having low permittivity, with suitable example materials with such low permittivity properties including the Rogers 4003 or the Isola 408HR materials.

The antenna 1300 includes a radiating element 1304 (e.g., a patch antenna) coupled to a surface of the substrate 1302. The radiating element 1304 is configured to generate a radiation pattern 1320 (depicted in FIG. 13B-1) polarized in a first direction or a second direction (e.g., horizontally, such as along the x-axis, or vertically, such as along the y-axis).

The direction of polarization is based on which port provides electromagnetic signals to the radiating element 1304. For example, if port 1306-1 provides the electromagnetic signals, then the antenna 1300 is horizontally polarized, whereas if port 1306-2 provides the electromagnetic signals, then the antenna 1300 is vertically polarized. Further, when the antenna 1300 has dimensions of 100×100×5 mm, the radiation pattern 1320 achieved a peak gain of 4.89 dB (FIG. 13B) with a radiation efficiency of approximately 82%. It is noted that the radiating element 1304 is shown as semi-transparent for ease of illustration and discussion.

Figures 1, 13B:
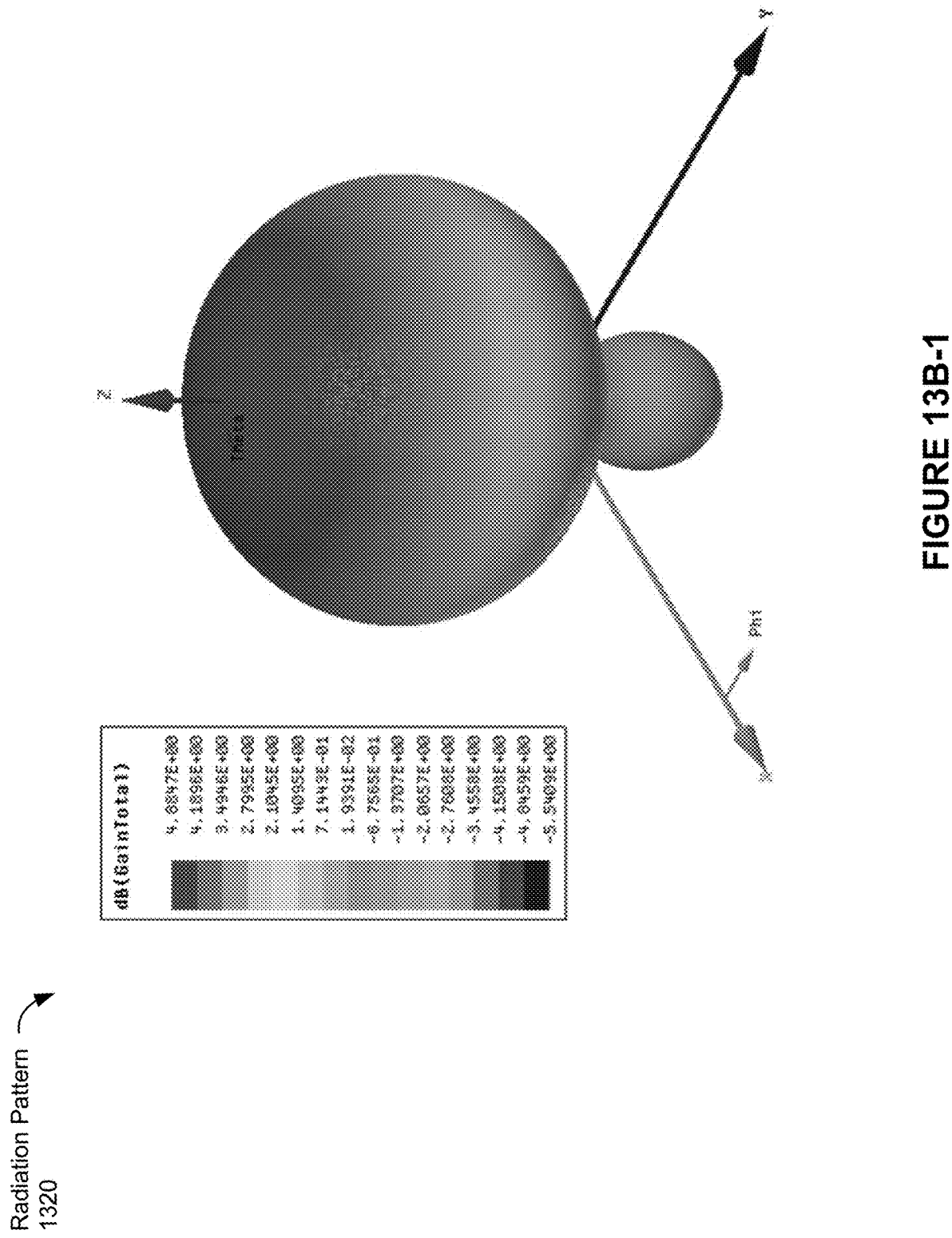
Figures 2, 13B:
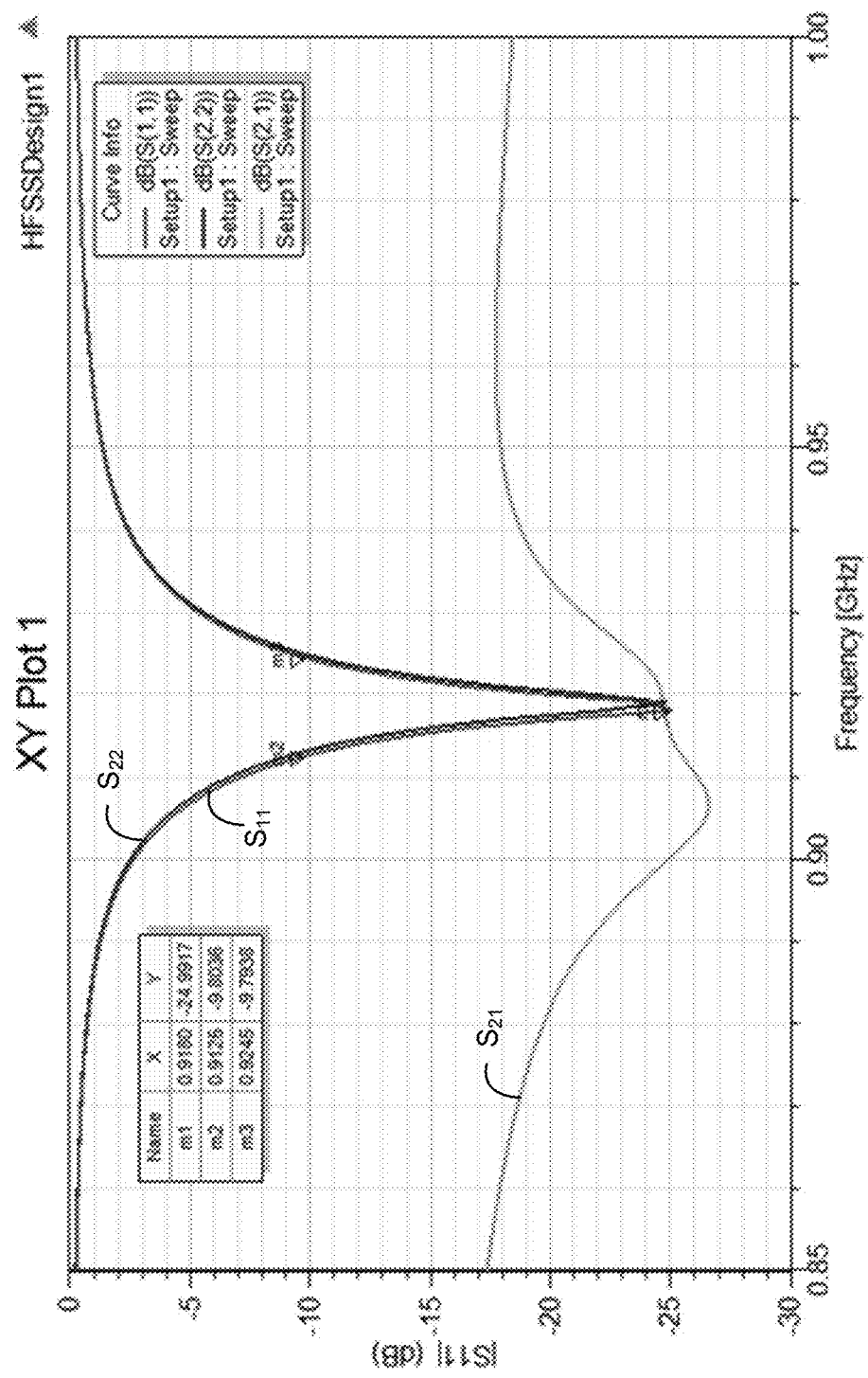
Figure 13C:
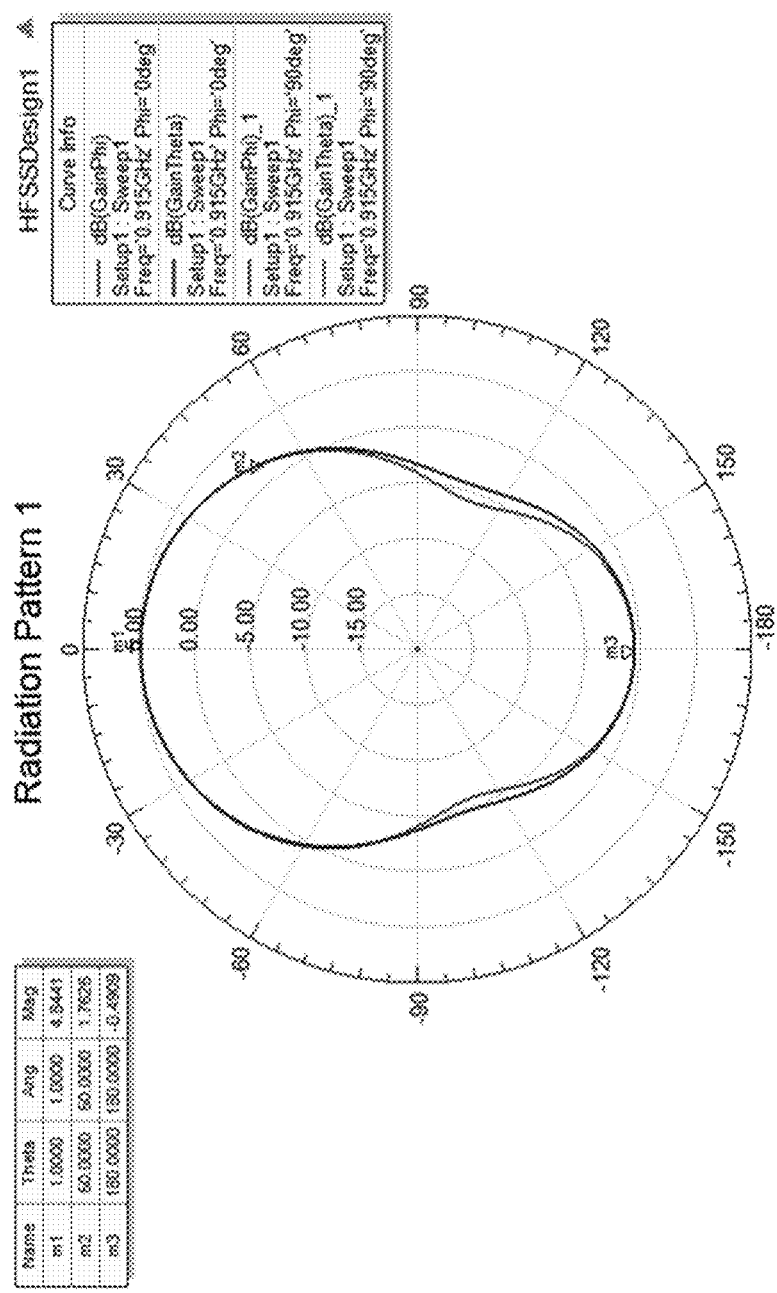
FIG. 13C shows a cross-sectional view of a radiation pattern produced by the dual-polarized antenna depicted in FIG. 13A when port 1306-1 is active.

The ports 1306-1, 1306-2 are attached to the substrate 1302 and are configured to receive electromagnetic signals from one or more power amplifiers of the power amplifier(s) 216 (FIG. 2A). The ports 1306-1, 1306-2 may be connected to the same power amplifier or different power amplifiers. FIG. 13B-2 is a diagram 1325 that shows mutual coupling effects for the dual-polarized antenna, in accordance with some embodiments. Curve $S_{21}$ in the diagram 1325 illustrates that mutual coupling (i.e., coupling effect) between the ports 1306-1, 1306-2 peaks at −25 dB when the antenna 1300 is radiating electromagnetic waves at 915 MHz (measured between ports 1306-1, 1306-2 of the antenna 1300). The other curves $S_{11}$ and $S_{22}$ show measurements of coupling effects between port 1306-1 with itself and 1306-2 with itself, respectively.

Figure 13D:
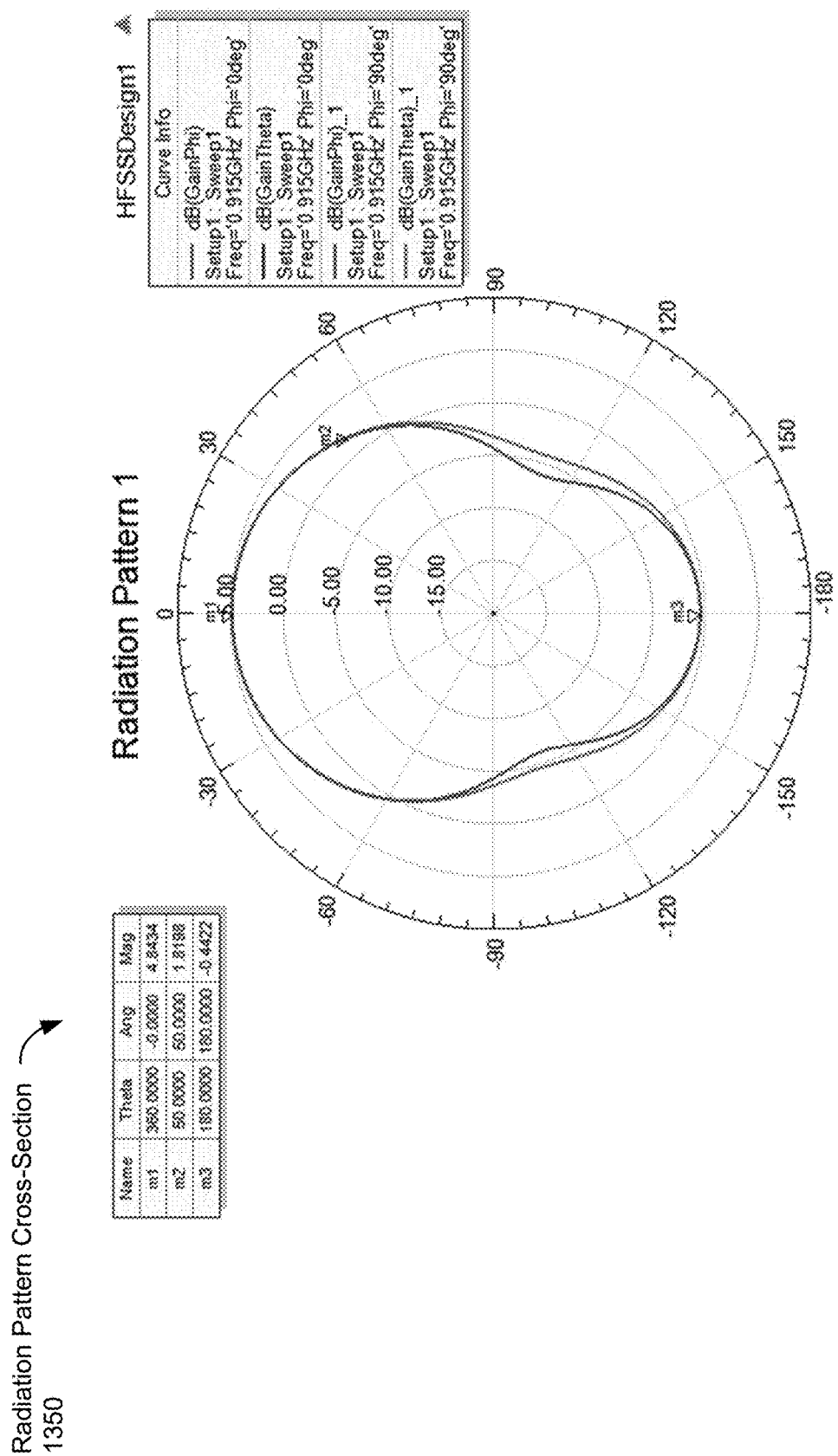
FIG. 13D shows a cross-sectional view of a radiation pattern produced by the dual-polarized antenna in FIG. 13A when port 1306-2 is active.
Figure 13E:
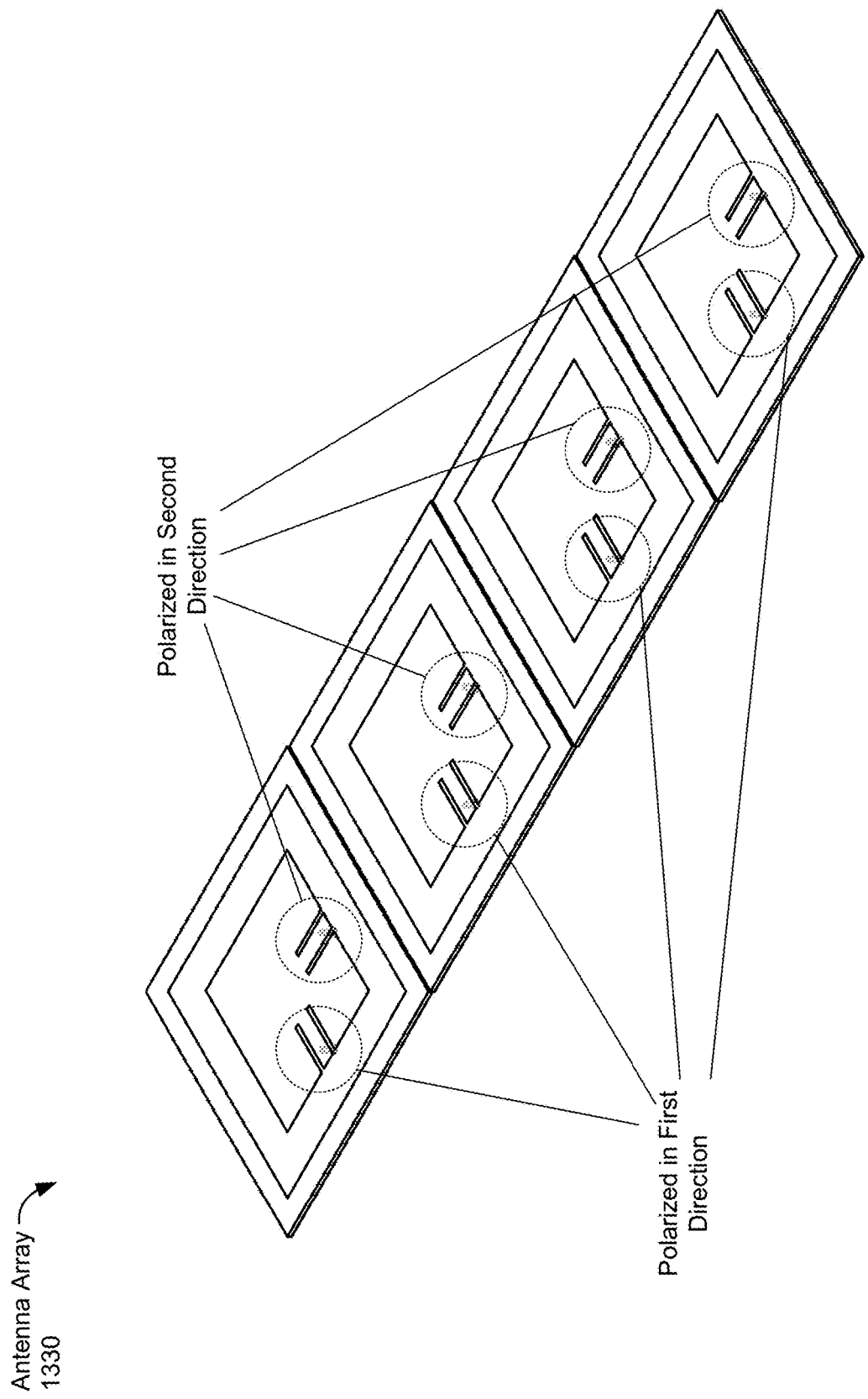
FIG. 13E shows an example of an antenna array that includes a group of the dual-polarized antennas.

FIG. 13D and FIG. 13E illustrate respective cross-sectional views 1340, 1350 of the resulting radiation pattern 1320 (taken along the X-Z plane shown in FIG. 13B), in accordance with some embodiments. In particular, FIG. 13D is a cross-sectional view 1340 of the resulting radiation pattern 1320 when port 1306-1 is activated, and FIG. 13E is a cross-sectional view 1350 of the resulting radiation pattern 1320 when port 1306-2 is activated.

FIG. 13E shows an example of an antenna array that includes a group of the dual-polarized antennas. As shown, the transmitter 102 (in embodiments where it includes the antenna array 1330) can selectively activate port 1306-1 of each antenna 1300 in the array 1330 to achieve an overall polarization in a first direction (e.g., vertical polarization). Further, the transmitter 102 can selectively activate port 1306-2 of each antenna 1300 in the array 1330 to achieve an overall polarization in a second direction (e.g., horizontal polarization). Selecting activating different ports in the antenna array 1330 is beneficial when a polarization of the receiver's 120 antenna(s) is known. For example, when the receiver's 120 antenna is horizontally polarized, then the transmitter 102 can selectively activate the necessary ports so that the electromagnetic waves radiated by the antenna array 1330 have a polarization that matches the polarization of the receiver's 120 antenna.

Figure 13F:
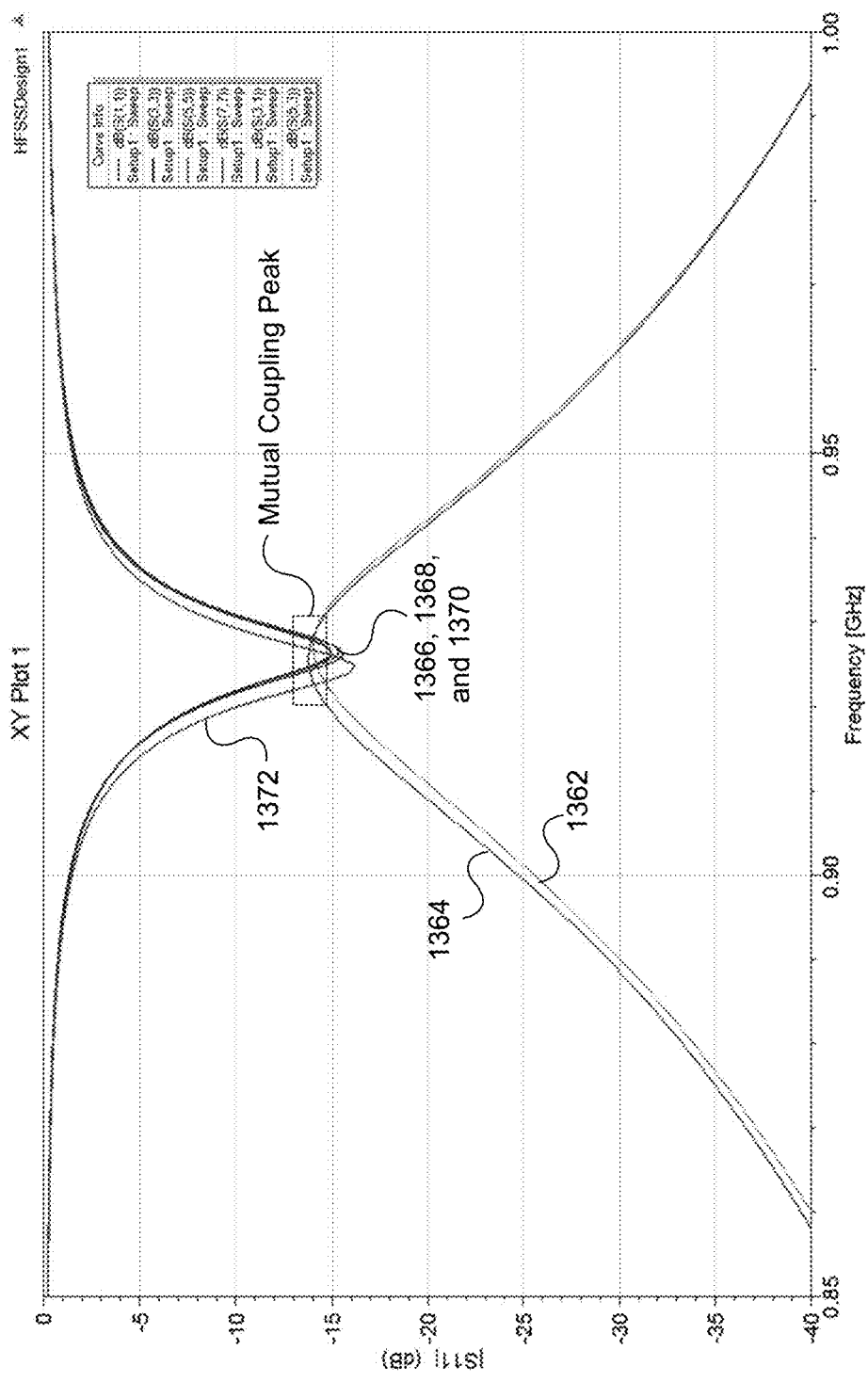
FIG. 13F shows a diagram representing mutual coupling effects measured between different ports within the antenna array of FIG. 13E.

FIG. 13F illustrates mutual coupling effects (e.g., curves 1362 and 1364) between antennas in the antenna array 1330, in accordance with some embodiments. As discussed above, mutual coupling (i.e., the "coupling effect") can be measured between respective ports/feeds of antennas in an antenna array, and the coupling effect indicates an amount of radiated electromagnetic energy that is absorbed by, e.g., a first antenna when a second antenna is radiating electromagnetic signals (and vice versa). For example, each antenna 1300 in the antenna array 1330 has respective first and second ports 1306-1, 1306-2 (i.e., ports 1-8 in total), and in this example, curve 1362 in the diagram 1360 was produced by activating/ feeding each of the respective second ports 1306-2 (the ports circled in FIG. 13E as "polarized in second direction," which will be referred to simply as ports 1, 3, 5, and 7, respectively, moving from left-to-right across FIG. 13E). FIG. 13F shows that the coupling effect between active ports 3 and 1 in the first and second instances of the antenna 1300, respectively, peaks at approximately −14 dB when both antennas are radiating electromagnetic waves at approximately 915 MHz (curve 1364 shows a similar result for mutual coupling effects between ports 3 and 5). The other curves 1366, 1368, 1370, and 1372 show measurements of coupling effects between each of ports 3, 3; 5, 5; 7, 7; and 1, 1, respectively.

FIG. 13G illustrates radiation patterns 1370 and 1380 generated by the antenna array 1330.

Section E.1: First Embodiment of a Multidimensional Dipole Antenna Over Folded Shield FIGS. 15A-15E illustrate a first embodiment of a multidimensional antenna over folded shield 1500. In certain embodiments, the antenna 1500 is positioned near a decoupling mechanism (e.g., decoupling wall 1522, FIG. 15C). In some embodiments, the antenna 1500 (or pairs of the antenna 1500) is (are) also included in antenna arrays that have the antenna duplets discussed above (e.g., these antennas 1500, or pairs therefore, may be positioned between the antenna duplets that have co-polarized antennas). By creating antenna arrays that include both the duplets discussed above and the antennas 1500, certain antennas arrays may be built that are capable of servicing different wireless-power-receiving devices that may require differently polarized power waves.

Figure 15A:
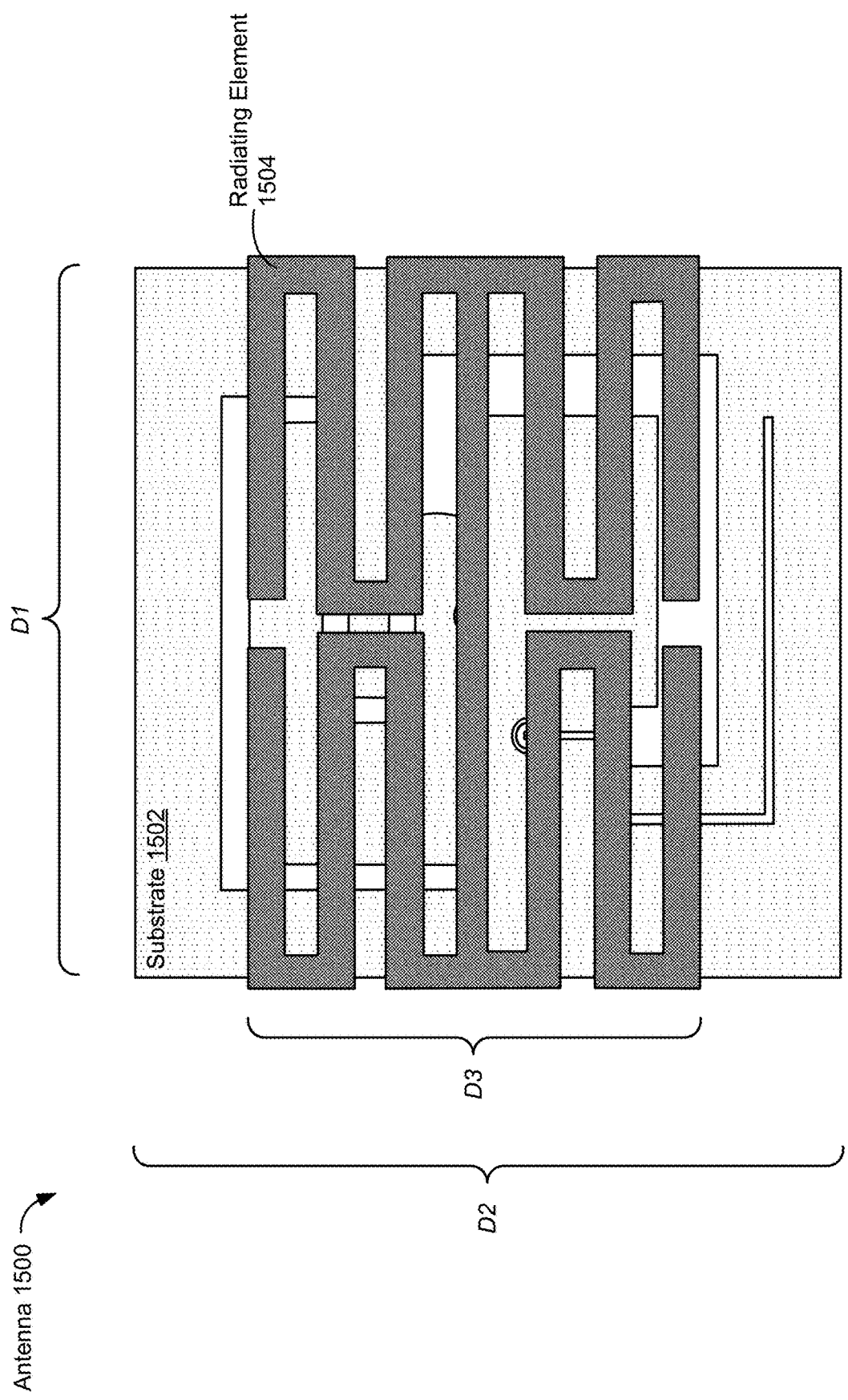

FIG. 15A is a top view of the antenna 1500 in accordance with some embodiments. The antenna 1500 includes a substrate 1502 (e.g., a printed circuit board or a ground plane) having a largest cross-sectional dimension less than $0.25\lambda$ in length. For instance, the substrate 1502 could be behind the ground plane, or the substrate 1502 could be left out altogether if a balun is an external component. Additional features/components of the substrate 1502 are discussed below with reference to FIG. 15B.

Figure 15B:
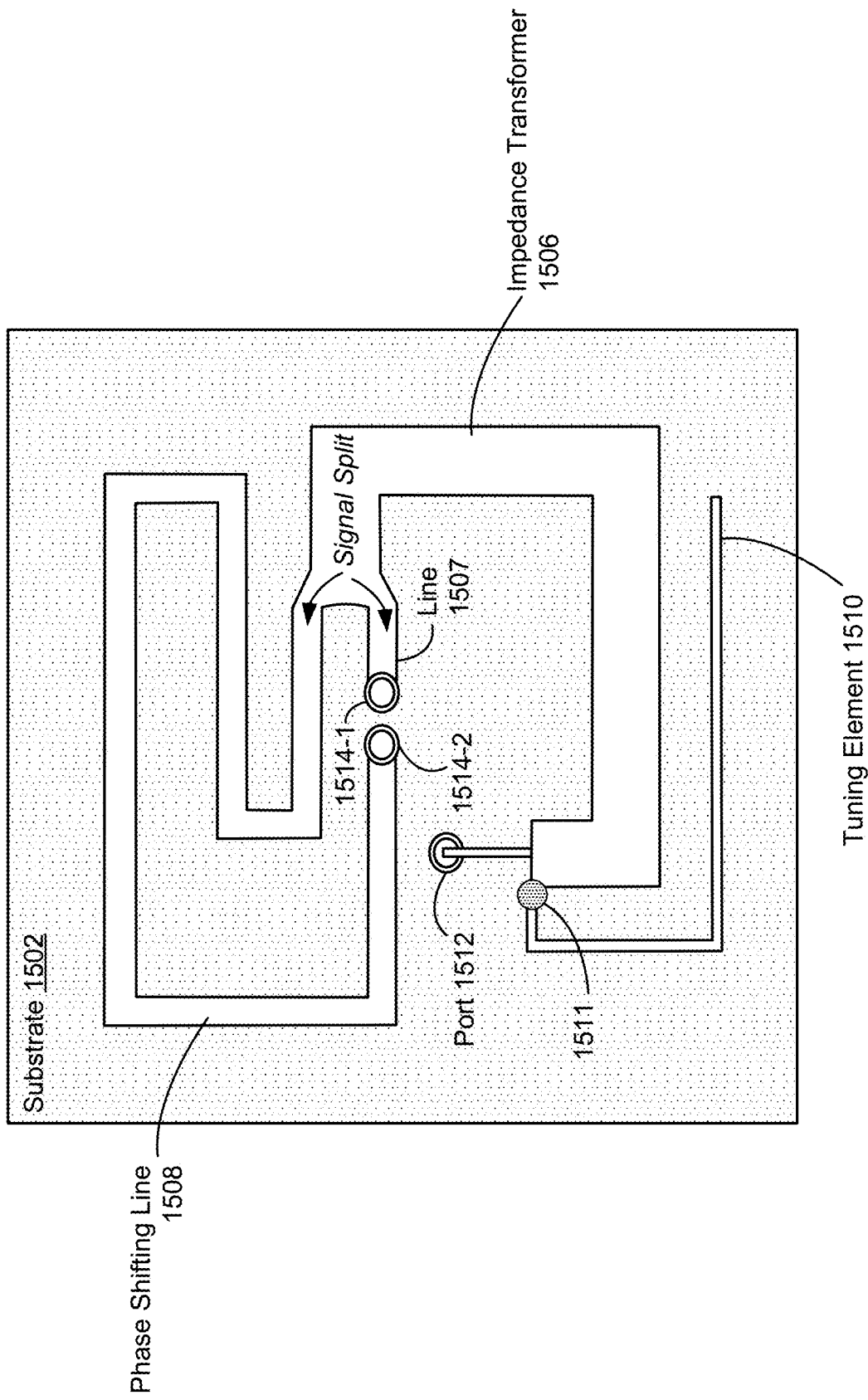
Figure 15C:
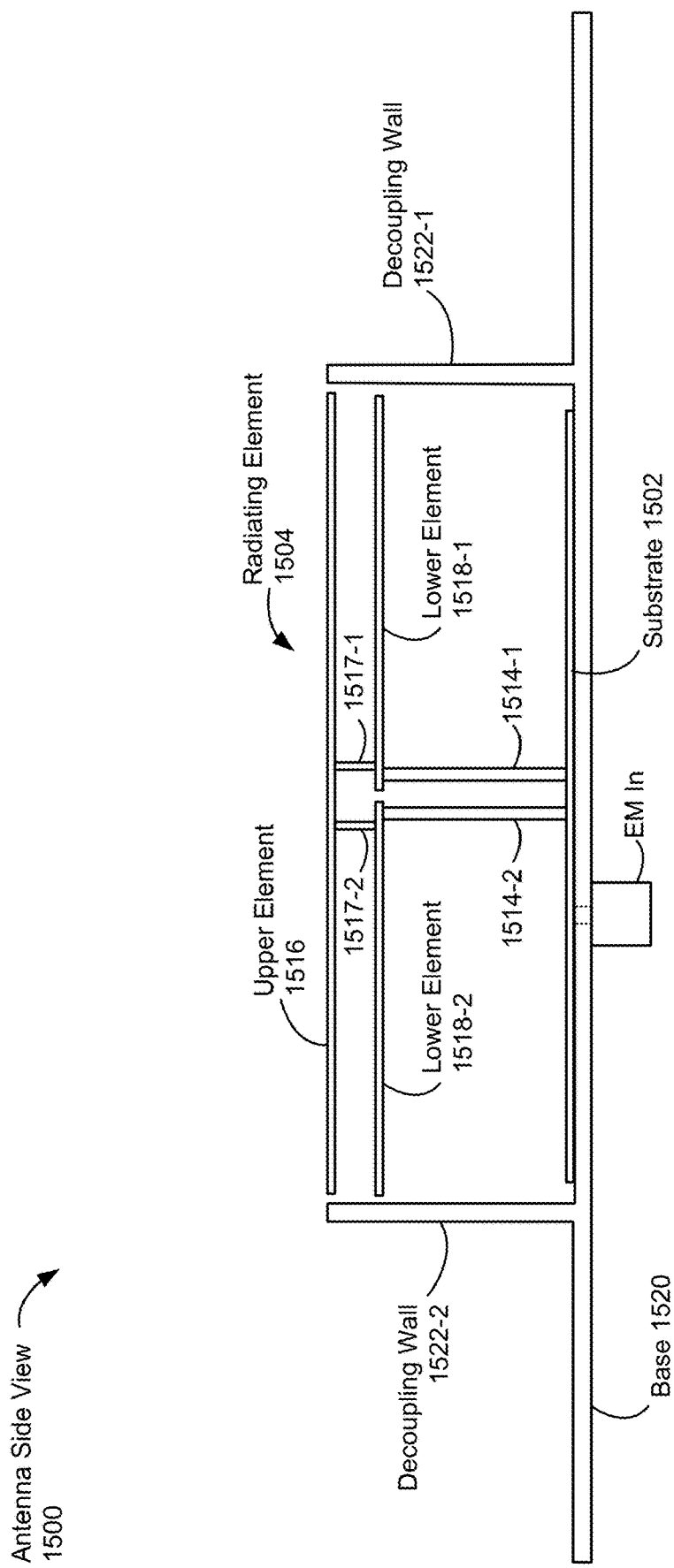

The antenna 1500 includes a radiating element 1504 offset from a surface of the substrate (or the ground plane) 1502 (e.g., as shown in FIG. 15C). The radiating element 1504 is configured to generate a radiation pattern polarized in a first direction. Further, when the antenna 1500 has dimensions of D1=45 mm, D2=40 mm, and D3=26 mm, the antenna 1500 achieved a peak gain of 3.4 dB with a radiation efficiency of approximately 83%. It is noted that the antenna 1500's design in FIGS. 15A-15E is a stamped metal design, where the radiating element 1504 is on air. Similar performance can be achieved with a printed antenna version on a substrate with low loss tangent (e.g., similar to the substrate 1103 configuration of the antenna 1100, FIG. 11A).

Figure 15D:
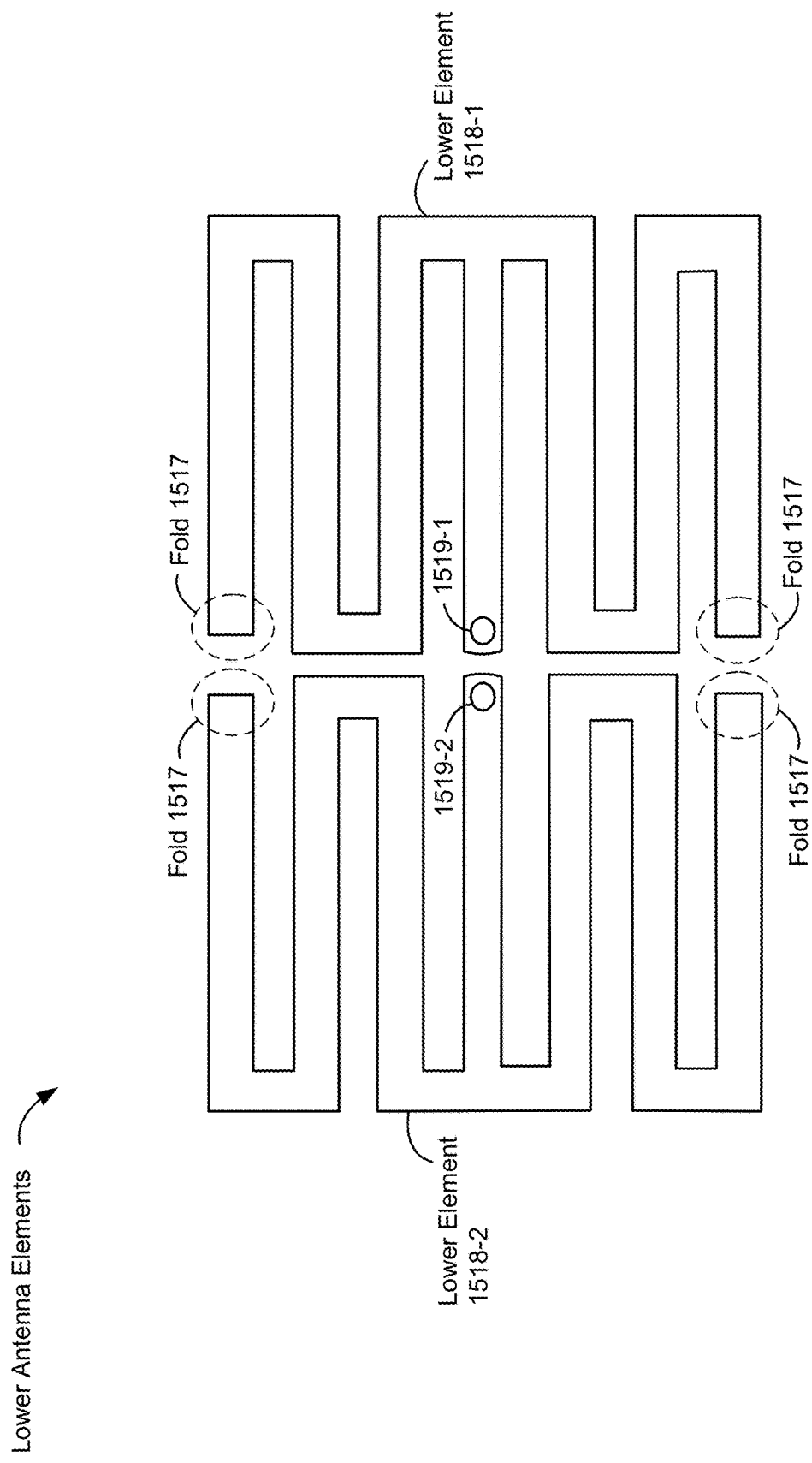

With reference to FIG. 15C, the radiating element 1504 includes an upper element 1516 and two lower elements 1518-1 and 1518-2, which may be co-planar lower elements. The upper and lower elements follow meandering patterns, where the meandering patterns followed by the two lower elements 1518-1 and 1518-2 can be symmetrical meandering patterns. The first lower element 1518-1 connects with the upper element 1516 via two folds 1517 (FIG. 15D), and the second lower element 1518-2 connects with the upper element 1516 via two different folds 1517 (FIG. 15D). The folds 1517 (e.g., folds 1517-1 and 1517-2, FIG. 17C) may be part of the upper antenna element 1516, the lower antenna elements 1518-1, 1518-2, or some combination thereof. The meandering and folding serve the purpose of reducing the total antenna size and increasing the radiation resistance of the structure. In some embodiments, dimensions of the radiating element 1504 (e.g., D3) range from approximately $\lambda/7 \times \lambda/10$, thereby making this a compact design. It is noted that meandering shapes, antenna element widths, and upper-lower antenna element separations can be adjusted to optimize performance at other frequencies or when a substrate is used. As shown in FIG. 15D, the two lower elements 1518-1 and 1518-2 are distinct elements (i.e., split apart). Further, a symmetry of the radiation pattern and its broadside pointing direction is ensured by having a symmetric structure "north and south" of the respective feed point.

Still with reference to FIG. 15C, first and second feeds 1514-1, 1514-2 extend from the substrate 1502 and connect with the first and second lower elements 1518-1, 1518-2, respectively (e.g., connection locations 1519-1, 1519-2, FIG. 15D). The first and second feeds 1514-1, 1514-2 are configured to provide electromagnetic signals to the first and second lower elements 1518-1, 1518-2, respectively. Further, the electromagnetic signals provided to the first and second lower elements 1518-1, 1518-2 travel to the upper element 1516 though the folds 1517, where the electromagnetic signals meander back towards a center of the upper element 1516.

With continued reference to FIG. 15C, the antenna 1500 is coupled to a metallic base 1520 (e.g., the substrate 1502 is mechanically and/or chemically attached to the base 1502). The metallic base 1520 improves the front-to-back ratio of the antenna 1500 by limiting backwards radiation, thereby increasing forward gain. In some embodiments, an optimized radiation efficiency can be achieved when the metallic base 1520 has a length of approximately $\lambda/2$ (greater and lesser lengths can also be used). The metallic base 1520 includes one or more sets of decoupling walls (e.g., decoupling wall set 1522-1, 1522-2) where each set parallels two edges of the antenna 1500. The set of decoupling walls 1522-1, 1522-2 extends away from the base 1520 to a height that substantially matches a height of the antenna 1500. For example, a height of the antenna 1500 may be approximately 10 mm while the height of the decoupling walls may be approximately 11 mm. By placing the radiating element 1504 in close proximity to the decoupling wall set 1522-1, 1522-2, three effects are achieved: (i) the resonance frequency of the antenna 1500 is lowered, thus allowing for extra miniaturization, (ii) mutual coupling between two closely spaced instances of antenna 1500 is considerably reduced (e.g., antennas 1500-1, 1500-2, FIG. 15E), and (iii) the radiation efficiency of the antenna array 1530 can be increased.

With reference to FIG. 15B, the radiating element 1504 has been removed for ease of illustration of aspects of the substrate 1502. The antenna 1500 is designed in such a way that the electromagnetic signals provided to the first lower element 1518-1 by the first feed 1514-1 have a 180-degree phase shift relative to the electromagnetic signals provided to the second lower element 1518-2 by the second feed 1514-2 (i.e., the first and second feeds 1514-1, 1514-2 are differential feeds). To accomplish this, the substrate 1502 includes lines 1507 and 1508 (also referred to as "traces") that split the electromagnetic signals, where (i) the line 1507 is connected to the first lower element 1518-1 by the first feed 1514-1 and (ii) the line 1508 is connected to the second lower element 1518-2 by the second feed 1514-2. As shown, the line 1508 has a meandering pattern that imparts a 180-degree phase shift to electromagnetic signals that travel along the line 1508, relative to the electromagnetic signals that travel along the line 1507.

The substrate 1502 includes an impedance transformer 1506 connected to a port 1512. The port 1512 is configured to receive electromagnetic signals (e.g., EM In, FIG. 15C) from one or more power amplifiers of the power amplifier(s) 216, and provide the electromagnetic signals to the impedance transformer 1506. As shown, the two lines 1507, 1508 are combined and united with the impedance transformer 1506, which is configured to change the dipole impedance to the feed impedance.

In some embodiments, the antenna 1500 can be a single fed instead of differential fed. In such a case, one of the feeds is directly connected to the ground plane (shield) and a balun would not be needed. Further, in some embodiments, the substrate 1502 is removed and matching is achieved through a different mechanism, such as lumped components placed at an external board.

The substrate 1502 also includes a tuning stub 1510 configured to change an operating frequency (e.g., +/−approximately 25 MHz) of the antenna 1500, while maintaining other radiation characteristics. In some embodiments, a connection 1511 between the tuning stub 1510 and the impedance transformer 1506 is an electrical switch (e.g., diode or the like), while in other embodiments the connection 1511 is a metal deposit, such as solder. Although not shown, the tuning stub 1510 may be broken apart at several locations, thereby allowing for various degrees of tuning. In such embodiments, a respective connection 1511 is positioned between adjacent segments of the broken apart tuning stub 1510. Electrical switches for tuning are discussed in further detail above with reference to FIG. 11A.

Figure 15E:
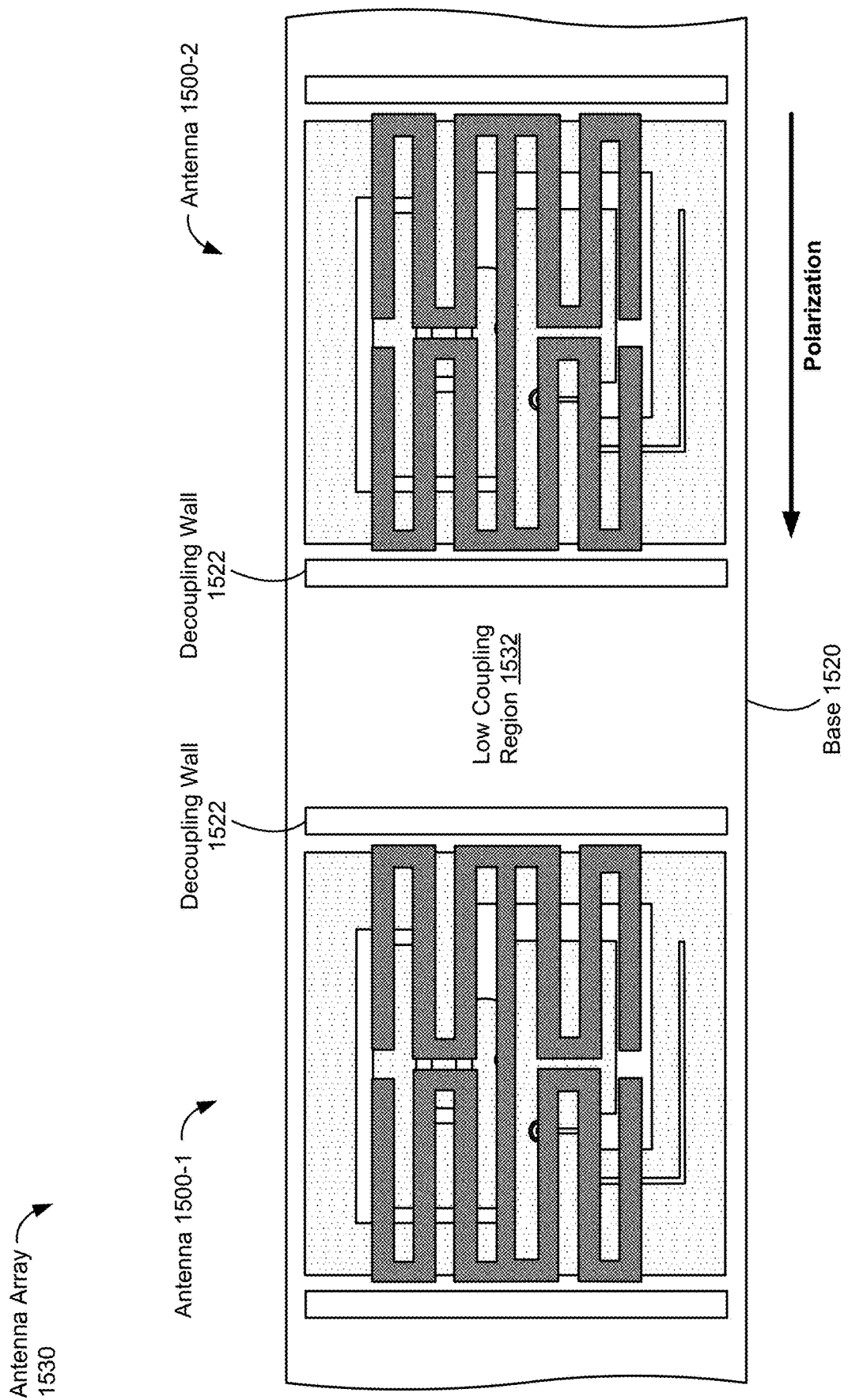

FIG. 15E illustrates an antenna array 1530 that includes multiple instances of the antenna 1500 in accordance with some embodiments. As shown, a first antenna 1500-1 and a second antenna 1500-2 are attached to the base 1520 and have a polarization aligned with a longest dimension of the base 1520. In some embodiments, a center-to-center distance between the first and second antennas 1500 is approximately 55 mm (although various arrangements are possible). Because two decoupling walls 1522 separate the first and second antennas 1500, the coupling effect between the first and second antennas 1500 is lower relative to conventional antenna arrays. The antenna array 1530 may include more than two instances of the antenna 1500 (e.g., the antenna array 1530 may have a similar configuration to the antenna array 110, or any other antenna array described herein).

Furthermore, in some embodiments, the antenna array 1530 is combined with some of the other antenna arrays described herein. For example, the antenna array 1530 may be one of the antenna groups in FIG. 1 (e.g., antenna array 1530 can be group 114-*n*) and another antenna array described herein (e.g., duplets 500 or 600) may be another one of the antenna groups depicted in FIG. 1.

Figure 15F:
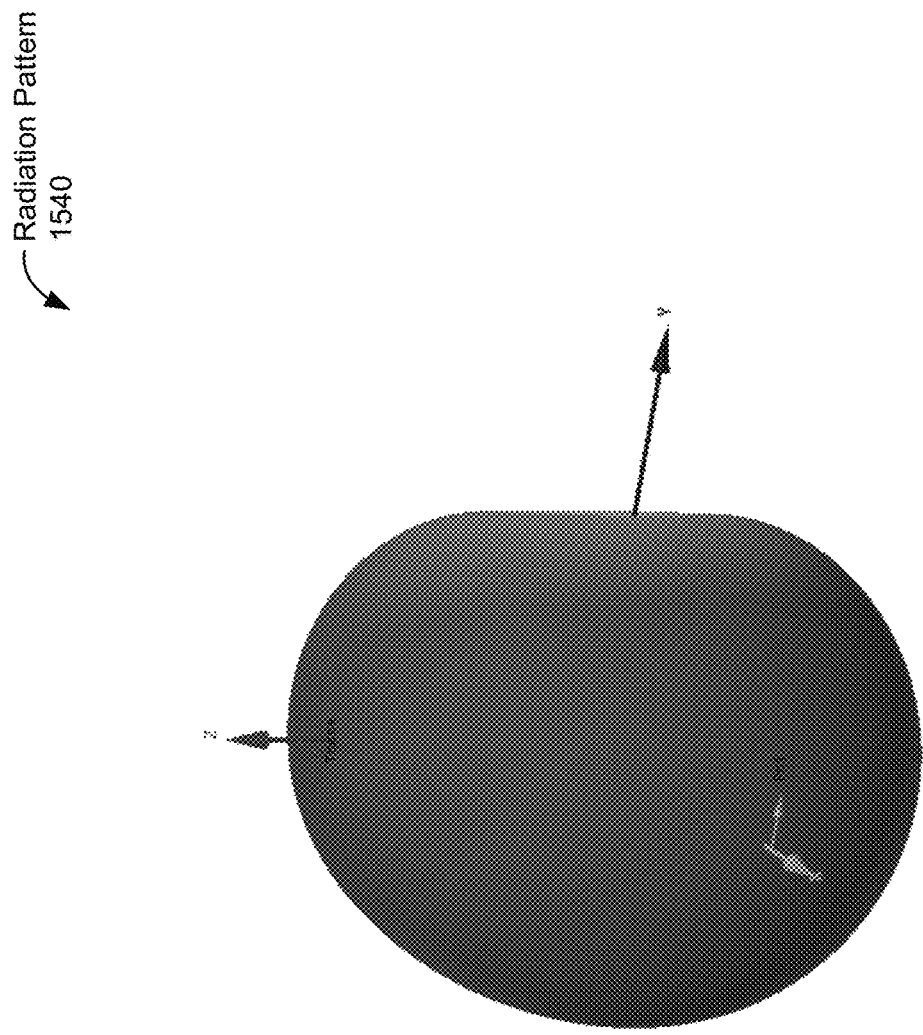
FIG. 15F shows a radiation pattern produced by the first embodiment of the multidimensional dipole antenna over folded shield.

FIG. 15F illustrates a radiation pattern 1540 generated by the antenna 1500 in accordance with some embodiments. In this example, the radiation pattern 1540 has a somewhat omnidirectional pattern in the XZ-plane, with a maximum gain in the positive X-direction (with a radiation null formed along the Y-axis), and forms an overall torus shape having a peak gain of approximately 3.65 decibels (dB). The radiation pattern 1540 also has a front-to-back radiation ratio of about 5 dB.

Figure 15G:
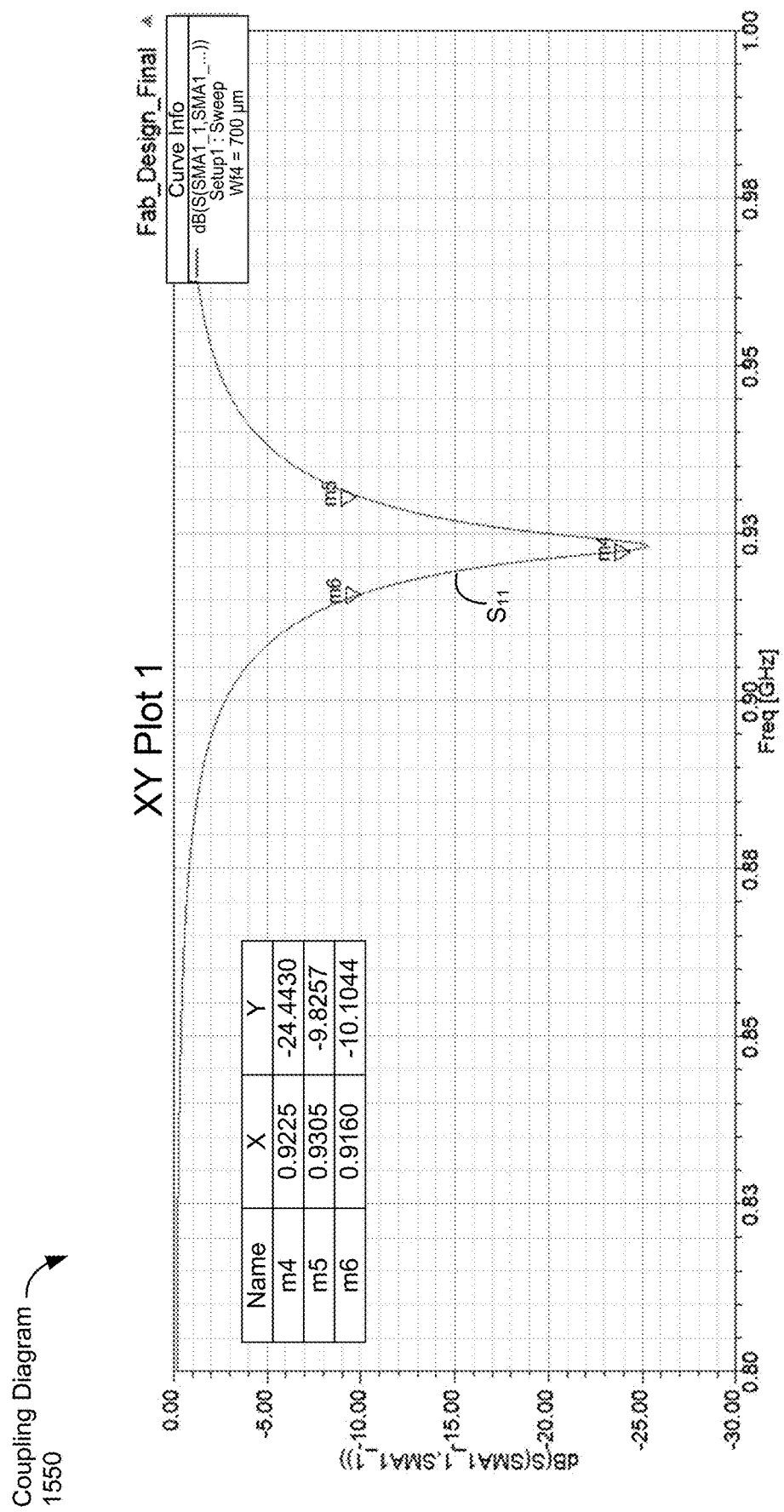
FIG. 15G shows a diagram representing mutual coupling effects measured between a port and itself within the first embodiment of the multidimensional dipole antenna over folded shield.

FIG. 15G is a diagram 1550 that shows mutual coupling effects for the antenna 1500, in accordance with some embodiments. The curve $S_{11}$ shows the antenna return loss, indicating an antenna operation bandwidth ($S_{11}$<−10 dB) of 15 MHz, from 916 MHz to 930 MHz approximately.

The inventors have also discovered a number of particular array configurations that work well in implementing the transmission techniques discussed in reference to FIGS. 17A-20 below. For example, a 2-2-2-2 array configuration and a 3-2-3 array configuration have been discovered.

Figures 1, 15H:
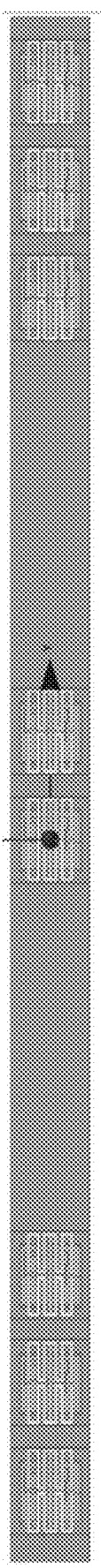
Figures 2, 15H:
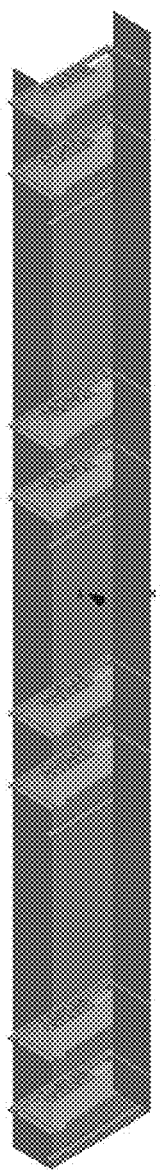
Figures 3, 15H:
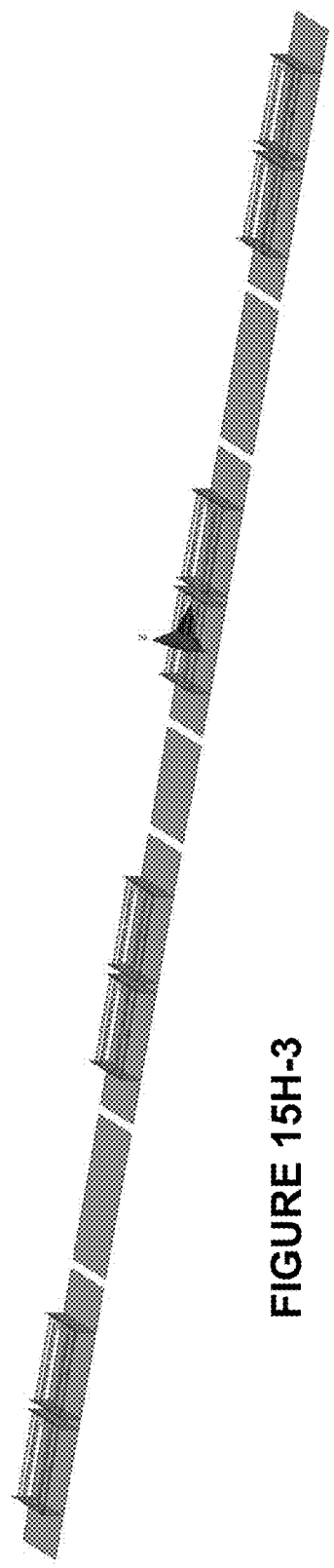
Figure 15I:
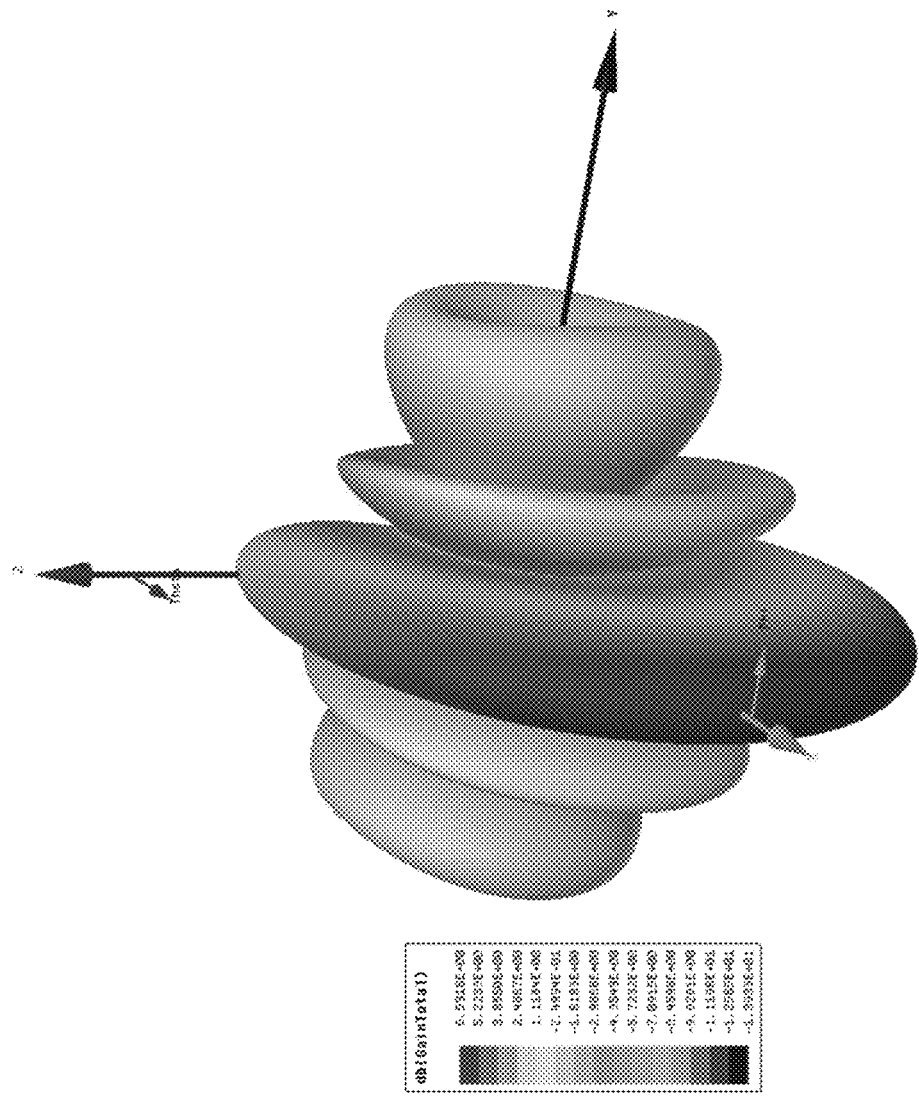
FIG. 15I shows transmission characteristics for the example array configuration depicted in FIG. 15H-1.
Figure 15J:
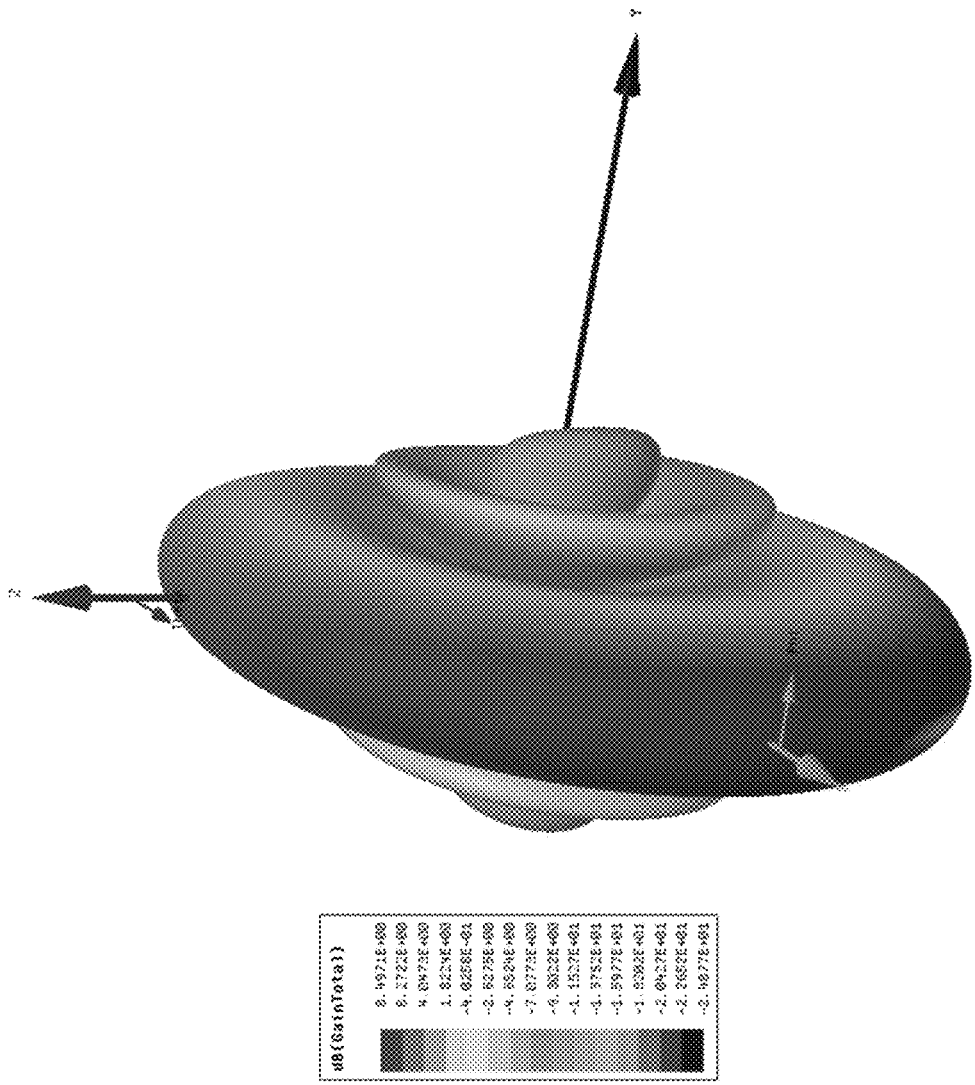
FIGS. 15J and 15K show transmission characteristics for the example array configuration depicted in FIG. 15H-2.
Figure 15K:
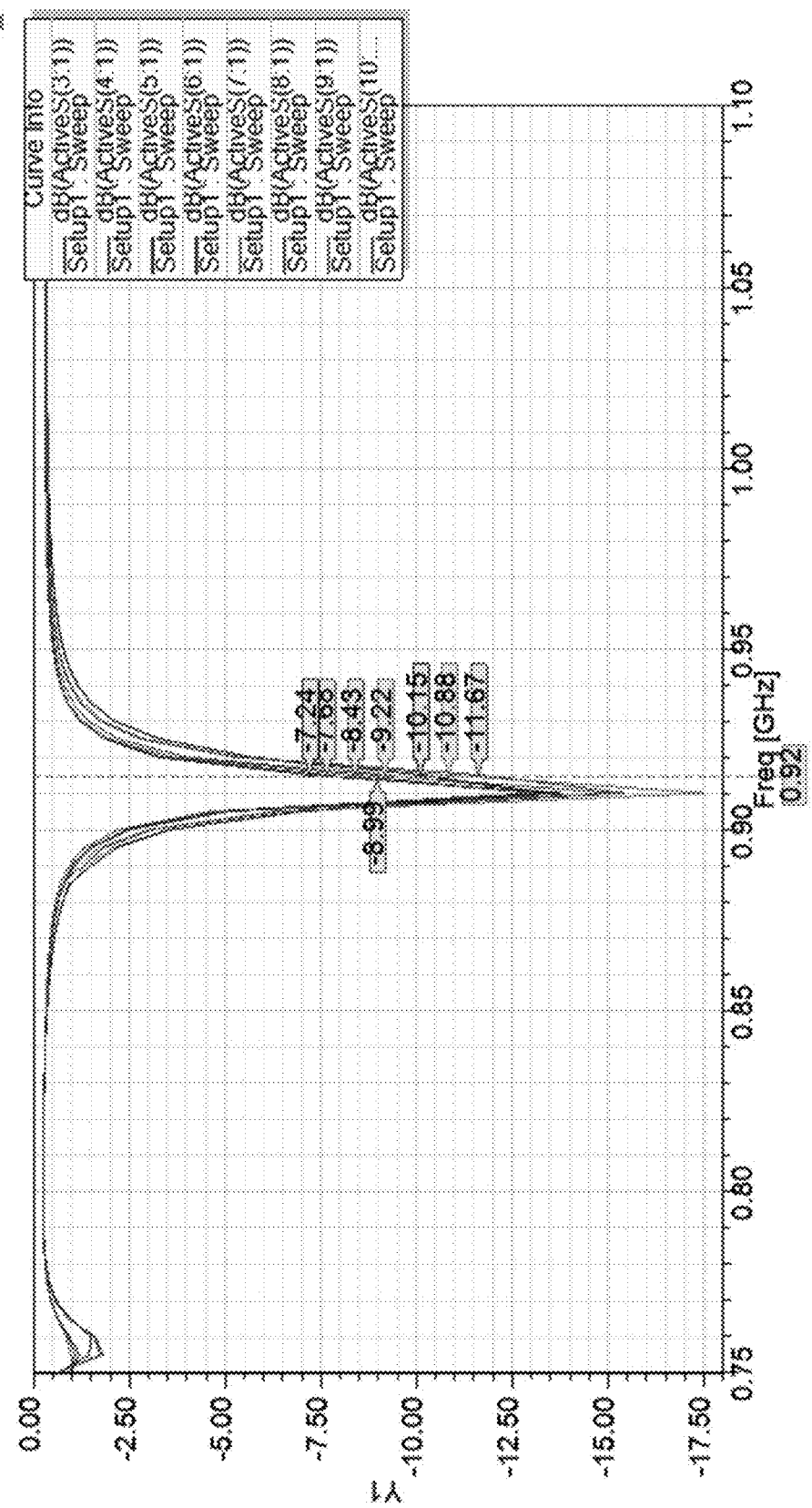

An example of the 2-2-2-2 array configuration is shown in FIGS. 15H-2 and 15H-3, and its transmission characteristics are depicted in the radiation pattern of FIG. 15J and in the return loss graph of FIG. 15K. In this example, all antennas in the array being vertically polarized, and the combination of using a 2-2-2-2 array group configuration with all antennas in the array being vertically polarized (e.g., the polarization is perpendicular to the long side of the ground plane) results in a radiation efficiency of 64%.

An example of the 3-2-3 array configuration is shown in FIG. 15H-1, and its transmission characteristics are depicted in the radiation pattern of FIG. 15I. In this example, all antennas in the array being horizontally polarized (e.g., the polarization is parallel to the long side of the ground plane) and, the combination of using a 3-2-3 array group configuration with all antennas in the array being horizontally polarized results in a radiation efficiency of 77%.

Thus, the inventors have discovered that the selection of the same polarization (whether each antenna should be horizontally or vertically polarized) is important for achieving a highest level of radiation efficiency, and that the same polarization that achieves the highest level of radiation efficiency may be dependent on which array group configuration is used (e.g., 3-2-3 versus 2-2-2-2).

Figure 16A:
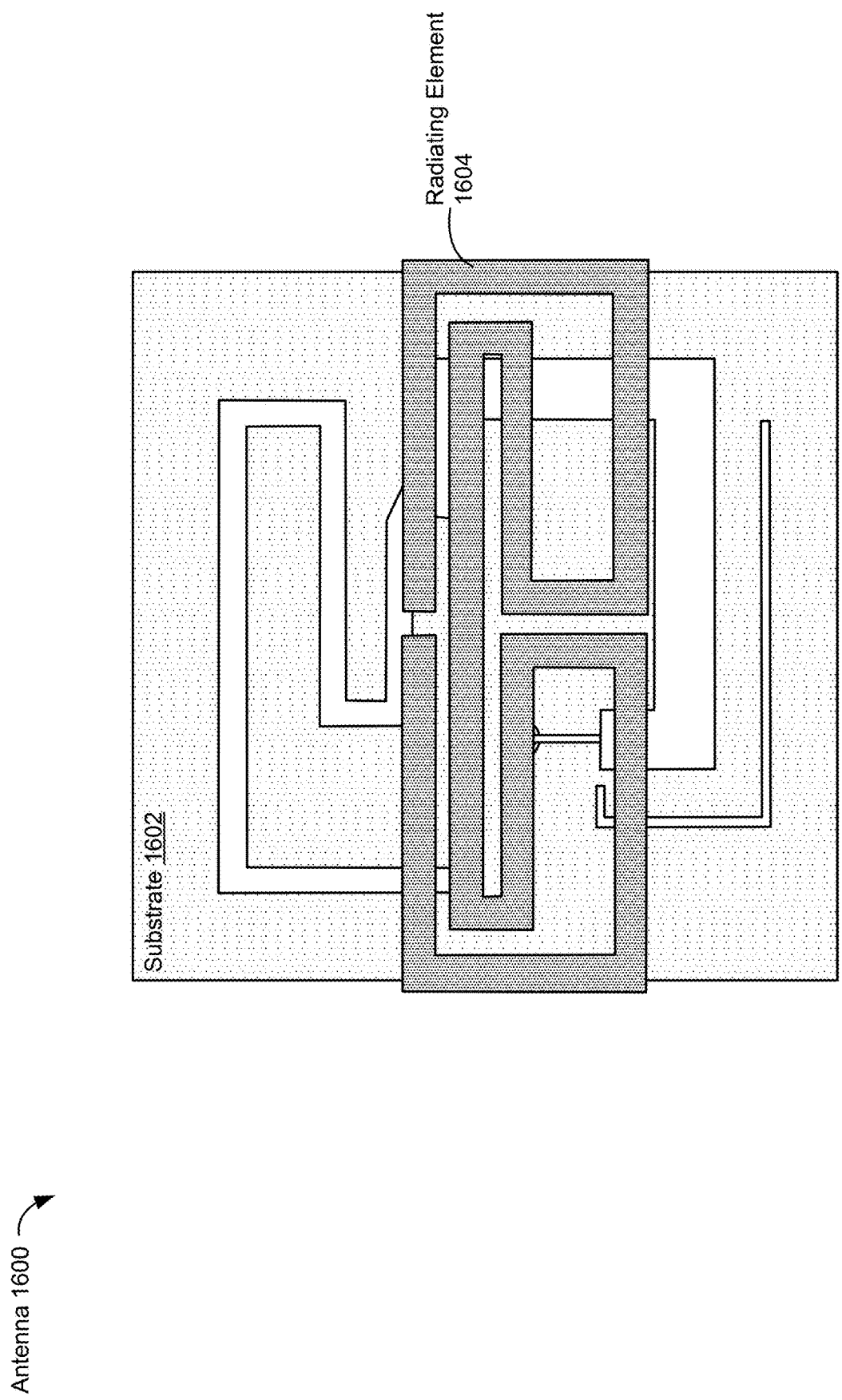
FIGS. 16A-16B illustrate a second embodiment of a multidimensional dipole antenna over folded shield in accordance with some embodiments.
Figure 16B:
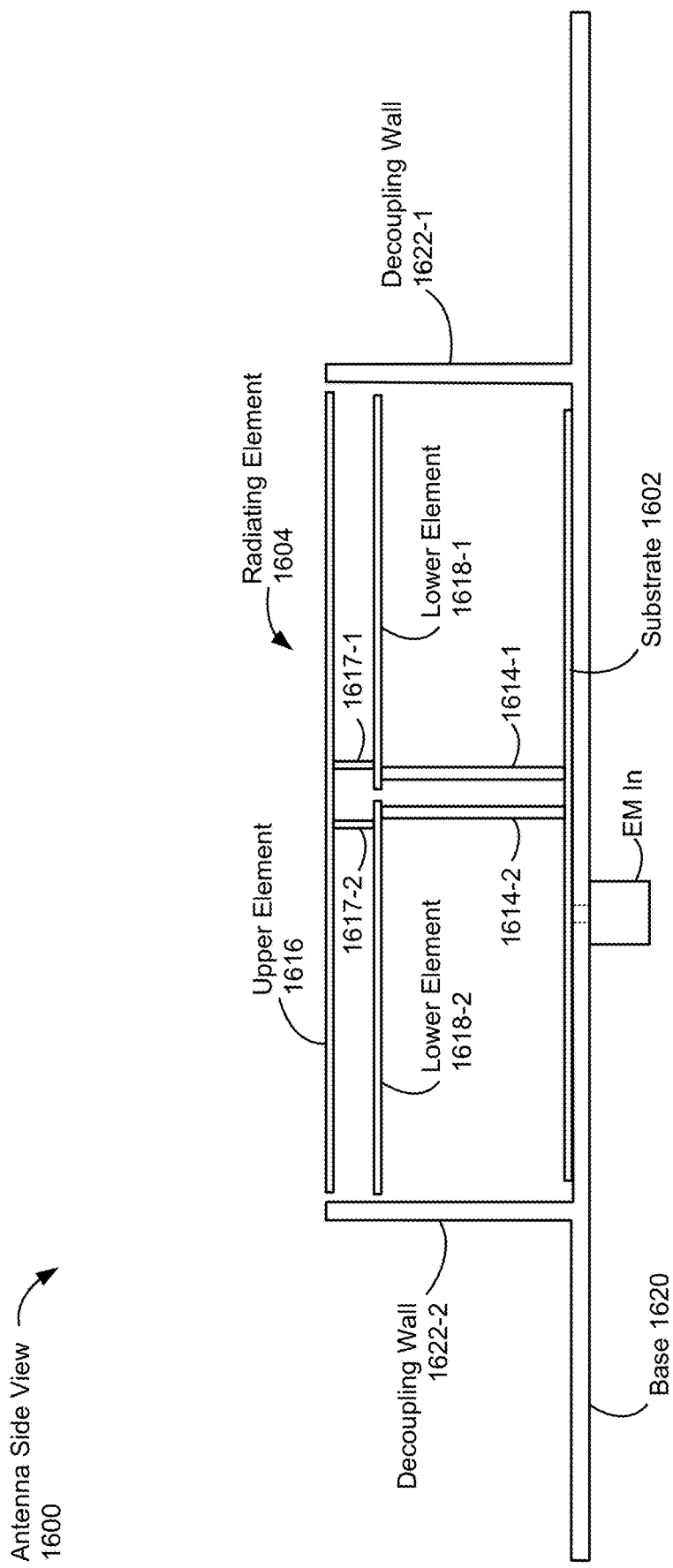

Section E.2: Second Embodiment of a Multidimensional Dipole Antenna Over Folded Shield FIGS. 16A-16B illustrate a second embodiment of a multidimensional dipole antenna over folded shield 1600 (referred to simply as antenna 1600 below). The antenna 1600 shares many of the same components with the antenna 1500 (and may be placed near a similar decoupling mechanism, such as decoupling walls 1622 depicted in FIG. 16B); however, a meandering pattern of the antenna 1600's radiating element 1604 differs from the radiating element 1504 of the antenna 1500. For example, while the radiating element 1604 also includes substantially symmetrical upper and lower elements, the meandering patterns of these element are substantially shorter than the meandering patterns of the radiating element 1504. In some embodiments, the radiating element 1604 is offset in one direction to compensate for the shorter length of the radiating element 1604. For example, the radiating element 1604 may be vertically offset (up or down), and in doing so, tilting of a radiation pattern created by the antenna 1600 with respect to broadside is reduced, and in some instances eliminated.

The other components of the antenna 1600 correspond to equivalent features described above with reference to FIGS. 15A-15E. Therefore, for the sake of brevity, the description of these features is not repeated here. It is noted that an antenna array may include one or more instances of the antenna 1600 and antenna 1500. For example, the antenna array may include a first antenna group with instances of the antenna 1600 and a second antenna group with instance of the antenna 1500. In another example (separate from or in addition to the previous example), the antenna array may include at least one antenna group with one or more instances of the antenna 1500 and one or more instances of the antenna 1600. Additionally, other antennas described herein can be included in an antenna array that includes one or more instances of the antenna 1500 and/or the antenna 1600.

Figure 16C:
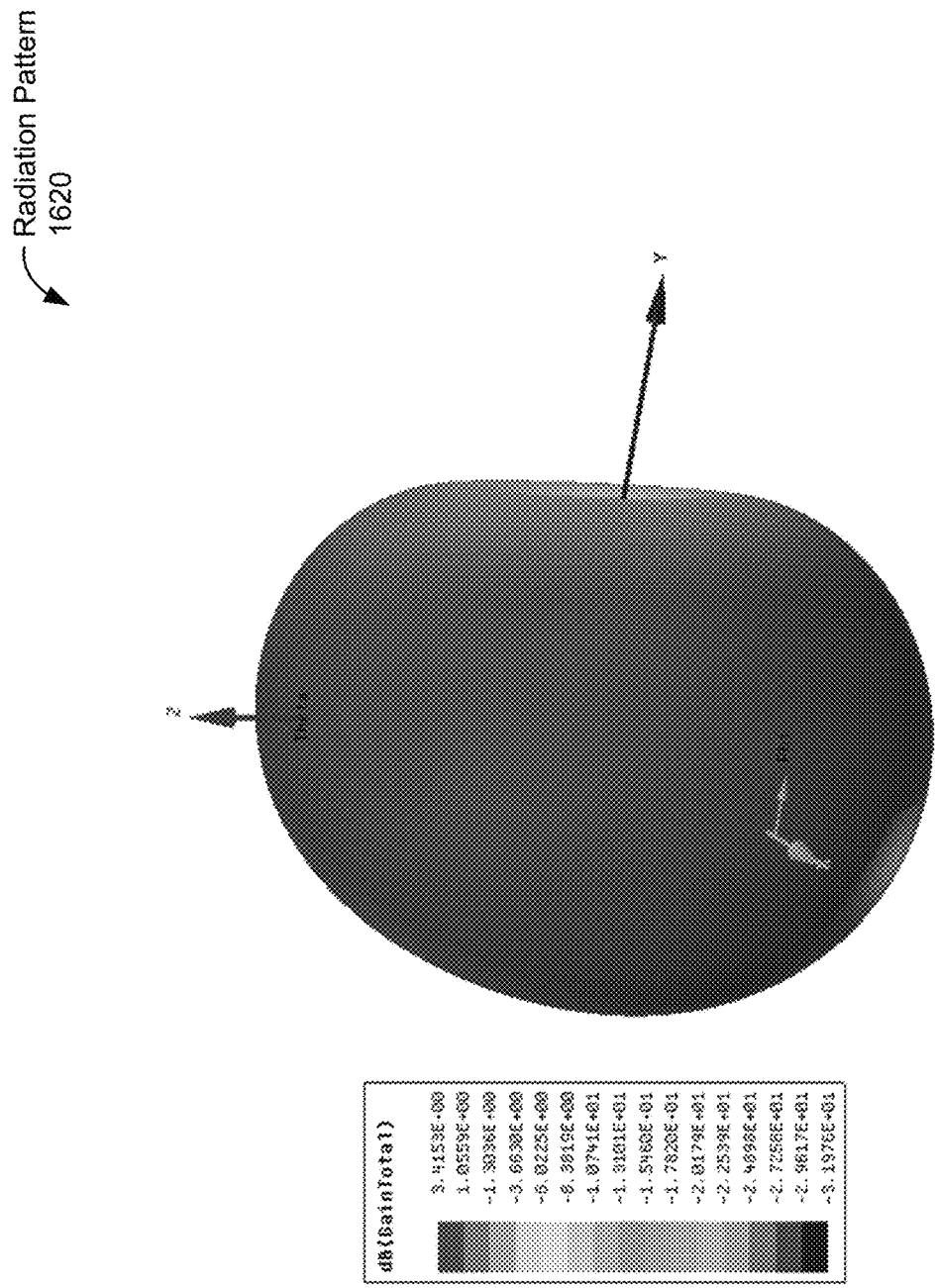
FIG. 16C shows a radiation pattern produced by the second embodiment of the multidimensional dipole antenna over folded shield.
Figure 16D:
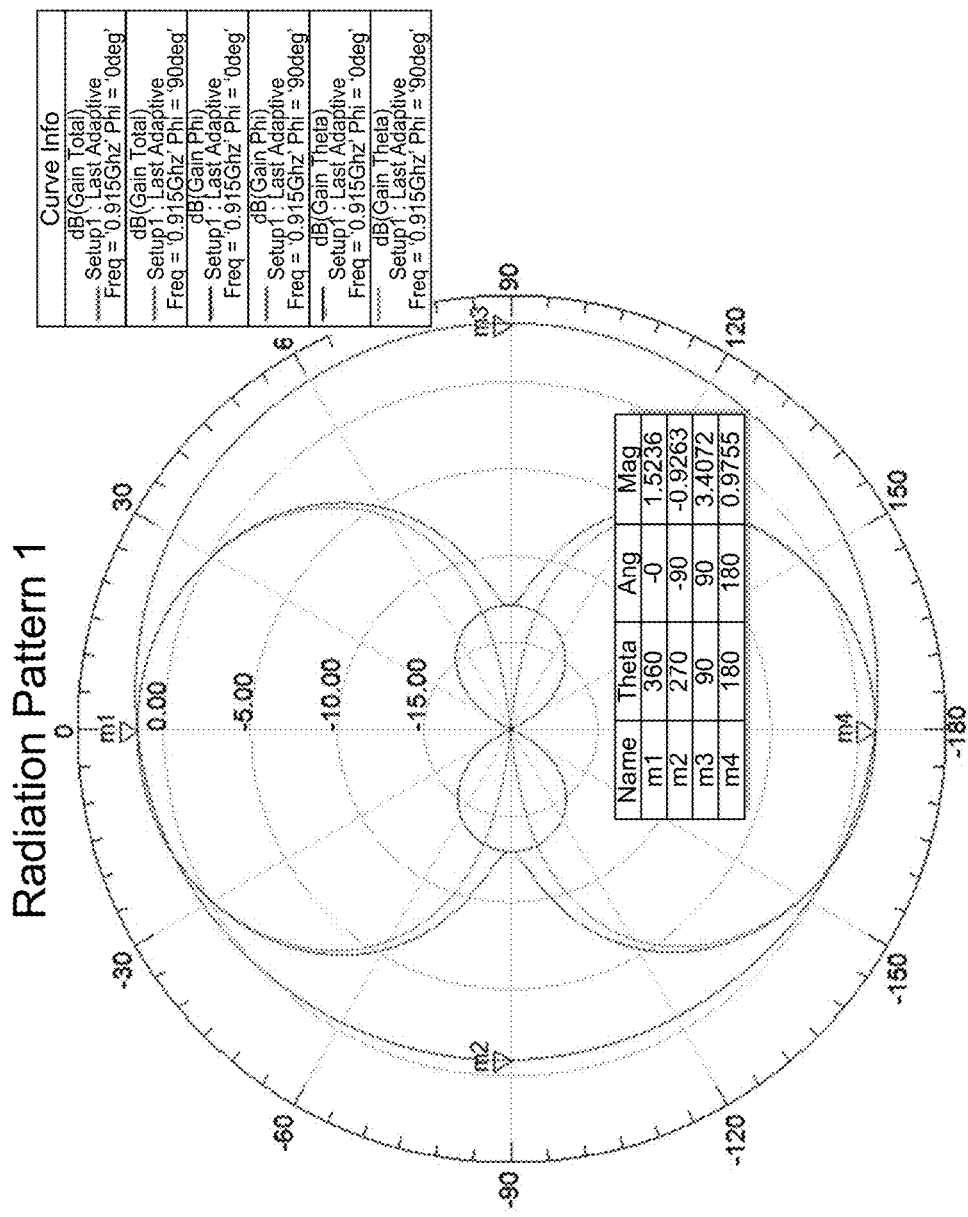
FIG. 16D is a cross-sectional view of the radiation pattern shown in FIG. 16C.
Figure 16E:
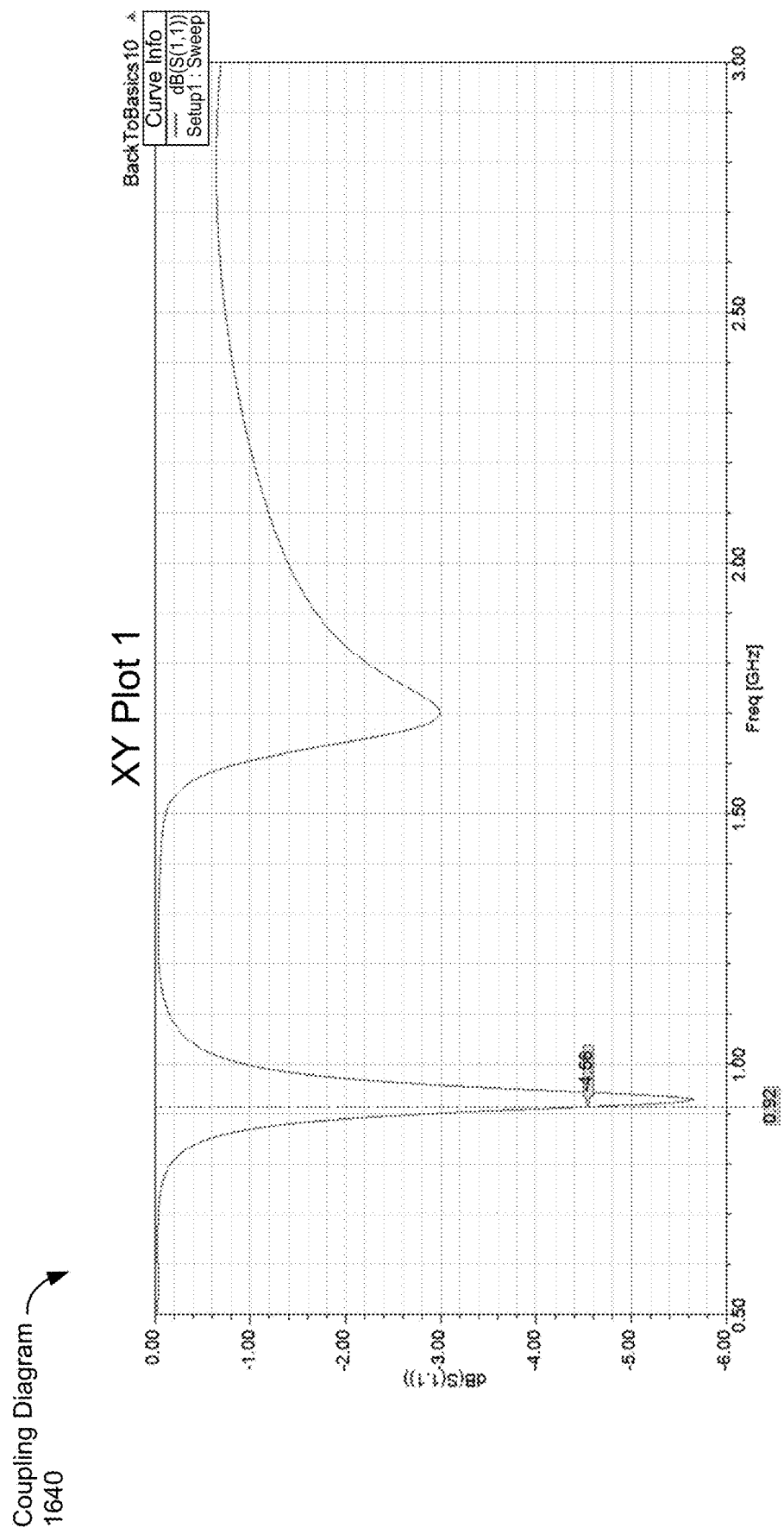
FIG. 16E shows a diagram representing mutual coupling effects measured between a port and itself within the second embodiment of the multidimensional dipole antenna over folded shield.

FIG. 16C illustrates a radiation pattern 1620 generated by the antenna 1600. FIG. 16D illustrates a cross-sectional view 1630 of the radiation pattern 1620 shown in FIG. 16C (taken along the X-Z plane and the Y-Z plane shown in FIG. 16C). FIG. 16E is a diagram 1640 that shows return loss for the antenna 1600.

Section F: Power Wave Transmission Techniques to Focus Wirelessly Delivered Power at a Receiving Device As noted earlier in the Summary section, there is also a need for a wireless transmission solution that complies with regulations that are constantly evolving and that overcomes physical constraints of conventional transmission techniques (e.g., defocusing effects). One such solution is depicted and explained with reference to FIGS. 17A-20. This solution may be implemented and applied to a variety of different antenna array configurations (e.g., any of the antenna arrays described herein), thereby producing an antenna array the utilizes a beam-forming methodology which allows for the antenna arrays discussed herein to comply with governing regulations for the transmission of electromagnetic waves into free space. The antenna arrays, duplets, and individual antennas discussed above may be used when implementing this beam-forming methodology, and specific examples of such implementations are described below.

Figure 17A:
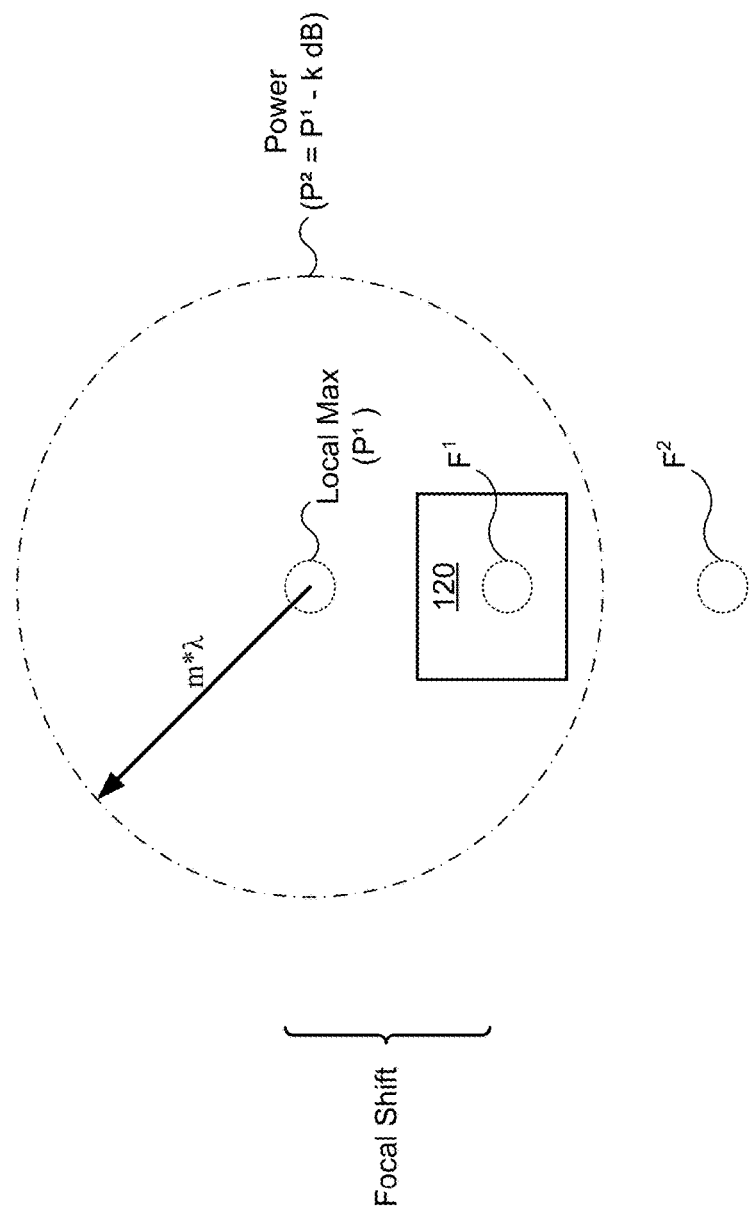
FIG. 17A illustrates a two-dimensional representation of a sphere of electromagnetic energy that is produced by an antenna array, in accordance with some embodiments.

FIG. 17A illustrates a two-dimensional representation of a concentration of electromagnetic energy that is produced by an antenna array in accordance with some embodiments. As shown, a local maximum of power ($P^1$) is formed at a first distance away from an antenna array 1710 (e.g., an instance of antenna array 110, FIG. 1) when the antenna array 1710 transmits electromagnetic waves to a first focal point ($F^1$), which corresponds to a location of the receiver 120. As shown, the receiver 120 is located at a second distance away from the antenna array 1710 (the second distance is further from the antenna array 1710 than the first distance), and the local maximum of power ($P^1$) is formed at a location that is in front of (i.e., positioned closer to the antenna array 1710) the receiver 120's location. This result can be attributed to "defocusing," which refers to certain effects caused by transmitted electromagnetic waves interacting during transmission. The example of transmitting to a single focal point ($F^1$) is used to demonstrate the concept of focal shift. As explained in more detail below, certain embodiments of the antenna arrays described herein also transmit to a second focal point ($F^2$, also shown in FIG. 17A and are thereby able to control concentrations of energy in a way that ensures that the receiver's location is within a certain distance of the local maximum of power and also ensures that a satisfactory roll off of the power level is present at certain distances away from the antenna array.

The difference between a location of the local maximum of power ($P^1$) and the receiver's location caused by defocusing is referred to as "focal shift," which is the distance between the assigned focal point ($F^1$) (i.e., the receiver's location) and the actual location of the field amplitude peak ($P^1$). The "focal shift" typically is proportional to the assigned focal point's ($F^1$) distance away from the antenna array 110 (i.e., as the assigned focal point's ($F^1$) distance away from the antenna array 110 increases, so does the focal shift). Accordingly, problems caused by defocusing are more pronounced with antenna arrays transmitting propagating electromagnetic waves that must travel a certain non-zero distance (e.g., 1 wavelength or greater) to reach an intended receiver.

Because governing regulations are not well-defined and are constantly evolving and because of physical constraints of conventional transmission techniques (e.g., the defocusing effects discussed above), designing a power-transmission device that will comply with these regulations is a very difficult proposition. Focal shift, in particular, must be properly accounted for in order to design antenna arrays that will comply with possible governing regulations.

For example, governing regulations may eventually require that: (i) a the receiver's location reside within a predefined radial distance (e.g., m*λ) from the local maximum of power ($P^1$), and (ii) the power, relative to the maximum power ($P^1$), decay by at least k dB at the predefined radial distance (e.g., m*λ) in all directions ($P^2$) from the local maximum of power ($P^1$) (e.g., in all spherical dimensions/directions from $P^1$ away from the array). Further, in some instances, the regulations can require some power decrease at a point closer to the antenna array than the local maximum of power ($P^1$) (i.e., a local minimum of power is required). Additionally, in some instances, the regulations can require that a magnitude of the local maximum of power ($P^1$) is below some predefined threshold. The following equation may represent the required power decay at the predefined radial distance:

$$P^2 = P^1 - kdB$$

where k is a number ranging from approximately 1 dB to 6 dB (although these values may change depending on a size and power delivered by the antenna array). Accordingly, transmitting devices that do not or simply cannot adequately compensate for focal shift struggle to comply with any possible governing regulations.

In order to compensate for focal shift, the antenna array 1710 can be instructed (e.g., by the or more processors 204 of the transmitter 102) to focus electromagnetic waves at two different focal points: a first focal point ($F^1$) and a second focal point ($F^2$), as shown in FIG. 17A (additional examples are shown in FIGS. 18A and 19A-19D). By using two different focal points, effects of focal shift are minimized (and appropriately accounted for). As a result, the transmitter 102 is able to manage focal shift, and in turn transmit electromagnetic waves in compliance with governing regulations. A "separation distance" between the first and second focal points differs depending on certain requirements (e.g., location of the receiver, desired level of power at the local maximum, desired power roll-off away from the local maximum, etc.), and the second focal point ($F^2$) may or may not be within the predefined radial distance. Creating multiple focal points, and some of the associated advantages, are discussed in further detail below.

Figure 17B:
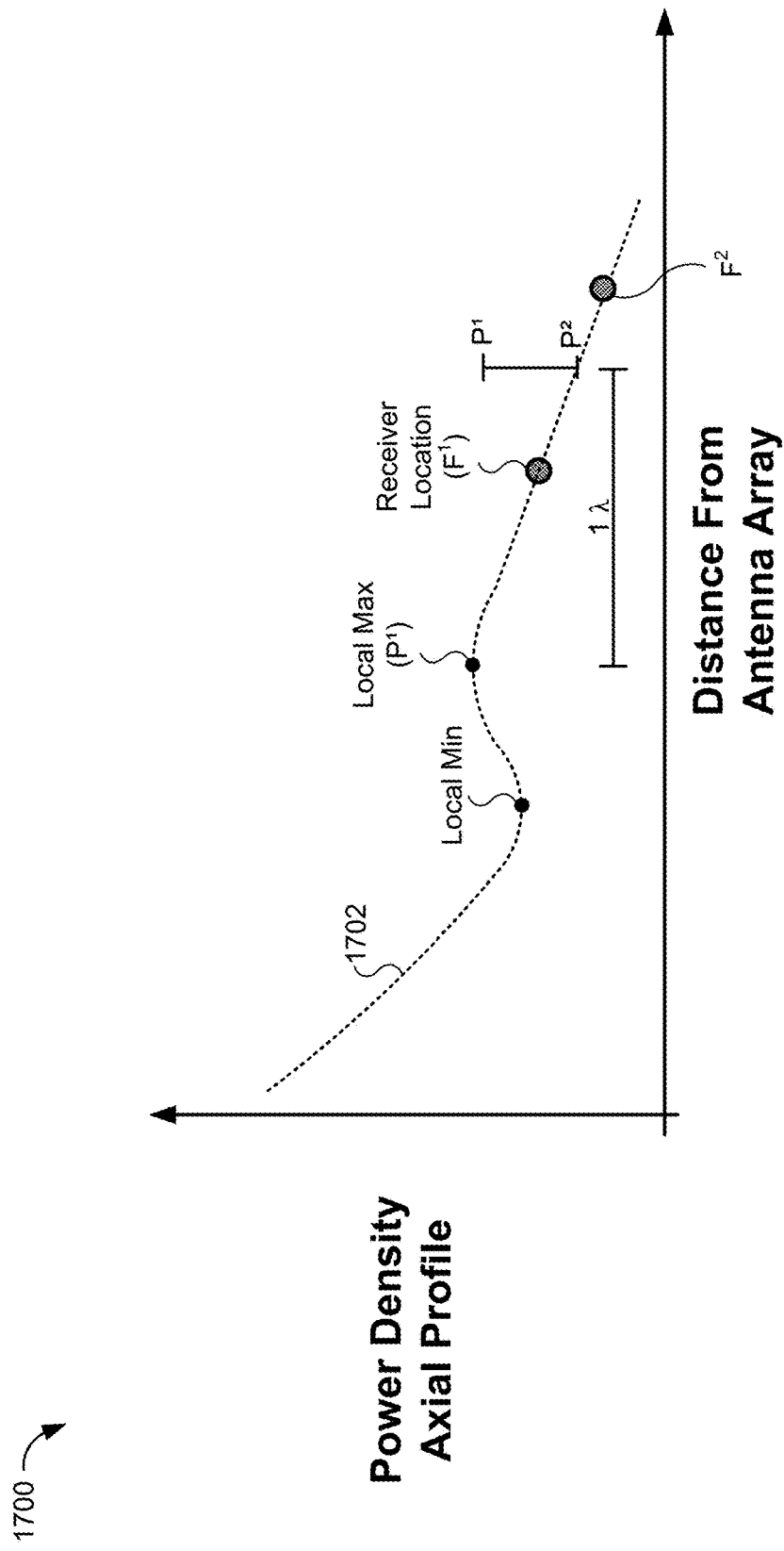
FIG. 17B is a diagram 1700 that depicts power density levels relative to distance from the antenna array shown in FIG. 17A, in accordance with some embodiments.

FIG. 17B is a diagram 1700 that depicts power density levels relative to distance from the antenna array shown in FIG. 17A, in accordance with some embodiments. For ease of discussion, the predefined radial distance is defined as 1λ. However, the predefined radial distance may be other values, such as 0.5λ, 1.5λ, 2λ, etc., or may be defined relative to a range of values such as between 0.5λ to 2.5λ, between 0.5λ-1.5λ, between 0.75λ to 1λ, etc. In some embodiments, the predefined radial distance is not defined relative to a wavelength ("λ") and is instead defined using a unit of length, such as feet, such that the predefined radial distance may 0.5 feet, 1.5 feet, 2 feet, or some other appropriate value.

The illustrated diagram 1700 includes an example power profile 1702 (curve shown using a dotted line) of transmitted electromagnetic waves for the transmission of power at-a-distance using multiple focal points. An X-axis of the diagram 1700 corresponds to the power profile's (1702) distance from the antenna array 1710 and the Y-axis of the diagram 1700 corresponds to a power density of the power profile 1702 (e.g., in the axial direction). As shown, the power profile 1702 includes a local minimum (Local Min) and a local maximum ($P^1$). Furthermore, the receiver's (120) location resides within one wavelength (1λ) from the local maximum ($P^1$) and a power density of the power profile 1702 decays by at least k dB at a distance of 1, ($P^2$) from the local maximum ($P^1$). To create the power profile 1702, the transmitter 102 can transmit some electromagnetic waves to a first focal point ($F^1$) and transmit some electromagnetic waves to a second focal point ($F^2$), e.g., as shown in FIG. 18A.

Figure 18A:
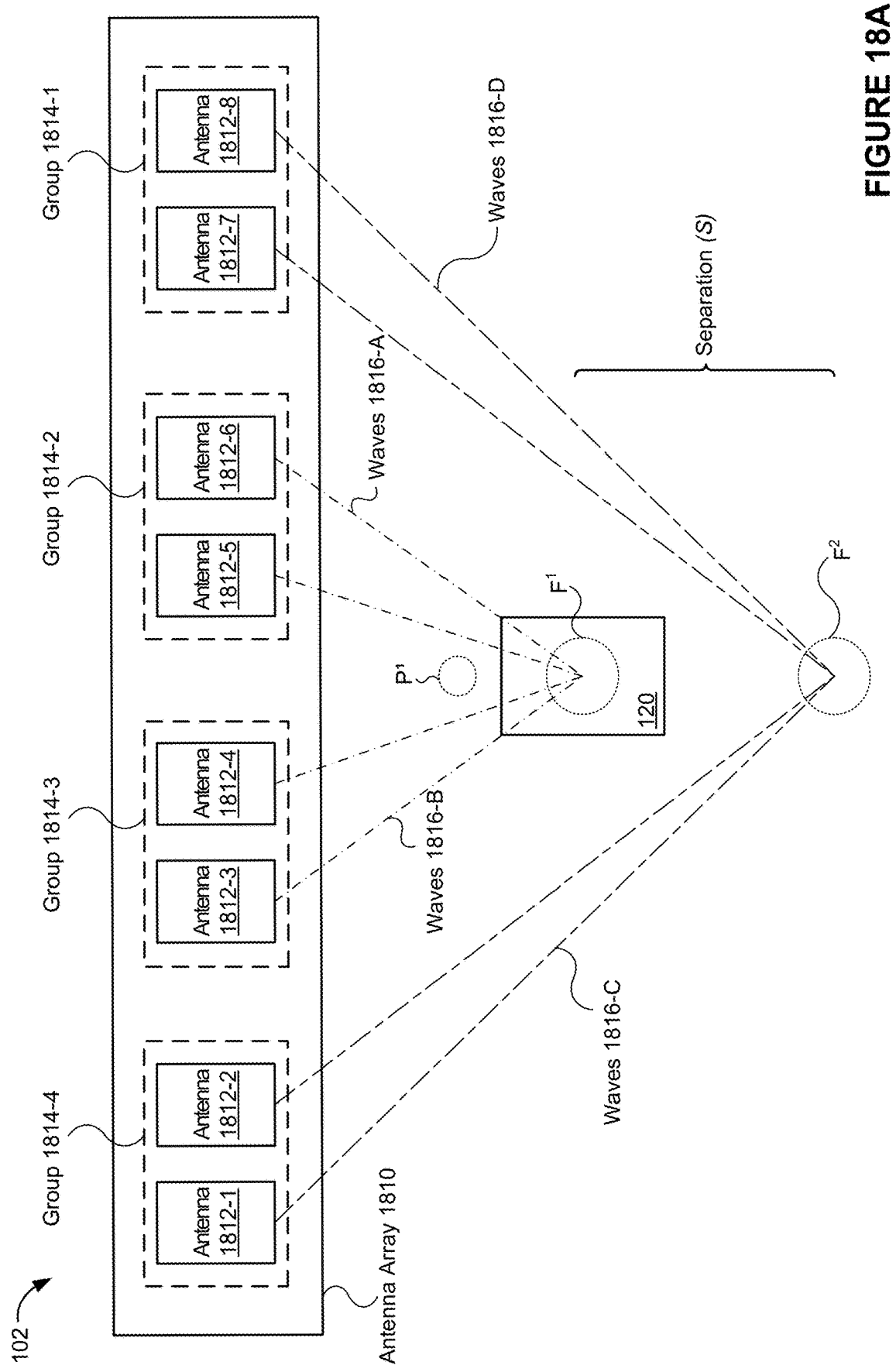
FIG. 18A is a block diagram illustrating a representative wireless power transmission system having four antenna groups in its antenna array in accordance with some embodiments.

It is also noted that the power profile 1702 represents a combined power profile that is produced by transmitting to two different focal points, e.g., a first power profile created by transmitting to a first focal point (e.g., power profile created by antenna groups 1814-4 and 1814-1, FIG. 18A) and a second power profile created by transmitting to a second focal point (e.g., power profile created by antenna groups 1814-2 and 1814-2, FIG. 18A).

Accordingly, the example power profile 1702 illustrates that the antenna array 1710 properly accounts for focal shift to ensure proper generation of a local maximum and appropriate decay of the power levels. The antenna arrays discussed herein and their corresponding methods of operation are used to achieve such results (i.e., allowing these antenna arrays to comply with future governing regulations).

Figure 17C:
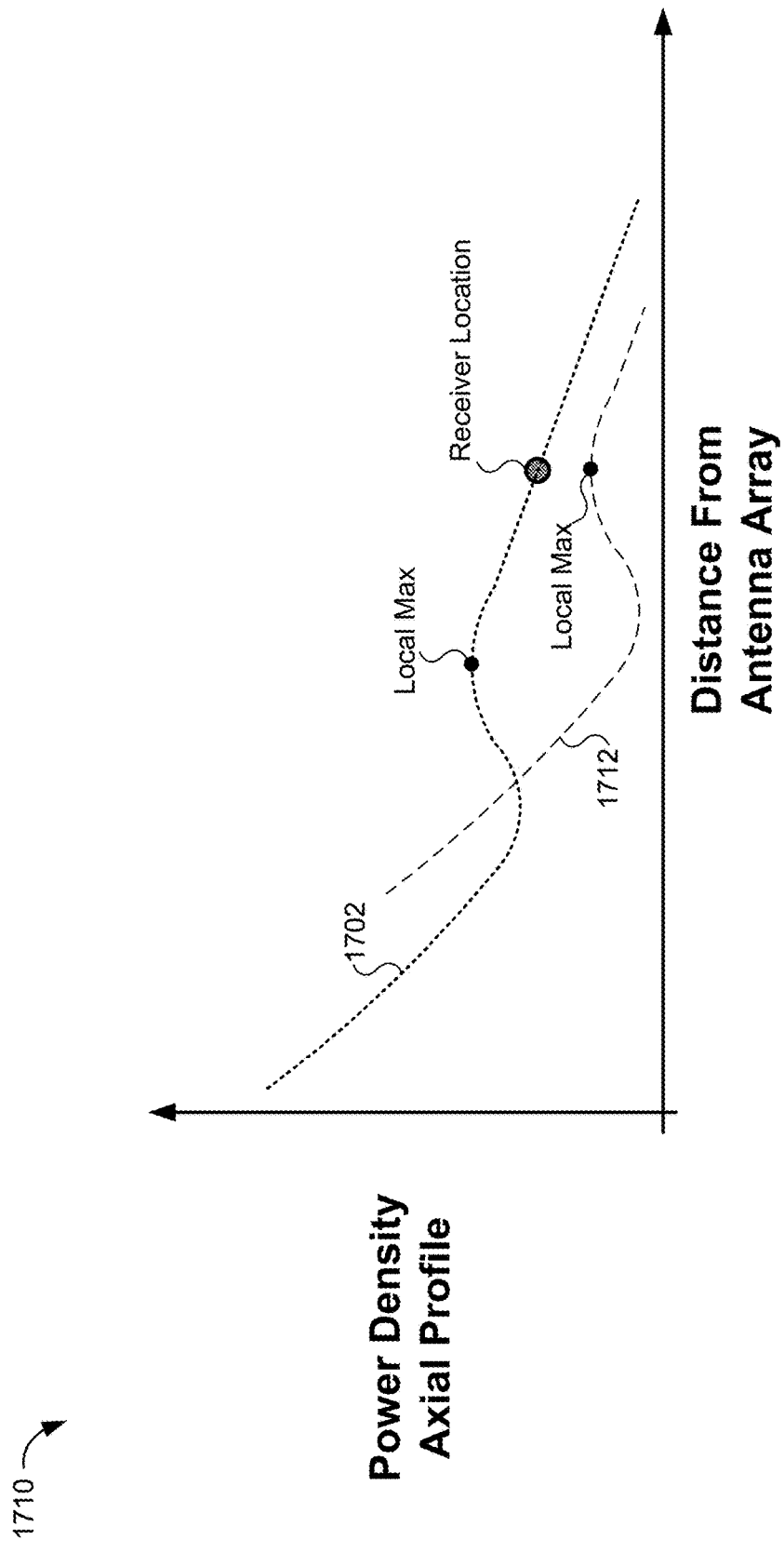
FIG. 17C is a diagram that shows power profiles with different local maxima, in accordance with some embodiments.

FIG. 17C is a diagram that shows power profiles with different local maxima, in accordance with some embodiments. In particular, the prophetic diagram 1710 shows that creation of a local maximum at a distance away from the receiver's (120) location (as shown in the power profile 1702, which may be produced when the antenna array 1710 uses two different focal points as discussed in more detail below) can result in the received power at the receiver's location being greater than when the antenna array focuses all of its antennas directly at (or even past) the receiver's location (as shown in the power profile 1712). The result shown in FIG. 17C illustrates that conventional antenna array designs (and transmission techniques associated therewith) fail to properly account for defocusing effects and are thereby unable to focus power in a way that will satisfy governing regulations. Thus, the inventors have discovered that the received power can actually be increased by creating local maxima away from the receiver's location.

Additionally, when the antenna array uses at least two different focal points, the local maximum can be displaced closer to the receiver location. In addition to using at least two different focal points, instead of delivering the same transmitting power to all the antennas on the array, the same amount of power can be redistributed such that some elements get higher power and others lower (as is explained in more detail below, e.g. in reference to FIGS. 18A-18G), the power at the receiver location is greater than when all antennas were focused to the receiver location and all were excited with same amount of power.

FIGS. 18A-18G illustrate a block diagram of an antenna array 1810 in operation that properly accounts for the effects caused by defocusing in accordance with some embodiments. The antenna array 1810 is an example of the antenna array 110.

In this particular example, the antenna array 1810 includes four antenna groups 1814-A-1814-D, where each antenna group 1814 includes two antennas 1812 (e.g., antenna duplets or any other appropriate groups of the antennas described herein). In some embodiments, each antenna 1812 is the same antenna type while in some other embodiments one or more antennas 1812 differ in type. As explained above with reference to FIG. 1, the antenna groups 1814-A-1814-D are spaced-apart by edge-to-edge distances (e.g., $D^1$ and $D^2$, FIG. 1), which may be the same or different distances (in certain embodiments, the center-to-center distances between the respective groups of antennas may also be the same or different).

In some embodiments, antennas within each group are also co-polarized and produce perpendicularly oriented radiation patterns, as discussed above with respect to, e.g., FIGS. 3A, 5, and 6A. It is noted that, while each antenna group 1814 includes two antennas 1812 in this particular example, each antenna group 1814 may include two or more antennas, as discussed below with reference to FIG. 19A. Moreover, the antenna array 1810 may include more or less than four antenna groups. In some embodiments, the antenna array 1810 includes instances of antenna 1500 and/or antenna 1600.

Each antenna 1812 within each of the antenna groups 1814 is configured to transmit electromagnetic waves (e.g., electromagnetic waves 1816-A, 1816-B, etc.) to respective focal points (e.g., $F^1$ or $F^2$) that are determined based on a location of the receiver 120. For example, the antennas 1812 in the second and third antenna groups 1814-2, 1814-3 are configured to transmit electromagnetic waves 1816-A, 1816-B to a first focal point ($F^1$), which corresponds to a location of a receiver 120. In contrast, the antennas 1812 in the first and fourth antenna groups 1814-1, 1814-4 are configured to transmit electromagnetic waves 1816-C, 1816-D to a second focal point ($F^2$), which does not correspond to the location of the receiver 120. Instead, the second focal point ($F^2$) is further from the antenna array 1810 relative to the location of the first focal point ($F^1$). By creating two different focal points, the transmitter 102 minimizes electromagnetic wave interaction during transmission, thereby minimizing (and appropriately accounting for) effects caused by defocusing, as noted above. As a result, the transmitter 102 is able to manage focal shift, and in turn transmit electromagnetic waves in compliance with governing regulations. Additionally, even though the local maximum ($P^1$) is not at the receiver's location, the antenna array is still able to deliver sufficient energy to the receiver 120 that allows the receiver to receive operating power and/or to sufficiently charge a battery (or other power-storing component) associated therewith. The power profile 1702 shown in FIG. 17B, in some instances, corresponds to the transmission example illustrated in FIG. 18A.

A plurality of factors contributes to the effects caused by defocusing. The factors include but are not limited to: (i) values of transmission characteristics (e.g., respective values for transmission characteristics including power level, phase, frequency, etc.) of electromagnetic waves transmitted to $F^1$, (ii) values of transmission characteristics of electromagnetic waves transmitted to $F^2$, (iii) a separation distance (S) between the focal points, (iv) the location of the receiver 120 relative to the transmitter 102, and (v) a distribution of the antenna elements on the antenna array. With respect to factor (iv), in some instances, the transmitter 102 is configured to transmit electromagnetic waves to different focal points when the location of the receiver 120 is a sufficient distance away from the antenna array 1810 (e.g., the location of the receiver 120 satisfies a threshold separation distance). In instances where the location of the receiver 120 is not at a sufficient distance away from the antenna array 1810 (e.g., less than ½ wavelength way from the antenna array), the transmitter 102 may be configured to transmit electromagnetic waves to a single focal point.

In some embodiments, the transmitter 102 is adapted to control a location of a local maximum of power (e.g., P¹, FIG. 17A), a magnitude of the local maximum of power, and a magnitude of power at the receiver's location (e.g., control drop off from the local maximum of power) by changing a separation distance (S) between the two focal points. For example, when the separation distance (S) is a first separation distance, the local maximum of power is formed at a first distance away from the antenna array 1810 and has a first power magnitude, and when the separation distance (S) is a second separation distance (e.g., greater than or less than the first separation distance), the local maximum of power is formed at a second distance away from the antenna array 1810 and has a second power magnitude. In this way, the transmitter 102 is able control power focusing of the antenna array and thereby comply with various regulations from different governing bodies. As discussed below, in certain embodiments, various beam settings are predetermined during a configuration or setup process for the antenna array and the transmitter performs a lookup to determine which of these various beam settings to use based on the receiver's current location.

In order to sufficiently diminish the effects of defocusing, the transmitter 102 selects specific values for transmission characteristics (e.g., power level, phase, etc.) of electromagnetic waves transmitted by antennas in each antenna group based on a location of the receiver 120. In the illustrated embodiment, the receiver 120 is centered with the antenna array 1810, and as a result, the electromagnetic waves 1816-A, 1816-B have substantially the same values for their respective transmission characteristics (illustrated using a first common line pattern for electromagnetic waves 1816-A, 1816-B), and the electromagnetic waves 1816-C, 1816-D have substantially the same values for their respective transmission characteristics (illustrated using a second common line pattern for electromagnetic waves 1816-C, 1816-D). It is noted that the values for the electromagnetic waves 1816-A, 1816-B differ from the values for the electromagnetic waves 1816-C, 1816-D.

FIGS. 18B-18E are diagrams that illustrate various axial power profiles that can be created by the antenna array 1810 using multiple focal points in accordance with some embodiments. For ease of discussion and illustration, the predefined radial distance is 1λ and the required drop off from the peak power is 3 dB (the "example power-focusing regulations"). As discussed above, the predefined radial distance and the required drop off may also have less restrictive values (e.g., the predefined radial distance is less than 1λ and the required drop off is 1 dB) or may have more restrictive values (e.g., the predefined radial distance is greater than 1λ and the required drop off is 4 or 5 dB). For explanatory purposes only, the antenna array in the depicted examples below is operating at a center frequency of approximately 925 MHz.

Figure 18B:
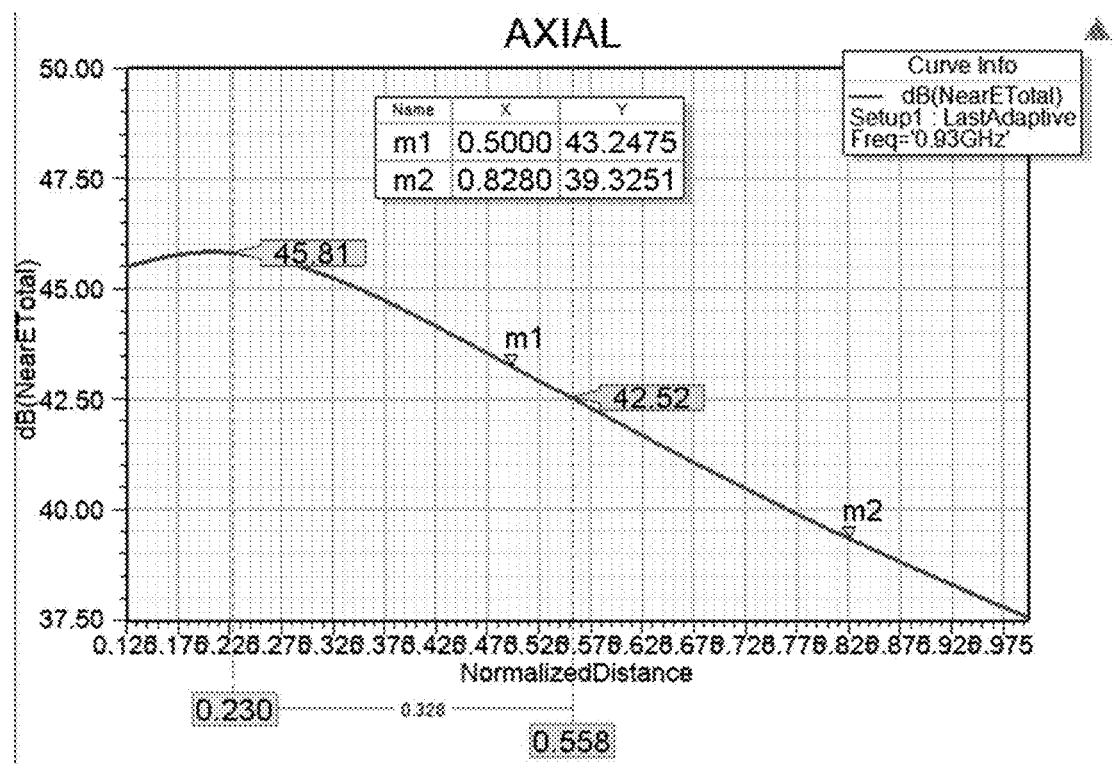
FIGS. 18B-18G are diagrams that illustrate various power profiles that can be created by the antenna array of FIG. 18A, in accordance with some embodiments.
Figure 18C:
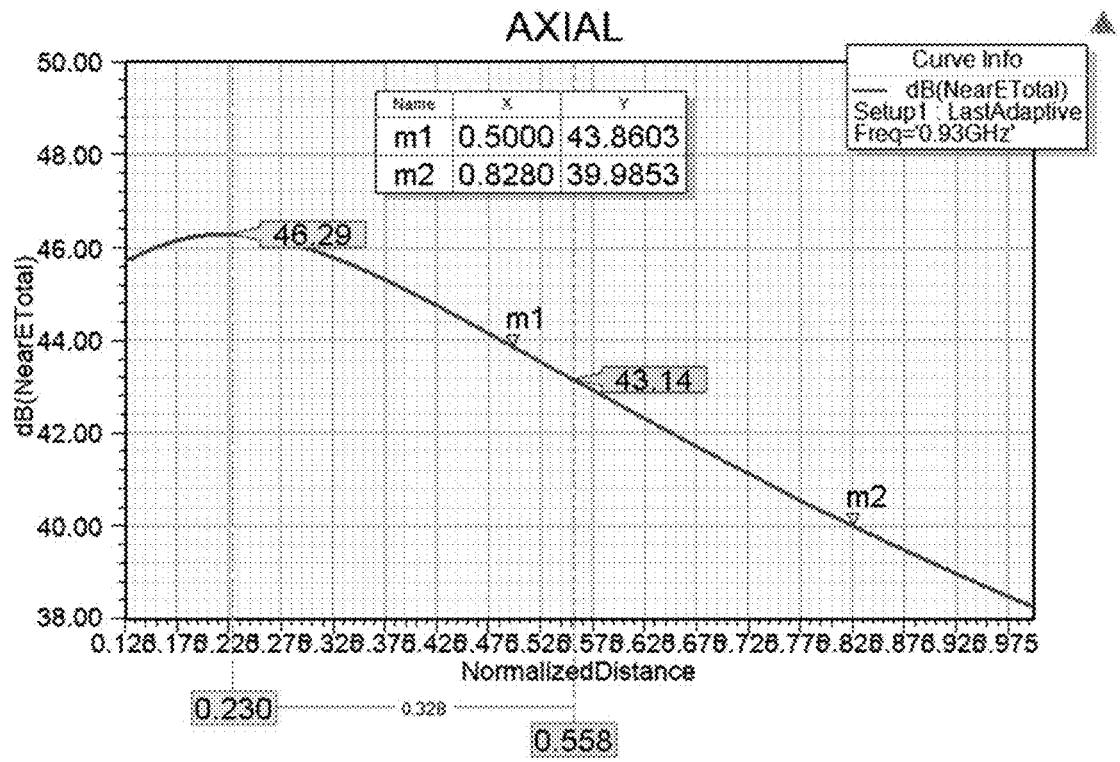

Turning now to FIGS. 18B and 18C, example axial power profiles produced by the antenna array 1810 are illustrated, demonstrating power-focusing results caused by adjusting a power level of transmitted electromagnetic waves, while the antennas' (1812) respective phases are fixed. For example, with reference to FIG. 18B, the antennas 1812 in the first and fourth antenna groups 1814-1, 1814-4 transmit electromagnetic waves with 3 watts of power to the second focal point (F²), while the antennas 1812 in the second and third antenna groups 1814-2, 1814-3 transmit electromagnetic waves with 1 watt of power to the first focal point (F¹). As such, the antennas 1812 in antenna groups 1816 furthest away from the receiver's 120 location transmit electromagnetic waves with a higher power level, relative to the antennas 1812 in antenna groups 1816 closest to the receiver's 120 location. As shown in FIG. 18B, the axial power profile has a local maximum of 45.81 dB at a distance of 0.23 meters from the antenna array 1810. Further, the axial power profile decreases to 42.52 dB at 1λ from the local maximum (i.e., 3.29 dB decrease). Accordingly, this axial power profile demonstrates that by implementing the transmission techniques described herein, the antenna array 1810 is capable of complying with the example power-focusing regulations defined above.

With reference to FIG. 18C, the antennas 1812 in the first and fourth antenna groups 1814-1, 1814-4 transmit electromagnetic waves with 4 watts of power to the second focal point (F²) (i.e., a 1 watt increase relative to the illustrated example of FIG. 18B), while the antennas 1812 in the second and third antenna groups 1814-2, 1814-3 transmit electromagnetic waves with 1 watt of power to the first focal point (F¹). As shown in FIG. 18C, the axial power profile has a local maximum of 46.29 dB at a distance of 0.23 meters from the antenna array 1810. Further, the axial power profile decreases to 43.14 dB at 1λ from the local maximum (i.e., 3.16 dB decrease). Accordingly, the axial power profile demonstrates that by implementing the transmission techniques described herein, the antenna array 1810 is capable of complying with the example power-focusing regulations defined above. Moreover, in comparison with FIG. 18B, the axial power profile of FIG. 18C has a higher local maximum with a more rapid decrease from the local maximum, demonstrating the fine-level of power-focusing control that may be achieved by implementing the transmission techniques described herein.

In some embodiments, adjusting a power level of the electromagnetic waves is performed by having the single integrated circuit discussed above provide instructions to at least one power amplifier (e.g., one or more of the power amplifier(s) 216, FIG. 2A). Further, in some embodiments, a first power amplifier (or one or more first power amplifiers) is instructed to adjust power levels of one or more antenna groups of the antenna array while a second power amplifier (or one or more second power amplifiers) is instructed to adjust power levels of one or more different antenna groups of the antenna array. The power feeding circuitry 218 (FIG. 2A) may be configured to provide the electromagnetic waves to the at least one power amplifier under control of the single integrated circuit. In some embodiments, antenna elements 1812 within a particular group have different power levels. For example, a first antenna 1812 in a first group (e.g., one of groups 1814-1-1814-4) may transmit electromagnetic waves at a first power level, while a second antenna 1812 in the first group may transmit electromagnetic waves at a second power level different from the first power level. This level of adjustment allows the transmitter 102 to provide granular adjustments to the antenna array, to further hone the power profile created by the antenna array. Additionally, the individual antenna elements within a particular antenna group may be coupled to and fed by the same power amplifier or different power amplifiers.

Figure 18D:
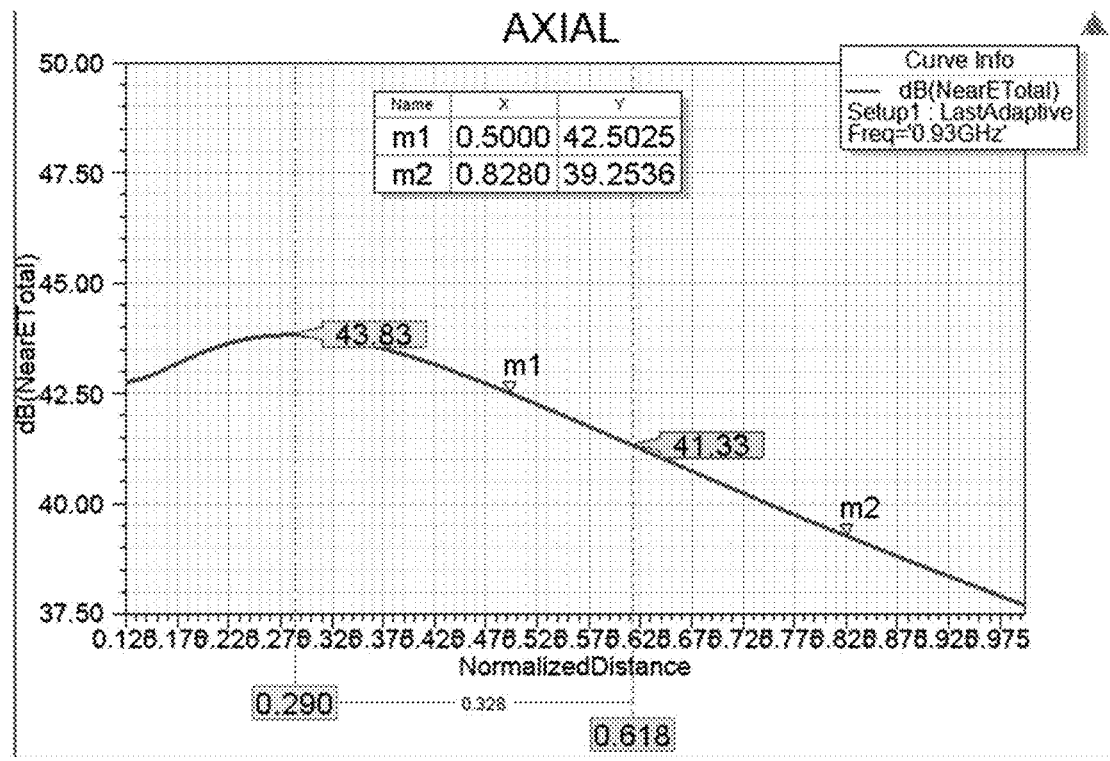
Figure 18E:
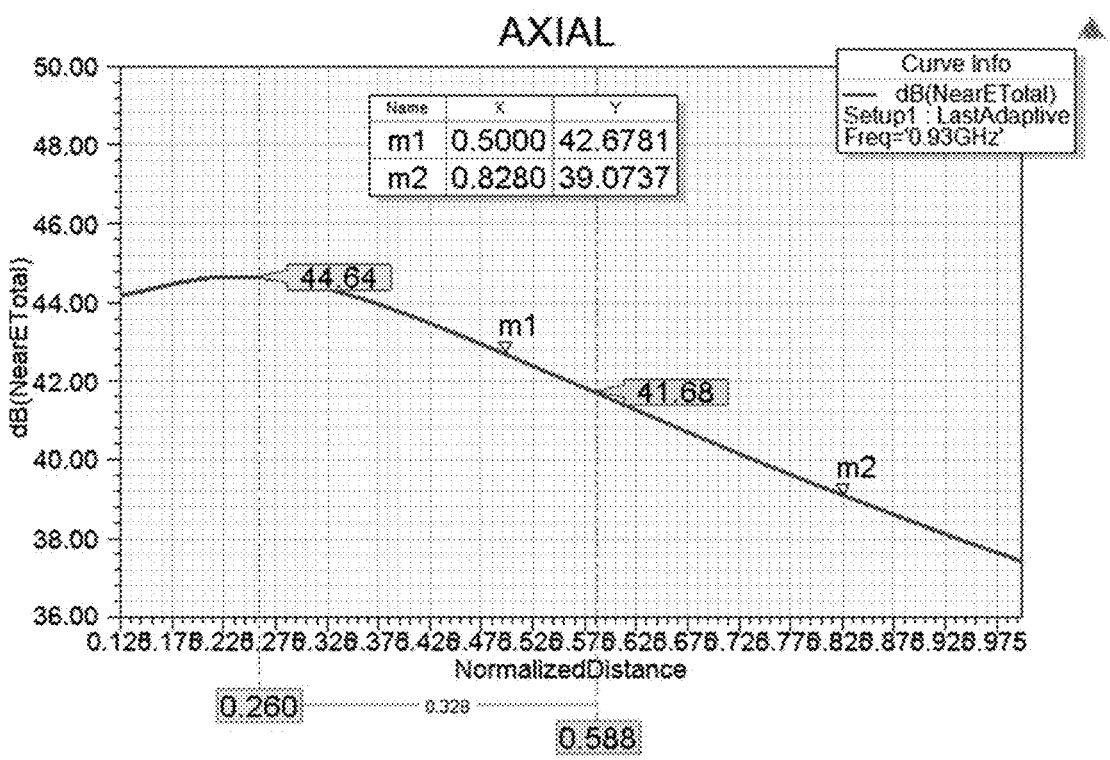

With reference now to FIGS. 18D and 18E, power-focusing results are illustrated after adjusting phases of the antennas 1812, while a power level of the transmitted electromagnetic waves is fixed. For example, with reference to FIG. 18D, the first and second antennas 1812 in the first and fourth antenna groups 1814-1, 1814-4, which transmit to the second focal point (F²), have phases of approximately 77.5 degrees and 105.8 degrees, respectively (the second antenna 1812 being positioned further from a location of the receiver 120), while the first and second antennas 1812 in the second and third antenna groups 1814-2, 1814-3, which transmit to the first focal point ($F^1$), have phases of approximately 6.1 degrees and 17 degrees, respectively (the first antenna 1812 being positioned nearest a location of the receiver 120). As shown in FIG. 18D, the axial power profile has a local maximum of 43.83 dB at a distance of 0.29 meters from the antenna array 1810. Further, the axial power profile decreases to 41.33 dB at 1λ from the local maximum (i.e., 2.5 dB decrease). Accordingly, the axial power profile is not in compliance with the example power-focusing regulations defined above.

With reference to FIG. 18E, phases of some antennas 1812 of the antenna array 1810 have been adjusted so that the axial power profile complies with the example power-focusing regulations. In particular, the first and second antennas 1812 in the first and fourth antenna groups 1814-1, 1814-4, which transmit to the second focal point ($F^2$), have phases of approximately 93 degrees and 121 degrees, respectively, while the first and second antennas 1812 in the second and third antenna groups 1814-2, 1814-3, which transmit to the first focal point ($F^1$), have phases of approximately 6.1 degrees and 17 degrees, respectively. In other words, with respect to FIG. 18D, the phases of the first and second antennas 1812 in the first and fourth antenna groups 1814-1, 1814-4 have been adjusted. As shown in FIG. 18E, the axial power profile has a local maximum of 44.65 dB at a distance of 0.26 meters from the antenna array 1810. Further, the axial power profile decreases to 41.7 dB at 1λ from the local maximum (i.e., ~ 3 dB decrease). Accordingly, the axial power profile is in compliance with the example power-focusing regulations defined above. In comparison to FIG. 18D, the axial power profile of FIG. 18E has a higher local maximum with a more rapid decrease from the local maximum. Accordingly, phase adjustments can be used to increase power and also increase power roll off.

In some embodiments, power levels and phase adjustments are made in tandem to optimize the local maximum and the corresponding drop off. This level of adjustment allows the transmitter 102 to provide granular adjustments to the antenna array, to further focus the power profile created by the antenna array.

Figure 18F:
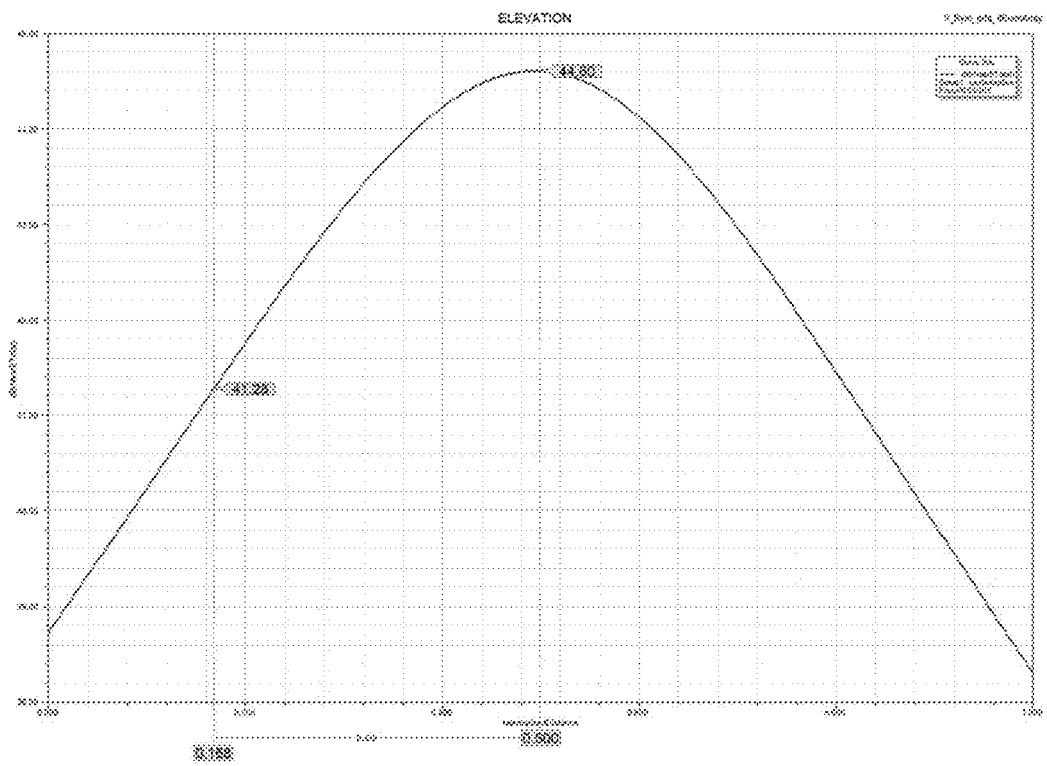
Figure 18G:
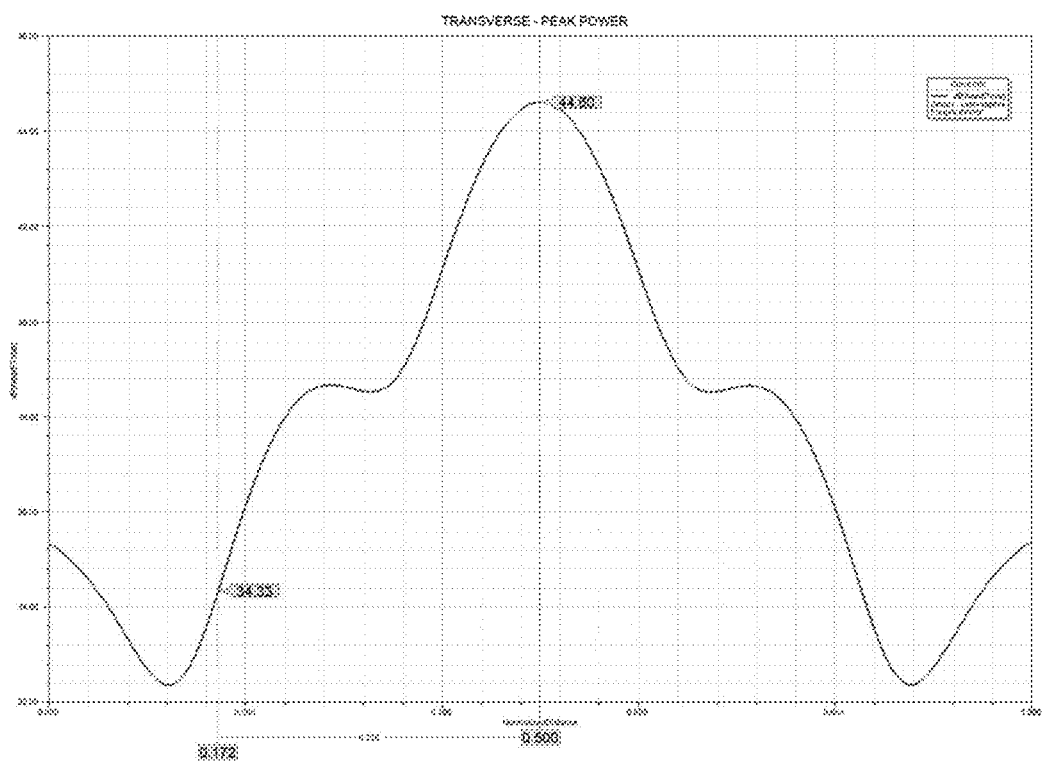

FIGS. 18F and 18G provide additional diagrams for the transmission scenario illustrated in FIG. 18E. For example, FIG. 18F shows an elevation of the power profile of FIG. 18E, normalized at the local maximum. FIG. 18G shows the power profile of FIG. 18E in the transverse plane, whereas FIG. 18E shows the power profile in the axial plane. These figures demonstrate that using the transmission techniques described herein ensures that the antenna array will satisfy the example power-focusing regulations in three dimensions.

FIGS. 19A-19E are block diagrams of a wireless power transmission system 1900 in accordance with some embodiments. The wireless power transmission system 1900 may be an example of the wireless power transmission system 100 (FIG. 1). For each figure, the wireless power transmission system 1900 includes a transmitter 102 and a receiver 120 (although the wireless power transmission system could include any number of transmitters and receivers, as discussed with reference to FIG. 1).

The transmitter 102 includes an antenna array 1910, which is an example of the antenna array 110. The antenna array 1910 includes a plurality of antenna groups 1914-1, 1914-2, ... 1914-$n$, where each antenna group 1914 includes a plurality of antennas 1912. The antennas 1912 in each of the groups can be the same antenna type or different antenna types (e.g., the antennas 1912-*a* . . . 1912-*d* may be any of the antennas described herein, as well as other conventional antenna designs). Additionally, the plurality of antennas 1912 in each antenna group 1914 may be coplanar and collinearly aligned with each other, and with all other antennas 1912 in the plurality of antenna groups 1914. Further, each respective antenna 1912 in each of the plurality of antenna groups 1914 can have a same polarization (i.e., they are also all co-polarized). The number of antennas 1912 in each antenna group 1914 may be the same (e.g., antenna array 1810, FIG. 18A) or different (e.g., antenna array 110, FIG. 1). In some embodiments, a largest cross-sectional dimension of the antenna array is between 2λ to 3λ (determined relative to an operating frequency of the antenna array). The antenna groups of the plurality of antenna groups 1914-1, 1914-2, . . . 1914-$n$ are spaced-apart by distances (e.g., $D^1$ and $D^2$, FIG. 1), which may be the same or different distances.

In certain embodiments, the antenna array is also configured as a multi-band antenna array and may also be configured to produce electromagnetic waves having different polarizations. For example, the antennas 1912-*a* to 1912-*d* may include co-polarized antennas that produce perpendicularly oriented radiation patterns (to produce EM radiation waves at a first frequency and with a first polarization), the antennas 1912-*e* to 1912-*h* may include the antennas 1500 (to produce EM radiation at a second frequency and with a second polarization), and the antennas 1912-*i* to 1912-1 may include co-polarized antennas that produce perpendicularly oriented radiation patterns (to produce EM radiation at the first frequency and with the first polarization). Numerous configurations are within the scope of this disclosure, as will be readily appreciated by one of skill in the art upon reading the descriptions provided herein.

Antennas 1912 within each of the antenna groups 1914 are configured to transmit electromagnetic waves 1916-A, 1916-B, ... 1916-N to a focal point (e.g., $F^1$ or $F^2$). In some embodiments, antennas 1912 from one or more antenna groups 1914 transmit electromagnetic waves to a first focal point ($F^1$), while antennas 1912 from one or more other antenna groups 1914 transmit electromagnetic waves to a second focal point ($F^2$) that is further from the antenna array 1910 relative to a location of the first focal point ($F^1$). The transmitter 102 is configured to assign a particular antenna group (or one or more antennas of a particular antenna group) to a focal point based on a location of the receiver 120 relative to the particular antenna group (or the antennas therein). In some embodiments, these assignments are predetermined based on a configuration/setup process for the antenna array that determines all appropriate beam settings to use based on various locations of the receiver device.

In some embodiments, antennas closest to the location of the receiver 120 can be instructed to transmit waves to the first focal point ($F^1$) (e.g., antennas therein satisfy a first threshold distance) while other antennas are instructed to transmit waves to the second focal point ($F^2$) (e.g., other antennas therein satisfy a second threshold distance but fail to satisfy the first threshold distance). For example, in FIG. 19A, the receiver 120 is aligned with a center of the antenna array 1910, and as a result, antennas 1912 in the antenna group 1914-2 are closest to the location of the receiver 120 relative to other antennas 1912 in the antenna array. Therefore, the antennas 1912 in the antenna group 1914-2 are assigned to transmit to the first focal point ($F^1$) while antennas 1912 in the other antenna groups 1914 are assigned to transmit to the second focal point ($F^2$). Each focal point may have antennas from one or more antenna groups assigned to it.

Furthermore, values for transmission characteristics (e.g., amplitude, phase, etc.) of electromagnetic waves transmitted by the assigned antennas are determined (or selected based on predetermined beam settings) based on the location of the receiver 120 relative to the assigned antennas and/or the focal point assignment. For example, the receiver 120 is equidistant from antennas 1912 in the antenna group 1914-2, and therefore a first value for amplitude (e.g., power level—a first transmission characteristic) is determined (or selected based on predetermined beam settings) for the antennas 1912 in the antenna group 1914-2. As such, the electromagnetic waves 1916-A are shown having a first dash pattern, indicating that the electromagnetic waves 1916-A are transmitted with the first value for amplitude. Values for other transmission characteristics, such as phase, may also be determined (or selected based on predetermined beam settings).

The receiver 120 is also equidistant from antennas 1912 in the first antenna group 1914-1 and the nth antenna group 1914-n. Therefore, a second value for amplitude, greater than the first value, is determined (or selected based on predetermined beam settings) for the antennas 1912 in these other antenna groups. Thus, the electromagnetic waves 1916-B and 1916-N are shown having a second dash pattern different from the first dashed pattern, indicating that the electromagnetic waves 1916-B and 1916-N are transmitted with the second value for amplitude. Again, values for other transmission characteristics, such as phase, may also be determined (or selected based on predetermined beam settings). The second value for amplitude is greater than the first value for amplitude, in the illustrated embodiment, because electromagnetic waves transmitted by the antennas 1912 in the first antenna group 1914-1 and the nth antenna group 1914-n travel further than electromagnetic waves transmitted by antennas 1912 in the second antenna group 1914-2.

In some embodiments, values for a particular transmission characteristic differ within a respective antenna group. For example, using the first antenna group 1914-1 as an example, the transmitter 102 may assign different values for amplitude (and/or phase) to the various antennas 1912-a . . . 1912-d in the first antenna group 1914-1 based on a proximity of the antennas 1912-a . . . 1912-d to the receiver 120 (or the assigned focal point). For example, a first antenna 1912 closest to the receiver 120 may be assigned a first value for amplitude, a second antenna 1912 further from the receiver 120 may be assigned a second value for amplitude greater than the first value for amplitude, and so on (e.g., if the first antenna group 1914-1 includes three or more antennas).

Figure 19B:
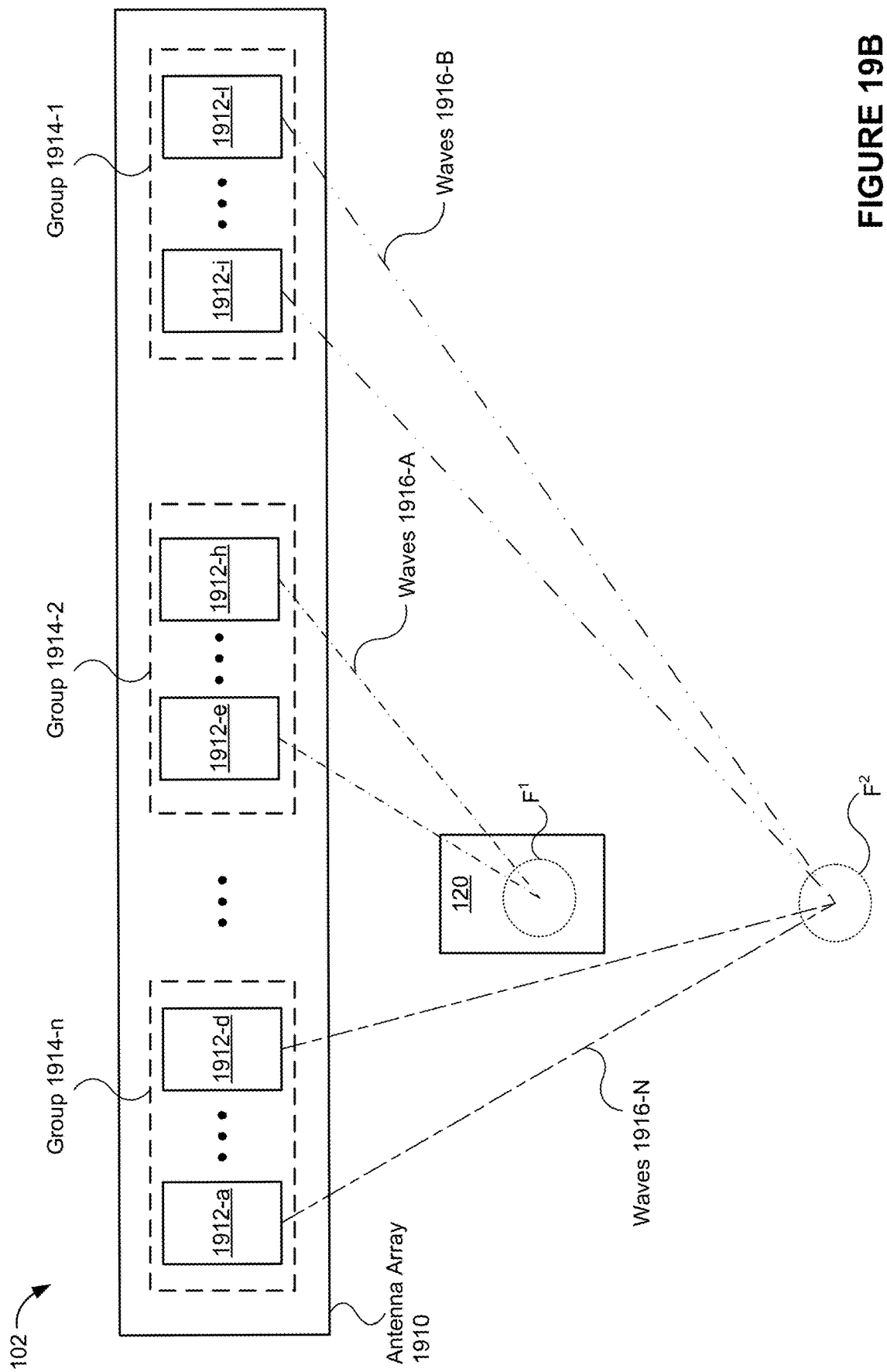

With reference to FIG. 19B, the receiver 120 is offset from the center of the antenna array 1910 (e.g., offset left of center). In this particular example, even though the receiver 120 is offset to the left, antennas 1912 in the antenna group 1914-2 are assigned to the first focal point ($F^1$) and antennas 1912 in the other antenna groups 1914 are assigned to the second focal point ($F^2$). However, the receiver 120 is not equidistant from the antennas 1912 in any particular group. Accordingly, the transmitter 102 may determine (or select) different values for a particular transmission characteristic for each antenna group.

For example, a first value for amplitude may be determined for the antennas 1912 in the antenna group 1914-2, a second value for amplitude may be determined for the antennas 1912 in the antenna group 1914-n, and a third value for amplitude may be determined for the antennas 1912 in the antenna group 1914-1. In this particular example, the third value is greater than the first and second values, and the second value may or may not be greater than the first value, depending on the receiver's 120 location relative to the second antenna group 1914-2 and the nth antenna group 1914-n. Thus, the electromagnetic waves 1916-A are shown having a first dash pattern, indicating that the electromagnetic waves 1916-A are transmitted with the first value for amplitude, the electromagnetic waves 1916-B are shown having a second dash pattern different from the first dashed pattern, indicating that the electromagnetic waves 1916-N are transmitted with the second value for amplitude, and the electromagnetic waves 1916-B are shown having a third dash pattern different from the first and second dashed patterns, indicating that the electromagnetic waves 1916-C are transmitted with the third value for amplitude.

In some embodiments, values for a particular transmission characteristic differ within a respective antenna group, as explained above. For example, within each antenna group 1914 illustrated in FIG. 19B, the transmitter 102 may assign different values for amplitude (and/or phase) to the various antennas 1912 in each antenna group 1914 based on a proximity of the antennas 1912-a . . . 1912-b in the antenna group 1914 to the receiver 120 (or the assigned focal point).

Figure 19C:
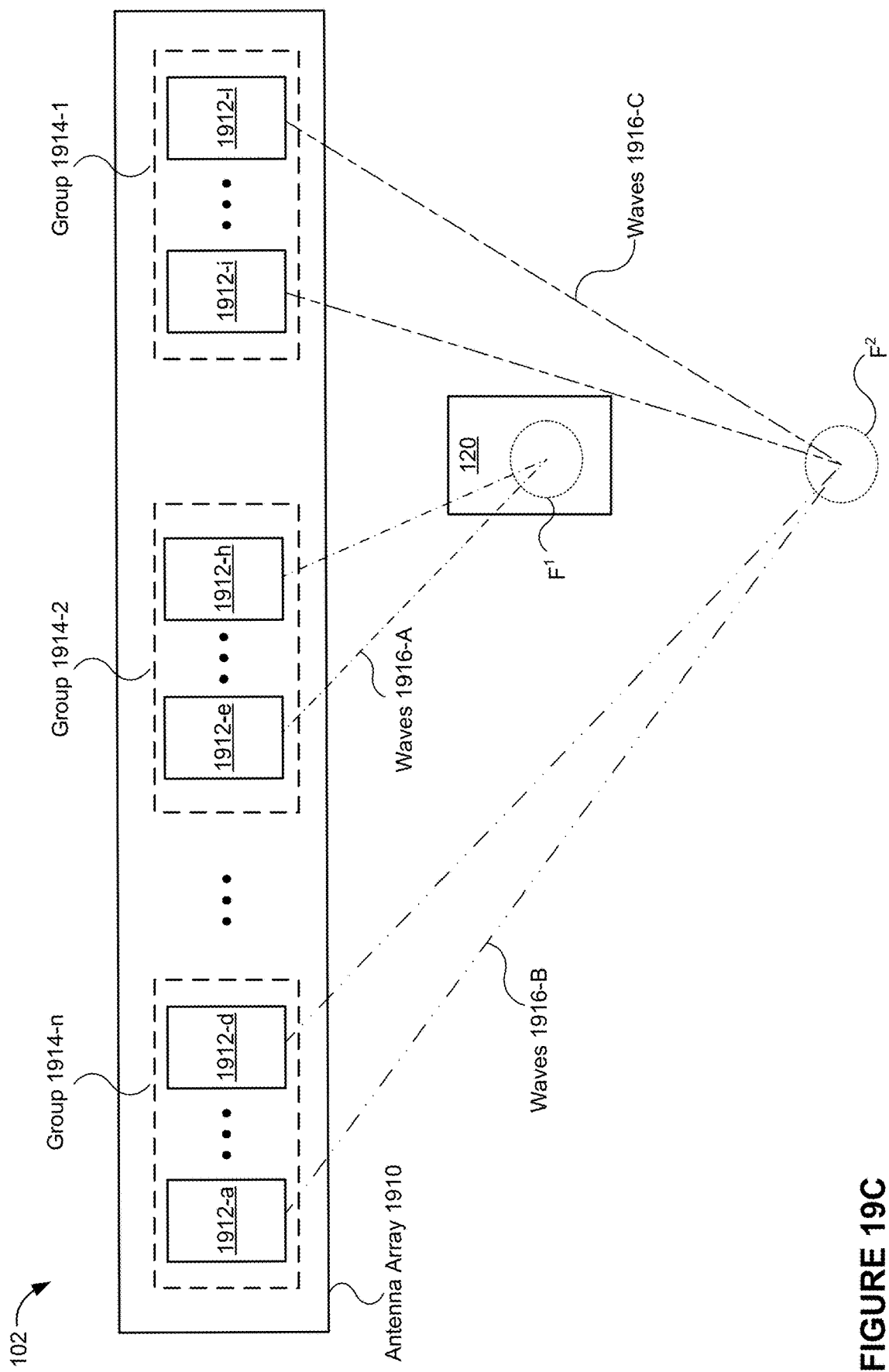

With reference to FIG. 19C, the receiver 120 is offset from the center of the antenna array 1910 (e.g., offset right of center). The scenario illustrated in FIG. 19C is opposite to the scenario illustrated in FIG. 19B. Therefore, for the sake of brevity, a duplicative description is not provided here.

Figure 19D:
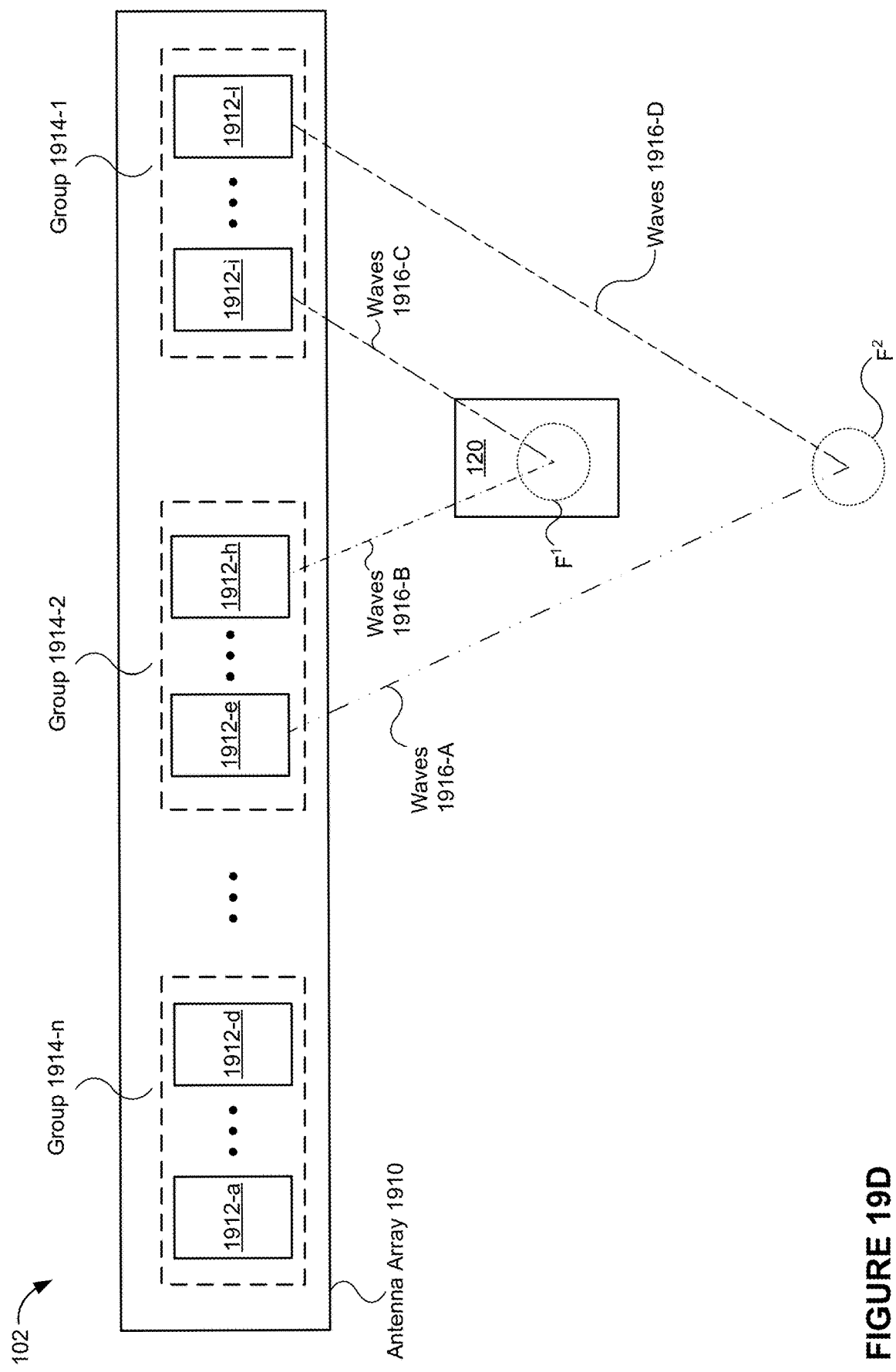

With reference to FIG. 19D, the receiver 120 is offset from the center of the antenna array 1910 (e.g., offset right of center). In this particular example, due to the receiver 120 being offset, at least one antenna 1912 in the second antenna group 1914-2 is assigned to the first focal point ($F^1$) and at least one antenna 1912 in the first antenna group 1914-1 is also assigned to the first focal point ($F^1$). Further, at least one antenna 1912 in the second antenna group 1914-2 is assigned to the second focal point ($F^2$) and at least one antenna 1912 in the first antenna group 1914-1 is also assigned to the second focal point ($F^2$). In such embodiments, the transmitter 102 may determine values for a particular transmission characteristic for each antenna 1912 within each antenna group 1914. For example, a first value for amplitude may be determined for a first antenna 1914 in the second antenna group 1914-2, a second value for amplitude may be determined for a second antenna 1914 in the second antenna group 1914-2 (and so on, if needed), a third value for amplitude may be determined for a first antenna 1914 in the first antenna group 1914-1, a fourth value for amplitude may be determined for a second antenna 1914 in the first antenna group 1914-1, and so on as needed. In some embodiments, the first, second, third, and fourth values are different, while in some embodiments one or more of the values are the same. For example, if the receiver 120 is equidistant from antennas 1912 in the first antenna group 1914-1 and antennas 1912 in the second antenna group 1914-2, then: (i) the first and third values may be the same and (ii) the second and fourth values may be the same, but nevertheless different from the first and third values.

In some embodiments, the position of the second focal point ($F^2$) relative to the first focal point ($F^1$) changes in accordance with a position of the receiver 120 relative to the antenna array 1910. For example, with reference to FIG. 19D, the second focal point ($F^2$) is shown vertically aligned with the first focal point ($F^1$), even though the receiver 120 is positioned right of the antenna array's 1910 center. However, the second focal point ($F^2$) may be shifted to the right when the receiver 120 is right of center, such that the second focal point ($F^2$) is no longer vertically aligned with the first focal point ($F^1$). The second focal point ($F^2$) may also be shifted to the left when the receiver 120 is left of center.

Although the illustrated embodiments show two focal points, in some embodiments, three or more focal points are used. For example, a first focal point is positioned at the receiver's location, while the other two focal points are positioned away from the receiver's location, with one of the two focal points to the left of the receiver's location and the other of the two focal points to the right of the receiver's location (i.e., a triangle of focal points is formed, with a tip of the triangle at the receiver's location). Additionally, for off center receiver locations, the second focal point ($F^2$) could in general be placed at a further apart point than the first focal point ($F^1$) in the direction of a line going from the center of the array to the receiver location, i.e., along a slanted line. Completely horizontal alignment of the two focal points may also be used (e.g., the first focal point is to the left of the receiver's location and the second focal point is to the right of the receiver's location). A general observation is that the further away the receiver is from the antenna array, the further away the second focal point has to be placed from the antenna array (i.e., gap between the first and second focal points increases).

In some embodiments, at least one antenna group 1914 is shut off. The at least one antenna group 1914 may be shut off when an edge-to-edge difference between a closest antenna of the least one antenna group 1914 and the receiver 120 satisfies a threshold (e.g., greater than the second threshold distance). In some embodiments, sufficient power can be transferred to the receiver using a subset (e.g., two) of the antenna groups and, therefore, the remaining antenna groups may be shut off for this added reason.

Figure 19E:
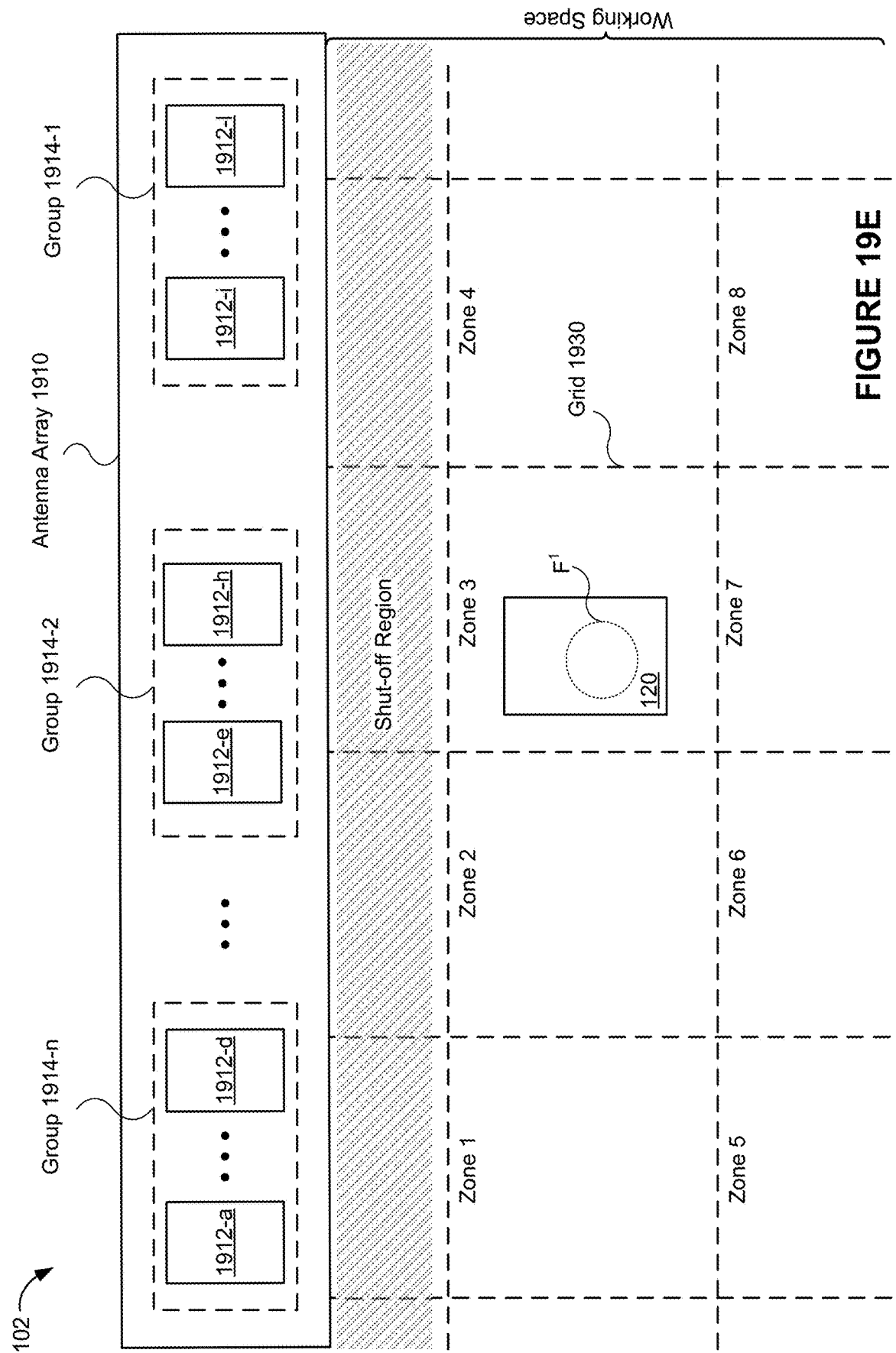

FIG. 19E illustrates a system for determining values for transmission characteristics in accordance with some embodiments. As shown, the transmitter 102 includes a working (e.g., operating) space, which is an area where the transmitter 102 may service devices in need of a charge. At least a portion of the working space may be divided into a grid 130, where each cell of the grid 1930 is associated with corresponding values for one or more transmission characteristics, which may be predetermined (e.g., by having the antenna array transmit to each respective cell of the grid 1930 using different values for transmission characteristics at each of the antenna groups until optimal power-focusing conditions are realized for the respective cell, and the values that allowed the antenna array to realize the optimal power-focusing conditions are then stored as the beam settings, which the antenna array will use once a receiver is determined to be within the respective cell).

In some embodiments, the corresponding values for the one or more transmission characteristics are stored in the transmitter's 102 memory (e.g., memory 206, FIG. 2A). In such embodiments, the transmitter 102 may include one or more beam lookup tables 240 (FIG. 2A) that store and organize the corresponding values in a data structure for later retrieval. The corresponding values may include values for antennas that transmit to the first focal point ($F^1$) and for antennas that transmit to the second focal point ($F^2$). In other words, a first set of corresponding values is selected to direct waves to the first focal point ($F^1$) and a second set of corresponding values is selected to direct waves to the second focal point ($F^2$).

To illustrate, the transmitter 102 can determine that the receiver 120 is located within Zone 3 of the grid 1930. In response to determining that the receiver 120 is located within Zone 3 of the grid 1930, the transmitter 102 determines (e.g., retrieves using a lookup table) values for the one or more transmission characteristics based on the receiver 120 being located within Zone 3 of the grid 1930. For example, the transmitter 102 may reference a beam lookup table 240 stored in memory 206 to find the appropriate values for one or more transmission characteristics when a receiver 120 is located within Zone 3 of the grid 1930.

In another example, the transmitter 102 may compute the appropriate values for the one or more transmission characteristics dynamically. The appropriate values may include values for antennas that transmit to the first focal point ($F^1$) (i.e., the receiver's 120 location) and for antennas that transmit to the second focal point ($F^2$). It is noted that the size of each cell can vary depending on the circumstance, and the example size dimensions depicted in FIG. 19E are non-limiting examples used for illustrative purposes.

In some embodiments, each antenna group is shut off when the transmitter 102 detects a person or animal (or some other sensitive object) within a predefined region of the working space (e.g., shaded "Shut-off Region" shown in FIG. 19E). Each antenna group is shut off to avoid exposing any sensitive objects to the electromagnetic energy, e.g., because a power level of the electromagnetic energy in the Shut-off Region is higher than a power level of the electromagnetic energy in other regions of the working space when the antenna array is operating (e.g., area left of Local Min in FIG. 17B may correspond to the "Shut-Off area"). The predefined region may extend the length (or some distance less than the length) of the transmitter 102.

FIG. 20 is a flow diagram showing a method 2000 of wireless power transmission in accordance with some embodiments. Operations (e.g., steps) of the method 2000 may be performed by a controller of a transmitter (e.g., processor(s) 204 of transmitter 102, FIG. 2A, which may be the single integrated circuit discussed above in reference to FIG. 2A). At least some of the operations shown in FIG. 20 correspond to instructions stored in a computer memory or computer-readable storage medium (e.g., memory 206 of the transmitter 102, FIG. 2A).

The method 2000 is performed (2002) at a wireless-power-transmitting device (e.g., transmitter 102, FIG. 1) that includes an antenna array (e.g., antenna array 1910, FIG. 19A), the antenna array including a first antenna group (e.g., antenna group 1914-2, FIG. 19A) of at least two antennas (e.g., antennas 1912-e . . . 1912-h shown in the antenna group 1914-n) and a second antenna group of at least two antennas (e.g., antennas 1912-a . . . 1912-d shown in antenna group 1914-n) distinct from the first antenna group. The wireless-power-transmitting device may be in communication with a controller (e.g., processor(s) 204 of transmitter 102, FIG. 2A) that performs (or causes performance of) the operations discussed below. In some embodiments, the at least two antennas in the first antenna group and the at least two antennas in the second antenna group are co-planar (e.g., each antenna extends away from the antenna array 110 to the same height, thereby having a common plane). In addition, the at least two antennas in the first antenna group and the at least two antennas in the second antenna group may be collinearly aligned along an axis (e.g., antennas 1912 shown in FIG. 19A are collinearly aligned along an axis running the length of the antenna array 1910).

In some embodiments, antennas within each group are also co-polarized and have perpendicular radiation patterns, as discussed in more detail with respect to FIGS. 3-9. Any of the antennas exhibiting these characteristics (such as those discussed with respect to FIGS. 10-16) may be used within these antenna groups. In some embodiments, the antenna array is a miniaturized antenna array in which each of the antennas in the first and second antenna groups of antennas has a largest dimension of less than 0.25λ in size.

In some embodiments, the antenna array includes a third antenna group with at least two antennas (e.g., antennas 1912-i . . . 1912-1 shown in antenna group 1914-1, FIG. 19A) distinct from the first and second antenna groups. In such embodiments, the first antenna group (e.g., group 1914-2, FIG. 19A) is positioned between the second and third antenna groups within the antenna array, and the first antenna group is separated from the second and third antenna groups by at least a non-zero spacing distance. Furthermore, the at least two antennas in the first antenna group are positioned in a central region of the antenna array, and the respective at least two antennas of each of the second and third antenna groups are positioned near opposing edge regions of the antenna array. In some embodiments, the second and third antenna groups include a same number of antennas, and the first antenna group includes fewer than the same number of antennas (or vice versa). Alternatively, in some embodiments, each antenna group includes the same number of antennas (e.g., antenna groups 1814-1-1814-4 include the same number of antennas, FIG. 18A).

In some embodiments, the method 2000 includes receiving (2004) a signal from a wireless-power-receiving device (e.g., receiver 120, FIG. 1) from which a location of the wireless-power-receiving device is determined. In some embodiments, the transmitter 102 determines the location of the wireless-power-receiving device based on signal strength of the signal, triangulation, and/or response time (e.g., the receiver 120 timestamps the signal when sent which is then compared against a timestamp of the signal when it is received at the transmitter). Alternatively or in addition, the method 2000 includes (i) detecting a phase of the signal and (ii) determining the location of the receiver device relative to the antenna array based on the phase of the signal. In some embodiments, the receiving device transmits its precise location (e.g., within 0.5 cm) to the transmitting device. In some embodiments, the receiving device includes a location detection device, such as a GPS (global positioning satellite or the like) or other geo-location receiver, for determining its location, and sends corresponding GPS-data to the transmitter in the signal. In some embodiments, the location is an estimated or approximate location of the wireless-power-receiving device. In such embodiments, the receiver may be determined to be within a particular predetermined portion of the transmission field of the transmitter 102, based on the estimation (e.g., determined to be within one of the Zones/cells illustrated in FIG. 19E).

In some embodiments (in addition to or as an alternative to step 2004), the location of the wireless-power-receiving device is determined by first determining an optimal phase on each transmitting antenna element that maximizes received power, which is accomplished by rotating the feed phase of antenna elements and monitoring the received power. There are several ways of doing the above, including: (i) starting with all antennas activated (i.e., on), transmit at a known or arbitrary phase, sequentially scan the phase for each antenna element and monitor received power, and record the optimal phase that maximizes received power; (ii) starting with only one reference antenna activated, sequentially activate a second antenna, scan the phase of the second antenna while monitoring received power, record the optimal phase that maximizes received power, switch the antenna off, and repeat this procedure until all transmitting antennas have been calibrated; and (iii) starting with only one reference antenna activated, sequentially activate each antenna while scanning the phase of the newly activated antenna, and then keep adding antennas until all transmitting antennas are activated (or any combination of (i)-(iii)). Once the optimal phase that maximizes received power is determined, then the method 2000 may include determining the location of the wireless-power-receiving device based on the determined optimal phase.

In some embodiments, the wireless-power-receiving device includes an electronic device (e.g., mobile phone, watch, TV remote, battery, etc.) and wireless power receiving circuitry (e.g., a receiver 120, which includes power receiver antennas, rectifier circuitry, and a power converter) that is coupled with the electronic device (e.g., embedded in or integrated with the electronic device).

In some embodiments, the method 2000 includes, based on the location of the wireless-power-receiving device, selecting (2006) (i) a first value for a first transmission characteristic that is used for transmission of electromagnetic waves by the at least two antennas in the first antenna group, and (ii) a second value, distinct from the first value, for the first transmission characteristic that is used for transmission of electromagnetic waves by the at least two antennas in the second antenna group. For example, as discussed below, these values can be a preferred amplitude, phase, and/or polarization of the signal. In some embodiments, the second value is greater than the first value (e.g., when the receiver 120 is closest to the first antenna group). Additionally, the first and second values can be determined dynamically or they can be predetermined. Moreover, in some embodiments, the first and second values are stored in a lookup table (e.g., beam lookup table(s) 240, FIG. 2A). In such embodiments, selecting (2006) the first and second values includes obtaining the first and second values from the lookup table.

In some embodiments, before selecting (2006) the first and second values, the method 2000 includes determining that the location of the wireless-power-receiving device is within a first cell of a plurality of cells (e.g., Zone 3 of the grid 1930, FIG. 19E). In such embodiments, selecting (2006) the first and second values includes using values assigned the first cell, which may be stored in the lookup table. Selecting values for transmission characteristics using the grid 1930 is discussed in detail with reference to FIG. 19E.

The first transmission characteristic can be amplitude (e.g., power level value) for the transmission of electromagnetic waves. In some embodiments, the wireless-power-transmitting device selects additional values for other transmission characteristics as well. For example, the wireless-power-transmitting device may also select respective values for phase, polarization, etc. Selecting values for transmission characteristics is discussed in further detail above with reference to FIGS. 19A-19E.

In some embodiments, the method 2000 includes transmitting (2008) to the location of the wireless-power-receiving device, by the at least two antennas in the first antenna group, first electromagnetic waves having the first value for the first transmission characteristic. For example, with reference to FIG. 19A, antennas 1912-e . . . 1912-h shown in antenna group 1914-2 are transmitting electromagnetic waves 1916-A to a location of the receiver 120 (e.g., transmit to a first focal point ($F^1$)). The electromagnetic waves 1916-A are shown having a first dash pattern, indicating that the electromagnetic waves 1916-A are transmitted with the first value for the first transmission characteristic.

In some embodiments, the method 2000 includes transmitting (2010) to a focal point that is further from the wireless-power-transmitting device than the location of the wireless-power-receiving device, by the at least two antennas in the second antenna group, second electromagnetic waves with the second value for the first transmission characteristic. For example, with reference to FIG. 19A, antennas 1912-a . . . 1912-d shown in antenna group 1914-n (or antennas 1912-i . . . 1912-1 shown in antenna group 1914-1) are transmitting electromagnetic waves 1916-N to a second focal point ($F^2$), where $F^2$ is further from the transmitter 102 than the location of the receiver 120 (a first focal point ($F^1$) is at the receiver's location). The electromagnetic waves 1916-B are shown having a second dash pattern different from the first dashed pattern, indicating that the electromagnetic waves 1916-B are transmitted with the second value for the first transmission characteristic. Transmitting electromagnetic waves to focal points is discussed in further detail above with reference to FIGS. 18A-18C and 19A-19E.

The wireless-power-receiving device uses energy from at least the first electromagnetic waves to power or charge the wireless-power-receiving device. Stated another way, transmission of the first and second electromagnetic waves produces a level of electromagnetic energy near the location of the wireless-power-receiving device (e.g., as shown in FIG. 17B's power profile 1702) and the wireless-power-receiving uses the EM energy (i.e., at least some of the level of EM energy) to power or charge the wireless-power-receiving device.

In some embodiments, before selecting (2006) the first and second values and the transmitting steps (2008) and (2010), the method 2000 includes determining that the location of the wireless-power-receiving device is a sufficient distance away from the antenna array (e.g., a separation distance between the wireless-power-receiving device and the antenna array satisfies a threshold separation distance, such as the receiving device being located 12 cm or more away from the transmitting device). In accordance with a determination that the location of the wireless-power-receiving device is a sufficient distance away from the antenna array, the method 2000 proceeds to the selecting (2006) and the transmitting steps (2008) and (2010). And, in accordance with a determination that the location of the wireless-power-receiving device is not a sufficient distance away from the antenna array (i.e., the wireless-power-receiving device is close to the antenna array, such as closer that one wavelength or a half wavelength), the method 2000 includes transmitting to the location of the wireless-power-receiving device, by the at least two antennas in the first and second antenna groups, the first and second electromagnetic waves (i.e., a single focal point is used).

In some embodiments, the location of the wireless-power-receiving device is positioned along an axis extending away from the antenna array and the focal point is further from the antenna array along the axis. In other words, the location of the wireless-power-receiving device and the focal point are co-axially positioned with respect to the wireless-power-transmitting device. For example, with reference to FIG. 19A, the location of the wireless-power-receiving device and the second focal point ($F^2$) are vertically aligned. Alternatively, in some embodiments, the focal point is offset from the position of the wireless-power-receiving device in a direction (e.g., as shown in FIGS. 19C and 19D).

In some embodiments, transmission of the first and second electromagnetic waves generates a local minimum of electromagnetic energy at a first distance from the antenna array (e.g., Local Min, FIG. 17B), and a local maximum of electromagnetic energy at a second distance greater than the first distance from the antenna array (e.g., Local Max, FIG. 17B). Further, the location of the wireless-power-receiving device may be at a third distance greater that the second distance from the antenna array. For example, with reference to FIG. 17B, the local minimum and maximum are formed at two different distances, and the location of the receiver 120 is at some distance greater than the two different distances.

Moreover, in some embodiments, the first and second electromagnetic waves have a wavelength ($\lambda$) and a difference between the second and third distances is less than or equal to $m*\lambda$, where "m" is a number that may range from approximately 0.25 to 5. Furthermore, in some embodiments, the local maximum of electromagnetic energy has a first power level and transmission of the first and second electromagnetic waves generates a concentration (e.g., a sphere) of electromagnetic energy having a second power level at a distance of $m*\lambda$ from the local maximum. The second power level is less than the first power level by a predetermined amount. The predetermined amount may range from 0.5 dB to 5 dB, although greater values are possible depending on the application (e.g., depending on a size and feed power of the antenna array). The concentration of electromagnetic energy is discussed in further detail above with reference to FIGS. 17A-17B.

In those embodiments where the antenna array includes the third antenna group, the method 2000 includes transmitting (2012), to the focal point that is further from the wireless-power-transmitting device than the location of the wireless-power-receiving device, by the at least two antennas in the third antenna group, third electromagnetic waves with the second value for the first transmission characteristic. For example, with reference to FIG. 19A, antennas 1912-i . . . 1912-1 shown in antenna group 1914-1 are transmitting electromagnetic waves 1916-B to the second focal point ($F^2$), where $F^2$ is further from the transmitter 102 than the location of the receiver 120. The electromagnetic waves 1916-B are shown having the second dash pattern different from the first dashed pattern, indicating that the electromagnetic waves 1916-N are transmitted with the second value for the first transmission characteristic. In some embodiments, electromagnetic waves 1916-B are transmitted with a third value for the first transmission characteristic different from the first and second values (e.g., when the receiver 120 is offset left of center or right of center, FIGS. 19C and 19D).

In some embodiments, the selecting (2006) also includes selecting respective phase settings for (i) each antenna of the at least two antennas in the first antenna group, (ii) each antenna of the at least two antennas in the second antenna group, and (iii) optionally each antenna of the at least two antennas in the third antenna group. Further, in some embodiments, respective phase settings for the at least two antennas in the second antenna group and respective phase settings for the at least two antennas of the third antenna group are the same. However, in some embodiments, the respective phase settings for the at least two antennas in each group may differ. Selecting phase settings is discussed in further detail above with reference to FIGS. 18D and 18E.

As noted above, in some embodiments, antennas within each group of the antenna array are also co-polarized (i.e., they have a same polarization). The inventors have discovered that the selection of the same polarization (whether each antenna should be horizontally or vertically polarized) is important for achieving a highest level of radiation efficiency (as was discussed above), and that the same polarization that achieves the highest level of radiation efficiency is dependent on which array group configuration is used. For example, when the 3-2-3 array group configuration is used (e.g., three antennas in a first antenna group, two antennas in a second antenna group, and three antenna in a third antenna group, as shown in FIG. 15H-1), the inventors have discovered that the same polarization is horizontal relative to a surface of the antenna array on which of the antennas of each of the groups is placed (e.g., as shown on FIG. 15H-1, the combination of using a 3-2-3 array group configuration with all antennas in the array being horizontally polarized results in a radiation efficiency of 77%). As another example, when the 2-2-2-2 array group configuration is used, the same polarization is vertical relative to a surface of the antenna array on which the antennas of each of the groups is placed (e.g., as shown on FIG. 15H-3, the combination of using a 2-2-2-2 array group configuration with all antennas in the array being vertically polarized results in a radiation efficiency of 64%). These specific array group configurations are just examples and numerous other configurations are also described herein and will be readily apparent to one of skill in the art upon reading this description.

Figure 21:
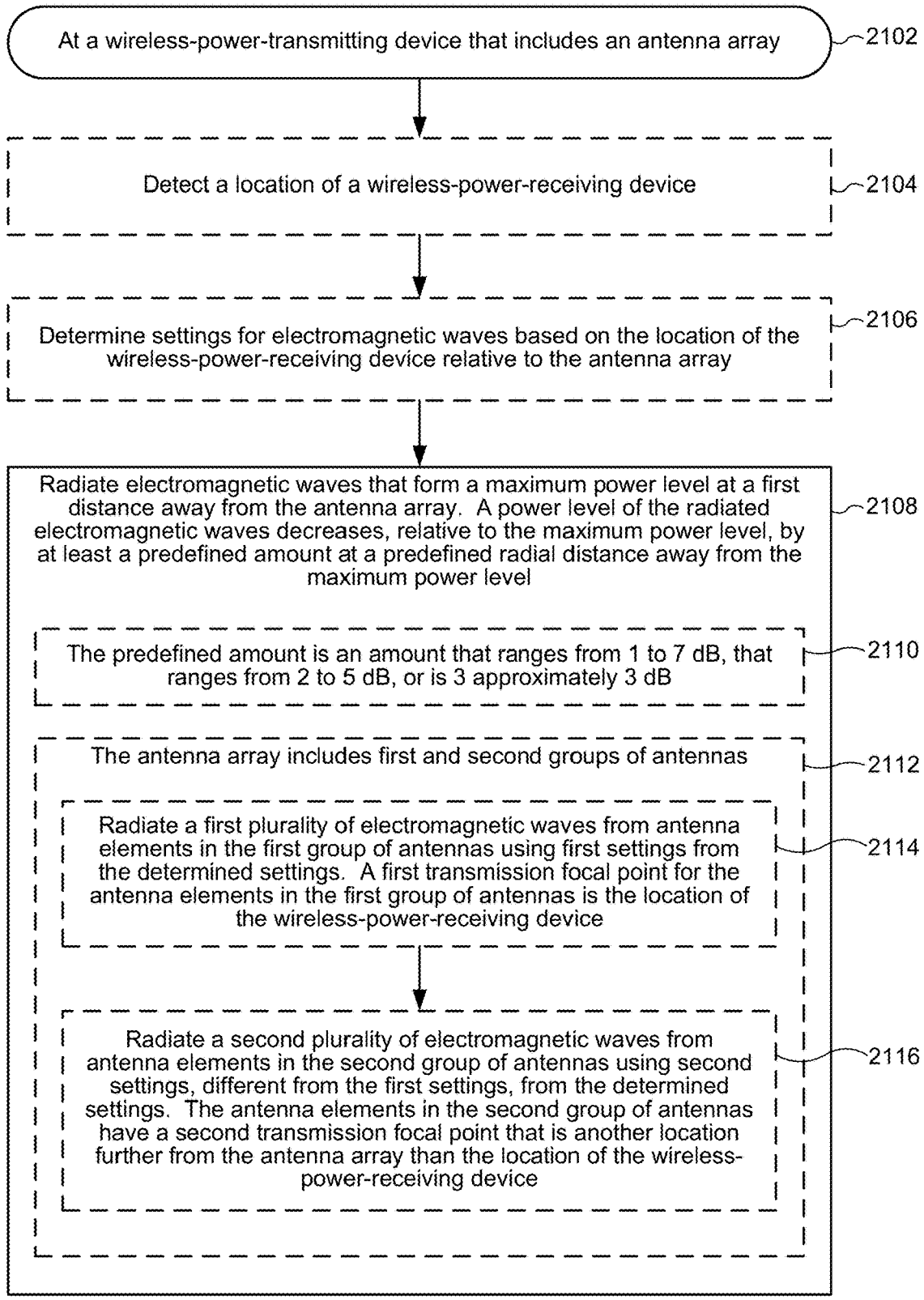
FIG. 21 is another flow diagram showing a method of wireless power transmission in accordance with some embodiments.

FIG. 21 is a flow diagram showing a method 2100 of wireless power transmission in accordance with some embodiments. Operations (e.g., steps) of the method 2100 may be performed by a controller of a transmitter (e.g., processor(s) 204 of transmitter 102, FIG. 2A, which may be the single integrated circuit discussed above in reference to FIG. 2A). At least some of the operations shown in FIG. 21 correspond to instructions stored in a computer memory or computer-readable storage medium (e.g., memory 206 of the transmitter 102, FIG. 2A).

The method 2100 is performed (2102) at a wireless-power-transmitting device (e.g., transmitter 102, FIG. 1) that includes an antenna array (e.g., antenna array 1910, FIG. 19A, antenna array 1810, FIG. 18A, etc.). In some embodiments, the antenna array includes a first antenna group of at least two antennas and a second antenna group of at least two antennas distinct from the first antenna group (2112). The first and second antenna groups may be composed of one or more of the antenna groups illustrated in FIGS. 18A-19E. A structure of the wireless-power-transmitting device is described in further detail above with reference to the method 2000 (e.g., step 2002).

In some embodiments, the method 2100 includes detecting (2104) a location of a wireless-power-receiving device. For example, the wireless-power-receiving device may send a signal to the wireless-power-transmitting device from which a location of the wireless-power-receiving device is determined. Detecting a location of the wireless-power-receiving device is discussed in further detail above with reference to the method 2000 (e.g., step 2004).

In some embodiments, the method 2100 includes determining (2106) settings for electromagnetic waves based on the location of the wireless-power-receiving device relative to the antenna array. For example, the wireless-power-transmitting device may select values for transmission characteristics used for transmission of the electromagnetic waves. Selecting values for transmission characteristics is discussed in further detail above with reference to the method 2000 (e.g., step 2006) and FIGS. 19A-19E.

The method 2100 includes radiating (2108) electromagnetic waves that form a maximum power level at a first distance away from the antenna array. A power level of the radiated electromagnetic waves decreases, relative to the maximum power level, by at least a predefined amount at a predefined radial distance away from the maximum power level. For example, with reference to FIGS. 17A and 17B, the predefined radial distance from the maximum power level ($P^1$) is, say, $1\lambda$, and a power level at $P^2$ drops by a predefined amount from the maximum power level ($P^1$) (e.g., the drop is shown in FIG. 17B). In some embodiments, the predefined amount is an amount that ranges from approximately 1 to 7 dB. In some other embodiments, the predefined amount is an amount that ranges from approximately 2 to 5 dB. In some other embodiments, the predefined amount is approximately 3 dB (2110). $P^1$ and $P^2$ are discussed in further detail above with reference to FIGS. 17A-18A.

As noted above, in some embodiments, the antenna array includes first and second groups of antennas (2112). In such embodiments, when the wireless-power-transmitting device radiates the electromagnetic waves (2108), the wireless-power-transmitting device radiates (2114) a first plurality of electromagnetic waves from antenna elements in the first group of antennas using first settings from the determined settings. A first transmission focal point for the antenna elements in the first group of antennas is the location of the wireless-power-receiving device (e.g., $F^1$, FIG. 18A).

Further, the wireless-power-transmitting device also radiates (2116) a second plurality of electromagnetic waves from antenna elements in the second group of antennas using second settings, different from the first settings, from the determined settings. The antenna elements in the second group of antennas have a second transmission focal point (e.g., $F^2$, FIG. 18A) that is another location further from the antenna array than the location of the wireless-power-receiving device. As an example, with reference to FIG. 18B, the antennas 1812 in the first and fourth antenna groups 1814-1, 1814-4 transmit electromagnetic waves with 3 watts of power to the second focal point ($F^2$), while the antennas 1812 in the second and third antenna groups 1814-2, 1814-3 transmit electromagnetic waves with 1 watt of power to the first focal point ($F^1$). As such, the antennas 1812 in antenna groups furthest away from the receiver's 120 location transmit electromagnetic waves with a higher power level, relative to the antennas 1812 in antenna groups closest to the receiver's 120 location. Additional examples are discussed above with reference to FIGS. 18C-18E, and FIGS. 19A-19E.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific embodiments.

However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of wirelessly delivering power to an electronic device, the method comprising:
at a wireless-power-transmitting device that includes an antenna array, the antenna array including a first antenna group of at least two antennas and a second antenna group of at least two antennas distinct from the first antenna group, wherein the wireless-power-transmitting device is in communication with a controller:
based on a location of a wireless-power-receiving device, selecting by the controller:
(i) a first value for a first transmission characteristic that is used for transmission of electromagnetic waves by the at least two antennas in the first antenna group, and
(ii) a second value, distinct from the first value, for the first transmission characteristic that is used for transmission of electromagnetic waves by the at least two antennas in the second antenna group;
transmitting to the location of the wireless-power-receiving device, by the at least two antennas in the first antenna group, first electromagnetic waves with the first value for the first transmission characteristic; and
transmitting to a focal point that is further from the wireless-power-transmitting device than the location of the wireless-power-receiving device, by the at least two antennas in the second antenna group, second electromagnetic waves with the second value for the first transmission characteristic,
wherein the wireless-power-receiving device uses energy from at least the first electromagnetic waves to power or charge the wireless-power-receiving device.

2. The method of claim 1, wherein the at least two antennas in the first antenna group and the at least two antennas in the second antenna group are the same type of antenna.

3. The method of claim 1, wherein:
the antenna array further comprises a third antenna group of at least two antenna elements, and
the method further comprises transmitting, to the focal point that is further from the wireless-power-transmitting device than the location of the wireless-power-receiving device, by the at least two antennas in the third antenna group, third electromagnetic waves with the second value for the first transmission characteristic.

4. The method of claim 3, wherein:
the first antenna group is positioned between the second and third antenna groups within the antenna array, and
the first antenna group is separated from the second and third antenna groups by at least a non-zero spacing distance.

5. The method of claim 4, wherein the second value is greater than the first value.

6. The method of claim 5, wherein:
the selecting also includes selecting respective phase settings for (i) each antenna of the at least two antennas in the first antenna group, (ii) each antenna of the at least two antennas in the second antenna group, and (iii) each antenna of the at least two antennas in the third antenna group, and
the first, second, and third electromagnetic waves are transmitted using the respective phase settings.

7. The method of claim 6, wherein respective phase settings for the at least two antennas in the second antenna group and respective phase settings for the at least two antennas of the third antenna group are the same.

8. The method of claim 3, wherein the second and third antenna groups include a same number of antennas, and the first antenna group includes fewer than the same number of antennas.

9. The method of claim 1, wherein:
the location of the wireless-power-receiving device is positioned along an axis extending away from the antenna array; and
the focal point is further from the antenna array along the axis.

10. The method of claim 1, wherein the at least two antennas in the first antenna group and the at least two antennas in the second antenna group are co-planar.

11. The method of claim 1, wherein the first and second values are predetermined.

12. The method of claim 11, wherein:
the first and second values are stored in a lookup table; and
selecting the first and second values comprises obtaining, by the controller, the first and second values from the lookup table.

13. The method of claim 1, wherein:
transmission of the first and second electromagnetic waves generates:
a local minimum of electromagnetic energy at a first distance from the antenna array; and
a local maximum of electromagnetic energy at a second distance greater than the first distance from the antenna array; and
the location of the wireless-power-receiving device is at a third distance greater that the second distance from the antenna array.

14. The method of claim 13, wherein:
the first and second electromagnetic waves have a wavelength ($\lambda$); and
a difference between the second and third distances is less than or equal to $1\lambda$.

15. The method of claim 14, wherein:
the local maximum of electromagnetic energy has a first power level;
transmission of the first and second electromagnetic waves generates a sphere of electromagnetic energy having a second power level at a distance of $1\lambda$ from the local maximum; and
the second power level is less than the first power level by a predetermined amount.

16. The method of claim 3, wherein:
the at least two antennas in the first antenna group are positioned in a central region of the antenna array;
respective at least two antennas of each of the second and third antenna groups are positioned in opposing edge regions of the antenna array.

17. The method of claim 1, wherein the selecting is performed upon determining that the wireless-power-receiving device is located within a wireless-power-transmission range of the wireless-power-transmitting device.

18. The method of claim 1, further comprising, at the wireless-power-transmitting device:
- receiving, via an antenna of the antenna array, a signal from the wireless-power-receiving device;
- detecting a phase of the signal; and
- determining, by the controller, the location of the wireless-power-receiving device relative to the antenna array based on the phase of the signal.

19. A wireless-power-transmitting device comprising:
- an antenna array including a first antenna group of at least two antennas and a second antenna group of at least two antennas distinct from the first antenna group;
- one or more processors; and
- memory storing one or more programs for execution by the one or more processors, the one or more programs including instructions that, when executed by the one or more processors, cause a wireless-power-transmitting device to:
  - based on a location of a wireless-power-receiving device, select:
    - (i) a first value for a first transmission characteristic that is used for transmission of electromagnetic waves by the at least two antennas in the first antenna group, and
    - (ii) a second value, distinct from the first value, for the first transmission characteristic that is used for transmission of electromagnetic waves by the at least two antennas in the second antenna group;
  - transmit to the location of the wireless-power-receiving device, by the at least two antennas in the first antenna group, first electromagnetic waves with the first value for the first transmission characteristic; and
  - transmit to a focal point that is further from the wireless-power-transmitting device than the location of the wireless-power-receiving device, by the at least two antennas in the second antenna group, second electromagnetic waves with the second value for the first transmission characteristic,
- wherein the wireless-power-receiving device uses energy from at least the first electromagnetic waves to power or charge the wireless-power-receiving device.

20. A non-transitory computer-readable storage medium, storing one or more programs configured for execution by one or more processors of a wireless-power-transmitting device that includes an antenna array including a first antenna group of at least two antennas and a second antenna group of at least two antennas distinct from the first antenna group, the one or more programs including instructions that, when executed by the one or more processors of the wireless-power-transmitting device, cause the wireless-power-transmitting device to:
- based on a location of the wireless-power-receiving device, select:
  - (i) a first value for a first transmission characteristic that is used for transmission of electromagnetic waves by the at least two antennas in the first antenna group, and
  - (ii) a second value, distinct from the first value, for the first transmission characteristic that is used for transmission of electromagnetic waves by the at least two antennas in the second antenna group;
- transmit to the location of the wireless-power-receiving device, by the at least two antennas in the first antenna group, first electromagnetic waves with the first value for the first transmission characteristic; and
- transmit to a focal point that is further from the wireless-power-transmitting device than the location of the wireless-power-receiving device, by the at least two antennas in the second antenna group, second electromagnetic waves with the second value for the first transmission characteristic,
- wherein the wireless-power-receiving device uses energy from at least the first electromagnetic waves to power or charge the wireless-power-receiving device.

\* \* \* \* \*